US009904914B1

(12) United States Patent
Bent, II et al.

(10) Patent No.: US 9,904,914 B1
(45) Date of Patent: Feb. 27, 2018

(54) NOTIFICATION SYSTEM AND METHOD

(71) Applicant: Island Intellectual Property, LLC, Manhasset, NY (US)

(72) Inventors: Bruce R. Bent, II, New York, NY (US); Charles R. Buarque de Macedo, Ardsley, NY (US)

(73) Assignee: ISLAND INTELLECTUAL PROPERTY, LLC, Manhasset, NY (US)

( * ) Notice: Subject to any disclaimer, the term of this patent is extended or adjusted under 35 U.S.C. 154(b) by 0 days.

(21) Appl. No.: 15/698,227

(22) Filed: Sep. 7, 2017

Related U.S. Application Data

(62) Division of application No. 14/933,703, filed on Nov. 5, 2015.

(60) Provisional application No. 62/107,027, filed on Jan. 23, 2015.

(51) Int. Cl.
*G06Q 40/00* (2012.01)
*G06Q 20/10* (2012.01)

(52) U.S. Cl.
CPC .................................. *G06Q 20/10* (2013.01)

(58) Field of Classification Search
None
See application file for complete search history.

(56) References Cited

U.S. PATENT DOCUMENTS

| 4,232,367 A | 11/1980 | Youden et al. |
| 4,346,442 A | 8/1982 | Musmanno |
| 4,376,978 A | 3/1983 | Musmanno |
| 4,400,017 A | 8/1983 | Pendergrass |

(Continued)

FOREIGN PATENT DOCUMENTS

| JP | 10-049590 A | 2/1998 |
| WO | WO-95/23379 A1 | 8/1995 |
| WO | WO-99/18529 A1 | 4/1999 |
| WO | WO-02/42952 A1 | 5/2002 |
| WO | WO-03/012580 A2 | 2/2003 |
| WO | WO-2005/006111 A2 | 1/2005 |

OTHER PUBLICATIONS

"The US Banking System: origin, development and regulation", History Now, Jun. 2010.

(Continued)

*Primary Examiner* — Chika Ojiaku
(74) *Attorney, Agent, or Firm* — Amster, Rothstein & Ebenstein, LLP

(57) ABSTRACT

Systems, methods, and program products for performing cash sweep transactions with customer control are disclosed. A deposit sweep computer system may determine first allocations of funds for a plurality of customers. The system may determine for a first subset of the customers that their funds are allocated to respective different depository institutions than previously used for the respective customer. The system may generate and transmit to client devices associated with the first subset of customers machine-readable instructions to render respective destination institution management graphical user interfaces providing an indication of the respective different depository institutions along with accept options and reject options. The system may receive one or more selections of accept options or reject options. The system may then determine and execute second allocations based at least in part upon the first allocations and the one or more selections of the reject options.

24 Claims, 37 Drawing Sheets

(56) References Cited

U.S. PATENT DOCUMENTS

| | | |
|---|---|---|
| 4,597,046 A | 6/1986 | Musmanno et al. |
| 4,674,044 A | 6/1987 | Kalmus et al. |
| 4,694,397 A | 9/1987 | Grant et al. |
| 4,700,297 A | 10/1987 | Hagel et al. |
| 4,751,640 A | 6/1988 | Lucas et al. |
| 4,774,663 A | 9/1988 | Musmanno et al. |
| 4,953,085 A | 8/1990 | Atkins |
| 4,985,833 A | 1/1991 | Oncken |
| 5,093,787 A | 3/1992 | Simmons |
| 5,126,936 A | 6/1992 | Champion et al. |
| 5,206,803 A | 4/1993 | Vitagliano et al. |
| 5,220,501 A | 6/1993 | Lawlor et al. |
| 5,235,507 A | 8/1993 | Sackler et al. |
| 5,262,942 A | 11/1993 | Earle |
| 5,270,922 A | 12/1993 | Higgins |
| 5,291,398 A | 3/1994 | Hagan |
| 5,297,032 A | 3/1994 | Trojan et al. |
| 5,424,938 A | 6/1995 | Wagner et al. |
| 5,541,994 A | 7/1996 | Tomko |
| 5,630,073 A | 5/1997 | Nolan |
| 5,631,828 A | 5/1997 | Hagan |
| 5,644,727 A | 7/1997 | Atkins |
| 5,649,116 A | 7/1997 | McCoy et al. |
| 5,671,363 A | 9/1997 | Cristofich et al. |
| 5,680,460 A | 10/1997 | Tomko |
| 5,684,965 A | 11/1997 | Pickering |
| 5,689,650 A | 11/1997 | McClelland et al. |
| 5,710,889 A | 1/1998 | Clark et al. |
| 5,712,912 A | 1/1998 | Tomko |
| 5,737,420 A | 4/1998 | Tomko |
| 5,748,783 A | 5/1998 | Rhoads |
| 5,765,144 A | 6/1998 | Larche et al. |
| 5,768,426 A | 6/1998 | Rhoads |
| 5,774,880 A | 6/1998 | Ginsberg |
| 5,781,654 A | 7/1998 | Carney |
| 5,799,086 A | 8/1998 | Sudia |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin et al. |
| 5,822,436 A | 10/1998 | Rhoads |
| 5,826,241 A | 10/1998 | Stein et al. |
| 5,826,243 A | 10/1998 | Musmanno et al. |
| 5,832,119 A | 11/1998 | Rhoads |
| 5,841,978 A | 11/1998 | Rhoads |
| 5,848,400 A | 12/1998 | Chang |
| 5,852,811 A | 12/1998 | Atkins |
| 5,862,260 A | 1/1999 | Rhoads |
| 5,864,685 A | 1/1999 | Hagan |
| 5,875,437 A | 2/1999 | Atkins |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 5,991,408 A | 11/1999 | Pearson et al. |
| 6,002,770 A | 12/1999 | Tomko et al. |
| 6,012,048 A | 1/2000 | Gustin |
| 6,014,642 A | 1/2000 | El-Kadi et al. |
| 6,016,482 A | 1/2000 | Molinari et al. |
| 6,024,287 A | 2/2000 | Takai et al. |
| 6,026,438 A | 2/2000 | Piazza et al. |
| 6,035,398 A | 3/2000 | Bjorn |
| 6,041,314 A | 3/2000 | Davis |
| 6,044,371 A | 3/2000 | Person et al. |
| 6,047,324 A | 4/2000 | Ford et al. |
| 6,049,782 A | 4/2000 | Gottesman et al. |
| 6,052,673 A | 4/2000 | Leon et al. |
| 6,088,585 A | 7/2000 | Schmitt et al. |
| 6,088,685 A | 7/2000 | Kiron et al. |
| 6,088,686 A | 7/2000 | Walker |
| 6,092,056 A | 7/2000 | Tull et al. |
| 6,105,005 A | 8/2000 | Fuhrer |
| 6,108,641 A | 8/2000 | Kenna et al. |
| 6,112,191 A | 8/2000 | Burke |
| 6,119,093 A | 9/2000 | Walker et al. |
| 6,128,603 A | 10/2000 | Dent |
| 6,131,810 A | 10/2000 | Weiss et al. |
| 6,154,732 A | 11/2000 | Tarbox |
| 6,154,770 A | 11/2000 | Kostakos |
| 6,164,533 A | 12/2000 | Barton |
| 6,189,785 B1 | 2/2001 | Lowery |
| 6,192,347 B1 | 2/2001 | Graff |
| 6,219,794 B1 | 4/2001 | Soutar et al. |
| 6,226,623 B1 | 5/2001 | Schein et al. |
| 6,317,783 B1 | 11/2001 | Freishtat et al. |
| 6,324,353 B1 | 11/2001 | Laussermair |
| 6,324,523 B1 | 11/2001 | Killeen et al. |
| 6,363,360 B1 | 3/2002 | Madden |
| 6,374,231 B1 | 4/2002 | Bent et al. |
| 6,408,336 B1 | 6/2002 | Schneider et al. |
| 6,424,725 B1 | 7/2002 | Rhoads et al. |
| 6,453,416 B1 | 9/2002 | Epstein |
| 6,505,160 B1 | 1/2003 | Rhoads |
| 6,513,020 B1 | 1/2003 | Weiss et al. |
| 6,970,843 B1 | 11/2005 | Forte |
| 7,058,223 B2 | 6/2006 | Cox |
| 7,089,202 B1 | 8/2006 | McNamar et al. |
| 7,103,556 B2 | 9/2006 | Del Rey et al. |
| 7,124,101 B1 | 10/2006 | Mikurak |
| 7,133,840 B1 | 11/2006 | Kenna et al. |
| 7,171,016 B1 | 1/2007 | Rhoads |
| 7,203,845 B2 | 4/2007 | Sokolic et al. |
| 7,206,761 B2 | 4/2007 | Colvin |
| 7,216,100 B2 | 5/2007 | Elliott |
| 7,308,110 B2 | 12/2007 | Rhoads |
| 7,313,543 B1 | 12/2007 | Crane |
| 7,321,874 B2 | 1/2008 | Dilip et al. |
| 7,321,875 B2 | 1/2008 | Dilip et al. |
| 7,328,179 B2 | 2/2008 | Sheehan et al. |
| 7,346,472 B1 | 3/2008 | Moskowitz et al. |
| 7,366,695 B1 | 4/2008 | Allen-Rouman et al. |
| 7,376,606 B2 | 5/2008 | Jacobsen |
| 7,383,223 B1 | 6/2008 | Dilip et al. |
| 7,383,227 B2 | 6/2008 | Weinflash et al. |
| 7,392,222 B1 | 6/2008 | Hamilton et al. |
| 7,401,037 B2 | 7/2008 | Arena et al. |
| 7,440,914 B2 | 10/2008 | Jacobsen |
| 7,490,240 B2 | 2/2009 | Scheidt et al. |
| 7,502,758 B2 | 3/2009 | Burke |
| 7,505,937 B2 | 3/2009 | Dilip et al. |
| 7,509,286 B1 | 3/2009 | Bent et al. |
| 7,519,551 B2 | 4/2009 | Bent et al. |
| 7,536,340 B2 | 5/2009 | Dheer et al. |
| 7,536,350 B1 * | 5/2009 | Bent ............ G06Q 20/10 705/35 |
| 7,562,392 B1 | 7/2009 | Rhoads et al. |
| 7,596,522 B1 | 9/2009 | Jacobsen |
| 7,603,307 B2 | 10/2009 | Jacobsen |
| 7,640,199 B1 | 12/2009 | Hyland |
| 7,657,761 B2 | 2/2010 | Sokolic et al. |
| 7,660,700 B2 | 2/2010 | Moskowitz et al. |
| 7,668,771 B1 * | 2/2010 | Bent ............ G06Q 20/10 705/35 |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,707,106 B1 | 4/2010 | Swanson, Sr. et al. |
| 7,716,131 B2 | 5/2010 | Bent et al. |
| 7,720,755 B1 | 5/2010 | Coyle |
| 7,729,987 B1 | 6/2010 | Wakim et al. |
| 7,752,107 B1 | 7/2010 | Bent et al. |
| 7,752,129 B2 | 7/2010 | Bent et al. |

(56) References Cited

U.S. PATENT DOCUMENTS

| | | |
|---|---|---|
| 7,756,767 B2 | 7/2010 | Cluse et al. |
| 7,769,688 B1 | 8/2010 | Bent et al. |
| 7,788,235 B1 | 8/2010 | Yeo |
| 7,788,501 B2 | 8/2010 | Abdallah et al. |
| 7,797,207 B1 | 9/2010 | Dilip et al. |
| 7,809,640 B1 | 10/2010 | Bent et al. |
| 7,814,017 B2 | 10/2010 | Vancini et al. |
| 7,835,546 B2 | 11/2010 | Abe |
| 7,837,100 B2 | 11/2010 | Bonalle et al. |
| 7,849,003 B2 | 12/2010 | Egnatios et al. |
| 7,860,771 B2 | 12/2010 | Colvin |
| 7,865,435 B1 | 1/2011 | Medina, III |
| 7,873,571 B1 | 1/2011 | Wehmer |
| 7,873,677 B2 | 1/2011 | Messing et al. |
| 7,886,969 B2 | 2/2011 | Antoo et al. |
| 7,890,424 B1 | 2/2011 | Wakim et al. |
| 7,894,600 B2 | 2/2011 | Sato |
| 7,895,098 B2 | 2/2011 | Beard |
| 7,895,099 B2 | 2/2011 | Whiting et al. |
| 7,899,743 B2 | 3/2011 | Jacobsen |
| 7,899,745 B1 | 3/2011 | Jacobsen |
| 7,899,746 B1 | 3/2011 | Jacobsen |
| 7,899,747 B1 | 3/2011 | Jacobsen |
| 7,904,372 B2 | 3/2011 | Whiting et al. |
| 7,917,433 B2 | 3/2011 | Jacobsen |
| 7,921,057 B1 | 4/2011 | Jacobsen |
| 7,933,821 B1 | 4/2011 | Bent et al. |
| 7,936,905 B2 | 5/2011 | Takahashi et al. |
| 7,945,511 B2 | 5/2011 | O'Brien et al. |
| 7,949,494 B2 | 5/2011 | Moskowitz et al. |
| 7,996,308 B1 | 8/2011 | Bent et al. |
| 8,000,495 B2 | 8/2011 | Levy et al. |
| 8,005,277 B2 | 8/2011 | Tulyakov et al. |
| 8,010,988 B2 | 8/2011 | Cox |
| 8,015,084 B1 | 9/2011 | Hirka et al. |
| 8,015,085 B2 | 9/2011 | Blagg et al. |
| 8,019,657 B2 | 9/2011 | Bent et al. |
| 8,019,668 B1 | 9/2011 | Bent et al. |
| 8,020,187 B2 | 9/2011 | Cox |
| 8,032,456 B1 * | 10/2011 | Bent ............... G06Q 20/102 |
| | | 235/379 |
| 8,036,984 B2 | 10/2011 | Elterich |
| 8,036,986 B2 | 10/2011 | Jacobsen |
| 8,051,004 B2 | 11/2011 | Jacobsen |
| 8,051,005 B2 | 11/2011 | Jacobsen |
| 8,055,557 B2 | 11/2011 | Sorbe et al. |
| 8,069,113 B2 | 11/2011 | Elterich |
| 8,086,508 B2 | 12/2011 | Dheer et al. |
| 8,090,651 B2 | 1/2012 | Winslow et al. |
| 8,094,949 B1 | 1/2012 | Rhoads |
| 8,095,446 B2 | 1/2012 | Green et al. |
| 8,103,582 B1 | 1/2012 | Zettner |
| 8,108,272 B2 | 1/2012 | Sorbe et al. |
| 8,116,516 B2 | 2/2012 | Rhoads |
| 8,121,943 B2 | 2/2012 | Elterich |
| RE43,246 E | 3/2012 | Bent et al. |
| 8,150,766 B1 | 4/2012 | Bent et al. |
| 8,191,156 B2 | 5/2012 | Kubo |
| 8,200,554 B2 | 6/2012 | Foss et al. |
| 8,205,237 B2 | 6/2012 | Cox |
| 8,214,175 B2 | 7/2012 | Moskowitz et al. |
| 8,234,188 B1 * | 7/2012 | Phillips ............... G06Q 40/00 |
| | | 705/30 |
| 8,239,321 B1 | 8/2012 | Bent et al. |
| 8,244,611 B2 | 8/2012 | Galit |
| 8,214,652 B2 | 9/2012 | LaCous |
| 8,260,697 B1 | 9/2012 | Bent et al. |
| 8,260,705 B1 * | 9/2012 | Bent ............... G06Q 40/06 |
| | | 235/379 |
| 8,275,703 B1 | 9/2012 | Billman |
| 8,285,991 B2 | 10/2012 | Scheidt |
| 8,290,859 B1 | 10/2012 | Bent et al. |
| 8,290,860 B1 | 10/2012 | Bent et al. |
| 8,290,861 B1 | 10/2012 | Bent et al. |
| 8,306,912 B2 | 11/2012 | Galit |
| 8,311,916 B1 | 11/2012 | Bent et al. |
| 8,311,939 B1 | 11/2012 | Bent et al. |
| 8,326,766 B2 | 12/2012 | Hirka et al. |
| 8,352,342 B1 * | 1/2013 | Bent, II ............... G06Q 40/06 |
| | | 705/35 |
| 8,355,985 B1 | 1/2013 | Bent et al. |
| 8,359,267 B1 | 1/2013 | Bent et al. |
| 8,364,586 B1 | 1/2013 | Medina, III |
| 8,370,236 B1 * | 2/2013 | Bent ............... G06Q 40/04 |
| | | 705/35 |
| 8,380,621 B1 | 2/2013 | Bent et al. |
| 8,386,382 B1 | 2/2013 | Bent |
| 8,386,383 B1 | 2/2013 | Bent |
| 8,392,299 B2 | 3/2013 | Sorbe et al. |
| 8,392,304 B1 | 3/2013 | Phillips et al. |
| 8,392,330 B2 | 3/2013 | Sorbe et al. |
| 8,401,962 B1 | 3/2013 | Bent |
| 8,429,074 B2 | 4/2013 | Galit |
| 8,452,702 B1 * | 5/2013 | O'Donnell ............... G06Q 40/02 |
| | | 235/379 |
| 8,458,089 B1 * | 6/2013 | Gareis ............... G06Q 40/02 |
| | | 235/379 |
| 8,498,933 B1 | 7/2013 | Bent et al. |
| 8,521,569 B1 | 8/2013 | Bent et al. |
| 8,560,442 B1 | 10/2013 | Bent et al. |
| 8,566,200 B1 | 10/2013 | Bent et al. |
| 8,566,201 B1 * | 10/2013 | Bent ............... G06Q 20/10 |
| | | 705/35 |
| 8,571,960 B1 | 10/2013 | Bent et al. |
| 8,571,984 B1 | 10/2013 | Bent et al. |
| 8,583,515 B2 | 11/2013 | Sorbe et al. |
| 8,583,545 B1 * | 11/2013 | Bent ............... G06Q 40/02 |
| | | 705/35 |
| 8,589,289 B1 | 11/2013 | O'Donnell et al. |
| 8,589,295 B2 | 11/2013 | Sorbe et al. |
| 8,600,830 B2 | 12/2013 | Hoffberg |
| 8,606,676 B1 | 12/2013 | Bent et al. |
| 8,612,324 B1 | 12/2013 | Bent et al. |
| 8,630,943 B2 | 1/2014 | Maricondi |
| 8,640,179 B1 | 1/2014 | Cox |
| 8,645,244 B2 | 2/2014 | Fanous et al. |
| 8,655,689 B1 * | 2/2014 | Gareis ............... G06Q 40/08 |
| | | 235/379 |
| 8,656,441 B1 | 2/2014 | Cox |
| 8,660,928 B2 | 2/2014 | Green |
| 8,666,887 B2 | 3/2014 | Elterich |
| 8,670,560 B2 | 3/2014 | Cheddad et al. |
| 8,682,730 B2 | 3/2014 | Hirka et al. |
| 8,688,577 B1 | 4/2014 | Bent |
| 8,712,911 B1 | 4/2014 | Bent et al. |
| 8,719,062 B1 | 5/2014 | Bent et al. |
| 8,719,157 B1 | 5/2014 | Bent et al. |
| 8,781,931 B1 | 7/2014 | Bent et al. |
| 8,782,726 B1 | 7/2014 | Cox |
| 8,788,409 B1 | 7/2014 | Souza |
| 8,788,414 B2 | 7/2014 | Sorbe et al. |
| 8,904,464 B1 | 12/2014 | Cox |
| 8,904,465 B1 | 12/2014 | Cox |
| 8,959,357 B2 | 2/2015 | Baughman |
| 9,070,151 B2 | 6/2015 | Moskowitz |
| 9,197,414 B1 | 11/2015 | Martin et al. |
| 9,256,885 B1 | 2/2016 | Cox |
| 9,348,820 B1 | 5/2016 | Cox |
| 9,374,370 B1 * | 6/2016 | Bent, II ............... H04L 63/0442 |
| 2001/0023414 A1 | 9/2001 | Kumar et al. |
| 2001/0032182 A1 | 10/2001 | Kumar et al. |
| 2001/0052077 A1 | 12/2001 | Fung et al. |
| 2002/0007330 A1 | 1/2002 | Kumar et al. |
| 2002/0023055 A1 | 2/2002 | Antognini |
| 2002/0026575 A1 | 2/2002 | Wheeler et al. |
| 2002/0030359 A1 | 3/2002 | Bergenek et al. |
| 2002/0046144 A1 | 4/2002 | Graff |
| 2002/0062452 A1 | 5/2002 | Ford |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent |
| 2002/0095592 A1 | 7/2002 | Daniell et al. |
| 2002/0128951 A1 | 9/2002 | Kiron et al. |

(56) References Cited

U.S. PATENT DOCUMENTS

| | | |
|---|---|---|
| 2002/0128969 A1 | 9/2002 | Parmelee et al. |
| 2002/0150241 A1 | 10/2002 | Scheidt et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0065642 A1 | 4/2003 | Zee |
| 2003/0080185 A1 | 5/2003 | Werther |
| 2003/0135437 A1 | 7/2003 | Jacobsen |
| 2003/0149646 A1 | 8/2003 | Chen et al. |
| 2003/0163403 A1 | 8/2003 | Chen et al. |
| 2003/0177092 A1 | 9/2003 | Paglin |
| 2003/0191702 A1 | 10/2003 | Hurley |
| 2003/0200174 A1 | 10/2003 | Star |
| 2003/0208436 A1 | 11/2003 | Rothman Michael |
| 2003/0225642 A1 | 12/2003 | Baker et al. |
| 2003/0236728 A1 | 12/2003 | Sunderji et al. |
| 2004/0039674 A1 | 2/2004 | Coloma |
| 2004/0059924 A1 | 3/2004 | Soto et al. |
| 2004/0107157 A1 | 6/2004 | Bleunven et al. |
| 2004/0111361 A1 | 6/2004 | Griffiths et al. |
| 2004/0128229 A1 | 7/2004 | Raines et al. |
| 2004/0128235 A1 | 7/2004 | Kemper et al. |
| 2004/0138974 A1 | 7/2004 | Shimamura et al. |
| 2004/0153398 A1 | 8/2004 | Baumgartner et al. |
| 2004/0153400 A1 | 8/2004 | Burke |
| 2004/0162773 A1 | 8/2004 | Del et al. |
| 2004/0177036 A1 | 9/2004 | Nutahara et al. |
| 2004/0181671 A1 | 9/2004 | Brundage et al. |
| 2004/0243540 A1 | 12/2004 | Moskowitz et al. |
| 2004/0249741 A1 | 12/2004 | Understein |
| 2005/0010801 A1 | 1/2005 | Spies et al. |
| 2005/0044035 A1 | 2/2005 | Scott |
| 2005/0044036 A1 | 2/2005 | Whiting et al. |
| 2005/0091137 A1 | 4/2005 | Woeber |
| 2005/0102225 A1 | 5/2005 | Oppenheimer et al. |
| 2005/0102226 A1 | 5/2005 | Oppenheimer et al. |
| 2005/0108120 A1 | 5/2005 | Malka et al. |
| 2005/0108149 A1 | 5/2005 | Bent et al. |
| 2005/0114246 A1 | 5/2005 | Coloma |
| 2005/0138353 A1 | 6/2005 | Spies et al. |
| 2005/0149436 A1 | 7/2005 | Elterich |
| 2005/0154662 A1 | 7/2005 | Langenwalter |
| 2005/0177496 A1 | 8/2005 | Blagg et al. |
| 2005/0228733 A1 | 10/2005 | Bent et al. |
| 2006/0004655 A1 | 1/2006 | Alexander et al. |
| 2006/0047593 A1 | 3/2006 | Naratil et al. |
| 2006/0106703 A1 | 5/2006 | Del et al. |
| 2006/0155644 A1 | 7/2006 | Reid et al. |
| 2006/0167773 A1 | 7/2006 | Yang et al. |
| 2006/0212385 A2 | 9/2006 | Bent et al. |
| 2006/0212389 A2 | 9/2006 | Bent et al. |
| 2006/0213980 A1 | 9/2006 | Geller et al. |
| 2006/0273152 A1 | 12/2006 | Fields |
| 2006/0282356 A1 | 12/2006 | Andres et al. |
| 2007/0043666 A1 | 2/2007 | Burdette |
| 2007/0083938 A1 | 4/2007 | Aoki et al. |
| 2007/0118449 A1 | 5/2007 | De La Motte et al. |
| 2007/0130065 A1 | 6/2007 | Staab et al. |
| 2007/0143196 A1 | 6/2007 | Colvin |
| 2007/0198404 A1 | 8/2007 | Hirka et al. |
| 2007/0233590 A1 | 10/2007 | Hardison, III |
| 2007/0255655 A1 | 11/2007 | Kemper et al. |
| 2007/0271174 A2 | 11/2007 | Bent et al. |
| 2007/0276752 A1 | 11/2007 | Whiting et al. |
| 2007/0288400 A1 | 12/2007 | Menon |
| 2008/0015985 A1 | 1/2008 | Abhari et al. |
| 2008/0046358 A1 | 2/2008 | Holm-Blagg et al. |
| 2008/0065532 A1 | 3/2008 | De, La Motte |
| 2008/0077996 A1 | 3/2008 | Kubo |
| 2008/0097899 A1 | 4/2008 | Jackson et al. |
| 2008/0120228 A1 | 5/2008 | Bent et al. |
| 2008/0133280 A1 | 6/2008 | Ziegler |
| 2008/0133396 A1 | 6/2008 | De La Motte |
| 2008/0195534 A1 | 8/2008 | Landis et al. |
| 2008/0222053 A1 | 9/2008 | Jacobsen |
| 2008/0243666 A1* | 10/2008 | Rowan .................. G06Q 30/08 705/37 |
| 2008/0288398 A1 | 11/2008 | Maricondi |
| 2009/0006985 A1 | 1/2009 | Fong et al. |
| 2009/0012899 A1 | 1/2009 | Friesen |
| 2009/0024496 A1 | 1/2009 | Balachandran et al. |
| 2009/0043699 A1 | 2/2009 | Elterich |
| 2009/0043701 A1 | 2/2009 | Elterich |
| 2009/0055313 A1 | 2/2009 | Elterich |
| 2009/0119227 A1 | 5/2009 | Green et al. |
| 2009/0138412 A1 | 5/2009 | Jacobsen |
| 2009/0141890 A1 | 6/2009 | Steenstra et al. |
| 2009/0150284 A1 | 6/2009 | Burke |
| 2009/0164320 A1 | 6/2009 | Galit |
| 2009/0164350 A1 | 6/2009 | Sorbe et al. |
| 2009/0164351 A1 | 6/2009 | Sorbe et al. |
| 2009/0164352 A1 | 6/2009 | Sorbe et al. |
| 2009/0164353 A1 | 6/2009 | Sorbe et al. |
| 2009/0164368 A1 | 6/2009 | Galit |
| 2009/0164370 A1 | 6/2009 | Sorbe et al. |
| 2009/0241197 A1 | 9/2009 | Troyansky |
| 2009/0281936 A1 | 11/2009 | Fanous et al. |
| 2009/0327154 A1 | 12/2009 | Van Vooren et al. |
| 2010/0138324 A1 | 6/2010 | Allen |
| 2010/0241559 A1 | 9/2010 | O'Connor |
| 2010/0268668 A1 | 10/2010 | Burdette |
| 2010/0274687 A1 | 10/2010 | Ghosh et al. |
| 2010/0274718 A1 | 10/2010 | Ghosh et al. |
| 2011/0078073 A1 | 3/2011 | Annappindi |
| 2011/0106703 A1 | 5/2011 | Jay et al. |
| 2011/0131103 A1 | 6/2011 | Hirka et al. |
| 2011/0208640 A1 | 8/2011 | Geoghegan et al. |
| 2011/0246359 A1 | 10/2011 | O'Brien et al. |
| 2011/0270720 A1 | 11/2011 | Manohar |
| 2011/0276473 A1 | 11/2011 | Blok |
| 2011/0311042 A1 | 12/2011 | Cheddad et al. |
| 2012/0016782 A1 | 1/2012 | Hardison, III |
| 2012/0041875 A1 | 2/2012 | Sorbe et al. |
| 2012/0047066 A1 | 2/2012 | Sorbe et al. |
| 2012/0054095 A1 | 3/2012 | Lesandro et al. |
| 2012/0078750 A1 | 3/2012 | Watkins |
| 2012/0179628 A1 | 7/2012 | Green |
| 2013/0030971 A1 | 1/2013 | Weiss et al. |
| 2013/0030974 A1 | 1/2013 | Casey et al. |
| 2013/0054429 A1 | 2/2013 | Minor et al. |
| 2013/0066702 A1 | 3/2013 | Galit |
| 2013/0104080 A1 | 4/2013 | Bosworth et al. |
| 2013/0151433 A1* | 6/2013 | Hicks ................ G06Q 30/0279 705/329 |
| 2013/0159152 A1 | 6/2013 | Minor et al. |
| 2013/0179339 A1 | 7/2013 | Sorbe et al. |
| 2013/0232080 A1 | 9/2013 | Galit |
| 2013/0238505 A1 | 9/2013 | Hirka et al. |
| 2014/0012726 A1 | 1/2014 | Kruse |
| 2014/0052625 A1 | 2/2014 | Sorbe et al. |
| 2014/0143140 A1 | 5/2014 | Elterich |
| 2014/0180962 A1 | 6/2014 | Fiala et al. |
| 2014/0188737 A1 | 7/2014 | Salah et al. |

OTHER PUBLICATIONS

VVebster's New Twentieth Century Dictionary, Unabridged, Second Edition, 1983, p. 1336.
U.S. Appl. No. 14/179,096, filed Feb. 12, 2014, Island Intellectual Property LLC.
U.S. Appl. No. 14/268,479, filed May 2, 2014, Island Intellectual Property LLC.
Nguyen et al "An Approach to Protect Private Key using Fingerprint Biometric Encryption Key in BioPKI based Security System", 2008 10th Intl. Conf. on Control, Automation, Robotics and Vision Hanoi, Vietnam, Dec. 17-20, 2008.
Feng et al. "Private key generation from on-line handwritten signatures", Information Management & Computer Security Oct. 4, 2002 159-164.

(56) References Cited

OTHER PUBLICATIONS

U.S. Appl. No. 14/933,689 Nov. 5, 2015 Island Intellectual Property, LLC.
U.S. Appl. No. 14/933,580 Nov. 5, 2015 Island Intellectual Property, LLC.
U.S. Appl. No. 14/179,096 Feb. 12, 2014 Island Intellectual Property, LLC.
U.S. Appl. No. 14/268,479 May 2, 2014 Island Intellectual Property, LLC.
U.S. Appl. No. 12/794,448, Jun. 4, 2010, Bruce Bent et al.
U.S. Appl. No. 12/638,544, Dec. 15, 2009, Bruce Bent.
U.S. Appl. No. 12/794,448, Jun. 4, 2010, Bruce Bent.
U.S. Appl. No. 13/710,999, Dec. 11, 2012, Bruce Bent II.
U.S. Appl. No. 13/715,370, Dec. 14, 2012, Bruce Bent.
U.S. Appl. No. 13/733,645, Jan. 3, 2013, Bent.
U.S. Appl. No. 13/736,515, Jan. 8, 2013, Bent.
U.S. Appl. No. 13/801,501, Mar. 13, 2013, Bent.
U.S. Appl. No. 13/801874, Mar. 13, 2013, Bent.
U.S. Appl. No. 13/828,468, Mar. 14, 2013, Gareis.
U.S. Appl. No. 13/828,929, Mar. 14, 2013, Gareis.
U.S. Appl. No. 13/829,309, Mar. 14, 2013, O'Donnell.
U.S. Appl. No. 13/829,747, Mar. 14, 2013, O'Donnell.
U.S. Appl. No. 13/829,974, Mar. 14, 2013, Bent.
U.S. Appl. No. 13/830,143, Mar. 14, 2013, Bent.
U.S. Appl. No. 13/839,890, Mar. 15, 2013, Bent.
U.S. Appl. No. 13/840,685, Mar. 15, 2013, Bent.
U.S. Appl. No. 13/841,778, Mar. 15, 2013, Bent.
U.S. Appl. No. 13/828,929 Mar. 14, 2013, Gareis.
U.S. Appl. No. 13/842,360, Mar. 15, 2013, Bent.
U.S. Appl. No. 14/074,219, Nov. 7, 2013, Bent.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 1996 or earlier; 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Pat. No. 4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold existing customers' deposits, Mar. 17, 1988, 7 pgs.
Insured Savings Remote Site Sweep Procedures, 1996 or earlier; 3 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, Jul. 17, 1990; 1 pg.
Addendum to Insured Savings Agency Agreement, Jul. 17, 1990; 1 pg.
Letter to Paula Martin, Jul. 3, 1990, 1 pg.
Letter to John Lovell, Jul. 3, 1990, 1 pg.
Insured Savings Balance Limits form, 1996 or earlier; 1 sheet.
Email from John Oncken re: Depository Levels at Insured Savings Depositories, Nov. 2, 1989, 1 pg.
Cash Management Balance Monitoring Agreement Form; 1996 or earlier; 1 sheet.
Memorandum from Ed Piner, Subject: Discontinuation of Automatic Balance Monitoring in conjunction with Insured Savings Accounts, May 21, 1991, 1 pg.
Blank form letter from Edward N. Piner, May 24 1991, 1 pg.
Letter from First City National Bank of Austin, Sep. 20, 1982, 5 pgs.
First City, Texas —Austin, Special Products, Feb. 20, 1992, with Schedule A & Schedule B, 6 pgs.
Letter From William W. Wiles, Secretary of the Board, Board of Governors of the Federal Reserve System, Jun. 22, 1983, 6 Sheets.
Letter From Oliver I. Ireland, Associate General Counsel, Board of Governors of the Federal Reserve System, Jun. 22, 1988, 5 Sheets.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investors MoneyAccounts$^{SM}$ and Insurance Plus Service Agreement, Schedule A, Mar. 1994; 3 sheets.
Investors MoneyAccounts$^{SM}$ (an FDIC-insured money market account), Apr. 1996; 4 sheets.
Investors MoneyAccounts$^{SM}$ The FDIC-Insured Money Market with an Important Plus., Apr. 1996; 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, Mar. 2000; 11 sheets.
First National Bank in Brookings, Certificates of Deposit, Jul. 17, 2009 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, 6 *FRC Monitor*, Dec. 2003, 2 sheets.
Crane, P. & Krasner, Mike, *An iMoney Net Special Report*™ , "Brokerage Cash Sweep Options: The Shift from Money Funds to FDIC-Insured Bank Deposit Accounts", Nov. 2004, 64 pgs.
The May 1998 Senior Financial Officer Survey, *Board of Govenors of the Federal Reserve System*, with Appendix A, 48 pgs.
Interest Rate Review© A Publication of *Meyer Weekly Interest Rate Survey*, A Look At Tiers, vol. II, No. 4, Apr. 1987, 6 pgs.
Interest Rate Review® A Publication of *Meyer Weekly Interest Rate Survey*, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch & You, "Financial Services The Way You Want, When You Want Them," Jan. 2000 4 Sheets.
Merrill Lynch, Pierce, Fenner & Smith Incorporated, "Information Statement," 2000, 12 Sheets.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", on *Wall Street*, Nov. 2000, 1 sheet.

(56) References Cited

OTHER PUBLICATIONS

Quest Insured Account, *QUESTessentials*, May 17, 1994; 3 sheets.
Quest Insured Account, *Information Statement*, 5 sheets.
OCC Insured Bank Deposit Account, Jun. 1993; 3 sheets.
Insured Bank Deposit Account, *Information Statement*, Jul. 1, 2000, 2 sheets.
Letter from Marilyn J. Hensle, announcing Salomon Smith Barney Bank Deposit Program.<sup>SM</sup>, with Q&A, Aug. 16, 2000; 14 sheets.
Bank Deposit program Disclosure Statement, *Salomon Smith Barney*, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 1982; 18 pgs.
The Insured Savings Account, Issuer Guide to Offering MMDAs through Merrill Lynch, Jul. 1986; 27 pgs.
Insured Savings Account Fact Sheet, The Merrill Lynch Cash Management Account Financial Service, Apr. 1987, 11 pgs.,.
CMA Insured Savings Account Fact Sheet, Jul. 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, *American Banker*, Dec. 6, 2000, 2 pgs.
Insured Deposit Account (IDA), May 21, 1996, 11 pgs.
An Introduction to the Smith Barney *Insured Deposit Account*, 1995, 8 pgs.
Memorandum from Ted Hamilton re: Insured Deposit Account, Oct. 10, 1995, 13 pgs.
The Insured Deposit Account: "Money in the Bank", 1997, 2 sheets.
Merrill Joins Money Market Account, CMA; Broker Begins Testing With 12 Institutions, *Lexis Nexis*, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial agility for banker's and their clients, 6 pgs.
Federally "Insured Deposit Program", AmVest Capital, 1 sheet.
Federally Insured Deposit Program for Banks, AmVest capital, Jan. 15, 2010, 2 sheets.
Flow Chart, AmVest Capital, Dec. 9, 2009, 1 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co. Nov. 2, 2009, 2 sheets.
D.A. Davison & Co., Bank Insured Deposit Program, Disclosure Statement, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC. PLUS Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010, 3 pgs.
Folio Investing: Brokerage Features >> Cash Investments>> Cash Sweep FAQ, Jan. 18, 2010, 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denison Company, Sheboygan, WI, retrieved from internet Nov. 2, 2009; 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
The Hilliard Lyons Insured Deposit Program Disclosure Document, Hilliard Lyons, 10 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, May 2006; 2 sheets.
Customer Agreement, Cleared Through Legent Clearing, May 2006; 3 pgs.
Cash Management, Mesirow Financial—B/D and IA Services, www.mesirowfinancial.com/bdia/cas_mgmt.jsp, Jan. 15, 2010, 2 sheets.
Frequently Asked Questions: FDIC Sweep Program, optionsXpress, retrieved from internet Jan. 6, 2010; www.optionsxpress.com/welcom/faq/aq/fdc.aspx#rate.
Terms & Conditions for optionsXpress' Bank Insured Deposit Program, optionsXpress, Oct. 14, 2009; 6 pgs.
Frequently Asked Questions: FDIC Sweep Program, optionsXpress, www.optionsxpress.com/welcom/faq/fdic.aspx, Jan. 6, 2010, 3 pgs.

(56) References Cited

OTHER PUBLICATIONS

Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, Jan. 5, 2010; www.pershing.com/rates.html, 1 sheet.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 16, 2010, 5 pgs.
Eagle sweep disclosure, first republic Securities Company, Jun. 1, 2009, 12 pgs.
The financial organizer, ProCash Plus, Apr. 2007; 12 pgs.
Insured deposit account program disclosure booklet, 16 pgs.
Update New FDIC product at IPI: Deutsche Bank Insured Deposit Program, Investment Professionals Inc, Feb. 4, 2009, 11 pgs.
Insured cash account, , http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securities America, Jul. 17, 2009; 3 pgs.
Insured deposit program, www.aigadvisorgroup.com/fdic/03.04.09.htm, Jan. 15, 2010, 3 pgs.
FlexInsured Account$^{SM}$, PrimeVest, http://primevest.com/flexInsured_account.asp, Jan. 14, 2010, 1 sheet.
FlexInsured$^{SM}$ Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneagee.com/sali/pcg/pages/products-services.aspx, Nov. 4, 2009, 2 sheets.
Terms and conditions for cash sweep, sterne agee, 2 sheets.
Client account agreement to Sterne Agee Clearing, Inc, Sterne, Agee & Leach, Inc and its authorized agents, Feb. 3, 2009, 5 pgs.
Valet a full service asset management account, http:/valetaccount.com/visaTerms.php, Nov. 12, 2009, 6 pgs.
A sweet suite of business products brings our bank to you, AndroscogginBank, www.androscogginbank.com, 1 sheet.
We have your banking needs covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastweatbank.com/English/SS_SIDPrograms.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com, Jan. 15, 2010, 1 sheet.
Protect your cash portfolio!, www.insureddepositsonline.com/component/option.com_frontpage/Itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
Over $12,5 million of FDIC deposit insurance available, Insured Deposit Program, Deutsche Bank, Apr. 2009; www.insureddepositsonline.com, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deutsche Bank, www.insureddepositsonline.com, 1 sheet.
Bank insured agency deposit account program custodial account agreement, Evolve Bank & Trust, 8 pgs.
Insured deposit online, Deutsche Bank Insured Deposit Program, list of program banks, retrieved from internet May 14, 2009; 2 sheets.
Insured deposit online, The Insured Deposit Program, Evolve Bank & Trust, retrieved from internet Apr. 3, 2009; 2 sheets.
Insured deposit online, Frequently asked questions, Evolve Bank & Trust, www.insureddepositsonline.com/content/section/3/71, May 14, 2009, 3 pgs..
Insured deposit online, The Insured Deposit Program, Evolve Bank & Trust, Apr. 3, 2009, 2 pgs.
Personal Banking, Insured Deposit Program www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Up to $10 million of FDIC deposit insurance available, Insured Deposit Program, Pulaski Bank, 1 sheet.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Bank, www.pulaskibankstl.com/personal/checking-personalinsured.htm, May 14, 2009, 1 sheet.
Up to 512.5 million of FDIC deposit insurance available, Insured Deposit Program, Pulaski Bank, 1 sheet.
Who can benefit from the insured deposit program?, Insured Deposit Program, Pulaski Bank, Apr. 2009; 2 sheets.
Insured agency deposit account terms and conditions, Pulaski Bank, 1 sheet.
Banks for DBTCA, 2 sheets.
Total Bank Solutions, Corporate overview, 1 sheet.
Total Bank Solutions, Deposit Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.

(56) References Cited

OTHER PUBLICATIONS

Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, TBS Bank Deposit Account, 7 pgs.
Christopher McCrum, LinkedIn, http://74.125.93.132/search?=cache:5hs9cebUSjgJ:www.linkedin.com/pub/christopher-mccrum/ . . ., Nov. 2, 2009, 2 sheets.
Kentucky Bankers Association, Alternative for excess deposit coverage Free Webiners, http://209.235.145/cgi-bin/websuite/tcsassnwebsuite.pl? . . ., Nov. 2, 2009, 2 sheets.
Kentucky Bankers Association Detailed listening, http://member.kybanks.conVsource/members . . ., Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/, Nov. 2, 2009, 2 sheets.
Fast fax-back reply, Kentucky Bankers Association, 1 sheet.
Deutsche Bank, Deutsche Bank insured deposit program, Dec. 18, 2009; 3 pgs.
Deutsche Bank Insured Deposits, Bank list as of Dec. 18, 2009, 1 sheet.
DB Advisors, Deutsche Bank Group, Insured Deposit Program, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
Cd's pass agencies as largest holding in MMFs: Repo plunges in Sep., www.cranedata.us/archives/news/2009/10/, Nov. 3, 2009, 14 pgs.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) AJP).
Lawsuit by Island Intellectual Property LLC and Intrasweep LLC against Institutional Deposits Corp., Defendant Institutional Deposits Corp.'s Preliminary Invalidity Contentions, Mar. 15, 2010; Case No. 09-CV-03079-JEC.
Exhibit 1, Invalidity Chart: IMA and Insurance Plus Service Agreement, U.S. Pat. No. 7,509,286, dated Mar. 2010, 21 pgs.
Exhibit 2, Invalidity Chart: Investors Money Account$^{SM}$ System, U.S. Pat. No. 7,509,266, dated Mar. 2010, 26 pgs.
Exhibit 3, Invalidity Chart: Insured Money Account System, U.S. Pat. No. 7,509,286, dated Mar. 2010, 26 pgs.
Exhibit 4, Invalidity Chart: U.S. Pat. No. 4,985,833 (Oncken), U.S. Pat. No. 7,509,286, dated Mar. 2010, 21 pgs.
Exhibit 5, Invalidity Chart: First City Bank of Texas' Insured Savings Program, U.S. Pat. No. 7,509,286, dated Mar. 2010, 39 pgs.
Exhibit 6, Invalidity Chart: Quest Insured Account, U.S. Pat. No. 7,509,286, dated Mar. 2010, 19 pgs.
Exhibit 7, Invalidity Chart: CIBC World Markets—Insured Bank Deposit Account, U.S. Pat. No. 7,509,286, dated Mar. 2010, 16 pgs.
Exhibit 8, Invalidity Chart: Merrill Lynch CMA/ISA Service, U.S. Pat. No. 7,509,286, received in Mar., 2010, 72 pgs.
Exhibit 9, Invalidity Chart: 1983 Fed Letter, U.S. Pat. No. 7,509,286, received in Mar., 2010, 16 pgs.
Exhibit 10, Invalidity Chart: Merrill Lynch Banking Advantage Program ("MLBA Program"), U.S. Pat. No. 7,509,286, dated Mar. 2010; 22 pgs.
Exhibit 11, Invalidity Chart: Merrill Lynch & You + MLBA Information Statement, U.S. Pat. No. 7,509,286, received in Mar., 2010, 18 pgs.
Exhibit 12, Invalidity Chart: Smith Barney Insured Deposit Account, U.S. Pat. No. 7,509,286, dated Mar. 2010, 22 pgs.
Exhibit 13, Invalidity Chart: Smith Barney Bank Deposit Program, U.S. Pat. No. 7,509,286, dated Mar. 2010, 18 pgs.
Exhibit 14, Invalidity Chart: Alliance Insured Account, U.S. Pat. No. 7,509,286, dated Mar. 2010, 16 pgs.
Exhibit 15, Invalidity Chart: Reserve's American Express Presentation, U.S. Pat. No. 7,509,286, dated Mar. 2010, 16 pgs.
Exhibit 16, Invalidity Chart: U.S. Pat. No. 7,376,606 (Jacobsen), U.S. Pat. No. 7,536,350, dated Mar., 2010, 6 pgs.
Exhibit 17, Obviousness Combinations Chart, U.S. Pat. No. 7,509,286, dated Mar., 2010, 351 pgs.
Lawsuit by *Island Intellectual Property LLC, et al.* v. *Deutsch Bank Trust Company Americas*, et al.; Defendant Deutsche Bank Trust Company Americas' Second Supplemental Responses to Double Rock's Interrogatories Nos. 2, 8 and 9, Jul. 2010, 65 pages.
Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pp.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
Letter to R.M. Zaitzeff, from W.W. Wiles, dated Jun. 22, 1963 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999; 6 pages.
Investors MoneyAccount$^{SM}$ and Insurance Plus Service Agreement, attached Schedule A (List of Banks Participating in the Insurance Plus Service), IMAD Mar. 1994, 3 pages.
Investors Money Account$^{SM}$ (an FDIC-insured money market account), IMA-1; Mar. 1994, 4 pages.
Investors MoneyAccount$^{SM}$, "The FDIC-Insured Money Market Investment with an Important Plus," IMA Oct. 1995, 2 pages.
1985 Sec No-Act. Lexis 2756, Investment Company Act of 1940—Section 3(a)(1), 2(a)(36); Securities Act of 1933—Section 2(1), Nov. 29, 1985, Kemper Financial Services, Inc., 9 pages.

(56) References Cited

OTHER PUBLICATIONS

Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/wwu.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071053, with attached SB08, dated Mar. 10, 2009, 2 pages.
Merrill Lynch & You, "Financial Services The Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/767,827, Dated Sep. 23, 2009, 4 pages.
USPTO Office Action, Office Action Summary, U.S. Appl. No. 11/767,827, Dated Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.
Merrill Lynch & Co., Inc., Form 10-K405 (Annual Report (Regulation S-K, item 405)), Filed Mar. 14, 2002 for the Period Ending Dec. 28, 2001 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Program$^{SM}$, (attached Q&A: Important Information about the New Salomon Smith Barney Bank Deposit Program), Aug. 16, 2002, 14 pages.
Salomon Smith Barney, "Bank Deposit Program Disclosure Statement," 2002; 3 pages.

FDIC, FDIC Law, Regulations, Related Acts—4000—Advisory Opinions, Oct. 22, 1987, J. W. VIA, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings™. Account Fact Sheet," The Merrill Lynch Cash Management Account® Financial Service, 1987; 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998; 1998; p. 4.
LexisNexis, the American Banker, Sep. 23, 1983, Merrill Joins Money Market Account, CMA; Broker Begins Testing With 12 Institutions, Byline: a. Aryan, 4 pages.
Merrill Lynch & Co Inc—Mer, 10k Wizard, Form 8-K, "Report of Unscheduled Material Events or Corporate Changes," Filed Mar. 7, 2002, 51 pages.
Federal Reserve System, Lexsee 51 FR 9632, "Definition of Deposit and Technical Amendments," Action: Final Rule, Mar. 20, 1986, 13 pages.
Federal Reserve System, Lexsee 56 FR 15494, "Regulation D--Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition); Aug. 1980; pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, Lexsee 47 FR 55207, "Reserve Requirements of Depository Institutions; Money Market Deposit Account," Dec. 8, 1982, Action: Final Rule, 5 pages.
Insured Bank Deposits™ Program Summary Information Statement, May 9, 2002; 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 2001 or earlier; 4 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 16, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.

(56) References Cited

OTHER PUBLICATIONS

Merrill Lynch, Insured Savings Account Fact Sheet, The Merrill Lynch Cash Management Account® Financial Service, Jan. 1986, 4 pages.

Merrill Lynch Money Markets, Inc., Merrill Lynch Capital Markets, "The Insured Savings Account, Issuer Guide to Offering MMDAs through Merrill Lynch," Sep. 1986; 36 pages.

Merrill Lynch, The Merrill Lynch Capital BuilderSM Account Financial Service, Insured SavingsSM Account Participating Depository Institutions, 1996, 2 pages.

Insured Deposit Account, May 21, 1996, 14 pages.

An Introduction to the Smith Barney Insured Deposit Account, Sep. 20, 1995; 8 pages.

Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.

Insured Deposit Account, Product Description for the Investor, Draft as of Sep. 20, 1995, 8 pages.

"Bank of Oak Ridge to Offer FDIC Insurance on up to $1.5 Million," Dialog Web Command Mode, 2 Sheets, Sep. 25, 2003, http://www.dialogweb.com/cgi/dwclient.

"Man Bites Dog: Funds Move Into Banking," IBC's Money Fund Selector, 2 Sheets, Nov. 6, 1998.

"Reverse Ups Insurance Limit on Money Market Account," Thomson Financial Inc. Mutual Fund Market News, 1 Sheet, Aug. 26, 2002.

"The Bank of New York adds a $300,000 FDIC-Insured Money Market Account Option to its Dividend Income Checking Account," PR Newswire Associations, Inc., PR Newswire, 2 Sheets, Apr. 18, 2002.

"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.

12 CFR Part 329—Interest on Deposit, Source: 51 FR 10808, Mar. 31, 1986, 5 Sheets.

AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.

AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.

AB 2011 Assembly Bill - Chaptered, http://www.leginfo.ca.gov/pub/bill/asm/ab_2001-2050/ab_2011_bill_20060925_chaptered.html, 2006, pp. 1-3.

AB 2011 Assembly Bill—Enrolled, http://www.leginfo.ca.gov/pub/bill/asm/ab_2001-2050/ab_2011_bill_20060816_enrolled.html, 2006, pp. 1-3.

AB 2011 Assembly Bill—History, Complete Bill History, http://www.leginfo.ca.gov/pub/bill/asm/ab_2001-2050/ab_2011_bill_20060925_history.html, 2006, p. 1.

About iMoneyNet, Inc., About iMoneyNet's Money Funds Division, 4 Sheets, Aug. 21, 2003, http://www.ibcdata.com/about.htm.

Adler, Joe, "Promontory to Roll Out Deposit Service Insuring Liquid Funds", American Banker, Feb. 22, 2010, 1 sheet.

An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.

Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.

Announcing Changes in Automatic "Sweep" Investment Options, LPL Financial Services, Linsco/Private Ledger, Member NASD/SIPC, Jun. 2006; 26 Sheets.

Bank Deposit Program, Online http://web.archive.org/web/20030620100115/http:/www.smithbarney.com/products_servi, Jan. 19, 2001, 4 Sheets.

Bent, "Bruce Bent Makes Money Market Funds Act Like Bank Accounts," Equity BBDP, Oct. 5, 1998, 3 Sheets.

Blackwell, "ABA to Approve System for Sharing Deposit Coverage," American Banker, 2 Sheets, Feb. 11, 2003.

Blackwell, "New Pitch: Deposit Insurance Sharing," American Banker Online, 4 Sheets, Jan. 21, 2003.

Board of Governors of the Federal Reserve System, 1984 Fed. Res. Interp. Ltr. Lexis 56, Nov. 16, 1984, 3 Sheets.

Board of Governors of the Federal Reserve System, 1988 Fed. Res. Interp. Ltr. Lexis 141, Jun. 22, 1988, 3 Sheets.

Board of Governors of the Federal Reserve System, 1989 Fed. Res. Interp. Ltr. Lexis 154, Jun. 21, 1989, 2 Sheets.

Board of Governors of the Federal Reserve System, 1989 Fed. Res. Interp. Ltr. Lexis 77, Mar. 14, 1989, 2 Sheets.

Board of Governors of the Federal Reserve System, 1990 Fed. Res. Interp. Ltr. Lexis 94, Feb. 1, 1990, 1 Sheet.

Board of Governors of the Federal Reserve System, 1991 Fed. Res. Interp. Ltr. Lexis 232, Jan. 30, 1991, 2 Sheets.

Board of Governors of the Federal Reserve System, 1994 Fed. Res. Interp. Ltr. Lexis 156, Jun. 24, 1994, 3 Sheets.

Board of Governors of the Federal Reserve System, 1994 Fed. Res. Interp. Ltr. Lexis 314, Oct. 17, 1994, 2 Sheets.

Board of Governors of the Federal Reserve System, 1994 Fed. Res. Interp. Ltr. Lexis 419, Oct. 14, 1994, 4 Sheets.

Britt, "Struggling with Sweep Accounts," America's Community Banker, vol. 6, No. 12, 11 Sheets, Dec. 1, 1997.

California Independent Bankers, ICBA Independent Community Bankers of America, Banker Bulletin, 2006, CIB 16th Annual Convention, vol. 4, issue 6, http://www.cib.org/banker_bulletin.htm.

Capital Briefs: Corporate Checking Account Relief Sought, American Banker, vol. 162, Jul. 28, 1997, 1 Sheet.

Certificate of Deposit Registry Service: Keeping Deposits in the Corn Patch, Banknews, 2 Sheets. Mar. 2003.

Chapelle et al. "Peering Into Tomorrow: At the Threshold of a New Century, Brokers and Others Discuss Where They were Going," Securities Data Publishing on Wall Street, 6 Sheets, Dec. 1, 1999.

Chapelle, "Merrill's Rivals Say They, Too. Offer Services Beyond Banking," Securities Data Publishing On Wall Street, 2 Sheets, Feb. 1, 2003.

CMA, Insured Savings Account Fact Sheet, Merrill Lynch, Pierce, Fenner & Smith Incorporated, 1997, pp. 49-57.

CMA, Insured Savings Account Fact Sheet, Merrill Lynch, Pierce, Fenner & Smith Incorporated, Jul. 1994, pp. 47-54.

CMA, The Investor Credit Line Service, Cost-Effective Financing for the '90s, Merrill Lynch, Pierce, Fenner & Smith Incorporated, 1997, pp. 36-46.

CMA, The Merrill Lynch Cash Management Account Financial Service, Insured Savings Account Participating Depository Institutions, Merrill Lynch, Pierce, Fenner & Smith Incorporated, Mar. 1995, 2 Sheets.

CMA, The Merrill Lynch Cash Management Account Financial Service, Insured Savings Account Participating Depository Institutions, Merrill Lynch, Pierce, Fenner & Smith Incorporated, Nov. 1992, 2 Sheets.

CMA, The Merrill Lynch Cash Management Account Financial Service, Merrill Lynch, Pierce, Fenner & Smith Incorporated, Jan. 1997, 35 Sheets.

Litigation Notice After Payment of Issue Fee filed in Parent U.S. Appl. No. 10/382,946, Apr. 3, 2009, 160 pages.

Coyle, "A Look at commercial Demand Deposit Options," America's Community Banker, vol. 9, Issue 2, Bell & Howell Information and Learning Company, 9 Sheets, Feb. 1, 2000.

Crockett, "Big Banks Found Stepping Up Marketing of 'Sweep' Accounts," American Banker, vol. 159, No. 198, American Banker Inc., 3 Sheets, Oct. 13, 1994.

(56) References Cited

OTHER PUBLICATIONS

Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D (6 Sheets).
Deposit Growth Strategies For Financial Institutions, New Sweep Account Helps Retain $40 Million in Business Deposits, vol. 7, No. 12, The Reserve Funds, May 2001, 1 Sheet.
Deutsche Bank Insured Deposit Program, Marketing Literature 2007, 3 pages.
Di 48, Excerpts of Transcript of Hearing, U.S. Dist. Ct., District of Delaware, Civil Action No. 82-680, Apr. 8, 1983, 5 sheets.
Di 56, Interrog. Response, U.S. Dist. Ct. District of Delaware, Civil Action No. 82-680, May 20, 1983, 15 Sheets.
Di 99, Suppl. Interrogatory Response, U.S. Dist. Ct., District of Delaware, Civil Action No. 82-630, May 30, 1984, 6 Sheets.
Dreyfus Insured Deposit Program, Disclosure Statement and Terms and Conditions, Dreyfus A BNY Mellon Company, 8 Sheets.
Dreyfus Insured Deposit Program, Multiple List Program—Effective May 11, 2009, 1 Sheet.
Email from Olivia Kim to Charles Macedo on Jun. 9, 2010 with attachement of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential—Attorneys only, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).
FDIC Federal Register Citations: Email from Bert Ely to Comments, Mar. 8, 2006, Subject: Large-Bank Deposit Insurance Determination Proposal- RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
FDIC, Federal Deposit Insurance Corporation, Letter to Mr. Ronald Rexter, Feb. 28, 2003, From Michelle M. Borzillo, Counsel Supervision and Legislation Section, 2 Sheets.
Federal Register: Oct. 9, 1997 (vol. 62, No. 196), pp. 52809-52868. http://www.fdic.gov/news/news/inactivefinancial/1997/fil97111b.html.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
Finistar Reg. No. 2,939,558, Registered Apr. 12, 2005.
Finistar, Providing FDIC Insured Funds as a Stable Source of Deposits to Commercial Banking Institutions, 16 Sheets, www.Finistar.com.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.

Frost Bank, Member FDIC, Checking Accounts, 1 Sheet, Sep. 19, 2003, https://www.frostbank.com/cgi-bin/ecomm/frost1/scripts/products/product_detail.jsp?BV_. . ..
Garmhausen, "Matching Small Banks with Large Muni Deposits," American Banker, Online The Financial Services Resource, Oct. 4, 2005, 4 pages, http://www.finstar.com/docs/AmericanBanker.html.
Heavyweight Funding, Bankers News, Mar. 4, 2003, vol. II, Issue No. 5, 2 Sheets.
Hencke, "New Rules for FDIC deposit Insurance", ABA Bank Compliance, vol. 20, No. 7, Jul./Aug. 1999, pp. 31-37.
Hoffman, "Reserve's FDIC-Insured Account Draws Regionals; But some see little need for insurance," Crain Communications Inc., Investment News, 2 Sheets, Jun. 4, 2001.
IDC Deposits, online, http://idcdeposits.com/ , 2009, 1 Sheet.
In the Know, Important Information About Your Account, Smith Barney Citigroup, 2005, 6 Sheets.
Insured Bank Deposit Program Summary Information Statement, Information Statement, and list of Eligible Program Banks Effective Feb. 10, 2005, 11 pages.
Insured Cash Account Program Disclosure Booklet, LPL Financial Services, Linsco/Private Ledger, Member NASD/SIPC 14 pages.
Jong et al., "The Valuation and Hedging of Variable Rate Savings Accounts," University of Amsterdam, Nov. 15, 2001, 23 Sheets.
Keenan, "Tapping Brokerages for Alternative to CDs," American Banker, The Financial Services Daily, 3 Sheets, Feb. 18, 2004.
Lake Forest Bank & Trust Company, Introducing MaxSafe Deposit Accounts with up to $3.75 Million in FDIC Insurance, www.lakeforestbank.com/maxsafe, 2 Sheets.
Lavine, "Check Out High-Yield Checking Accounts," Broward Daily Business Review, vol. 39, No. 102, 2 Sheets, Apr. 27, 1998.
Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.
Lawsuit by Carlo DeBlasio et al. against Merrill Lynch & Co., Inc. et al., Declaration of Andrew W. Stern, including Exhibits A, B, C, D, E and F, Nov. 12 2007, Case No. 07-cv-318 (RJS) (Document 59).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks"; Feb. 5, 2008.
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . .Feb. 5, 2008 (Document 72).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . .Feb. 5, 2008 (Document 73).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . .Feb. 5, 2008 (Document 74).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . .Feb. 5, 2008 (Document 75).
Lawsuit by Carlo DeBlasio et al. against Merrill Lynch & Co., Inc. et al., Declaration of Kenneth I. Schacter, including Exhibits A, B, C, D, F, G, H, I, J, K, L, M, N, O, P, Q and R, Nov. 14 2007, Case No. 07-cv-318 (RJS) (Document 69).

(56) References Cited

OTHER PUBLICATIONS

Lawsuit by Carlo DeBlasio et al. against Merrill Lynch & Co., Inc. et al., Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14 2007, Case No. 07-318 (RJS) (Document 67).
Lawsuit by Carlo DeBlasio et al. against Merrill Lynch & Co., Inc. et al., Declaration of Scott D. Musoff in Support of the Merrill Lynch Defendants' Motion to Dismiss the Second Amended Class Action Complaint, ECF Case, Nov. 12, 2007, Case No. 07-cv-318 (RJS) (Document 64).
Lawsuit by Carlo DeBlasio et al. against Merrill Lynch & Co., Inc. et al., Reply Declaration of Kenneth Schacter including Exhibits S and T, Mar. 6, 2008, Case No. 07-cv-318 (RJS) (Document 81).
Lawsuit by Carlo DeBlasio et al. against Merrill Lynch & Co., Inc. et al., Second Amended Class Action Complaint, Jury Trial Demanded, Introduction and Summary of Allegations, Jun. 11, 2007, Case No. 07-cv-318-VM.
Lawsuit by Carlo DeBlasio et al. against Merrill Lynch & Co., Inc. et al., Supplemental Declaration of Matthew J. Terry in Support of Motion to Dismiss by Defendants Wachovia Corp., Wachova Securities, LLC, Wachovia Bank N.A., and Wachovia Bank of Delaware, N.A., including Exhibits A and B, Mar. 6, 2008, Case No. 07-cv-318 (RJS) (Document 79).
Lawsuit by Carlo DeBlasio, et al. against Merrill Lynch & Co., Inc., et al., Opinion and Order Regarding Motions, Jul. 27, 2009, Case No. 07 CIV 318(RJS).
Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).
Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).
Lawsuit by Island Intellectual Property LLC and Intrasweep LLC against Institutional Deposits Corp. The Island Plaintiffs' Complaint against Defendant Institutional Deposits Corp., Nov. 4, 2009, Civil Action No. 1 09-CV-3079.
Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.
Lawsuit by Island Intellectual Property LLC and Intrasweep LLC against Institutional Deposits Corp., Consent Order, Apr. 21, 2010, Case No. 09-CV-3079 (Document 44).
Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).
Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).
Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM)(Document 114).
Lawsuit by Island Intellectual Property LLC, et al. against Deutsche Bank Trust Company Americas, et al,. Defendant Deutsch Bank Trust Company Americas' Responses to Double Rock's Interrogatories Nos. 1-10; May 2010; Civil Action No. 09 Civ. 2675 (VM)(AJP).
Lawsuit by Island Intellectual Property LLC, et al. against Deutsche Bank Trust Company Americas; Defendant Total Bank Solutions, LLC's Responses to Double Rock's Common Interrogatory Nos. 1-10 to Defendants; May 2010; Civil Action No. 09 Civ. 2675 (VM)(AJP).
Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.
Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.
Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.
Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).
Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).
Lawsuit by Island Intellectual Property LLC, Lids Capital LLC, Double Rock Corporation and Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer to Consolidated First Amended Complaint, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer to Consolidated First Amended Complaint and Counter Claims, Jun. 25, 2009, Civil Action No. 09 CIV 2675.

(56) References Cited

OTHER PUBLICATIONS

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Complaint and Counterclaims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Network, LLC's, Counterclaim with Prejudice, Oct. 19, 2009, (Document 68).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 CV 2675 (VM) (AJP) (Document 73).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).

Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.

Lawsuit by Promontory Interfinancial Network, LLC against Double Rock Corporation p/k/a Reserve Management Corporation, Complaint, Mar. 24, 2009, Civil Action No. 1:09 CV 316.

Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.

Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.

Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.

Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.

Letter From Jamey Basham, Attorney, Lexsee 1990 FDIC Interp. Ltr., Lexis 1, Federal Deposit Insurance Corporation, FDIC-90-02, Jan. 3, 1990, 2 Sheets.

Letter From Joseph A. DiNuzzo, Counsel, Oct. 20, 1999, FDIC, Federal Deposit Insurance Corporation, 1 Sheet.

Letter From Merle Y. Waldman, Lexsee 1985 Sec No- Act., Lexis 1593, Securities Exchange Act of 1934—Section 15(a), Jan. 8, 1985, 11 Sheets.

Letter from Michael Bradfield, General Counsel, Board of Governors of the Federal Reserve System, Nov. 16, 1984, 4 Sheets.

Letter From Roger A. Hood, Assistant General Counsel, Jul. 16, 1986, FDIC, Federal Deposit Insurance Corporation, Legal Division, 1 Sheet.

Letter from Roger M. Zaitzeff, Seward & Kissel to Gilbert T. Schwartz, Associate General Counsel, Board of Governors of the Federal Reserve System; May 10, 1983, 5 sheets.

Letter from Stephanie Martin, Assoc. General Counsel, Board of Governors of the Federal Reserve System, Apr. 22, 2004, 8 Sheets.

Letter to Mr. James E. Creekman, Group Vice President, From Oliver Ireland, Associate General Counsel, Aug. 1, 1995, 4 Sheets.

Letter to Mr. Jonathan L. Levin, Esq., From Oliver Ireland, Associate General Counsel, Oct. 18, 1996, 2 Sheets.

Letter to Mr. L.P. Fleming, Jr., Esq., From Oliver Ireland, Associate General Counsel, Feb. 7, 1995, 3 Sheets.

Letter to Ms. Brenda L. Skidmore, Senior Vice President, From Oliver Ireland, Associate General Counsel, Aug. 30, 1995, 4 Sheets.

Letter to William R. Burdette, CEO, Apr. 6, 2009, FDIC, Federal Deposit Insurance Corporation, 2 pages.

Letter to William R. Burdette, CEO, Nov. 15, 2007, FDIC, Federal Deposit Insurance Corporation, 5 Sheets.

Liberman et al., Market Watch, "How Important are Banks?" FDIC Insurance on Deposits Just One Continuing Advantage, Oct. 17, 2006, 3 Sheets.

McReynolds et al. "Unusual Products for Unusual Times," Securities Data Publishing on Wall Street, 6 Sheets, May 1, 2001.

McReynolds, "The Power of Cash: Ho-hum cash can be great product (and lead to more business) in troubled times," Securities Data Publishing on Wall Street, 3 Sheets, Jun. 1, 2002.

Merriam-Webster Online Dictionary, 10th Edition, Definition of "Associated", 2 Sheets.

Merrill Lynch Announces Beyond Banking, the Power of Advice for Smarter Cash Management, Jan. 8, 2 Sheets.

Merrill Moves CMA Cash to Bank, Street Talk, on Wall Street, Nov. 2000, p. 26.

Money Fund Report, Bank of New York Adds Insured Sweeps Option, Friday, May 3, 2002, The Reserve Funds, 1 Sheet.

Money Fund Report, IBC Financial Data, Inc., Nov. 6, 1998, 1 Sheet.

Money Fund Report, Insured Cash Sweep Options Proliferate, Friday, Jun. 1, 2001, The Reserve Funds, 1 Sheet.

Money Market Insight's, Goldman Sachs May Create Bank to Offer Insured Cash Sweeps, Aug. 2002 Issue, 3 Sheets.

Munk, Merrill Makes New Push Into Traditional Banking, Dow Jones Newswires, Jan. 3, 2003, 1 Sheet.

Mutual Funds Magazine, Bargain Basement Funds, Oct. 1997, 1 Sheet.

Mutual Funds Magazine, Bargain Basement Funds, Oct. 1997, 2 Sheets.

News Article: "Regulators Support Demand Deposit Bill", Regulatory Compliance Watch—Mar. 9, 1998; 2 Sheets, vol. 9, No. 10.

Northbrook Bank & Trust Company, Introducing our MaxSafe CD with up to $700,000 of FDIC Insurance, 4 Sheets.

Northbrook Bank & Trust Company, Seven Times the Security of a Normal CD, Introducing our MaxSafe CD, 4 Sheets.

(56) References Cited

OTHER PUBLICATIONS

O'Brian, "Money-Market Funds Suit Many Investors, But Proud Creator Frets About Extra Risk," Re-Printed From the Wall Street Journal, Monday, Nov. 6, 2000, Dow Jones & Company, Inc., 2 Sheets.
On Wall Street, Helping Brokers Build a More Successful Business, The Power of Cash, Jun. 2002, 2 Sheets.
On Wall Street, Helping Brokers Build A More Successful Business, Unusual Products For Unusual Times, May 2001, 2 Sheets.
Online, www.usabancshares.com, Brave New World, 1999, 2 Sheets.
Part: 2, Monetary Policy and Reserve Requirements, Subpart—Regulation D, Board Interpretations of Regulation D, Transaction Accounts—Linked to Time Deposits, vol. 1, Federal Reserve Regulatory Service, Mar. 1994; 2 Sheets.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network, Promontory Interfinancial Network Announces New Deposit Placement Service, Jan. 21, 2003, 3 Sheets.
Promontory Interfinancial Network: http://www.promnetwork.com/index.html, 2003.
Promontory Interfinancial Network: Frequently Asked Questions (FAQs), Feb. 5, 2003, 5 pages.
Promontory to Roll Out Deposit Service Insuring Liquid Funds, American Banker, by Joe Adler, Feb. 22, 2010, 2 sheets.
Reserve Insured Deposits, United States Patent and Trademark Office, Reg. No. 2,694,910, Registered Mar. 11, 2003, 1 Sheet.
Reserve Management Corporation, Reserve Insured Deposits, Serial No. 76/315,600, dated.
Ring, National /Global, "Amex Spans The Globe in Retail Bank Buildup," Nov. 27, 2000, 1 Sheet.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of The Reserve Funds, Before the Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwritting, From: Denise Russo, Director, Underwritting, 6 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Fund, Study of U.S. Pat. No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, For Immediate Release, May 23, 2001, 1 Sheet.
The Reserve Funds, Reserve Management and Irwin Union Bank and Trust Company Partner to Offer The Reserve Return Sweep, For Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
The Unmatched Sweep Solution From The Cash Management Expert, 1999; 2 Sheets.
Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Waddell, "Sweeping Clean," Advisor, The Advisor to Advisors, Oct. 2001; 2 Sheets.

(56) References Cited

OTHER PUBLICATIONS

Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011; 55 pages.
Lawsuit by Island Intellectual Property LLC against First Southwest Company; Complaint for Patent Infringement; Civil Action No. 1:11-cv-00371-UNA; Apr. 26, 2011; 42 pages.
Lawsuit by Island Intellectual Property LLC et al., against Deutsche Bank Trust Company Americas, et al.; Expert Report of Richard T. Powers Concerning Invalidity of U.S. Pat. Nos. 7,509,286; 7,519,551; 7,536,350; 7,668,771; 7,668,772; 7,672,886; and 7,680,734; and Exhibits A-R; Civil Action No. 09 Civ. 2675(VM)(AJP), Oct. 28, 2010; 1,119 pages.
Lawsuit by *Island Intellectual Property LLC*v. *Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
Lawsuit by *Island Intellectual Property LLC*v. *Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
Lawsuit by *Island Intellectual Property LLC*v. *Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC*v. *First Southwest Company*; First Southwest Company's Answer to Complaint and Counterclaims; Civil Action 1:11-cv-371-SD; Jun. 20, 2011; 11 pages.
Lawsuit by Island Intellectual Property LLC, et al. against Deutsche Bank Trust Company Americas, et al.; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.
Lawsuit by Island Intellectual Property LLC, et al. against Deutsche Bank Trust Company Americas, et al.; Expert Report of the Honorable Gerald J. Mossinghoff and Exhibits A-E; Civil Action No. 09 Civ. 2675 (VM)(AJP); Nov. 23, 2010; 107 pages.
Lawsuit by Island Intellectual Property LLC, et al., against Deutsche Bank Trust Company Americas, et al.; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by Island Intellectual Property LLC, et al., against Deutsche Bank Trust Company Americas, et al.; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.
*Island Intellectual Property LLC et al.* v. *Deutsche Bank AG, et al.*; Memorandum and Order; Case 1:09-cv-02675-KBF; Doc. 289; Feb. 14, 2012; pp. 1-28.
*Island Intellectual Property LLC et al.* v. *Deutsche Bank AG, et al.*; Order; Case 1:09-cv-02675-KBF; Doc. 221; Feb. 14, 2012; pp. 1-34.
*Island Intellectual Property LLC et al.* v. *Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.
*Island Intellectual Property LLC et al.* v. *Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
*Island Intellectual Property LLC et al.* v. *Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.
*Island Intellectual Property LLC et al.* v. *Deutsche Bank Trust Company Americas, et al.*; Memorandum and Order; Case 1:09-cv-02675-KBF; Doc. 265; Feb. 6, 2012; pp. 1-22.
*Island Intellectual Property LLC et al.* v. *Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC et al.* v. *Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.
*Island Intellectual Property LLC et al.* v. *Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC et al.* v. *Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.
*Island Intellectual Property LLC et al.* v. *Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.
*Island Intellectual Property LLC et al.* v. *Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.
Knight-Ridder; Money Matters, Tips you can use—Limits Apply as FDIC Insurance Covers Depositor, Not Account; Chicago Tribune; Feb. 4, 1998; 2 pages.
Lawsuit by *Island Intellectual Property LLC et al.* v. *Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).
Lawsuit by *Island Intellectual Property LLC, et al.* v. *Deutsche Bank Trust Company Americas et al.*; Declaration of Olivia M. Kim in Support of Defendants' Motion for Summary Judgment of Invalidity Under 35 U.S.C. § 101; Oct. 6, 2011; Case 1:09-cv-02675-VM, Document 197.
Lawsuit by *Island Intellectual Property LLC, et al.* v. *Deutsche Bank Trust Company Americas, et al.* Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201.
Lawsuit by *Island Intellectual Property LLC, et al.* v. *Deutsche Bank Trust Company Americas, et al.*; Defendants Reply in Support of Their Motion for Summary Judgment of Invalidity Under 35 U.S.C. § 101; Nov. 15, 2011; Case 1:09-cv-02675-VM, Document 208.

(56) References Cited

OTHER PUBLICATIONS

Lawsuit by *Island Intellectual Property LLC*, et al. v. *Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.
Lawsuit by *Island Intellectual Property LLC, et al.* v. *Deutsche Bank Trust Company Americas, et al.*; Order; Dec. 7, 2011; Case 1:09-cv-02675-VM, Document 212.
Lawsuit by *Island Intellectual Property LLC, et al.* v. *Deutsche Bank Trust Company Americas, et al.*; Special Master's Report and Recommended Decision on Defendants' Summary Judgment Motion of Invalidity Under 35 U.S.C. § 101; Dec. 19, 2011.
Lawsuit by *Island Intellectual Property LLC, et al.* v. *Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.
Martens, Don W.; letter to Hon. Victor Marrero re. supplement to letter of Nov. 28, 2011 on tentative rulings on claim construction in *Island Intellectual Property LLC et al.* v. *Deutsche Bank Trust Co., et al.*; Nov. 28, 2011; Case 1:09-cv-02675-VM; Document 211.
Martens, Don W.; letter to Hon. Victor Marrero re. tentative rulings on claim construction in *Island Intellectual Property LLC et al.* v. *Deutsche Bank Trust Co., et al.*; Nov. 28, 2011; Case 1:09-cv-02675-VM, Document 210.
Scottrade Bank Deposit Program—Terms, Conditions & Disclosures; Author unknown; Aug. 2011; pp. 1-3.
Hencke, Christopher; New Rules for FDIC Deposit Insurance; ABA Bank Compliance, Jul./Aug. 1999, 20,7; pp. 31-37.
Campbell, Andrew, et al.; A new standard for deposit insurance and government guarantees after the crisis; Journal of Financial Regulation and Compliance, vol. 17 No. 3, 2009; pp. 210-239.
Cynamon et al.; Redefining the Monetary Aggregates: A Clean Sweep; Eastern Economic Journal, vol. 32, No. 4, Fall 2006; pp. 661-672.
12 CFR Part 330; Simplification of Deposit Insurance Rules; Federal Register, vol. 63 Issue 90; May 11, 1998; pp. 1-31.
The Merrill Lynch Cash Management Account—Financial Service; Jan. 1985; 18 pages.
America Express—Meeting Notes, Sep. 26, 2000, 2 pages.
American Express Conference Call Minutes, Topic: Tiered Balances, Jan. 25, 2001 @ 3:00pm-4:00pm, 2 pages.
American Express Financial Advisors Customized FDIC Product with Tiered Balances, Jan. 24, 2001, 2 pages.
Email to abufalino@vedderprice.com, from S. Johnson, Re: ReserveFunds and Wayne Hummer, dated Jul. 14, 2003 (attached email to S. Johnson, from abufalino@vedderprice.com on Jun. 26, 2003, Re: ReserveFunds and Wayne Hummer), 2 pages.
Fax to T. Vezeau, from L. Boone, Re: BBII's request to fax to you, dated Dec. 26, 2002 (attached Memo to K.A. Jacklin, from A. Rova, Re: Lert discovery, dated Dec. 23, 2002), 3 pages.
Letter to A.J. Bufallno, from C.R. Macedo, Re: Reserve Management Corporation, Wayne Hummer Investments LLC, Our File: 71297/80, dated Jan. 3, 2006, 2 pages.
Letter to A.J. Bufalino, from C.R. Macedo, Re: Reserve Management Corporation, Wayne Hummer Investments LLC, Our File: 71297/80, dated Feb. 23, 2006, 1 page.
Letter to A.J. Bufalino, from C.R. Macedo, Re: Reserve Management Corporation, Wayne Hummer Investments LLC, Our File: 71297/80, dated May 8, 2007, 2 pages.
Letter to A.J. Bufalino, from C.R. Macedo, Re: Reserve Management Corporation, Wayne Hummer Investments LLC, Our File: 71297/80, dated May 8, 2007 (attached Appendices 1-3) 6 pages.
Letter to A.J. Bufalino, from S. Johnson, Re: Response to May 29, 2003 letter/email correspondence, dated Aug. 5, 2003, 1 page.
Letter to A.J. Bufalino, from S. Johnson, Re: Response to May 29, 2003 letter/email correspondence, dated Aug. 5, 2003 (enclosing Jul. 16, 2003 letter to T.M. McDonald, May 29, 2003 fax to B. Bent II, Jan. 10, 2003 letter to R.L. Kratzer, note page), 7 pages.
Letter to A.J. Bufallno, from S. Johnson Re: U.S. Pat. No. 6,374,231, dated May 29, 2003, 2 pages.
Letter to A.J. Bufalino, from T.J. Vezeau, Re: U.S. Pat. No. 6,374,231, dated Feb. 11, 2003, 1 page.
Letter to C.R. Macedo, from A.J. Bufalino, Re: Reserve Management Corporation, Wayne Hummer Investments LLC, Our File: 71297/80, dated Mar. 16, 2006, 1 page.
Letter to J. Van De Graff, from R.L. Kratzer, Re: Reserve Management Corp. Assertion, dated Feb. 13, 2003, 1 page.
Letter to R.L. Kratzer, from T.J. Vezeau, Re: U.S. Pat. No. 6,374,231, dated Jan. 10, 2003, 1 page.
Letter to T.J. Vezeau, from A.J. Bufalino, Re: U.S. Pat. No. 6,374,231, dated Feb. 7, 2003, 1 page.
Letter to T.M. McDonald, from B. Bent II, Re: FDIC insured money market products, dated Jul. 16, 2003, 1 page.
Letter to T.M. McDonald, from B. Bent II, Re: FDIC insured money market products, dated Jul. 16, 2003 (enclosing Jul. 14, 2003 email to abufalino@vedderprice.com, May 29, 2003 letter to A.J. Bufalino, Feb. 13, 2003 letter to J. Van De Graaff, Feb. 11, 2003 letter to A.J. Bufalino, Feb. 7, 2003 letter to T. J. Vezeau, Jan. 10, 2003 letter to R.L. Kratzer), 9 pages.
Memo to Bruce Bent, from Bruce Bent II, Re: S&M Status, Oct. 15, 1997 (cc: Arthur, Mary, Marianne, Joe, Pat, Cathy, Michelle), 1 page.
Memo to Marianne, Pat, Bruce Bent, from Bruce Bent II, Re: Reserve Insured Deposit Account, Sep. 4, 1997, 1 page.
Memo to Marianne, Ralph, Customer Service, from Bruce Bent II, Re: Reserve IDA, Sep. 4, 1997, 1 page.
Case for "CORE" Deposits, Historic Degree of Stability, 2006, 1 page.

\* cited by examiner

S522d: Access, by a transaction management system comprising one or more intermediary computers, one or more databases holding transaction rules, and client authentication data for a client source account held in a source institution and one or more client destination accounts held in one or more destination institutions.

S523d: Access, by the transaction management system according to the transaction rules, source account information from a source account portal using the client authentication data S524d: Retrieve, by the transaction management system, source account balance information for the source account.

S526d: Retrieve, by the transaction management system, source account transaction data comprising one or more orders.

S528d: Determine, by the transaction management system, that the source account transaction data represents a net buy order having a net buy amount.

S530d: Retrieve, by the transaction management system from the one or more destination institutions, destination account balance information.

S532d: Determine, by the transaction management system, whether the source account balance equals or exceeds the net buy amount.  —Yes→

↓ No

S534d: Determine, by the transaction management system, a deficiency amount based at least in part on the source account balance and the net buy amount.

S536d: Generate, by the transaction management system, electronic transaction instructions for a transfer of at least the deficiency amount from the one or more destination accounts to the source account.

S538d: Execute or have executed, by the transaction management system, the electronic transaction instructions by accessing the destination account to perform a transaction.

S540d: Provide, from the transaction management system to a client device or log, an electronic notification of the transaction.

S652: Obtain, by the one or more transaction management computers, depository account access information comprising at least depository account authentication information.

S654: Obtain, by the one or more transaction management computers, depository account balance information for the depository account comprising a depository account balance by:
(i)     accessing, by the one or more transaction management computers using the depository account access information, a depository account information portal of a depository institution computer system associated with the depository institution, wherein access to the depository account information portal does not require specialized technological access to the depository institution computer system or authorization from the depository institution beyond the technological access and authorization provided to the client;
(ii)    obtaining, via the depository account information portal, the depository account balance information.

S656: Obtain, by the one or more transaction management computers, depository account maximum balance information comprising a depository account maximum balance.

S658: Determine, by the one or more transaction management computers, that a post-transfer depository account balance will not exceed the depository account maximum balance.

FIG. 6E

Your Transaction Management Account

| Home 802 | Source Accounts 804 | Destination Accounts 806 | Transaction Settings 808 | TMS Account 810 |

Source Accounts > New Source Account

Add New Source Account

Enter Source Institution:
842 [ ]

Enter Account Number:
844 [ ]

Enter Account Credentials:

Username: [ ] 846

Password: [ ] 848

[ Submit ]   [ Cancel ]

Your Transaction Management Account

| Home 802 | Source Accounts 804 | Destination Accounts 806 | Transaction Settings 808 | TMS Account 810 |

Source Accounts > Edit Broker-Dealer 1 Account 822-1

Edit Broker-Dealer 1 Account 822-1

Enter Source Institution:
852 [ Broker-Dealer 1 ]

Account Number:
854 [ 1004986106 ]

Enter Account Credentials:

Username: [ jsmith11 ] 856

Password: [ xxxxxxxxx ] 858

860 [ Save Changes ]   [ Cancel Changes ] 862

[ Delete Account ] 864

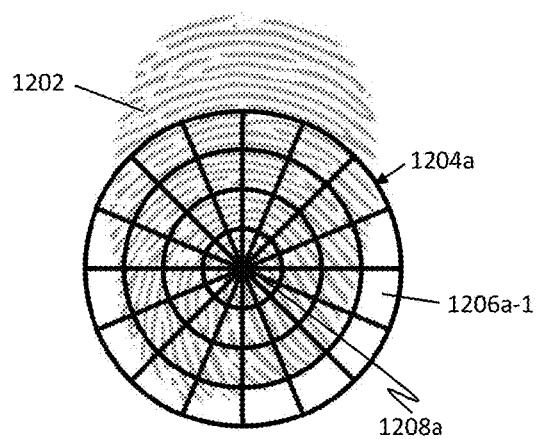
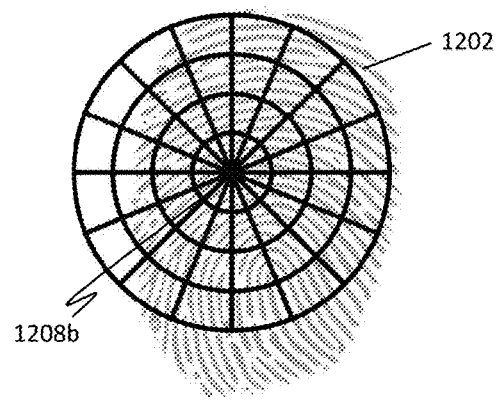
FIG. 12A
FIG. 12B
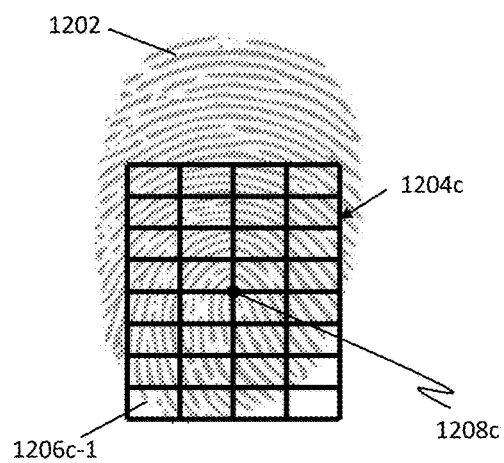
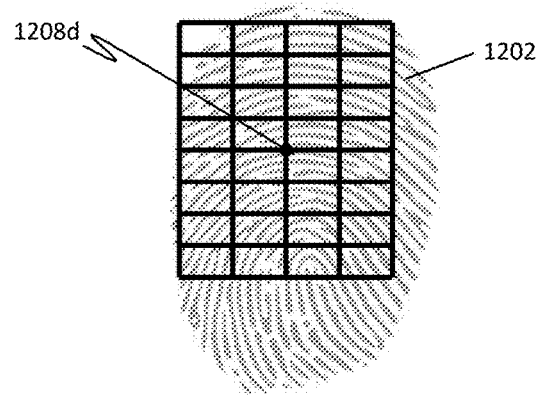
FIG. 12C
FIG. 12D

FIG. 13B-1

S1336: Provide, by the deposit sweep computer system to the client device, the second machine-readable instructions, causing the client device to render the updated destination institution management graphical user interface.

S1338: Receive, at the deposit sweep computer system from the client device via the updated destination institution management graphical user interface, an alternate depository institution selection comprising a selection of at least one of the alternate depository institution selection options.

S1340: Determine, by the deposit sweep computer system, an updated allocation of funds based at least in part upon the alternate depository institution selection.

S1342: Execute, by the deposit sweep computer system, the updated allocations of funds.

S1364: Receive, at the deposit sweep computer system from a second subset of the respective client devices within the predefined period of time, respective rejections of the respective different destination depository institutions via respective selections of the respective reject options.

S1366: Determine, by the deposit sweep computer system, second allocations of funds for the plurality of customers, the second allocations based at least in part upon the transaction information, the first allocations, and the respective rejections.

S1368: Execute, by the deposit sweep computer system, the second allocations of funds.

FIG. 13C-2

NOTIFICATION SYSTEM AND METHOD

CROSS-REFERENCE TO RELATED APPLICATIONS

This application is a Divisional of U.S. patent application Ser. No. 14/933,703, filed Nov. 5, 2015, which claims the priority of U.S. Provisional Patent Application Ser. No. 62/107,027, filed Jan. 23, 2015, the contents of which are incorporated by reference as if fully set forth herein.

FIELD OF THE INVENTION

The field of the invention generally relates to various technological improvements in systems, methods, and program products used in cash sweep systems, such as deposit sweep systems. In embodiments, the invention relates generally to new technological mechanisms to communicate with account holders so that such account holders can control the depository or other destination institutions in which funds are being allocated or held.

BACKGROUND OF THE INVENTION

Deposit sweep systems transfer funds between trading accounts, such as brokerage accounts, and interest bearing deposit accounts, such as bank or other depository accounts and other cash management vehicles. Such systems are implemented using computers specifically programmed to carry out deposit sweep operations, including transfer and allocation operations.

A shortcoming of existing deposit sweep systems is that they require cooperation, on a technological level, from the partner source institutions. Such cooperation can entail ensuring compatibility of the computer systems used to perform deposit sweep transactions, ensuring existence of technological access to source and/or destination computer systems, and ensuring compliance with any restrictions or conditions imposed by the source and destination institutions. Deposit sweep programs thus may require as a preliminary step establishment of technological connections among particular source institutions, destination institutions, and a deposit sweep management computer system. Deposit sweep program offerings may thus be limited to customers of particular partner source and destination institutions, such as brokerage institutions and/or depository institutions, or otherwise may require prospective deposit sweep program customers to establish accounts at such partner institutions. Heretofore, there has been a technological barrier to customers participating in deposit sweep systems without the cooperation and participation of the source institutions from which the funds to be swept are otherwise maintained. Therefore, it is desirable to provide a technical solution that bypasses such need for cooperation and provides greater flexibility to execute deposit sweep transactions with any available source or destination institution.

A second shortcoming of existing deposit sweep systems is the lack of technological mechanisms by which customers can exert control over the computer-implemented deposit sweep transactions to control which banks are used to store the customer's funds. Interaction between a deposit sweep system and an account holder from a separate source institution proves to be difficult among existing deposit sweep systems, and a technological manner in which to obtain such direct interaction, and thus user control, is desirable. Often, if a user knew of which particular depository institution his or her funds are being held at, or are to be held at, at any given moment, a user may object to the use of particular depository institutions for a number of reasons, including lack of insurance, difficulty of access to funds, or personal preference, to name a few reasons. Prior art deposit sweep systems lack technological mechanisms by which users can be informed in real time or even contemporaneously of the institutions at which their funds will be deposited and by which users can exert control over the institutions that are used. Often users must wait for a monthly statement to arrive. Technological improvements over such prior art deposit sweep systems are desired to inject customer control and/or timely notification into automated computer-implemented deposit sweep processes.

A third shortcoming of existing deposit sweep systems is security. Data hacks and phishing scams pose a persistent threat, particularly to data stored on computer systems or verification of user authentication information. Prior art security systems require storage of one or more reference credentials for a user, including biometric information, passwords, pin numbers, and/or fingerprint data, to which user access credentials are compared to authenticate them. The stored reference credentials are subject to data leaks and data breaches. While stored secret information, such as passwords, may be changed if compromised, biometric information cannot be changed as the various biometric signatures of a particular individual are generally unique and non-varying. Moreover, some users are reluctant to store their biometric information either in a device or at a cloud storage system (e.g., at a server), where the user cannot guarantee that others will not be able to access that personal biometric data. In addition to matching with reference credentials, other prior art security systems use public key cryptography that enables a user to provide a digital signature using a private key, which signature is verifiable using a corresponding public key. However, such systems require storage or memorization of the private key, which can be expressed as a large alphanumeric sequence. Memorization can be difficult, and again, stored keys may be leaked or hacked. Therefore it is desirable to provide a security system that does not store secret user credentials but that also does not require a user to input or provide a long private key or store sensitive biometric information which may be subject to a potential data breach.

SUMMARY OF THE INVENTION

An object of the present invention to address one or more the above problems as outlined in the prior art.

The field of the invention generally relates to various technological improvements in systems, methods, and program products used in deposit sweep systems or other cash sweep systems. In embodiments, the invention generally relates to systems, methods, and program products used to bypass technological cooperation from institutions holding trading accounts, depository accounts, and/or other cash management vehicles and/or cash management accounts, such as DDAs, MMDAs, NOW accounts, stable value funds, credit interest programs, to name a few, in order to transfer funds among those accounts freely. In embodiments, the invention further relates generally to biometric-based security systems to ensure authentication of electronic requests associated with deposit sweep processes. In embodiments, the invention further relates generally to new technological mechanisms to communicate with account holders so that such account holders can control the depository institutions in which funds are being held.

In embodiments, a biometric private key generation system may generate a private key based at least in part upon an input biometric reading and an input password, which may be a personal identification number (PIN). In embodiments, the resulting private key may not be stored but rather may be used to provide a digital signature for an electronic message. The private key may be deleted from the system after it is used to generate the digital signature. The signature may be verified by other entities using a public key corresponding to the private key in accordance with public key cryptography techniques. The private key may be regenerated by inputting both a new instance of the biometric reading as well as a new instance of the password.

In embodiments, a method for generating a secure biometric-based cryptographic key without storing biometric information in order to authenticate data in a deposit sweep transfer system may comprise receiving, via a first graphical user interface on a mobile device, a user password; capturing, using a biometric reader embedded in the mobile device, into a secure enclave processor core, a first digital biometric image of a biometric reading of a user, wherein the secure enclave processor core is only accessible to input passwords, digital biometric image data, and electronic messages targeted for encryption, and to receive from the secure enclave processor core encrypted electronic messages and public keys configured to verify the authenticity of encrypted electronic messages; converting, by the secure enclave processor core, the first digital biometric image into an invariant biometric feature vector using an integrated wavelet and Fourier-Mellin transformation process; converting, by the secure enclave processor core, the invariant feature vector using the user password into a 128-bit invariant code; generating, by the secure enclave processor core, an invariant asymmetric private key using the 128-bit invariant code and the user password; applying, by the secure enclave processor core, the invariant asymmetric private key to an electronic message comprising a message payload associated with a deposit sweep transaction to generate a digitally signed electronic message to be securely transmitted to a second device associated with the deposit sweep transaction; securely transmitting, from the mobile device to the second device, the digitally signed electronic message causing the deposit sweep transaction to be initiated upon successful verification of the digital signature using a corresponding public key previously provided to the second device, wherein the corresponding public key corresponds to the invariant asymmetric private key; and permanently deleting, from the secure enclave processor core, the user password, the first digital biometric image, the second digital biometric image, the third digital biometric image, the fourth digital biometric image, the fifth digital biometric image, the first set of feature data, the invariant biometric feature vector, the invariant asymmetric private key, and the 128-bit invariant code.

In embodiments, converting the first digital biometric image into an invariant biometric feature vector may be performed within the secure enclave processor core by applying, by the secure enclave processor core, a wavelet transformation to the first digital biometric image to generate a second digital biometric image; applying, by the secure enclave processor core, a fast Fourier transform to the second digital biometric image, to generate a third digital biometric image; applying, by the secure enclave processor core, a log-polar transformation to the third digital biometric image to generate a fourth digital biometric image; applying, by the secure enclave processor core, a high pass filter to the fourth digital biometric image to generate a fifth digital biometric image; applying, by the secure enclave processor core, a fast Fourier transform to the fifth digital biometric image to generate a first set of feature data; and applying, by the secure enclave processor core, row concatenation to the first set of feature data to generate the invariant biometric feature vector.

In embodiments, converting, by the secure enclave processor core, the invariant feature vector using the user password into a 128-bit invariant code can comprise generating, by the secure enclave processor core, using the user password a threshold intensity value; and applying, by the secure enclave processor core, the threshold intensity value to the invariant feature vector to generate the 128-bit invariant code.

In embodiments, the user password may be an alphanumeric password that is encoded to convert it to a numeric sequence. In embodiments, the user password may be a personal identification number. The user password may be received via an input device comprising any of a keyboard, keypad, pointer device, touch screen, or microphone.

In embodiments, the biometric reader may be a fingerprint scanner. The fingerprint scanner may be a capacitive fingerprint scanner.

In embodiments, prior to converting the first digital biometric image into an invariant biometric feature vector the secure enclave processor core may convert the first digital biometric image into a sixth digital biometric image by applying a distortion to the first digital biometric image, the distortion based at least in part upon the user password and the sixth digital biometric image to be converted into an invariant biometric feature vector in place of the first digital biometric image.

In embodiments, applying the distortion to the first digital biometric image can comprise selecting from a predefined set of distortion algorithms based at least in part upon a numeric value derived from the user password. In embodiments, applying the distortion to the first digital biometric image can comprise selecting a pixel location associated with a center of distortion based at least in part upon a numeric value derived from the user password.

In embodiments, generating a threshold intensity value using the user password can comprise obtaining, by the secure enclave processor core, a numeric value from the user password; and normalizing, by the secure enclave processor core, the numeric value within a predefined intensity range of possible intensity values by scaling the numeric value based at least in part upon a relation between a range of possible numeric values and the predefined intensity range.

In embodiments, applying the threshold intensity value to the invariant feature vector to generate the 128-bit invariant code can comprise generating, using the threshold intensity value, a sequence of real numbers comprising a set of pseudo-random vectors; applying a Gram-Schmidt orthonormalization to the set of pseudo-random vectors to transform them into an orthonormal set of vectors; computing an inner product between the invariant biometric feature vector and the orthonormal set of vectors; assigning a value of zero to each inner product value less than the threshold intensity value and assigning a value of one to each inner product value greater than the threshold intensity value; mapping each value to a bit location based at least in part upon the location within the biometric feature vector; and aggregating the values in their respective locations to produce a bit string. In embodiments, applying the threshold intensity value to the invariant feature vector to generate the 128-bit invariant code can further comprise, prior to computing the inner product, normalizing the invariant biometric feature vector between the values negative one and positive one.

In embodiments, applying, by the secure enclave processor core, the invariant asymmetric private key to an electronic message can comprise receiving, at the secure enclave processor core from a normal processor core, the electronic message; evaluating, by the secure enclave processor core, the electronic message to verify the message data format; generating, by the secure enclave processor core, a message digest by computing a hash of the message payload; and encrypting, by the secure enclave processor core, the message digest using the private key.

In embodiments, a system for generating a secure biometric-based cryptographic key without storing biometric information in order to authenticate data in a deposit sweep transfer system can comprise one or more processors (e.g., of a mobile device) and non-transitory computer-readable memory having stored thereon instructions to perform the steps of receiving, via a first graphical user interface on a mobile device, a user password; capturing, using a biometric reader embedded in the mobile device, into a secure enclave processor core, a first digital biometric image of a biometric reading of a user, wherein the secure enclave processor core is only accessible to input passwords, digital biometric image data, and electronic messages targeted for encryption, and to receive from the secure enclave processor core encrypted electronic messages and public keys configured to verify the authenticity of encrypted electronic messages; converting, by the secure enclave processor core, the first digital biometric image into an invariant biometric feature vector using an integrated wavelet and Fourier-Mellin transformation process; converting, by the secure enclave processor core, the invariant feature vector using the user password into a 128-bit invariant code; generating, by the secure enclave processor core, an invariant asymmetric private key using the 128-bit invariant code and the user password; applying, by the secure enclave processor core, the invariant asymmetric private key to an electronic message comprising a message payload associated with a deposit sweep transaction to generate a digitally signed electronic message to be securely transmitted to a second device associated with the deposit sweep transaction; securely transmitting, from the mobile device to the second device, the digitally signed electronic message causing the deposit sweep transaction to be initiated upon successful verification of the digital signature using a corresponding public key previously provided to the second device, wherein the corresponding public key corresponds to the invariant asymmetric private key; and permanently deleting, from the secure enclave processor core, the user password, the first digital biometric image, the second digital biometric image, the third digital biometric image, the fourth digital biometric image, the fifth digital biometric image, the first set of feature data, the invariant biometric feature vector, the invariant asymmetric private key, and the 128-bit invariant code.

In embodiments, a method for performing deposit sweep transactions that bypass source and/or destination institution technological cooperation can comprise obtaining, by one or more transaction management computers from one or more databases comprising non-transitory computer-readable memory, source account access information for a source account of a client, the source account held at a source institution and the source account access information comprising source account identifying information and source account authentication information; obtaining, by the one or more transaction management computers, one or more transaction rules; obtaining, by the one or more transaction management computers according to the one or more transaction rules, source account transaction data comprising one or more buy orders and/or sell orders for the source account by accessing, by the one or more transaction management computers using the source account access information, a source account information portal of a source institution computer system associated with the source institution, wherein access to the source account information portal does not require specialized technological access to the source institution computer system or authorization from the source institution beyond the technological access and authorization provided to the client, and by obtaining, via the source account information portal, the source account transaction data; determining, by the one or more transaction management computers, that the source transaction data represents a net buy order having a net buy amount based at least in part on information in the transaction data; obtaining, by the one or more transaction management computers via the source account information portal, source account balance information for the source account comprising a source account balance; determining, by the one or more transaction management computers, that the source account balance does not equal or exceed the net buy amount for the net buy order; determining, by the one or more transaction management computers, a deficiency amount based at least in part on the source account balance information and the net buy amount; accessing, by the one or more transaction management computers, the one or more databases to obtain depository account access information for a depository account held at a depository institution, the depository account access information comprising at least depository account identifying information and depository account authentication information; obtaining, by the one or more transaction management computers, depository account balance information for the depository account comprising a depository account balance by accessing, by the one or more transaction management computers using the depository account access information, a depository account information portal of a depository institution computer system associated with the depository institution, wherein access to the depository account information portal does not require specialized technological access to the depository institution computer system or authorization from the depository institution beyond the technological access and authorization provided to the client, and by obtaining, via the depository account information portal, the depository account balance information; determining, by the one or more transaction management computers, that the depository account balance equals the deficiency amount or exceeds the deficiency amount by at least a depository account balance threshold amount; generating, by the one or more transaction management computers, electronic transaction instructions for a transfer of at least the deficiency amount from the depository account to the source account; providing, by the one or more transaction management computers to the depository institution computer system via a depository account transaction portal of the depository institution computer system, the electronic transaction instructions causing the depository institution computer system to execute the transfer; generating, by the one or more transaction management computers, an electronic notification of the transfer; and transmitting, by the one or more transaction management computers to a client device associated with the client, the electronic notification of the transfer.

In embodiments, the method for performing deposit sweep transactions can further comprise determining, by the one or more transaction management computers, that the deficiency amount exceeds the depository account balance; generating, by the one or more transaction management computers, a second electronic notification comprising an indication of the deficiency amount; and transmitting, by the one or more transaction management computers to the client device, the second electronic notification.

In embodiments, the method for performing deposit sweep transactions can further comprise generating, by one or more transaction management computers, first machine-readable instructions to render an account access information graphical user interface comprising account credential input fields; transmitting, from the one or more transaction management computers to a client device, the first machine-readable instructions, causing an interface application at the client device to be activated to render the account access information graphical user interface on a display screen operatively connected to the client device; receiving, at the one or more transaction management computers from the client device via the account access information graphical user interface, source account access information for a source account of a client associated with the client device, the source account held at a source institution and the source account access information comprising source account identifying information and source account authentication information; and storing, by the one or more transaction management computers, the source account access information in one or more databases comprising non-transitory computer-readable memory.

In embodiments, the one or more transaction rules may comprise an account monitoring frequency for obtaining source account transaction data. In embodiments, the one or more transaction rules comprise a source account minimum balance amount. In embodiments, determining, by the one or more transaction management computers, that the source account balance does not equal or exceed the net buy amount for the net buy order may comprise determining that the source account balance does not exceed the net buy amount by at least the source account minimum balance amount.

In embodiments, the one or more transaction management computers may obtain depository account balance information for a plurality of depository accounts. The method may further comprise generating, by the one or more transaction management computers, electronic transaction instructions for transfers of a portion of at least the deficiency amount from each of a plurality of the depository accounts to the source account; and providing, by the one or more transaction management computers to respective depository institution computer systems via respective depository account transaction portals, the electronic transaction instructions causing the depository institution computer systems to execute the transfers. The one or more transaction management computers may determine the depository accounts from which to transfer funds based at least in part upon the transaction rules. In embodiments, the transaction rules may comprise any of minimizing a number of transfers necessary to cover the deficiency amount, preferencing depository accounts that have no FDIC coverage, or using depository accounts according to a preference order specified by the client.

In embodiments, the depository account balance threshold amount may be a depository account minimum balance.

In embodiments, the method may further comprise, prior to the step of generating, by the one or more transaction management computers, electronic transaction instructions, the steps of generating, a second electronic notification comprising an indication of a proposed sweep transfer of at least the deficiency amount from the depository account to the source account and a request for authorization to proceed with the proposed sweep transfer; and transmitting, from the one or more transaction management computers to the client device, the second electronic notification. In embodiments, the one or more transaction management computers may receive an electronic authorization to proceed with the proposed sweep transfer. The electronic authorization may be encrypted using an asymmetric private key generated based at least in part upon an invariant biometric feature vector associated with the client.

In embodiments, the source account information portal may comprise an application programming interface. In embodiments, the source account information portal may comprise a website accessible at a URL via the Internet. Obtaining, via the source account information portal, the source account transaction data may comprise screen scraping.

In embodiments, the electronic notification may comprise an updated source account balance after the transfer is executed or an updated depository account balance after the transfer is executed.

In embodiments, the electronic transaction instructions may comprise ACH instructions.

In embodiments, a system for performing deposit sweep transactions that bypass source and/or destination institution technological cooperation can comprise one or more processors and non-transitory computer-readable memory having stored thereon instructions to perform the steps of obtaining, by one or more transaction management computers from one or more databases comprising non-transitory computer-readable memory, source account access information for a source account of a client, the source account held at a source institution and the source account access information comprising source account identifying information and source account authentication information; obtaining, by the one or more transaction management computers, one or more transaction rules; obtaining, by the one or more transaction management computers according to the one or more transaction rules, source account transaction data comprising one or more buy orders and/or sell orders for the source account by accessing, by the one or more transaction management computers using the source account access information, a source account information portal of a source institution computer system associated with the source institution, wherein access to the source account information portal does not require specialized technological access to the source institution computer system or authorization from the source institution beyond the technological access and authorization provided to the client, and by obtaining, via the source account information portal, the source account transaction data; determining, by the one or more transaction management computers, that the source transaction data represents a net buy order having a net buy amount based at least in part on information in the transaction data; obtaining, by the one or more transaction management computers via the source account information portal, source account balance information for the source account comprising a source account balance; determining, by the one or more transaction management computers, that the source account balance does not equal or exceed the net buy amount for the net buy order; determining, by the one or more transaction management computers, a deficiency amount based at least in part on the source account balance information and the net buy amount; accessing, by the one or more transaction management computers, the one or more databases to obtain depository account access information for a depository account held at a depository institution, the depository account access information comprising at least depository account identifying information and depository account authentication information; obtaining, by the one or more transaction management computers, depository account balance information for the depository account comprising a depository account balance by accessing, by the one or more transaction management computers using the depository account access information, a depository account information portal of a depository institution computer system associated with the depository institution, wherein access to the depository account information portal does not require specialized technological access to the depository institution computer system or authorization from the depository institution beyond the technological access and authorization provided to the client, and by obtaining, via the depository account information portal, the depository account balance information; determining, by the one or more transaction management computers, that the depository account balance equals the deficiency amount or exceeds the deficiency amount by at least a depository account balance threshold amount; generating, by the one or more transaction management computers, electronic transaction instructions for a transfer of at least the deficiency amount from the depository account to the source account; providing, by the one or more transaction management computers to the depository institution computer system via a depository account transaction portal of the depository institution computer system, the electronic transaction instructions causing the depository institution computer system to execute the transfer; generating, by the one or more transaction management computers, an electronic notification of the transfer; and transmitting, by the one or more transaction management computers to a client device associated with the client, the electronic notification of the transfer.

In embodiments, a method for performing deposit sweep transactions that bypass source and/or destination institution technological cooperation can comprise obtaining, by one or more transaction management computers from one or more databases comprising non-transitory computer-readable memory, source account access information for a source account of a client, the source account held at a source institution and the source account access information comprising source account identifying information and source account authentication information; obtaining, by the one or more transaction management computers, one or more transaction rules comprising at least a source account maximum balance; obtaining, by the one or more transaction management computers, source account balance information for the source account comprising a source account balance by accessing, by the one or more transaction management computers using the source account access information, a source account information portal of a source institution computer system associated with the source institution, wherein access to the source account information portal does not require specialized technological access to the source institution computer system or authorization from the source institution beyond the technological access and authorization provided to the client, and by obtaining, via the source account information portal, the source account balance information; determining, by the one or more transaction management computers, that the source account balance exceeds the source account maximum balance; determining, by the one or more transaction management computers, an excess amount based at least in part upon the source account balance and the source account maximum balance; accessing, by the one or more transaction management computers, the one or more databases to obtain depository account information for a depository account held at a depository institution, the depository account information comprising at least a depository account address; generating, by the one or more transaction management computers, electronic transaction instructions for a transfer of at least the excess amount from the source account to the depository account; providing, by the one or more transaction management computers to the source institution computer system via a source account transaction portal of the source institution computer system, the electronic transaction instructions causing the source institution computer system to execute the transfer; generating, by the one or more transaction management computers, an electronic notification of the transfer; and transmitting, by the one or more transaction management computers to the client device, the electronic notification of the transfer.

In embodiments, the method may further comprise generating, by one or more transaction management computers, first machine-readable instructions to render an account access information graphical user interface comprising account credential input fields; transmitting, from the one or more transaction management computers to a client device, the first machine-readable instructions, causing an interface application at the client device to be activated to render the account access information graphical user interface on a display screen operatively connected to the client device; receiving, at the one or more transaction management computers from the client device via the account access information graphical user interface, source account access information for a source account of a client associated with the client device, the source account held at a source institution and the source account access information comprising source account identifying information and source account authentication information; and storing, by the one or more transaction management computers, the source account access information in one or more databases comprising non-transitory computer-readable memory.

In embodiments, the method may further comprise obtaining, by the one or more transaction management computers, depository account access information comprising at least depository account authentication information; obtaining, by the one or more transaction management computers, depository account balance information for the depository account comprising a depository account balance by accessing, by the one or more transaction management computers using the depository account access information, a depository account information portal of a depository institution computer system associated with the depository institution, wherein access to the depository account information portal does not require specialized technological access to the depository institution computer system or authorization from the depository institution beyond the technological access and authorization provided to the client, and by obtaining, via the depository account information portal, the depository account balance information; obtaining, by the one or more transaction management computers, depository account maximum balance information comprising a depository account maximum balance; and determining, by the one or more transaction management computers, that a post-transfer depository account balance will not exceed the depository account maximum balance.

In embodiments, the depository account maximum balance may be based at least in part upon a maximum insurable amount for FDIC insurance.

In embodiments, the transaction rules may further comprise an account monitoring frequency for obtaining source account balance data.

In embodiments, the source account information portal may comprise an application programming interface. In embodiments, the source account information portal may comprise a website accessible at a URL via the Internet. Obtaining, via the source account information portal, the source account balance information may comprise screen scraping.

In embodiments, the electronic transaction instructions may comprise ACH instructions.

In embodiments, a system for performing deposit sweep transactions that bypass source and/or destination institution technological cooperation can comprise one or more processors and non-transitory computer-readable memory having stored thereon instructions to perform the steps of obtaining, by one or more transaction management computers from one or more databases comprising non-transitory computer-readable memory, source account access information for a source account of a client, the source account held at a source institution and the source account access information comprising source account identifying information and source account authentication information; obtaining, by the one or more transaction management computers, one or more transaction rules comprising at least a source account maximum balance; obtaining, by the one or more transaction management computers, source account balance information for the source account comprising a source account balance by accessing, by the one or more transaction management computers using the source account access information, a source account information portal of a source institution computer system associated with the source institution, wherein access to the source account information portal does not require specialized technological access to the source institution computer system or authorization from the source institution beyond the technological access and authorization provided to the client, and by obtaining, via the source account information portal, the source account balance information; determining, by the one or more transaction management computers, that the source account balance exceeds the source account maximum balance; determining, by the one or more transaction management computers, an excess amount based at least in part upon the source account balance and the source account maximum balance; accessing, by the one or more transaction management computers, the one or more databases to obtain depository account information for a depository account held at a depository institution, the depository account information comprising at least a depository account address; generating, by the one or more transaction management computers, electronic transaction instructions for a transfer of at least the excess amount from the source account to the depository account; providing, by the one or more transaction management computers to the source institution computer system via a source account transaction portal of the source institution computer system, the electronic transaction instructions causing the source institution computer system to execute the transfer; generating, by the one or more transaction management computers, an electronic notification of the transfer; and transmitting, by the one or more transaction management computers to the client device, the electronic notification of the transfer.

In embodiments, a method for performing deposit sweep transactions that bypass source and/or destination institution technological cooperation can comprise transmitting, from a client device associated with a client to a transaction management computer system comprising one or more computers, client access credentials associated with a transaction management account; receiving, at the client device from the transaction management computer system, machine-readable instructions to render an account information graphical user interface; receiving, at the client device from a user input device, source account access information for a source account of the client, the source account held at a source institution and the source account access information comprising source account identifying information and source account authentication information; transmitting, from the client device to the transaction management computer system via the account information graphical user interface, the source account access information; accessing, by the client device, a source account transaction portal of a source institution computer system associated with the source institution, the source account transaction portal comprising transaction parameter options for transactions from the source account; transmitting, by the client device to the source institution computer system via the source account transaction portal, electronic transaction instructions comprising transaction parameters; receiving, at the client device from the transaction management computer system, a first electronic notification of a proposed sweep transfer from a deposit account associated with the client to the source account, the transaction management computer system having monitored the source account using the source account authentication information to access a source account information portal of the source institution computer system and having determined a deficiency of funds in the source account based at least in part upon pending order information obtained via the source account information portal; transmitting, from the client device to the transaction management computer system, an electronic authorization to perform the proposed sweep transfer; and receiving, at the client device from the transaction management computer system, a second electronic notification comprising an indication that the proposed sweep transfer was executed.

In embodiments, the method may further comprise receiving, at the client device from a user input device, depository account access information for a depository account of the client, the depository account held at a depository institution and the depository account access information comprising depository account identifying information and depository account authentication information; and transmitting, from the client device to the transaction management computer system via the account information graphical user interface, the depository account access information.

In embodiments, a system for performing deposit sweep transactions that bypass source and/or destination institution technological cooperation can comprise one or more processors and non-transitory computer-readable memory having stored thereon instructions to perform the steps of transmitting, from a client device associated with a client to a transaction management computer system comprising one or more computers, client access credentials associated with a transaction management account; receiving, at the client device from the transaction management computer system, machine-readable instructions to render an account information graphical user interface; receiving, at the client device from a user input device, source account access information for a source account of the client, the source account held at a source institution and the source account access information comprising source account identifying information and source account authentication information; transmitting, from the client device to the transaction management computer system via the account information graphical user interface, the source account access information; accessing, by the client device, a source account transaction portal of a source institution computer system associated with the source institution, the source account transaction portal comprising transaction parameter options for transactions from the source account; transmitting, by the client device to the source institution computer system via the source account transaction portal, electronic transaction instructions comprising transaction parameters; receiving, at the client device from the transaction management computer system, a first electronic notification of a proposed sweep transfer from a deposit account associated with the client to the source account, the transaction management computer system having monitored the source account using the source account authentication information to access a source account information portal of the source institution computer system and having determined a deficiency of funds in the source account based at least in part upon pending order information obtained via the source account information portal; transmitting, from the client device to the transaction management computer system, an electronic authorization to perform the proposed sweep transfer; and receiving, at the client device from the transaction management computer system, a second electronic notification comprising an indication that the proposed sweep transfer was executed.

In embodiments, a method of performing a deposit sweep transaction with customer control can comprise receiving, at a deposit sweep computer system comprising one or more computers, a deposit sweep file for a deposit sweep program, the deposit sweep file comprising transaction information; determining, by the deposit sweep computer system based at least in part upon the transaction information, allocations of funds for a plurality of customers, the allocations comprising identifications for each respective customer of one or more respective destination depository institutions and respective amounts to allocate to each respective destination depository institution; determining, by the deposit sweep computer system, for a first respective customer that at least one of the one or more respective destination depository institutions is a different destination depository institution for the first respective customer, the different destination depository institution not currently holding customer funds for the deposit sweep program for the first respective customer; generating, by the deposit sweep computer system, first machine-readable instructions to render a destination institution management graphical user interface comprising a different destination depository institution notification indicating that at least a portion of the customer funds are allocated to the different destination depository institution and further comprising a graphical accept option to approve the allocation and a graphical reject option to reject the allocation; providing, by the deposit sweep computer system to a client device, the first machine-readable instructions, causing the client device to activate an interface application to render the destination institution management graphical user interface on a display screen operatively connected to the client device; receiving, at the deposit sweep computer system from the client device, an approval of the allocation via the graphical accept option of the destination institution management graphical user interface; and executing, by the deposit sweep computer system, the allocations of funds.

In embodiments, the transaction information may comprise debits, credits, and/or balance information associated with a client account, and/or net credits, net debits information associated with a client account.

In embodiments, the step of determining, by the deposit sweep computer system, for the first respective customer that at least one of the one or more respective destination depository institutions is a different destination depository institution can comprise determining that the different destination depository institution does not hold customer funds in non-program accounts at the different destination depository institution.

In embodiments, the different destination depository institution notification may comprise an indication of the amount of funds allocated to the different destination depository institution for the first respective customer.

In embodiments, the destination institution management graphical user interface may comprise a transfer amount input element by which a user may input a maximum amount of funds permitted to be allocated to the different destination depository institution. The method may further comprise receiving, at the deposit sweep computer system from the client device along with the approval of the allocation, a maximum transfer amount via the transfer amount input element of the destination institution management graphical user interface; and determining, an updated allocation of funds based at least in part upon the maximum transfer amount, wherein executing, by the deposit sweep computer system, the allocations of funds comprises executing the updated allocation of funds.

In embodiments, the method may further comprise storing, by the deposit sweep computer system in one or more databases comprising non-transitory computer-readable memory, an indication of the approval of the allocation, the indication comprising an identification of the different destination depository institution.

In embodiments, the method may further comprise prior to executing the allocations of funds, determining, by the deposit sweep computer system, for a second respective customer that at least one of the one or more respective destination depository institutions is a respective different destination depository institution for the second respective customer, the respective different destination depository institution not currently holding customer funds for the deposit sweep program for the second respective customer; generating, by the deposit sweep computer system, second machine-readable instructions to render a respective destination institution management graphical user interface comprising a respective different destination depository institution notification indicating that at least a portion of the customer funds of the second respective customer are allocated to the respective different destination depository institution and further comprising a respective graphical accept option to approve the allocation and a respective graphical reject option to reject the allocation; providing, by the deposit sweep computer system to a second client device associated with the second respective customer, the second machine-readable instructions, causing the second client device to activate a respective interface application to render the respective destination institution management graphical user interface on a respective display screen operatively connected to the second client device; receiving, at the deposit sweep computer system from the second client device, a respective approval of the allocation via the respective graphical accept option of the respective destination institution management graphical user interface; and executing, by the deposit sweep computer system, the allocations of funds.

In embodiments, a system for performing a deposit sweep transaction with customer control can comprise one or more processors and non-transitory computer-readable memory having stored thereon instructions to perform the steps of receiving, at a deposit sweep computer system comprising one or more computers, a deposit sweep file for a deposit sweep program, the deposit sweep file comprising transaction information; determining, by the deposit sweep computer system based at least in part upon the transaction information, allocations of funds for a plurality of customers, the allocations comprising identifications for each respective customer of one or more respective destination depository institutions and respective amounts to allocate to each respective destination depository institution; determining, by the deposit sweep computer system, for a first respective customer that at least one of the one or more respective destination depository institutions is a different destination depository institution for the first respective customer, the different destination depository institution not currently holding customer funds for the deposit sweep program for the first respective customer; generating, by the deposit sweep computer system, first machine-readable instructions to render a destination institution management graphical user interface comprising a different destination depository institution notification indicating that at least a portion of the customer funds are allocated to the different destination depository institution and further comprising a graphical accept option to approve the allocation and a graphical reject option to reject the allocation; providing, by the deposit sweep computer system to a client device, the first machine-readable instructions, causing the client device to activate an interface application to render the destination institution management graphical user interface on a display screen operatively connected to the client device; receiving, at the deposit sweep computer system from the client device, an approval of the allocation via the graphical accept option of the destination institution management graphical user interface; and executing, by the deposit sweep computer system, the allocations of funds.

In embodiments, a client device, which may be a mobile device such as a mobile phone, may comprise one or more processors and non-transitory computer-readable memory having stored thereon computer-readable instructions to perform the steps of receiving, at client device associated with a first respective customer from a deposit sweep computer system, first machine-readable instructions to render a destination institution management graphical user interface comprising first display data comprising a different destination depository institution notification indicating that at least a portion of the customer funds are allocated to a different destination depository institution not currently holding funds of the first respective customer, the destination institution management graphical user interface further comprising a graphical accept option to approve the allocation of funds and a graphical reject option to reject the allocation; activating, by the client device an interface application to render the destination institution management graphical user interface on a display screen operatively connected to the client device; receiving, at the client device via an input device, a user selection of the graphical accept option; transmitting, from the client device to the deposit sweep computer system, an electronic approval of the allocation corresponding to the user selection of the graphical reject option; and receiving, at the client device, an electronic notification of an execution of the allocation of funds.

In embodiments, a method of performing a deposit sweep transaction with customer control can comprise receiving, at a deposit sweep computer system comprising one or more computers, a deposit sweep file for a deposit sweep program, the deposit sweep file comprising transaction information; determining, by the deposit sweep computer system based at least in part upon the transaction information, allocations of funds for a plurality of customers, the allocations comprising identifications for each respective customer of one or more respective destination depository institutions and respective amounts to allocate to each respective destination depository institution; determining, by the deposit sweep computer system, for a first respective customer that at least one of the one or more respective destination depository institutions is a different destination depository institution for the first respective customer, the different destination depository institution not currently holding customer funds for the deposit sweep program for the first respective customer; generating, by the deposit sweep computer system, first machine-readable instructions to render a destination institution management graphical user interface comprising first display data comprising a different destination depository institution notification indicating that at least a portion of the customer funds are allocated to the different destination depository institution and further comprising a graphical accept option to approve the allocation and a graphical reject option to reject the allocation; providing, by the deposit sweep computer system to a client device, the first machine-readable instructions, causing the client device to activate an interface application to render the destination institution management graphical user interface on a display screen operatively connected to the client device; receiving, at the deposit sweep computer system from the client device, a rejection of the allocation via the graphical reject option of the destination institution management graphical user interface; generating, by the deposit sweep computer system, second machine-readable instructions to render an updated destination institution management graphical user interface comprising second display data, the second display data comprising one or more alternate depository institution selection options; providing, by the deposit sweep computer system to the client device, the second machine-readable instructions, causing the client device to render the updated destination institution management graphical user interface; receiving, at the deposit sweep computer system from the client device via the updated destination institution management graphical user interface, an alternate depository institution selection comprising a selection of at least one of the alternate depository institution selection options; determining, by the deposit sweep computer system, an updated allocation of funds based at least in part upon the alternate depository institution selection; and executing, by the deposit sweep computer system, the updated allocations of funds.

In embodiments, the transaction information may comprise debits, credits, and/or balance information associated with a client account, and/or net credits, net debits information associated with a client account.

In embodiments, determining, by the deposit sweep computer system, for the first respective customer that at least one of the one or more respective destination depository institutions is a different destination depository institution may comprise determining that the different destination depository institution does not have an existing account for the first respective customer.

In embodiments, the different destination depository institution notification may comprise an indication of the amount of funds allocated to the different destination depository institution for the first respective customer.

In embodiments, the destination institution management graphical user interface may comprise respective maximum transfer amount input elements associated with each of the one or more alternate depository institution selection options by which a user may input respective maximum amounts of funds permitted to be allocated to the respective alternate depository institutions.

In embodiments, the method may further comprise storing, by the deposit sweep computer system in one or more databases comprising non-transitory computer-readable memory, an indication of the rejection of the allocation, the indication comprising an identification of the different destination depository institution. In embodiments, the method may further comprise storing, by the deposit sweep computer system in one or more databases comprising non-transitory computer-readable memory, an indication of the alternate depository institution selection, the indication comprising an identification of the alternate depository institution associated with the alternate depository institution selection.

In embodiments, a system for performing a deposit sweep transaction with customer control can comprise one or more processors and non-transitory computer-readable memory having stored thereon instructions to perform the steps of receiving, at a deposit sweep computer system comprising one or more computers, a deposit sweep file for a deposit sweep program, the deposit sweep file comprising transaction information; determining, by the deposit sweep computer system based at least in part upon the transaction information, allocations of funds for a plurality of customers, the allocations comprising identifications for each respective customer of one or more respective destination depository institutions and respective amounts to allocate to each respective destination depository institution; determining, by the deposit sweep computer system, for a first respective customer that at least one of the one or more respective destination depository institutions is a different destination depository institution for the first respective customer, the different destination depository institution not currently holding customer funds for the deposit sweep program for the first respective customer; generating, by the deposit sweep computer system, first machine-readable instructions to render a destination institution management graphical user interface comprising first display data comprising a different destination depository institution notification indicating that at least a portion of the customer funds are allocated to the different destination depository institution and further comprising a graphical accept option to approve the allocation and a graphical reject option to reject the allocation; providing, by the deposit sweep computer system to a client device, the first machine-readable instructions, causing the client device to activate an interface application to render the destination institution management graphical user interface on a display screen operatively connected to the client device; receiving, at the deposit sweep computer system from the client device, a rejection of the allocation via the graphical reject option of the destination institution management graphical user interface; generating, by the deposit sweep computer system, second machine-readable instructions to render an updated destination institution management graphical user interface comprising second display data, the second display data comprising one or more alternate depository institution selection options; providing, by the deposit sweep computer system to the client device, the second machine-readable instructions, causing the client device to render the updated destination institution management graphical user interface; receiving, at the deposit sweep computer system from the client device via the updated destination institution management graphical user interface, an alternate depository institution selection comprising a selection of at least one of the alternate depository institution selection options; determining, by the deposit sweep computer system, an updated allocation of funds based at least in part upon the alternate depository institution selection; and executing, by the deposit sweep computer system, the updated allocations of funds.

In embodiments, a client device, which may be a mobile device such as a mobile phone, may comprise one or more processors and non-transitory computer-readable memory having stored thereon computer-readable instructions to perform the steps of receiving, at client device associated with a first respective customer from a deposit sweep computer system, first machine-readable instructions to render a destination institution management graphical user interface comprising first display data comprising a different destination depository institution notification indicating that at least a portion of the customer funds are allocated to a different destination depository institution not currently holding funds of the first respective customer, the destination institution management graphical user interface further comprising a graphical accept option to approve the allocation and a graphical reject option to reject the allocation; activating, by the client device an interface application to render the destination institution management graphical user interface on a display screen operatively connected to the client device; receiving, at the client device via an input device, a user selection of the graphical reject option; transmitting, from the client device to the deposit sweep computer system, an electronic rejection of the allocation corresponding to the user selection of the graphical reject option; receiving, at the client device from the deposit sweep computer system, second machine-readable instructions to render an updated destination institution management graphical user interface comprising second display data, the second display data comprising one or more alternate depository institution selection options; rendering, by the client device the updated destination institution management graphical user interface on the display screen; receiving, at the client device via an input device, an alternate depository institution selection comprising a user selection of at least one of the alternate depository institution selection options; transmitting, from the client device to the deposit sweep computer system, the alternate depository institution selection; receiving, at the client device, an electronic notification of an updated allocation of funds, wherein the allocation does not allocate funds to the different destination depository institution and wherein the allocation allocates funds to an alternate depository institution associated with the alternate depository institution selection.

In embodiments, a method of performing a deposit sweep transaction with customer control can comprise receiving, at a deposit sweep computer system comprising one or more computers, a deposit sweep file for a deposit sweep program, the deposit sweep file comprising transaction information; determining, by the deposit sweep computer system based at least in part upon the transaction information, first allocations of funds for a plurality of customers, the first allocations comprising for each respective customer identifications of one or more respective destination depository institutions and respective amounts to allocate to each respective destination depository institution; determining, by the deposit sweep computer system, for a first subset of the plurality of customers that for each respective customer of the first subset of the plurality of customers at least one of the respective destination depository institutions is a respective different destination depository institution, the respective different destination depository institution not currently holding funds of the respective customer for the deposit sweep program; generating, by the deposit sweep computer system, respective first machine-readable instructions to render respective destination institution management graphical user interfaces each comprising respective first display data comprising a different destination depository institution notification indicating that at least a portion of the funds of the respective customer are allocated to the respective different destination depository institution and further comprising a respective graphical accept option to approve the respective allocation and a respective graphical reject option to reject the respective allocation; providing, by the deposit sweep computer system to a plurality of respective client devices each associated with one of the respective customers of the first subset of the plurality of customers, the respective first computer-readable instructions causing each respective client device to activate a respective interface application to render the respective destination institution management graphical user interface on a respective display screen operatively connected to the respective client device; receiving, at the deposit sweep computer system from a first subset of the respective client devices within a predefined period of time, respective approvals of the respective different destination depository institutions via respective selections of the respective accept options; receiving, at the deposit sweep computer system from a second subset of the respective client devices within the predefined period of time, respective rejections of the respective different destination depository institutions via respective selections of the respective reject options; determining, by the deposit sweep computer system, second allocations of funds for the plurality of customers, the second allocations based at least in part upon the transaction information, the first allocations, and the respective rejections; and executing, by the deposit sweep computer system, the second allocations of funds.

In embodiments, the method may further comprise, prior to determining the second allocations of funds, determining, by the deposit sweep computer system, a third subset of the respective client devices comprising those of the plurality of respective client devices not included in the first subset or the second subset of the respective client devices; and determining, by the deposit sweep computer system, respective approvals of the respective different destination depository institutions for each respective client device of the third subset of the respective client devices.

In embodiments, at least one of the respective rejections may comprise a selection of one or more alternate depository institutions.

In embodiments, executing the second allocations of funds may comprise updating an electronic ledger.

In embodiments, the method may further comprise, prior to determining the second allocations of funds, generating, by the deposit sweep computer system for each of the second subset of the respective client devices, respective second machine-readable instructions to render respective updated destination institution management graphical user interfaces each comprising respective second display data comprising one or more respective alternate depository institution selection options; providing, by the deposit sweep computer system to the second subset of the respective client devices, the respective second machine-readable instructions, causing each respective client device to render the respective updated destination institution management graphical user interface; and receiving, at the deposit sweep computer system from one or more of the second subset of the respective client devices via the respective updated destination institution management graphical user interfaces, respective alternate depository institution selections comprising respective selections of at least one of the respective alternate depository institution selection options, wherein determining, by the deposit sweep computer system, second allocations of funds for the plurality of customers comprises determining the second allocations based at least in part upon the transaction information, the first allocations, and the respective alternate depository institution selections.

In embodiments, the second allocations of funds do not include allocations of funds for the plurality of customers to the respective different destination depository institutions associated with the respective rejections.

In embodiments, a system for performing a deposit sweep transaction with customer control can comprise one or more processors and non-transitory computer-readable memory having stored thereon instructions to perform the steps of receiving, at a deposit sweep computer system comprising one or more computers, a deposit sweep file for a deposit sweep program, the deposit sweep file comprising transaction information; determining, by the deposit sweep computer system based at least in part upon the transaction information, first allocations of funds for a plurality of customers, the first allocations comprising for each respective customer identifications of one or more respective destination depository institutions and respective amounts to allocate to each respective destination depository institution; determining, by the deposit sweep computer system, for a first subset of the plurality of customers that for each respective customer of the first subset of the plurality of customers at least one of the respective destination depository institutions is a respective different destination depository institution, the respective different destination depository institution not currently holding funds of the respective customer for the deposit sweep program; generating, by the deposit sweep computer system, respective first machine-readable instructions to render respective destination institution management graphical user interfaces each comprising respective first display data comprising a different destination depository institution notification indicating that at least a portion of the funds of the respective customer are allocated to the respective different destination depository institution and further comprising a respective graphical accept option to approve the respective allocation and a respective graphical reject option to reject the respective allocation; providing, by the deposit sweep computer system to a plurality of respective client devices each associated with one of the respective customers of the first subset of the plurality of customers, the respective first computer-readable instructions causing each respective client device to activate a respective interface application to render the respective destination institution management graphical user interface on a respective display screen operatively connected to the respective client device; receiving, at the deposit sweep computer system from a first subset of the respective client devices within a predefined period of time, respective approvals of the respective different destination depository institutions via respective selections of the respective accept options; receiving, at the deposit sweep computer system from a second subset of the respective client devices within the predefined period of time, respective rejections of the respective different destination depository institutions via respective selections of the respective reject options; determining, by the deposit sweep computer system, second allocations of funds for the plurality of customers, the second allocations based at least in part upon the transaction information, the first allocations, and the respective rejections; and executing, by the deposit sweep computer system, the second allocations of funds.

BRIEF DESCRIPTION OF THE DRAWINGS

The above and related objects, features, and advantages of the present invention, will be more fully understood by reference to the following detailed description of the exemplary embodiments of the present invention, when taken in conjunction with the following exemplary figures, wherein:

FIG. 5D is flow chart of embodiments of the invention using retrieval operations for processing account transactions in accordance with exemplary embodiments of the present invention.

FIGS. 5E-1-5E-3 are flow charts of an exemplary process for performing a bypass deposit sweep to fund a source account in accordance with embodiments of the present invention.

FIGS. 6D-1-6D-2 are flow charts of an exemplary process for performing a bypass deposit sweep to maintain a source account maximum balance in accordance with embodiments of the present invention.

FIG. 6E is a flow chart of an exemplary process for analyzing a destination account balance in accordance with exemplary embodiments of the present invention.

FIG. 7A is a schematic diagram of embodiments of a client interface screen for accessing client source accounts in accordance with exemplary embodiments of the present invention.

FIG. 7B is a schematic diagram of embodiments of a client interface screen for obtaining client authentication data for accessing client source accounts in accordance with exemplary embodiments of the present invention.

FIG. 7C is a schematic diagram of embodiments of a client interface screen for accessing client destination accounts in accordance with exemplary embodiments of the present invention.

FIG. 7D is a schematic diagram of embodiments of a client interface screen for obtaining client authentication data for accessing client destination accounts in accordance with exemplary embodiments of the present invention.

FIG. 8C is a schematic diagram of embodiments of a client interface screen that may be presented when the Add Source Account button is activated for adding a new client source account in accordance with exemplary embodiments of the present invention.

FIG. 8D is a schematic diagram of embodiments of a client interface screen that may be presented when the Edit Account button is activated for viewing and editing the data for a particular one of the client's source accounts in accordance with exemplary embodiments of the present invention.

FIGS. 12A-D illustrate exemplary selection of a core point on a digital biometric image for biometric feature extraction in accordance with exemplary embodiments of the present invention.

FIGS. 13A-13C-2 are flow chart of processes for providing customer control in an automated deposit sweep transaction in accordance with exemplary embodiments of the present invention.

DETAILED DESCRIPTION OF EMBODIMENTS

Figure 1A:
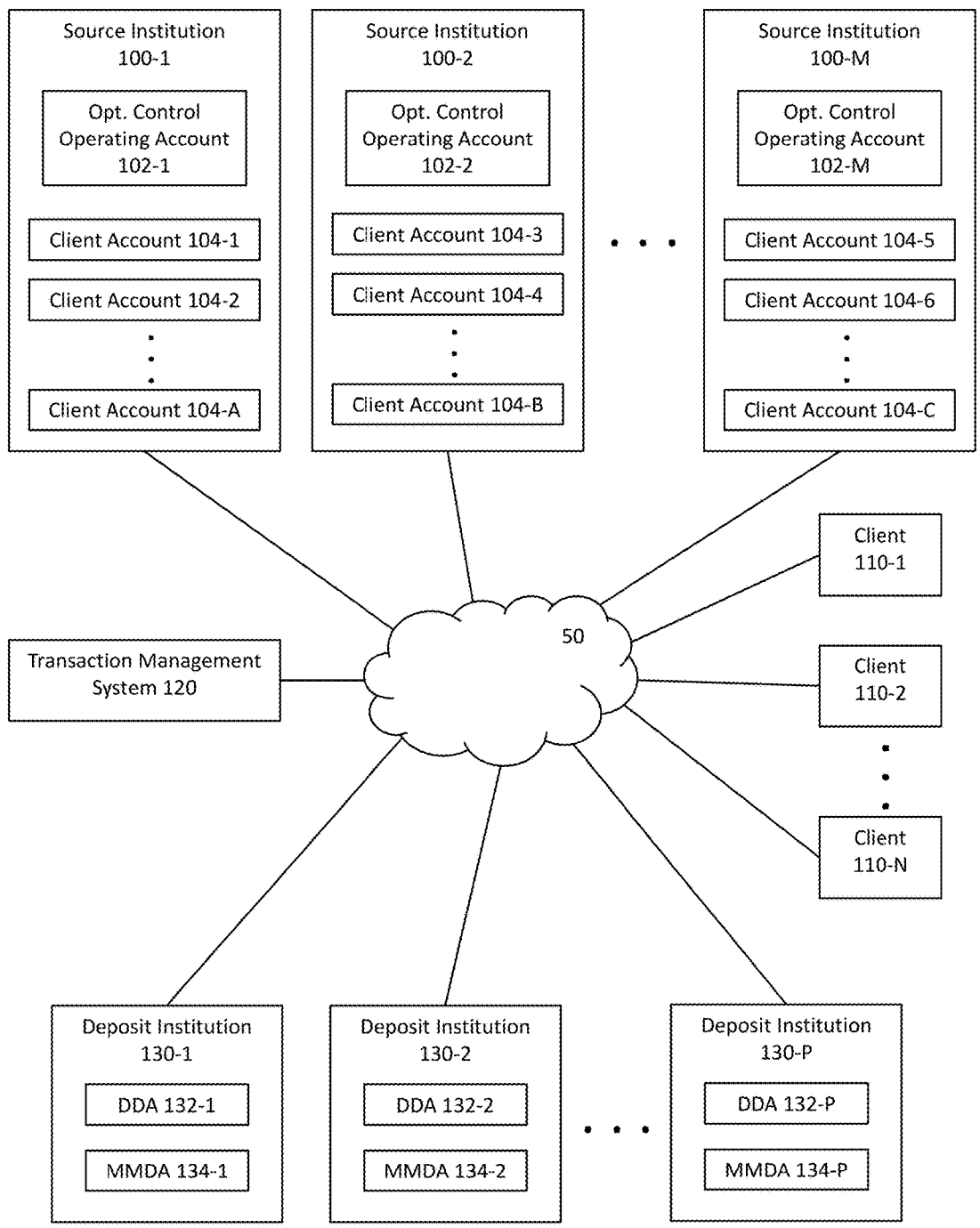
FIG. 1A is a schematic block diagram representing institutions, clients and a transaction management system in accordance with exemplary embodiments of the present invention.

The present invention generally relates to various technological improvements in systems, methods and program products used to transfer funds between trading accounts and interest bearing accounts.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

The automatic fund transfer programs of clearing firm computers currently control transfers between brokerage firms and cash management products, e.g., money market mutual funds, FDIC insured cash management products held in banks and other depository institution, and other cash management products. Note that a clearing firm or all or part of its functionality may be implemented in an independent entity, or in a source institution such as a broker dealer, or may be implemented in a source institution such as a program bank or other depository entity, or may be affiliated therewith. In particular, the automatic transfer functions of clearing firm computers, such as sweep programs for example, in many instances control coverage of the settlement of trades on behalf of a client in investment products. In embodiments, the invention provides a technical solution to enable an individual client to manage and perform fund transfer operations such as sweep transactions while bypassing automatic fund transfer functions, if any, in clearing firm computers and/or source institution computers and/or destination institution computers to eliminate the electronic processing delay and expense attendant thereto and, in embodiments, clearing firm and/or source institution and/or destination institution computer control. The technical problem solved is a unique problem caused by the shift of buy and sell transactions from the manual realm to computer control, so that an individual client no longer can directly control its buy and sell transactions. Note that in embodiments of the invention, a transfer function at a clearing firm computer or source or destination computer may be accessed by or on behalf of the client to make fund transfers, but this access will not be as part of an automatic transfer function of those entities. Thus, the active participation of the clearing firm and/or the source institution and/or the destination institution is bypassed though technological embodiments of the present invention.

Referring to FIG. 1A, there is shown a schematic block diagram representing institutions, clients and a transaction management system. The individual clients are represented by the client blocks 110-1, 110-2, . . . 110-N. The transaction management system (TMS) for performing the operations necessary to the automatic fund transfer programs of clearing firm and/or source institution and/or destination institution computers is represented by the block 120. The TMS 120 may be a deposit sweep computer system. The TMS 120 may be configured to access source and/or destination account information, e.g., using user credentials. In embodiments, a plurality of client accounts 104 may be associated with a single client 110.

Source institutions, e.g., various broker dealers which may originate buy and sell orders, are represented by the blocks 100-1, 100-2, . . . 100-M. Each of the source institutions is shown with a control operating account 102, which, in embodiments, may be an optional account. Each of the source institutions 100 is also shown with multiple different client accounts 104, e.g., for the client suffices 1, 2, . . . N. Source institutions may be banks, credit unions, other types of depository institutions, registered investment advisors, broker dealers, asset managers, trust companies, retirement programs, other financial institutions or intermediaries, to name a few. Typically, the source institutions are the institutions that interact with the clients that are placing or authorizing the respective clients' funds to go into and be managed by the system. Note that a source institution can be a clearing institution for one or more other source institutions or an intermediary for other source institutions. Source institutions can hold source accounts relating to securities and/or bonds, including trading thereof.

Depository institutions, e.g., destination institutions, are represented by the blocks 130-1, 130-2, . . . 130-P. Depository institutions can be any institution that is authorized to accept deposits and issue certificates of deposit. This would include state and national banks, state and federal savings banks, savings and loan associations, credit unions, and probably some industrial loan companies, depending on current law. Most but not necessarily all, would have government backed-insurance, such as Federal Deposit Insurance Corporation (FDIC) insurance, insurance for credit unions, or state insurance. Depository institutions can include banks holding bank accounts or institutions providing time deposit instruments, negotiable order of withdrawal (NOW) accounts, money market deposit accounts (MMDAs), aggregated MMDAs, demand deposit accounts (DDAs), aggregated DDAs, and/or certificates of deposit (CDs), to name a few. Each of the depository institutions is shown with an aggregated demand deposit account 132 holding the funds of multiple clients, and an aggregated money market deposit account 134 holding the funds of multiple clients. However, in embodiments, there may be a separate DDA and MMDA for each of multiple clients. In embodiments, a source institution may also be a depository institution and vice versa. Depository institutions may hold omnibus accounts and/or individual customer accounts. In embodiments, the source and deposit functions may be maintained in separate institutions. The entities shown may be associated with one or more computer systems and/or user electronic devices, as described herein with respect to FIG. 1C.

Depending on the particular deposit sweep transaction being executed, a source institution or a destination institution may be trading institution, such as a broker-dealer or brokerage institution, or a depository institution, such as a bank or other institution providing interest-bearing accounts (insured or not insured) or other investment accounts (e.g., money fund, exchange traded fund, etc.). Other destination institutions can include, by way of example, institutions holding, managing, and/or providing cash management vehicles and/or cash management accounts, such as DDAs, MMDAs, NOW accounts, stable value funds, credit interest programs, to name a few. Thus, a sweep transaction may involve an allocation, transfer, or other flow of funds from a source institution to a destination institution or vice versa from the destination institution to the source institution. In embodiments, a sweep transaction may involve an allocation, transfer, or other flow of funds from a first destination institution to a second destination institution.

While certain systems, methods, and program products described herein refer to embodiments involving deposit sweep transactions, it will be understood by one of skill in the art that such systems, methods, and program products may apply to other sweep transactions, such as cash sweep transactions, which may include money fund sweeps, stable value fund sweeps, capital investment plan (CIP) sweeps, or sweeps from or to any of the institutions holding cash management vehicles and/or cash management accounts as described herein, and the present invention extends to such embodiments.

Figure 1B:
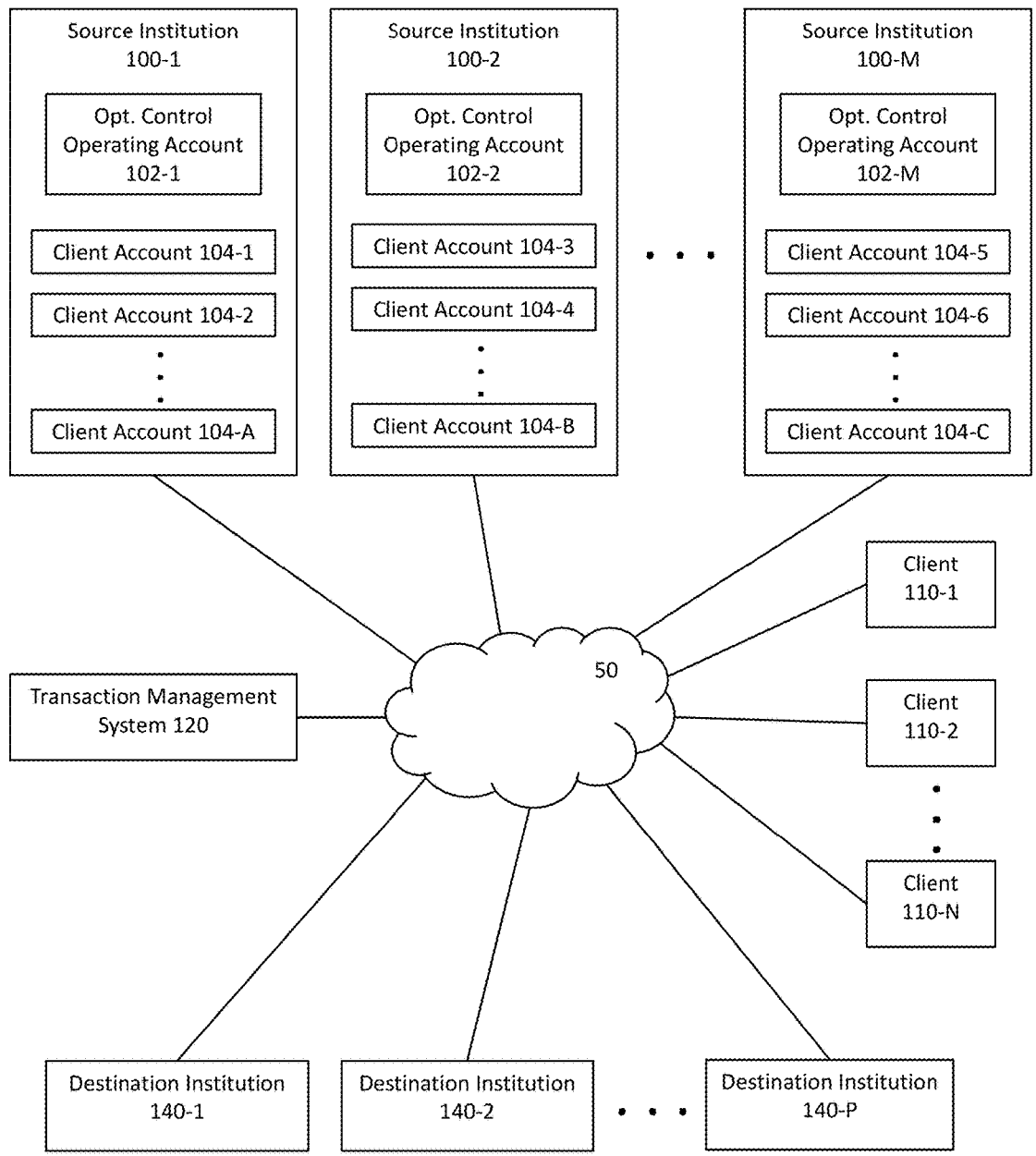
FIG. 1B is similar to FIG. 1A, except that the destination institutions 140 have been substituted for the depository institutions in accordance with exemplary embodiments of the present invention.

FIG. 1B is similar to FIG. 1A, except that the destination institutions 140 have been substituted for the deposit institutions. The destination institutions may include non-FDIC insured investment vehicles, such as money market mutual funds, other kinds of mutual funds, exchange traded funds (ETF), exchange traded notes (ETN), stable value funds, index funds, treasury bonds, stocks, bonds, notes, to name a few. Destination institutions can include institutions holding, managing, and/or providing cash management vehicles and/or cash management accounts, such as DDAs, MMDAs, NOW accounts, credit interest programs, to name a few. In preferred embodiments, investment vehicles should be liquid or substantially liquid, to name a few.

Figure 1C:
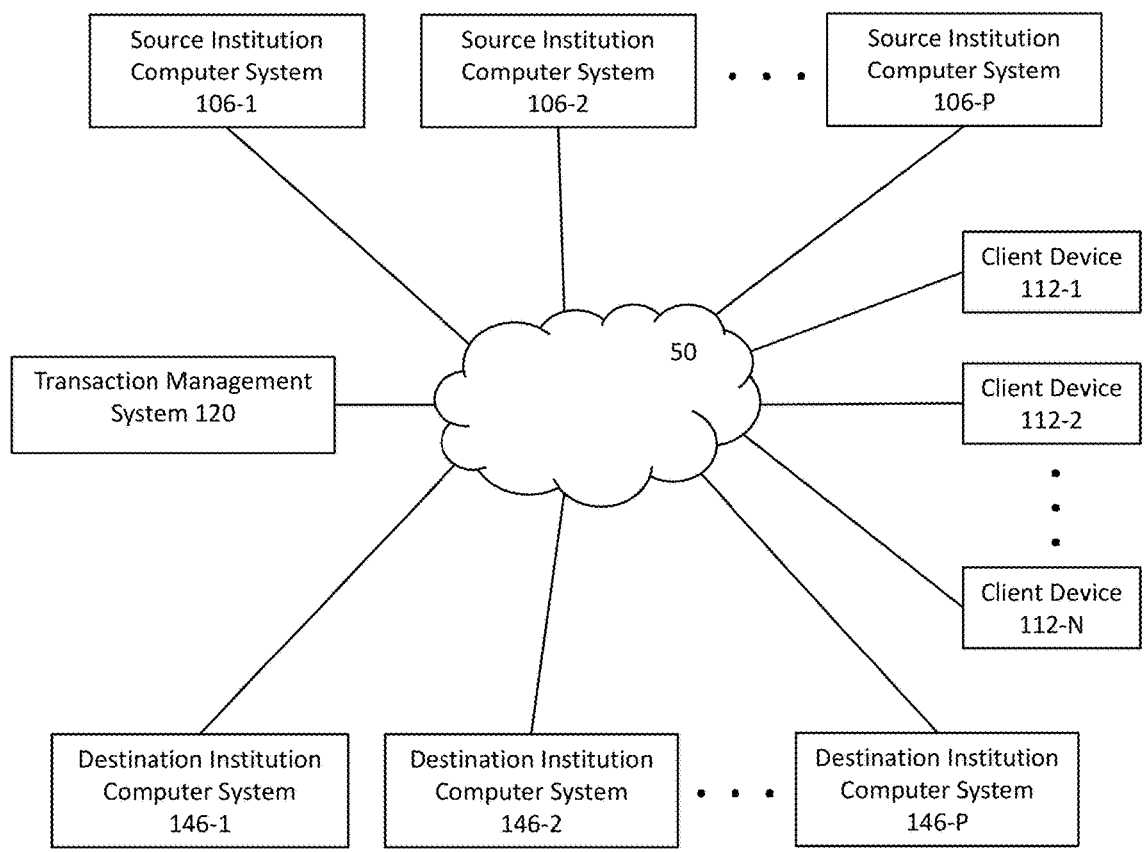
FIG. 1C is a schematic block diagram representing the computer systems for the institutions, clients and the transaction management system connecting via one or more communications networks in accordance with exemplary embodiments of the present invention.

FIG. 1C is a schematic block diagram representing the computer systems and/or user electronic devices for the institutions, clients and the transaction management system connecting via one or more electronic communications networks 50. An electronic communications network 50 may be a data network, such as the Internet, a wide area network, and/or a local area network, to name a few. The computer systems for the source institutions are represented by the blocks 106. The computer systems for the users are represented by the blocks 112. The computer systems for the destination institutions are represented by the blocks 146. The various computer systems may comprise one or more computers or user electronic devices. The computers and user electronic devices may comprise one or more processors, non-transitory computer-readable memory, communications portals, input devices (e.g., keyboard, mouse, touch screen, microphone, camera, scanner, to name a few) and output devices (e.g., display devices, speakers, to name a few). Communications portals can comprise hardware and/or software for transmitting, receiving, retrieving, and/or otherwise obtaining data, such as data packets or streams, according to one or more protocols, using wired and/or wireless communications. In embodiments, communications portals can include one or more communications chipsets, such as a GSM chipset, CDMA chipset, LTE chipset, Wi-Fi chipset, Bluetooth chipset, to name a few, and/or combinations thereof. Wired connections may be adapted for use with cable, telephone, fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports. Wireless connections may include cellular or cellular data connections adapted for use with one or more cellular communications protocols (e.g., digital cellular, PCS, CDPD, GPRS, EDGE, CDMA2000, 1×RTT, Ev-DO, HSPA, UMTS, 3G, 4G, 5G, and/or LTE, to name a few), and/or may include other wireless connections for use with wireless protocols such as Bluetooth, Bluetooth Low Energy, Wi-Fi, radio, satellite, and/or infrared connections, to name a few. Hardware for such communications portals can further include Ethernet interfaces (e.g., supporting a TCP/IP stack), X.25 interfaces, T1 interfaces, and/or antennas, to name a few.

Figure 2:
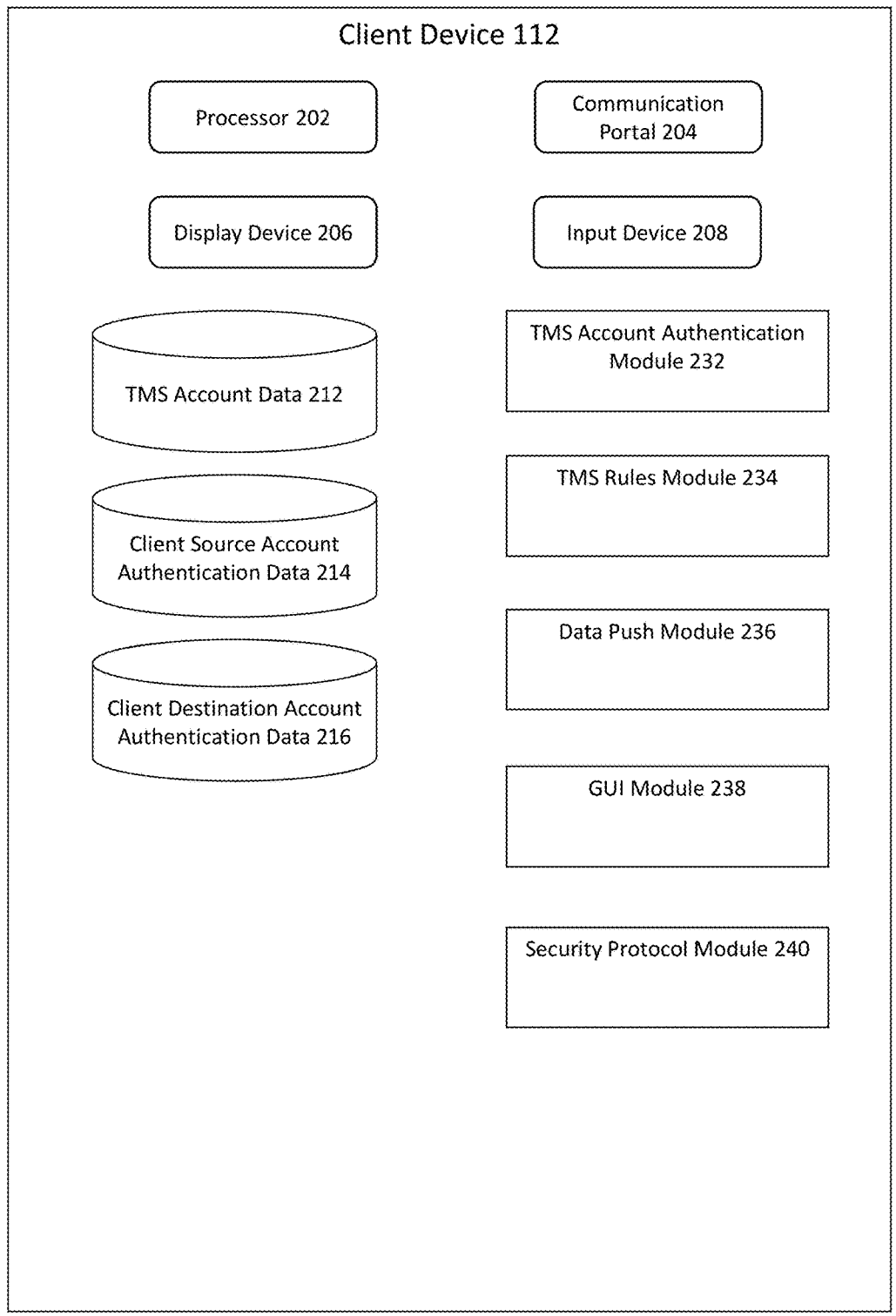
FIG. 2 is schematic block diagram representing components of a client device in accordance with exemplary embodiments of the present invention.

Referring to FIG. 2, there is shown a schematic block diagram representing components of a client device 112. In embodiments, the client device 112 may comprise a user electronic device, such as a computer, laptop computer, tablet computer, mobile phone, smart phone, PDA, web-enabled television, and/or wearable electronic device (e.g., watch and/or glasses), to name a few. In embodiments, the client device may comprise one or more processors 202, communications portals 204, display devices 206, e.g., an LCD display, and input devices 208, e.g., a keyboard, mouse, touch screen, etc. The client device 112 can further include non-transitory computer-readable memory. Data may be stored in one or more database stored on the computer-readable memory, and particular software modules may be stored on the computer-readable memory. Such modules may run or be configured to run on the one or more processors 202. Exemplary data and modules are described herein.

In embodiments, the client device 112 may comprise electronic data storage 212 for TMS account data. The TMS account data may comprise in embodiments, the user's information for the transaction management system 120, e.g., login credentials (username and/or password), contact information (email address, phone number, address), billing information (credit card information, bank account information), transaction rules, and/or notification settings, to name a few.

In embodiments, the client device 112 may comprise electronic data storage 214 for client source account authentication data. In embodiments, the client source account authentication data may comprise the user's information for accessing each account at the one or more source institutions of the client (e.g., account number, authentication information such as account login credentials, multi-factor authentication data, security questions, etc.). In embodiments, the client source account authentication data may also include information identifying the various source institutions. This may or may not be present on the client device. For example, in embodiments, such data may be stored at the TMS 120 instead of at the client device 112.

In embodiments, the client device 112 may comprise electronic data storage 216 for client destination account authentication data. In embodiments, the client destination account authentication data may comprise the user's information (e.g., login credentials, multi-factor authentication data, security questions) for accessing each account at one or more of the destination institutions or funds, or other destination institutions. The client destination account authentication data may also include information identifying the various destination accounts (destination institution or fund+account identifier, e.g. account number). This may or may not be present on the client device.

In embodiments, the client device 112 may store other data, such as transaction logs and/or account balance data for one or more accounts. In embodiments, the client device 112 may store account balance retrieval history data, which may identify one or more times associated with retrievals of account balance information.

In embodiments, the client device 112 may comprise a TMS Account Authentication Module 232 for logging into the user's TMS account (e.g., to manage settings, view history of fund transactions, to add accounts, etc.). In embodiments, this Module 232 may be configured to access the TMS Account Data 212 and the requisite authentication data to log in to the TMS 120. Screens for managing settings, viewing a history of transactions, etc., are shown and will be discussed in relation to FIGS. 8A-8F.

In embodiments, the client device 112 may comprise a TMS Rules electronic module 234 for creating and/or managing transaction rules (e.g., source/deposit account monitoring frequency, accounts to monitor, limits for cash transactions, account minimums and account maximums, to name a few). In embodiments, default electronic rules may be provided by the TMS, which may be stored at the client device 112 and/or stored at the TMS 120.

In embodiments, the client device 112 may comprise a data push module 236 configured to be triggered by an event, e.g., the receipt at the client device 112, via the one or more electronic networks 50 and the communications portal 204, of new balance data for accounts held in the client's source institutions 100, and/or new balance data for accounts held in the destination institutions 130, and/or may be triggered by the transmission of transaction data, e.g., buy and sell orders, or the receipt of this transaction data by the client device. In embodiments, this push module may be implemented using Web Socket technology, Java applets or other plug-ins, to name a few.

The client device 112 may include a graphical user interface (GUI) module 238. A GUI module 238 may receive display data from one or more remote sources (e.g., computer servers) and/or may receive machine-readable instructions for generating a particular graphical user interface comprising display content. In embodiments, the GUI module 238 may generate the display data and/or activate a viewer application to render the graphical user interface. The GUI module 238 may update a GUI with new display data based at least in part upon data and/or instructions received, e.g., from a remote server, and/or in response to user inputs and/or time-based events (e.g., delayed actions) based at least in part upon pre-programmed or previously received instructions.

The client device 112 may include a security protocol module 240, which may perform processes to encrypt electronic messages and/or apply digital signatures to electronic messages, as described herein. A security protocol module 240 may generate an asymmetric private key based at least in part upon an invariant biometric feature vector, which may be extracted from and/or derived at least from a biometric reading of a user (e.g., a fingerprint).

Figure 3:
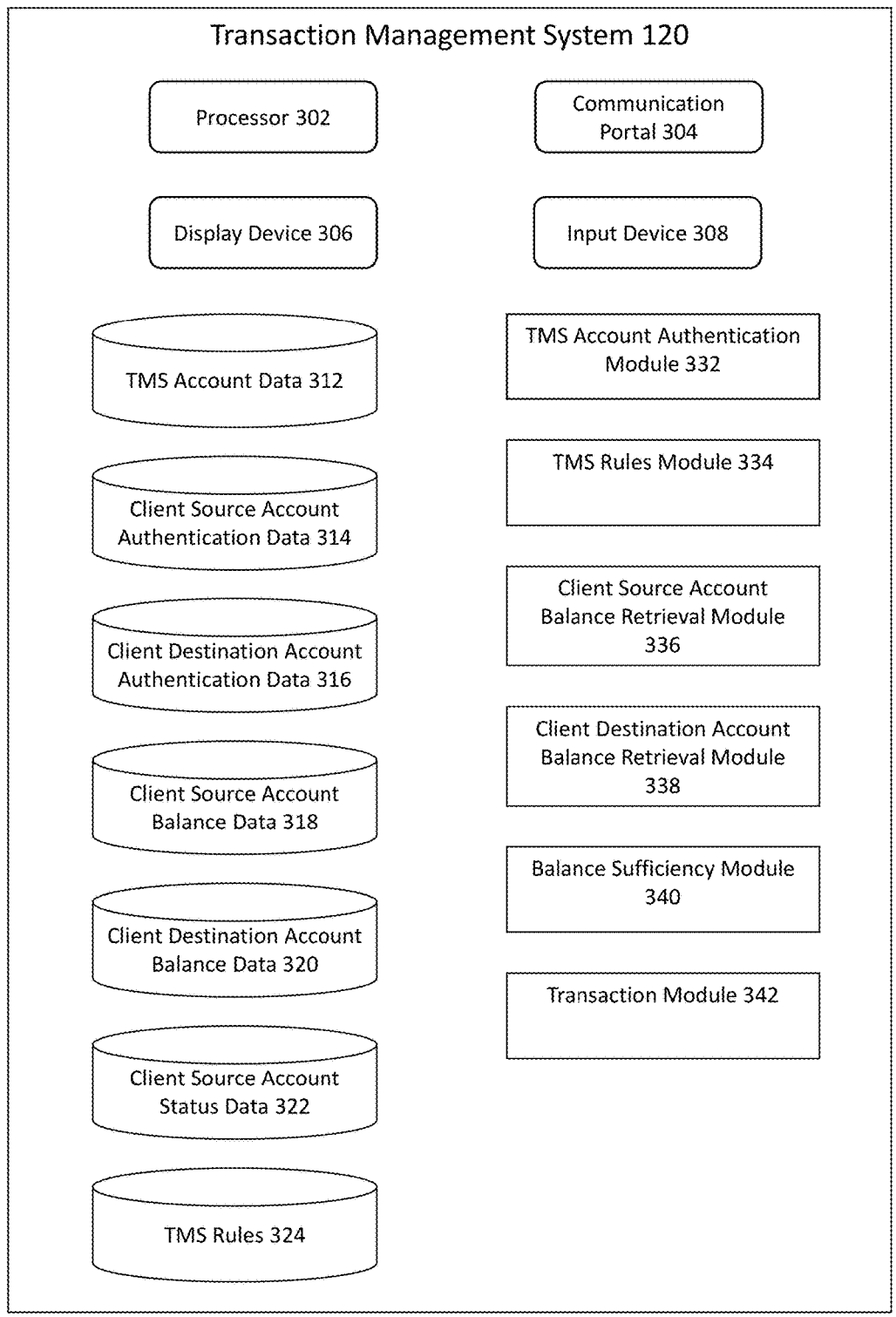
FIG. 3 is a schematic block diagram representing embodiments of a transaction management system in accordance with exemplary embodiments of the present invention.

Referring to FIG. 3, there is shown a schematic block diagram representing embodiments of the transaction management system (TMS) 120. The TMS 120 may be a computer system comprising one or more computers. The TMS 120 may comprise one or more processors 302, communications portals 304, display devices 306, and/or input devices 308. The TMS 120 can further include non-transitory computer-readable memory. Data may be stored in one or more database stored on the computer-readable memory, and particular software modules may be stored on the computer-readable memory. Such modules may run or be configured to run on the one or more processors 302. Exemplary data and modules are described herein.

In embodiments, the TMS 120 may comprise electronic data storage 312 for TMS account data. In embodiments, the TMS account data may comprise the user's information for the transaction management system, such as login credentials (username and/or password), contact information (email address, phone number, address), billing information (credit card information, bank account information), and/or user preferences and/or settings. In embodiments, TMS account data 312 can include TMS transaction history data, which may identify one or more transactions (e.g., fund transfers) performed by the TMS.

In embodiments, the TMS 120 may comprise electronic data storage 314 for client source account authentication data. In embodiments, the client source account authentication data may comprise the user's information for accessing each account at the source institution (account number, authentication information, such as login credentials). It can also include information identifying the various source institutions.

In embodiments, the TMS 120 may comprise electronic data storage 316 for client destination account authentication data. In embodiments, the client destination account authentication data may comprise the user's information for accessing each account at the one or more destination institutions. The client destination account authentication data may also include information identifying the various destination institutions.

In embodiments, the TMS 120 may comprise storage 318 for client source account balance data. In embodiments, client source account balance data may comprise an amount of cash held in a respective source account, and in embodiments, may further include amounts of other financial instruments or commodities (shares of stock, mutual funds, bonds, etc.). In embodiments, this balance data may be obtained on the fly after new transaction data has been received or obtained. In embodiments, the balance data may be obtained periodically, e.g., every 6 hours, 4 pm each day, once a week, twice a day, to name a few.

In embodiments, the TMS 120 may comprise electronic data storage 320 for client destination account balance data for one or more client destination accounts in the same or in different institutions. In embodiments, the client destination account balance data may comprise an amount of cash or liquid financial vehicles (e.g., an MMDA balance) held in a respective destination account, and in embodiments, may further include amounts of other financial instruments or commodities (shares of stock, mutual funds, bonds, etc.) held in the institution. In embodiments, this balance data may be obtained on the fly after new transaction data has been received or obtained. In embodiments, the balance data may be obtained periodically. In embodiments, client destination account transaction data 320 can include transaction history data for one or more destination accounts.

In embodiments, the TMS 120 may comprise electronic data storage 322 for client source account transaction data 322. In embodiments, the client source account transaction data may comprise pending order information for one or more trades, e.g., buy orders and/or sell orders. In embodiments, client source account transaction data 322 can include transaction history data for one or more source accounts.

In embodiments, the TMS 120 may comprise a TMS rules electronic storage 324 for storing electronic rules (e.g., user-specified and/or default rules) for performing various transactions. In embodiments, electronic transaction rules may be generated based at least in part upon user-specified and/or default rules. In embodiments, a user may set destination account balance limits that specify account balance limits (min or max limits), frequencies for performing cash transfer transactions (or other fund transfer transactions), and/or frequencies for determining account balances, to name a few.

In embodiments, the TMS 120 may further comprise a TMS account rules module 334 for generating and/or populating electronic transaction rules based at least in part upon user-specified rules and data and/or default rules. In embodiments, this module 334 may also trigger and/or execute such rules.

The TMS 120 may include a client source account balance retrieval module 336. Such a module may obtain (e.g., retrieve and/or receive) source account balance data, which may comprise a numerical balance amount. In embodiments, a balance amount may have a corresponding timestamp (e.g., date and/or time). The source account balance retrieval module 336 may use client source account authentication data 314 to access one or more source accounts and obtain the source account balance data.

The TMS 120 may include a client destination account balance retrieval module 338. Such a module may obtain (e.g., retrieve and/or receive) destination account balance data, which may comprise a numerical balance amount and may have a corresponding timestamp. The destination account balance retrieval module 338 may use client destination account authentication data 316 to access one or more destination accounts and obtain the destination account balance data.

In embodiments, the TMS 120 may further comprise a balance sufficiency module 340. In embodiments, the balance sufficiency module may be configured to determine whether a source account balance (obtained from the electronic storage 318 or obtained on the fly) is sufficient to cover a pending net buy order, and/or to determine whether there is excess cash in the client source account. In embodiments, this module determination may comprise subtracting an amount for the net buy order from the client source account balance, and determining if the result is a positive amount, or a deficiency amount.

In embodiments, the TMS 120 may further comprise a transaction module 342. In embodiments, the transaction module may be configured to generate electronic transaction instructions to move funds between institutions, and/or execute a movement of funds between institutions, e.g., fund movement from a source account held at a source institution to a destination account at a destination institution, or vice versa. In embodiments, the electronic transaction instructions and/or parameters may identify source and destination accounts, transaction amounts, and/or account credentials or a database pointer to electronically stored credentials to use for authorizing the transaction.

Figure 4:
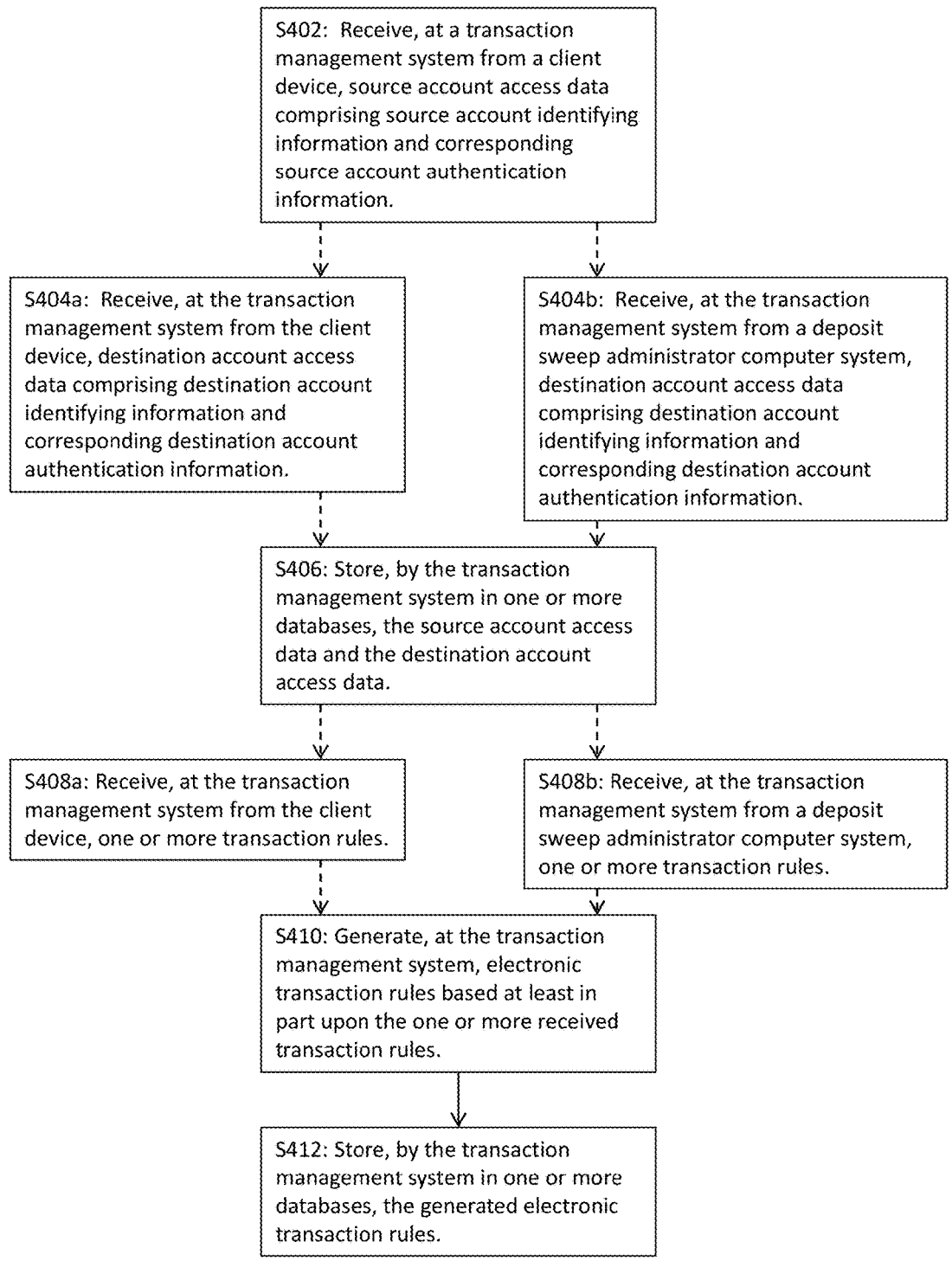
FIG. 4 is a flow chart of embodiments of system configuration operations with a client in accordance with exemplary embodiments of the present invention.

Referring to FIG. 4, there is shown a flow chart of embodiments of system set-up operations with a client. Block S402 represents a computer-implemented operation of receiving, at the transaction management system 120 from a client device 110, source account access data comprising source account identifying information and corresponding source account authentication information, e.g., user ID and password.

Block S404*a* represents a computer-implemented operation of receiving, at the transaction management system 120 from a client device 110, destination account access data comprising destination account identifying information and corresponding destination account authentication information, e.g., user ID and password. In embodiments, in a step S404*b*, the transaction management system may instead receive the destination account access data from a cash sweep, e.g., deposit sweep, administrator computer system or user device.

Block S406 represents a computer-implemented operation of storing, by the transaction management system 120 in one or more databases 214, 216, the source account access data and the destination account access data.

Block S408*a* represents a computer-implemented operation of receiving, at the transaction management system 120 from a client device 110, transaction rules or data for implementing one or more transaction rules. In embodiments, in a step S408*b*, such transaction rules or rules data may instead be received at the transaction management system from a deposit sweep administrator computer system or user device. Examples of such data to populate transaction rules comprise a source account minimum balance, a source account maximum balance, a source account target balance, a destination account minimum balance, an account balance monitoring frequency, a transaction monitoring frequency, e.g., every 30 seconds, every minute, every 10 minutes, etc., a default destination account for fund transfers from the source accounts, an order of destination institutions or other destination institutions for receiving deposits, and source-destination account links.

Block S410 represents a computer-implemented operation of generating, at the transaction management system 120, electronic transaction rules based at least in part upon the data received for implementing the one or more transaction rules.

Block S412 represents a computer-implemented operation of storing, by the transaction management system in one or more databases, the generated electronic transaction rules.

In embodiments, the transaction management system 120 may receive updated transaction rule data and/or updated account access data (e.g., modifications to existing data, new data, and/or requests to remove existing data). The transaction management system 120 may generate and/or store new and/or modified electronic transaction rules based at least in part upon the received updated rule data and/or account access data.

The transaction management system may execute cash sweeps such as deposit sweeps from trading accounts to depository accounts or vice versa, without the technological cooperation of the institutions holding the accounts. In embodiments, the transaction management system may determine whether deposit sweep customers or other cash sweep customers hold other funds, e.g., non-program funds, at program banks and may determine allocations of funds accordingly, e.g., so as not to exceed maximum account balances. In embodiments, the system may determine not to allocate such a customer's funds to a bank that already holds funds of the customer.

In embodiments, the transaction management system may comprise cash sweep software running on a client device. The cash sweep software may comprise deposit sweep software. A user of the client device may execute cash sweep operations, such as deposit sweep operations, using the cash and/or deposit sweep software. Accordingly, a third-party deposit management entity may not be required.

As described herein, a transaction management computer system may determine a need for a sweep transaction, such as a deposit sweep transaction. Such a sweep transaction may be from a source account at a source institution to a depository account at a depository institution. A sweep transaction may also be from a depository account at a depository institution to a source account at a source institution. In other embodiments, a sweep transaction may comprise an allocation or reallocation of funds among a plurality of institutions, such as a plurality of depository institutions or a plurality of both source and depository institutions. In embodiments, such allocations may involve omnibus depository accounts at one or more depository institutions.

Sweep transactions may be triggered by transactions at and/or transaction data obtained from one or more transaction sources or source institutions. Source institutions can include broker-dealers, brokerage firms, card servicers, bill payment servicers, ACH debit and/or credit servicers, check payment or processing servicers, to name a few. Examples of types of transactions that may occur in a source institution and thus trigger an event can include credit and/or debit events against the customer account at the source institution. For example, clients may access their funds for deposits and withdrawals from various transaction sources. Thus, card servicers represent credit and debit card processing organizations and networks. Internet bill payment servicers represent service providers for bill payment, checks, and funds exchanges generally via the Internet (or other electronic or data networks). ACH debits and credits represents various direct deposit and withdrawal clearinghouse services. Check payment servicers represent debit and credit transactions generated by paper check processing. Source institutions can also be associated with transactions generated as a result of other payment vehicles (such as touch-tone bill payment). Accordingly, clients may access their agent-managed funds by credit and debit cards, for Internet transactions, by direct deposits and withdrawals, by checks, and by other payment and funds exchange vehicles. Transaction data may be obtained from any of these source institutions. In embodiments, respective user access credentials may be used, e.g., by a transaction management system, to access electronic portals at such source institutions to obtain account balanced and/or transaction information, such as order amounts and/or dates. In embodiments, a transaction management system may monitor respective accounts at the source institutions to determine when transactions have occurred or are scheduled to occur, as described herein. Monitoring such accounts can comprise accessing account information, such as by using user access credentials to access respective electronic portals (e.g., according to a monitoring frequency), obtaining account information (e.g., balance information, transaction information, to name a few), and/or assessing a date and/or time associated with a last update of the account information and or a date and/or time associated with placement of order or fulfillment of orders for one or more transactions. In embodiments, assessing the date and/or time can comprise comparing such date and/or time to a date and/or time associated with the last retrieval of account information to determine if the account information is new. In embodiments, monitoring can comprise comparing current balance amounts to previous balance amounts to determine whether a change in balance has occurred.

Sweep transactions may be triggered by account balances in either the source institution or depository institution reaching or exceeding a threshold amount (e.g., a monetary amount, such as a dollar amount). Such a threshold amount may represent a maximum account balance (e.g., a maximum permissible or desirable balance) or a minimum account balance (e.g., a minimum permissible or desirable balance), which balance limits may be determined by user preference, government regulation, insurance requirements (e.g., maximum insurable amounts for an account or institution, which may be measured per customer), and/or institution requirements (e.g., required minimum account balances to avoid incurring fees). Exceeding a threshold may comprise a balance or projected balance (e.g., a projected post-transaction balance for a pending transaction) rising above the threshold. In other embodiments, exceeding the threshold may comprise falling below the threshold.

A need for one or more sweep transactions may be determined automatically by a transaction management computer system, e.g., based at least in part upon the occurrence of the sweep transaction triggers described herein. In embodiments, sweep transactions may be performed on certain days and/or times. For example, 9 AM E.T., 5 PM E.T., 8 PM E.T., a certain day of the week, or a certain date of the month, to name a few. Certain sweep transactions may require user approval. Such transactions may be defined by transaction parameters or transaction characteristics, such as source account identifiers, destination account identifiers, transfer amounts, and/or allocation amounts, to name a few. Transaction satisfying certain predefined characteristics may require user approval, such as transactions to or from particular accounts or institutions or transactions involving amounts exceeding a preset permissible transfer amount. Such characteristics may be stored as exceptions to default permissible transaction characteristics.

A transaction management computer system may monitor one or more accounts at one or more source and/or depository institutions to obtain the information necessary to determine when sweep transaction triggers occur. Such information can include account balance information, pending order information, and/or transaction information, such as completed order information. Account monitoring may be performed according to a predefined schedule, e.g., once per day, such as at 5 PM E.T., twice per day, such as at 9 AM E.T. and 5 PM E.T., once per week, once per month, twice per month, to name a few. An account monitoring frequency may govern how often to monitor one or more accounts. The system may monitor accounts on demand, e.g., upon receipt of a user electronic request to refresh account information. In embodiments, the system may receive or may determine an account update schedule for one or more particular institutions, e.g., brokerage institutions. Such a schedule may identify when account information is updated for access via a computer-based portal or may identify when transactions involving the account are executed or settled. The system may monitor the accounts according to the schedule of updates.

Thus, the present invention improves upon prior computer implemented deposit sweep systems, which could not automatically institute such a trigger themselves and instead would need to rely upon source institutions or the customer to initiate a sweep event. Thus, the technological solution of the present invention is very advantageous. It can expand the scope of sweep programs to cover additional source and/or depository institutions and/or can automate sweep triggering, such as deposit sweep triggering, without input or instruction from third parties other than sweep settings, which may be stored in advance in memory and may be optional.

In embodiments, the transaction management system may monitor a customer's emails, e.g., by accessing the customer's email account using email login credentials for the email account. The system may search for and/or determine emails matching certain criteria, such as one or more sender names or sender email addresses, e.g., corresponding to financial institutions, and/or determining subject or body information matching certain predefined text (e.g., the words "account", "balance", and/or "transaction", to name a few). In embodiments, the system may receive forwarded emails from the customer. The customer may set rules to forward transaction notification emails or other relevant emails automatically. In embodiments, the customer may specify, at the source and/or destination institutions, a transaction management system email address to receive account alerts. Upon receipt or detection of such an email, the transaction management system may retrieve account information from one or more source and/or depository institution accounts associated with the customer.

Figure 5A:
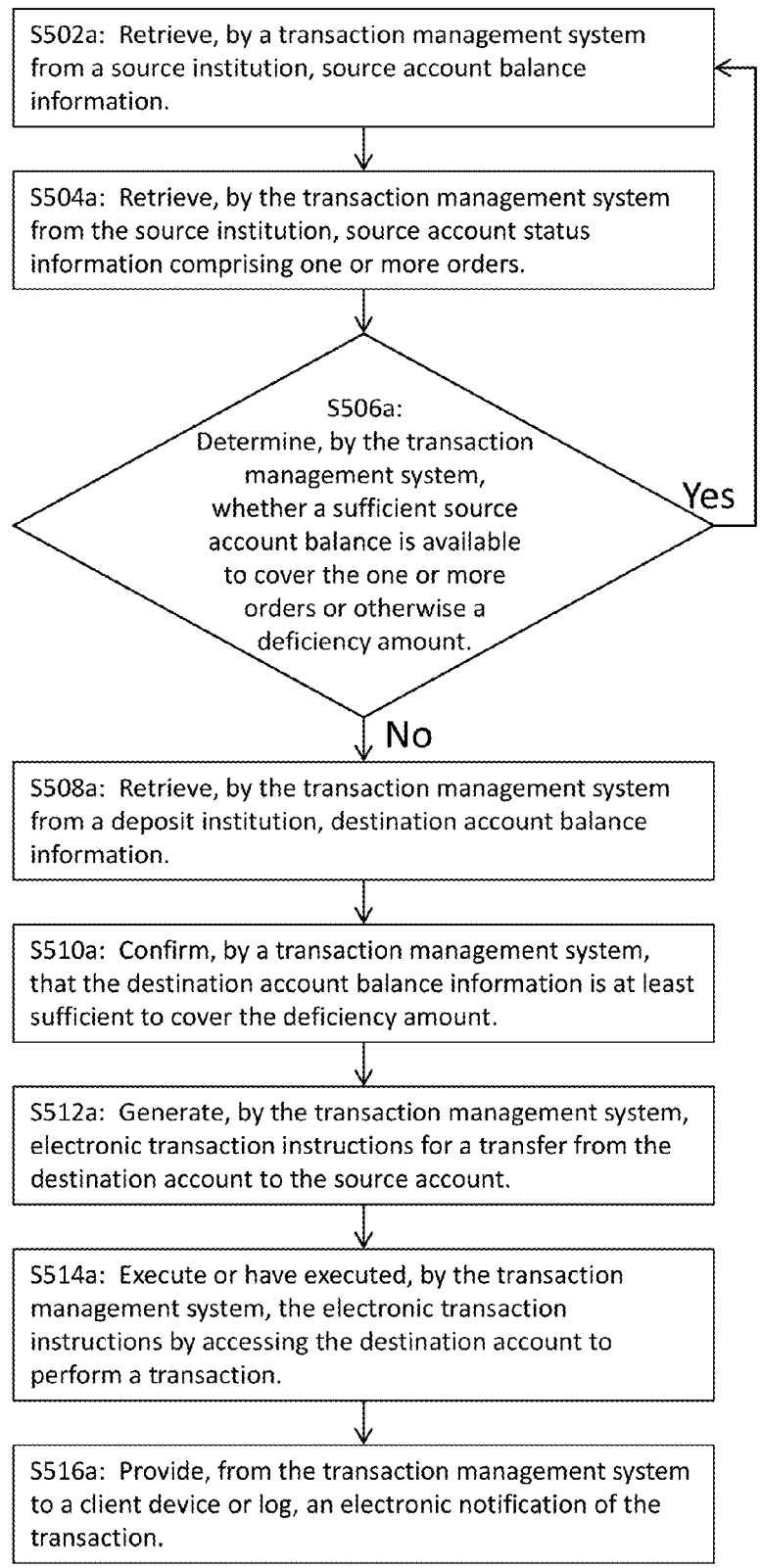
FIG. 5A is flow chart of embodiments of the invention for processing account transactions in accordance with exemplary embodiments of the present invention.

Referring to FIG. 5A, a flow chart is shown comprising embodiments for processing account fund movement transactions. In embodiments, the operations S502a and S504a comprise monitoring a source account. Block S502a comprises a computer-implemented operation of obtaining, e.g., retrieving or receiving, by the TMS 120 computer system, source account balance information from a source institution. In embodiments, this operation may comprise accessing the source institution server computer system 106 via the one or more communications networks 50 and accessing the client source account balance information using the client source account authentication data from electronic storage 314. In embodiments, one or more application programming interfaces ("APIs") may be used to access data from the source institution computer systems. In some embodiments, a screen scraping process may be used, whereby the TMS 120 computer system may access a source institution account information website, obtain the corresponding website data (e.g., by accessing the website page source information), and/or parse the website data to determine the relevant source account balance information. In embodiments, scraping can comprise accessing webpage data, parsing the webpage data, searching webpage data (e.g., GUI data and/or underlying front end webpage code, such as HTML) for one or more data items (e.g., words and/or characters such as "account", "balance", "$"), and/or performing regular expression matching to find particular expressions. In embodiments, this obtaining-the-balance operation S502a may be performed by periodic polling based at least in part upon electronically stored client polling instructions, and the source balance information stored in the client source account balance data storage 318. In embodiments, this obtaining operation may be triggered by the receipt of pushed client transaction data indicating a buy order or a sell order or receipt of a notice that there has been a change to the source account balance. In embodiments, this balance-obtaining operation may comprise receiving a client source account balance that has been pushed from one of the client devices or from the source institution (based at least in part upon authority from the client) when there has been a change to the client source account balance. Note that for convenience of explanation, the source institution and source account has been referred to in the singular. However, in embodiments, there may be a plurality of source accounts and a plurality of source institutions.

Block S504a comprises a computer-implemented operation of obtaining, e.g., retrieving or receiving, by the TMS 120 computer system source account transaction information from a source institution. In embodiments, this operation may comprise accessing the source institution server computer system 106, e.g., a broker-dealer for example, via the one or more communications networks 50, and polling for source account transaction information including data for one or more buy or sell orders using the client authentication data from storage 314. In embodiments, one or more APIs may be used to access data from the source institution computer systems. In embodiments, a screen scraping process may be used to obtain this data. In embodiments, this obtaining-transaction data operation S504a may be performed periodically based at least in part upon electronically stored client polling instructions using the source account transaction information stored in the client source account transaction storage 322. In embodiments, this obtaining operation may be triggered by the receipt of pushed client transaction data indicating a buy order or a sell order or receipt of a notice that there has been a change to the source account balance.

Block S506a comprises a computer-implemented operation of transforming data to determine, by the transaction management system 120, when there is transaction data for one or more pending buy and/or sell orders with corresponding order amounts, whether a sufficient source account balance is available to cover the one or more orders. In embodiments, this operation may comprise transforming data, e.g., via a netting operation, and based at least in part on the buy and/or sell orders to determine a net of the orders. When the net is a net buy order, the TMS 120 may further transform data, e.g., using a subtraction operation, and based at least in part the amount of the net buy order and the amount of the source account balance, to determine if the source account balance is equal to or greater than the amount of the net buy order. When the answer is YES, the operation may return to block S502a, e.g. for continued account balance monitoring and/or transaction monitoring. When the answer is NO, the TMS 120 may determine a deficiency amount and proceed to block S508a. In embodiments, when the answer is NO, then the system may generate and send an electronic notification, by the one or more intermediary computers and the one or more networks to the client.

Block S508a comprises a computer-implemented operation of obtaining, e.g., retrieving or receiving, by the TMS 120 computer system, destination account balance information from one or more destination institutions. In embodiments, this operation may comprise accessing the destination institution server computer system 130 via the one or more communications networks 50, and accessing the client destination account balance information using the client destination account authentication data from electronic storage 316. In embodiments, one or more APIs may be used to access data from the one or more destination institution computer systems. In embodiments, a screen scraping process may be used. In embodiments, this obtaining-the-balance operation S508a may be performed by periodic polling based at least in part upon electronic client polling instructions, and the retrieved destination balance information stored in the client destination account balance data storage 320. In embodiments, this obtaining operation may be triggered by the receipt of pushed client transaction data indicating a buy order or a sell order or receipt of a notice that there has been a change to the source account balance or the destination account balance. In embodiments, this operation may comprise receiving a client destination account balance that has been pushed from one of the client devices or from the destination institution (based at least in part upon authority from the client) when there has been a change to the client destination account balance. In embodiments, this operation may only be triggered by a determination that the client source account balance is not sufficient to cover a net buy order. In embodiments, when the destination balance from one or from a set of the destination accounts is not sufficient to cover the deficiency amount, then the system may generate and send an electronic notification, by the one or more intermediary computers and the one or more networks to the client.

Note that in embodiments the obtaining/retrieving operations of blocks S502a, S504a and S508a may be performed while bypassing the automatic fund transfer programs of clearing firm computers, and/or source institution computers and/or destination institution computers, and without regard to consent and/or the electronic cooperation of the source institution and/or destination institution systems. Likewise, in embodiments the generating and executing operations of blocks S512a and S514a may be performed while bypassing the automatic fund transfer programs of clearing firm computers, and/or source institution computers and/or destination institution computers and without regard to consent and/or the electronic cooperation of the source and destination institution systems. In embodiments, this bypassing may be accomplished via access using the client source and destination authentication information.

Thus, in embodiments, the computer-implemented operation may comprise directly accessing using client's credentials with the client's authority, by the one by the one or more intermediary computers via one or more networks, the desired information without requiring a computer of the client or the source institution computer and/or the destination institution computer to initiate the access.

In embodiments, the computer-implemented operation may comprise directly accessing using client's credentials with clients authority in response to a trigger notification of a transaction from the client computer, by the one by the one or more intermediary computers via one or more networks, the desired information without requiring the client computer or the source institution computer and/or the destination institution computer to initiate the access.

In embodiments, the computer-implemented operation may comprise periodically or aperiodically obtaining, by the one by the one or more intermediary computers via one or more networks, the desired information while bypassing one or more automatic fund transfer programs of the source institution computer and/or the destination institution computer and/or a clearing firm computer of a clearing firm, and without regards to consent of the source institution computer and/or the destination institution computer and/or the clearing firm computer.

In embodiments, the computer-implemented operation may comprise periodically or aperiodically directly accessing, by the one by the one or more intermediary computers via one or more networks, the desired information without regards to consent of the source institution computer and/or the destination institution computer and/or the clearing firm computer.

In embodiments, the computer-implemented operation may comprise periodically or aperiodically directly accessing, by the one by the one or more intermediary computers via one or more networks, the desired information while blocking operation of a sweep program by the source institution computer and/or the destination institution computer and/or a clearing firm computer of a clearing firm and without regards to consent of the source institution computer and/or the destination institution computer and/or the clearing firm computer.

In embodiments, the computer-implemented operation may comprise periodically or aperiodically directly accessing, by the one by the one or more intermediary computers via one or more networks, the desired information while maintaining an election or confirming operation of an election to not use a sweep program by the source institution computer and/or the destination institution computer and/or a clearing firm computer of a clearing firm and without regards to consent of the source institution computer and/or the destination institution computer and/or the clearing firm computer.

In embodiments, the computer-implemented operation may comprise determining if the source institution computer and/or the destination institution computer and/or a clearing firm computer of a clearing firm has an active sweep program, setting an election to deactivate use of the active sweep program when it has been determined that such sweep program is active; and periodically or aperiodically directly accessing, by the one by the one or more intermediary computers via one or more networks, the desired information for the account without regards to consent of the source institution computer and/or the destination institution computer and/or a clearing firm computer.

Block S510a comprises a computer-implemented operation of the transaction management system 120 determining if the balance maintained in the one or more client destination accounts is sufficient to cover at least the deficiency amount. In embodiments, this computer operation may comprise subtracting the deficiency amount from the destination balance of a destination account. In embodiments, the operation may comprise determining whether a destination account balance or a combination of destination account balances is greater than or equal to the deficiency amount. A transaction rule may require the system to maintain minimum balances in the one or more destination accounts, which may cause the transaction management system to determine whether the deficiency amount is available from a single destination account or otherwise whether an aggregate amount equaling the deficiency amount is available from a plurality of destination accounts, without violating the minimum account balance rule.

Block S512a comprises a computer-implemented operation of the transaction management system 120 generating electronic transaction instructions to transfer an amount of funds from one or more client destination accounts to cover the deficiency amount. In embodiments, appropriate client source account authentication data may be obtained from the storage 314 and/or appropriate client destination account authentication data may be obtained from the storage 316 and used to generate the electronic transaction instructions. In embodiments, this operation may comprise selecting one of the destination accounts from which to transfer funds, by the one or more intermediary computers, based at least in part upon one or more criteria. In embodiments the one or more criteria may comprise at least one selected from the group of a client preference, minimizing a number of transfers necessary to cover the deficiency amount, and selecting one of the destination accounts which has client funds in the account that exceed an FDIC insurance limit.

Block S514a comprises a computer-implemented operation of the transaction management system 120 executing or having executed the electronic transaction instructions. In embodiments, this operation may comprise initiating transfer of an amount from one or more of the client destination accounts to the source account using the destination account authentication credentials. In embodiments, this operation may comprise electronically transmitting the generated instructions via the one or more networks. Accordingly, executing the transaction instructions can comprise transmitting instructions to the one or more destination account institution computer systems to perform a fund transfer having a respective associated transfer amount and identifying the source account as the transfer recipient. In embodiment, when transaction data is obtained that represents a net buy order, the generating and sending or make accessible the one or more electronic instructions to transfer to the cover the deficiency amount is set to operate within a predetermined time period after a time associated with the source transaction data, so that the one or more buy orders are not defaulted.

Thus, in embodiments, the computer-implemented operation may comprise directly instructing the source institution computer or the destination institution computer to make a fund transfer using the client's credentials with the client's authority, by the one by the one or more intermediary computers via one or more networks, without requiring the client's computer or the source institution computer or the destination institution computer to initiate the request for transfer.

In embodiments, the computer-implemented operation may comprise directly instructing the source institution computer or the destination institution computer to make a fund transfer using client's credentials with the client's authority in response to a trigger notification of a transaction from the client computer, by the one by the one or more intermediary computers via one or more networks, without requiring the client's computer or the source institution computer or the destination institution computer to initiate the request for transfer.

In embodiments, the computer-implemented operation may comprise periodically or aperiodically instructing the source institution computer or the destination institution computer to make a fund transfer, by the one by the one or more intermediary computers via one or more networks, while bypassing one or more automatic fund transfer programs of the source institution computer and/or the destination institution computer and/or a clearing firm computer of a clearing firm, and without requiring the client's computer or the source institution computer or the destination institution computer to initiate the request for transfer.

In embodiments, the computer-implemented operation may comprise periodically or aperiodically directly instructing the source institution computer or the destination institution computer to make a fund transfer, by the one by the one or more intermediary computers via one or more networks, without requiring the client's computer or the source institution computer or the destination institution computer to initiate the request for transfer.

In embodiments, the computer-implemented operation may comprise periodically or aperiodically directly instructing the source institution computer or the destination institution computer to make a fund transfer, by the one by the one or more intermediary computers via one or more networks, the desired information while blocking operation of a sweep program by the source institution computer and/or the destination institution computer and/or a clearing firm computer of a clearing firm and without requiring the client's computer or the source institution computer or the destination institution computer to initiate the request for transfer.

In embodiments, the computer-implemented operation may comprise periodically or aperiodically directly instructing the source institution computer or the destination institution computer to make a fund transfer, by the one by the one or more intermediary computers via one or more networks, the desired information while maintaining an election or confirming operation of an election to not use a sweep program by the source institution computer and/or the destination institution computer and/or a clearing firm computer of a clearing firm and without requiring the client's computer or the source institution computer or the destination institution computer to initiate the request for transfer.

In embodiments, the computer-implemented operation may comprise determining if the source institution computer and/or the destination institution computer and/or a clearing firm computer of a clearing firm has an active sweep program, setting an election to deactivate use of the active sweep program when it has been determined that such sweep program is active; and periodically or aperiodically directly instructing the source institution computer or the destination institution computer to make a fund transfer, by the one by the one or more intermediary computers via one or more networks, without requiring the client's computer or the source institution computer or the destination institution computer to initiate the request for transfer.

Block S516*a* comprises a computer-implemented operation of the transaction management system 120 providing or making accessible over the one or more networks to the client device an electronic notification of the fund transfer from one or more of the client destination accounts to the source account. An electronic notification can comprise a push notification, an email, an SMS message, and/or an update to a TMS account activity log, to name a few. In embodiments, the client device may be a transaction history log maintained on a server of another, and may comprise updating that transaction history log. The client source account balance held in storage 318 and the respective one or more balances for the one or more destination accounts may then be updated. In embodiments, an electronic notification to proceed with a pending order may be transmitted to the source account.

Figure 5B:
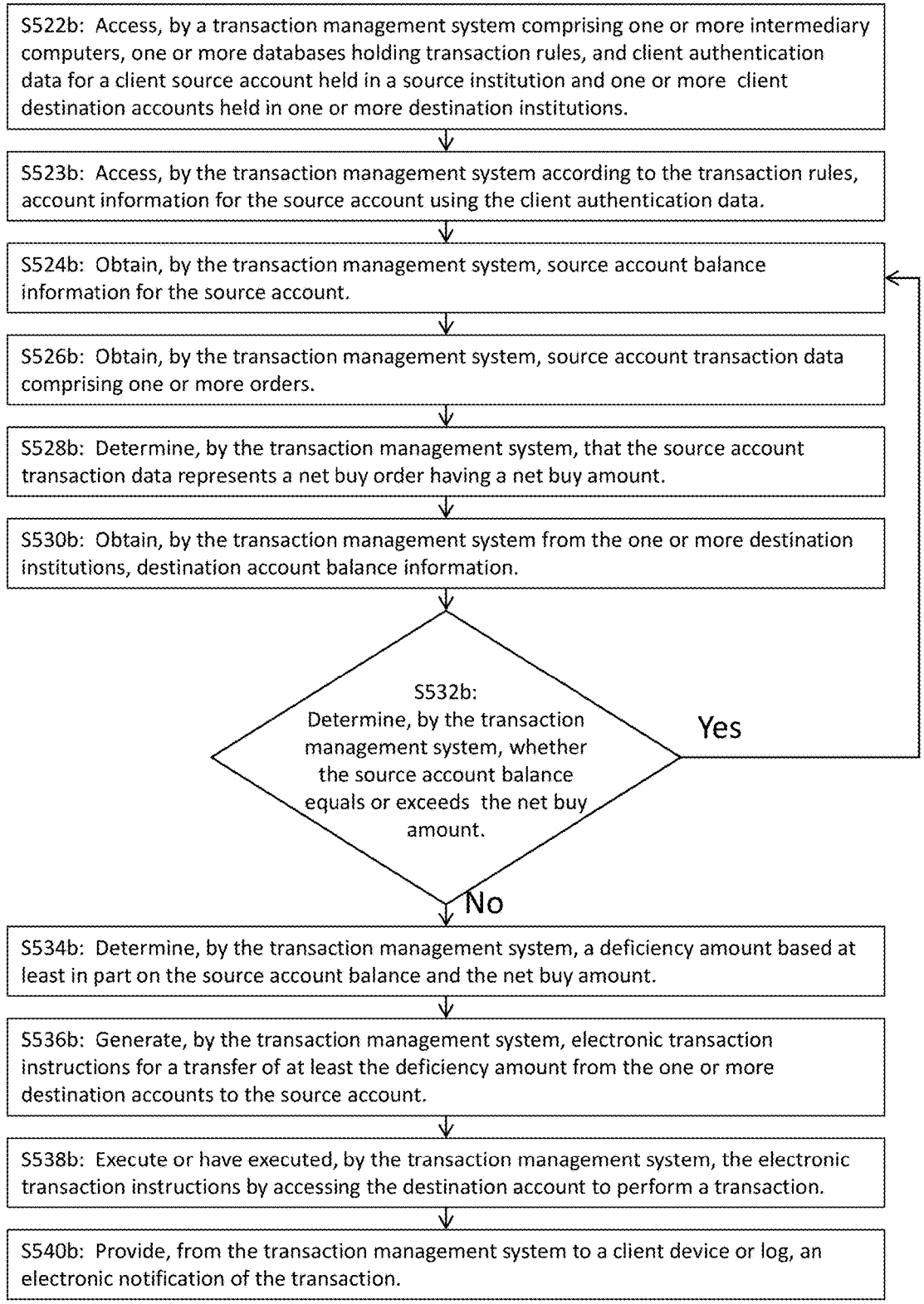
FIG. 5B is flow chart of further embodiments of the invention for processing account transactions in accordance with exemplary embodiments of the present invention.

Referring to FIG. 5B, a further embodiment is disclosed. Block S522*b* comprises a computer-implemented operation of the TMS 120 accessing, using one or more intermediary computers, one or more databases holding transaction rules and client authentication data. The client authentication data may be for a source institution to obtain source account balance information for the source account of the client held in the source institution and to obtain source transaction data for the source account. The client authentication data may also be for one or more destination institutions to obtain destination account balance data for one or more client destination accounts held in the one or more destination institutions. In embodiments, the one or more intermediary computers may not be affiliated with the source institution holding the source account or the one or more destination institutions holding the one or more destination accounts of the client.

Block 523*b* comprises a computer-implemented operation of the TMS 120 accessing account information for the source account using the client authentication data. Accessing account information can comprise logging into an account information portal (e.g., a website or an API, to name a few) or other portal provided by a source institution, e.g., using the source account client authentication data. In embodiments, the transaction rules may govern the frequency with which source account information is accessed, monitored, and/or evaluated by the TMS 120 or the time of day or date when the account information is accessed.

Block S524*b* comprises a computer-implemented operation of the TMS 120 periodically or aperiodically obtaining, by the one or more intermediary computers via one or more networks, the source account balance information for the source account. Note that for convenience of explanation, the source institution and source account have been referred to in the singular. However, in embodiments, there may be a plurality of source accounts and/or a plurality of source institutions.

In embodiments, the obtaining the source account balance information may comprise retrieving the source account balance information, via access to a server of the source institution, using the client source authentication data from the electronic storage 314. In embodiments, source account balance information may be scraped from a website provided by the source institution server. In embodiments, scraping can comprise accessing webpage data, parsing the webpage data, searching webpage data (e.g., GUI data and/or underlying front end webpage code, such as HTML) for one or more data items (e.g., words and/or characters such as "account", "balance", "$"), and/or performing regular expression matching to find particular expressions. In embodiments, the operation of obtaining source account balance information may be based at least in part upon automatic polling (e.g., a scheduled data retrieval process) or may be triggered by receiving data that a change has occurred in the source account balance and/or that a transaction order or a net buy order has been received.

In embodiments, the obtaining the source transaction data, and/or the source account balance information, may comprise receiving automatically pushed data (e.g., one or more data packets and/or electronic files) via the one or more data networks.

Block S526b comprises a computer-implemented operation of the TMS 120 periodically or aperiodically obtaining, by the one or more intermediary computers via the one or more networks, the destination account balance information for the one or more destination accounts.

In embodiments, the obtaining the destination account balance information may comprise retrieving the destination account balance information, via access to a server of the destination institution, using the client destination account authentication data from the electronic storage 316. In embodiments, destination account balance information may be scraped from a website provided by the destination institution server. In embodiments, this operation may be based at least in part upon automatic polling (e.g., according to a balance retrieval schedule, such as each business day at 5 pm) or may be triggered by receiving data indicating that a change has occurred in the destination account balance or that a transaction order or a net buy order has been received.

In embodiments, the obtaining the destination account balance information may comprise receiving an automatically pushed file and/or data packets via the one or more networks.

Block S528b comprises a computer-implemented operation of the TMS 120 periodically or aperiodically obtaining the source transaction data comprising one or more buy orders and/or sell orders for the source account, by the one or more intermediary computers via the one or more networks. In embodiments, the obtaining the source transaction data may comprise retrieving the source transaction data, via access to a server of the source institution, using the client source authentication data from the electronic storage 314. In embodiments, source transaction data may be scraped from a website provided by the source institution server, such as a transaction webpage identifying one or more pending transactions. In embodiments, this operation may be based at least in part upon automatic polling or may be triggered by receiving data that a change has occurred in the source account balance or that a transaction order or a net buy order has been received and/or placed.

In embodiments, the obtaining the source transaction data, may comprise receiving an automatically pushed file and/or data packets via the one or more networks.

Block S528b comprises a computer-implemented operation of the TMS 120 transforming data, e.g., using a netting operation, and using at least in part information in the transaction data, to determine, by the one or more intermediary computers, that the source transaction data for the source account represents a net buy order with a net buy amount. In embodiments, this operation may comprise first determining a net of any buy and sell amounts and then determining whether the net is a net buy amount. In embodiments, the operation may comprise determining that a given order is a buy order with a buy amount.

Block S530b comprises a computer-implemented operation of obtaining, e.g., retrieving or receiving, by the TMS 120 computers, destination account balance information from one or more destination institutions. In embodiments, this operation may comprise accessing the destination institution server computers 130 via the one or more communications networks 50, and accessing the client destination account balance information using the client destination account authentication data from electronic storage 316. In embodiments, one or more application programming interfaces ("API") may be used to access data from the one or more destination institution computer systems. In embodiments, a screen scraping process may be used. In embodiments, this obtaining-the-balance operation S530b may be performed by periodic polling based at least in part upon client polling instructions. In embodiments, this obtaining operation may be triggered by the receipt of pushed client transaction data indicating a buy order or a sell order or a net buy order or a determination of a net buy order or receipt of a notice (e.g., an electronic indication) that there has been a change to the source account balance or the destination account balance. In embodiments, this operation may comprise receiving a client destination account balance that has been pushed from one of the client devices or from the destination institution (based at least in part upon authority from the client) when there has been a change to the client destination account balance. In embodiments, this operation may only be triggered by a determination that the client source account balance is not sufficient to cover a net buy order. Accordingly, in embodiments, this operation may be performed following step S532b. The obtained destination balance information may be stored in the client destination account balance data storage 320.

Note that the obtaining/retrieving operations of blocks S524b, S526b and S530b may be performed while bypassing the automatic fund transfer programs of clearing firm computers, and/or source institution computers, if any, with the different permutations described above, and without regards to consent of the source and destination institutions or the electronic cooperation of the source and destination computers. In embodiments, this bypassing may be accomplished via the client source and destination authentication information.

Block S532b comprises a computer-implemented operation of transforming data to determine, by the transaction management system 120, when there is transaction data for one or more pending buy and/or sell orders with respective order amounts, whether a sufficient source account balance is available to cover the one or more orders. In embodiments, this operation may comprise transforming data, e.g., using a subtraction operation, and based at least in part the amount of the net buy order and the amount of the source account balance, to determine if the source account balance is equal to or greater than the net buy amount of the net buy order. When the answer is YES, then returning the operation to block S524b for further monitoring of account balances and/or transaction orders. When the answer is NO, then proceeding to block S534b.

Block S534b comprises a computer-implemented operation of the TMS 120 determining a deficiency amount, by the one or more intermediary computers, when a source account balance for the source account does not equal or exceed the net buy amount for the net buy order, based at least in part on the source account balance information for the source account. In embodiments, the determination may also be based at least in part upon the net buy amount (and/or the constituent amounts corresponding to the constituent orders thereof). In embodiments, this operation may comprise subtracting the net buy amount from the source account balance to determine the deficiency amount, or vice versa, and/or computing the absolute value of the difference as needed.

Block S536b comprises a computer-implemented operation of the TMS 120 generating, by the one or more intermediary computers, electronic transaction instructions for a transfer from at least one of the one or more destination accounts to the source account of at least the deficiency amount, including the respective client authentication data for the one or more destination accounts and the one or more source accounts. In embodiments, this operation may comprise accessing the appropriate client source account authentication data from the storage 314 and/or accessing the appropriate client destination account authentication data from the storage 316 for the instruction. In embodiments, only the client destination account authentication data may be needed. In embodiments, the electronic transaction instructions may comprise sending account identifiers (e.g., identifying the one or more client destination accounts from which to transfer funds), corresponding destination account authentication data, a transaction recipient account identifier (e.g., identifying the source account to which to transfer funds), and respective transfer amounts for each sending account. In embodiments, the instructions may be to transfer only the deficiency amount. In embodiments, the instructions may be to transfer the deficiency amount plus an additional amount (e.g., a fixed additional amount or a percentage additional amount). In embodiments, the additional amount may be based at least in part on a minimum source account balance rule set for the source account by the TMS rules module 324.

Block S538b comprises a computer-implemented operation of the TMS 120 executing or having executed, by the one or more intermediary computers and the one or more networks, the electronic transaction instructions. In embodiments, this operation may comprise executing or having executed the transaction instructions on the servers for the one or more destination institutions corresponding to the sending accounts, which execution may comprise selecting a transfer funds option (e.g., activating a button, indicator, or other user interface element) on the user interface provided by a destination institution computer system and/or inputting required transaction parameter information, such as a transfer amount and a transfer recipient (e.g., the source account identifier). Having instructions executed may thus comprise initiating a transaction at a destination institution computer system.

Block S540b comprises a computer-implemented operation of the TMS 120 computer system generating and/or sending an electronic notification, by the one or more intermediary computers and the one or more networks, of the transfer. In embodiments, the electronic notification may be transmitted to a user device associated with the TMS account owner. In embodiments, the electronic notification may comprise an update to a TMS transaction log provided via a TMS website and/or software application (e.g., a TMS mobile application running on one or more processors of a user device). In embodiments, the electronic notification may comprise an email, SMS message, and/or other electronic communication. In embodiments of the present invention, electronic notifications may provide an alert that account information has been updated and/or that a user response is requested, which alert may prompt or request the user to log into a secure GUI, e.g., via a web browser or dedicated application, to view the notification.

Figure 5C:
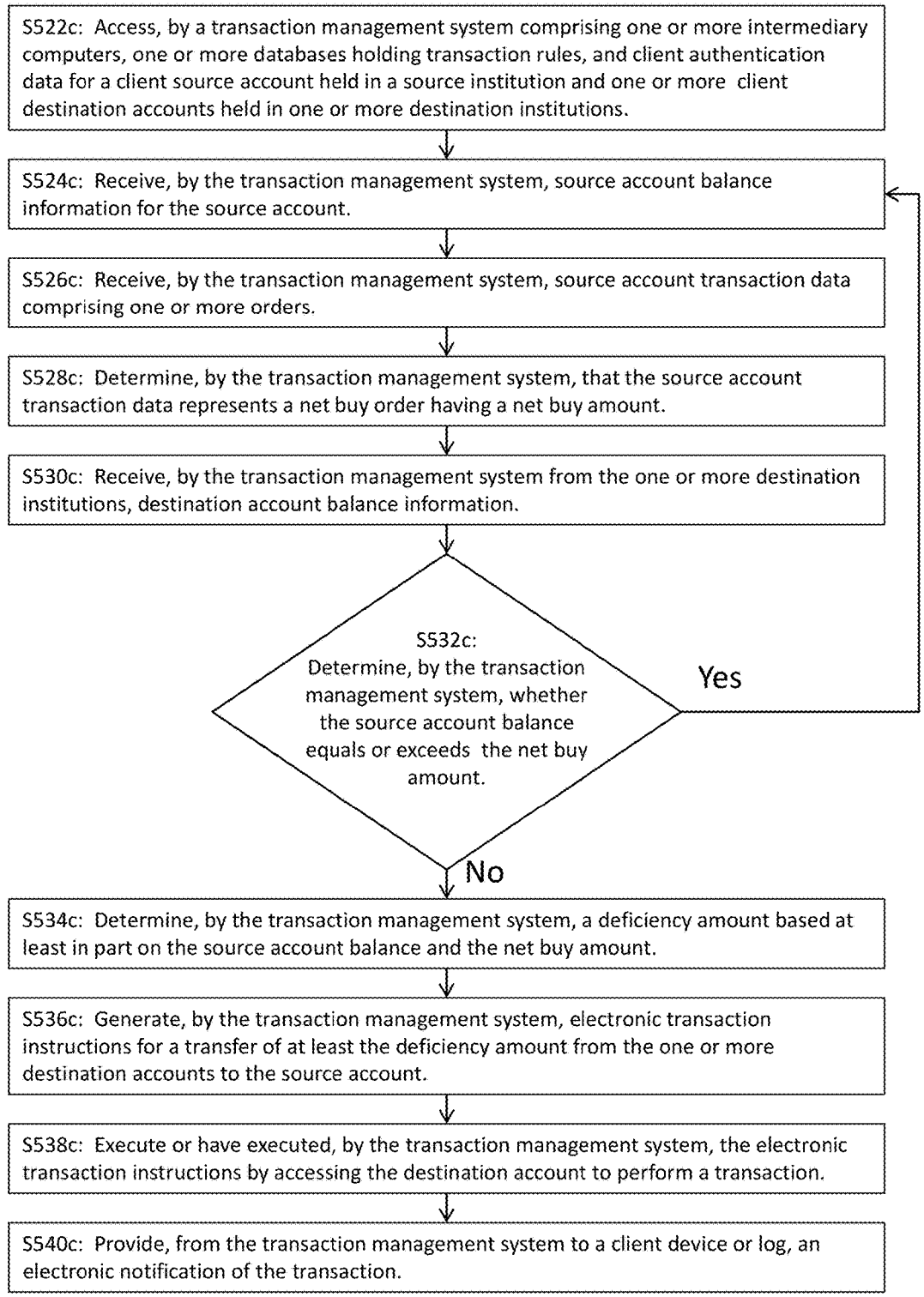
FIG. 5C is flow chart of yet further embodiments of the invention using push operations for processing account transactions in accordance with exemplary embodiments of the present invention.

Referring to FIG. 5C, a yet further embodiment of the invention is disclosed. This figure is the same as FIG. 5B except that operations S524c, S526c, and S530c comprise receiving operations to reflect that one or more or all of these operations may receive data that has been pushed to the TMS 120 from the client device and/or the source institution and/or the one or more destination institutions.

Referring to FIG. 5D, a yet further embodiment of the invention is disclosed. This figure is the same as FIG. 5B except that operations S524d, S526d, and S530d are retrieving steps performed by the TMS 120 instead of "obtaining" steps, to reflect that one or more or all of these operations may retrieve data by accessing the client device and/or the computer servers of the source institution and/or the computer servers of the one or more destination institutions using the respective client authentication information. In embodiments, as noted the retrieving operations (e.g., steps S524d, S526d, S530d) may comprise using one or more application programming interfaces (APIs) to access data from these third-party computer systems. In embodiments, data may be retrieved by scraping data from websites associated with the third-party computer systems, as discussed herein. In embodiments, any combination of receiving and retrieving operations may be used by the TMS to perform these steps.

Figures 1, 5E:
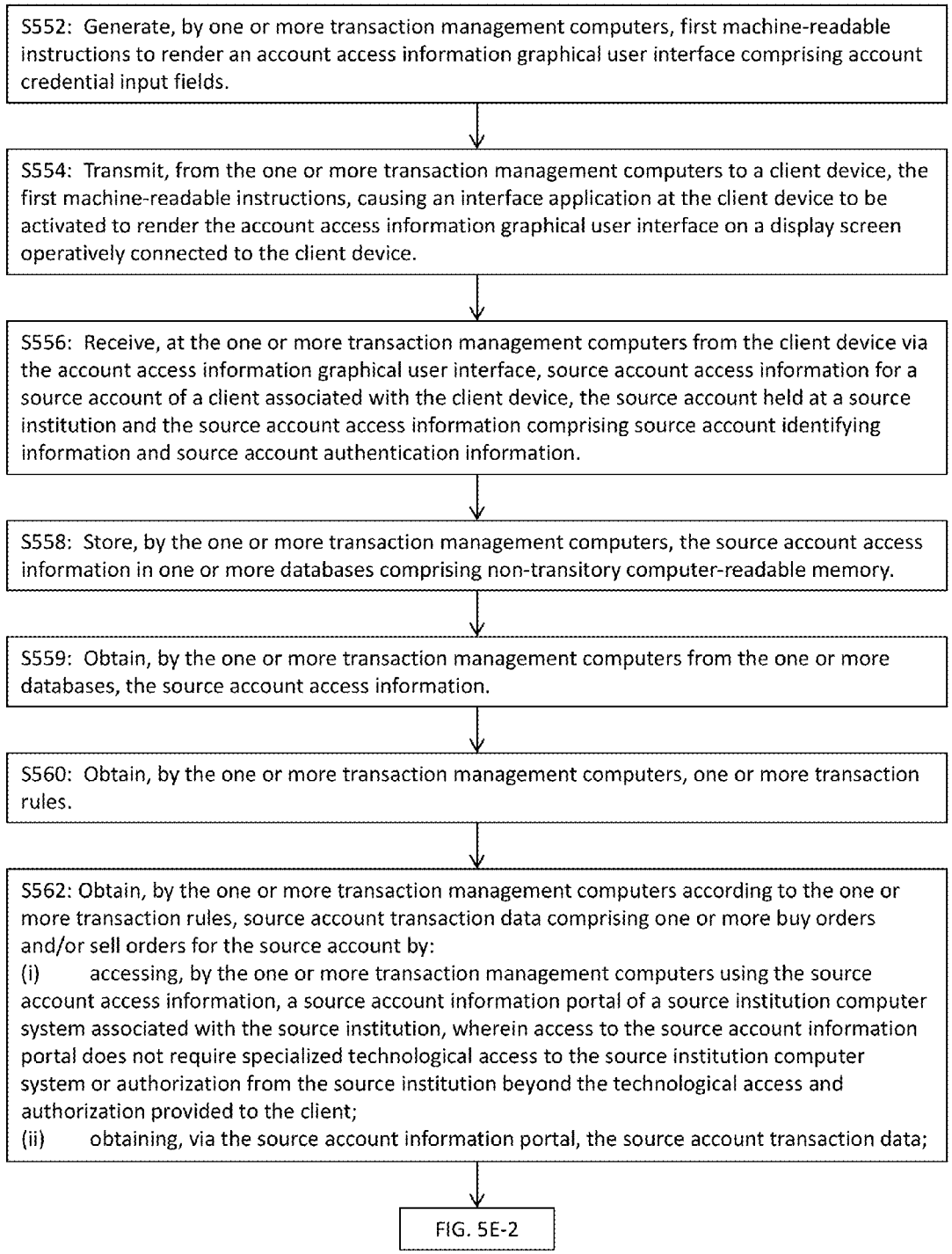
Figures 2, 5E:
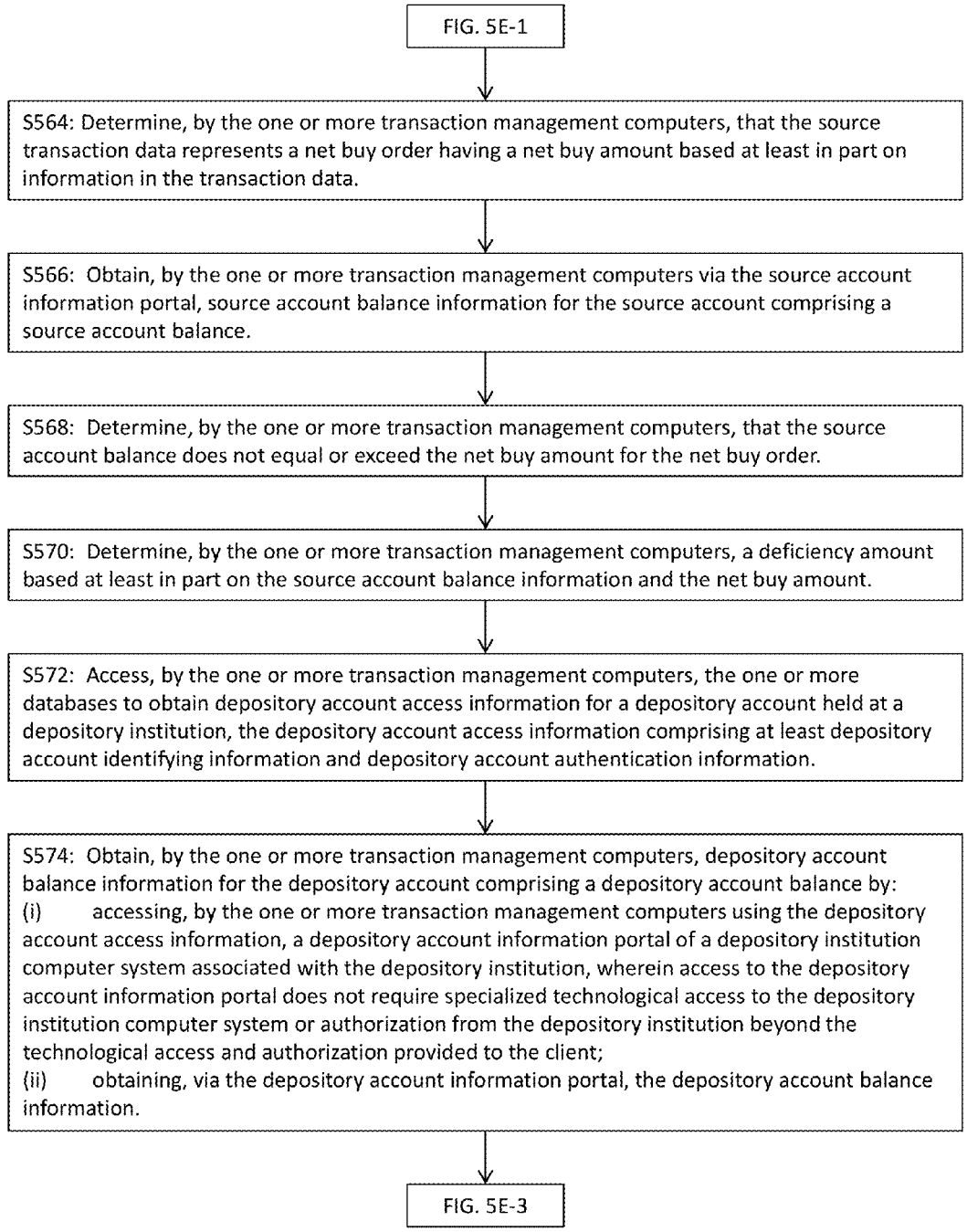
Figures 3, 5E:
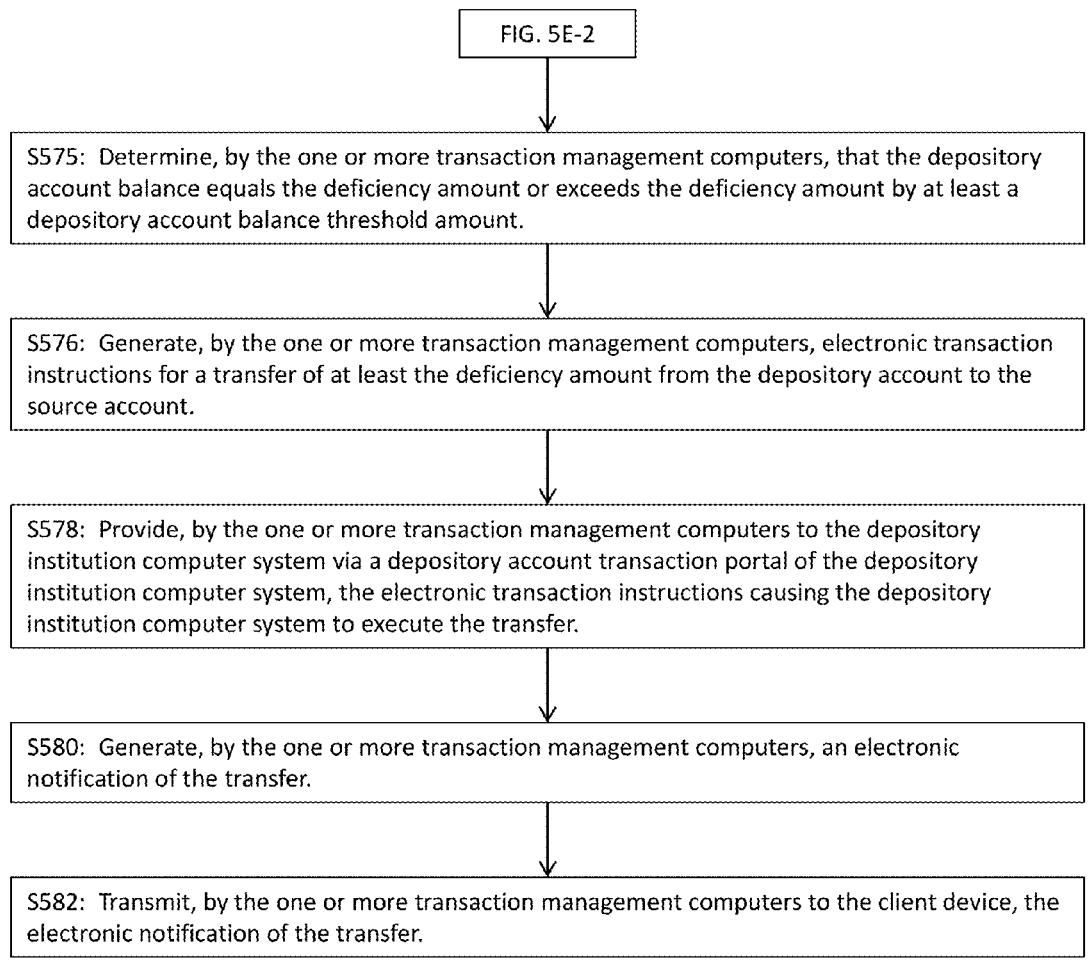

FIGS. 5E-1-5E-3 show an exemplary process for performing a bypass cash sweep and in particular a deposit sweep to fund a source account, e.g., a trading account, in accordance with embodiments of the present invention. The source account may be funded, at least in part, from a depository account, which may be an interest-bearing account and/or a highly liquid account, such as a bank account, money fund account, exchange-traded fund (ETF) account, to name a few. In embodiments, the depository account may be considered a destination account, even where funds are being transferred from the destination account to the source account.

In a step S552, one or more transaction management computers may generate first machine-readable instructions to render an account access information graphical user interface comprising account credential input fields. In embodiments, the machine-readable instructions may comprise any of data, graphical elements, layout and/or style code (e.g., Cascading Style Sheets (CSS)), content code (e.g., expressed in a mark-up language, such as HTML), and/or code for processing user inputs (e.g., expressed in JavaScript, PHP, Objective-C, and/or Java, to name a few).

In a step S554, the one or more transaction management computers may transmit to a client device the first machine-readable instructions, causing an interface application at the client device to be activated to render the account access information graphical user interface on a display screen operatively connected to the client device. In embodiments, the client device may be any of a personal computer, laptop computer, tablet computer, cell phone, smart phone, mobile devices, personal digital assistant, and/or wearable electronic device, to name a few.

In a step S556, the one or more transaction management computers may receive from the client device via the account access information graphical user interface, source account access information for a source account of a client associated with the client device, the source account held at a source institution and the source account access information comprising source account identifying information and source account authentication information.

In a step S558, the one or more transaction management computers may store the source account access information in one or more databases comprising non-transitory computer-readable memory. In embodiments, each time account access information for source or depository accounts is received, such information may be stored in the one or more databases.

In a step S559, the one or more transaction management computers may obtain from the one or more databases the source account access information. Where such information was just received at the one or more transaction management computers, it may already be in working memory and may not need to be retrieved from the one or more databases. In embodiments, account access information may be obtained from the one or more databases without receiving such information anew from the client device each time.

In a step S560, the one or more transaction management computers may obtain one or more transaction rules.

In a step S562, the one or more transaction management computers may obtain source account transaction data comprising one or more buy orders and/or sell orders for the source account by. The source account transaction data may be obtained according to the one or more transaction rules, which may specify a frequency, e.g., an account monitoring frequency, for obtaining (e.g., retrieving) source account transaction data. In embodiments, the one or more transaction management computers may obtain the source account transaction data by accessing, using the source account access information, a source account information portal of a source institution computer system associated with the source institution, wherein access to the source account information portal does not require specialized technological access to the source institution computer system or authorization from the source institution beyond the technological access and authorization provided to the client. The one or more transaction management computers may then obtain the source account transaction data via the source account information portal.

In embodiments, the source account information portal may comprise a text-based interface, such as a command line interface. In other embodiments, the source account information portal may comprise a graphical user interface. In embodiments, the source account information portal may comprise a website accessible at a URL via the Internet. Obtaining the source account transaction data may comprise screen scraping. In other embodiments, the source account information portal may comprise an application programming interface (API), which may be used by one or more other computer systems and/or user devices to request information from the source institution computer system and/or submit information to the source institution computer system.

In a step S564, the one or more transaction management computers may determine that the source transaction data represents a net buy order having a net buy amount based at least in part on information in the transaction data.

In a step S566, the one or more transaction management computers may obtain, via the source account information portal, source account balance information for the source account comprising a source account balance.

In a step S568, the one or more transaction management computers may determine that the source account balance does not equal or exceed the net buy amount for the net buy order. In embodiments, the transaction rules may comprise a source account minimum balance amount. The one or more transaction management computers may determine that the source account balance does not exceed the net buy amount by at least the source account minimum balance amount, e.g., so as to ensure that the source account minimum balance is maintained.

In a step S570, the one or more transaction management computers may determine a deficiency amount based at least in part on the source account balance information and the net buy amount.

In a step S572, the one or more transaction management computers may access the one or more databases to obtain depository account access information for a depository account held at a depository institution, the depository account access information comprising at least depository account identifying information and depository account authentication information.

In a step S574, the one or more transaction management computers may obtain depository account balance information for the depository account comprising a depository account balance by accessing, using the depository account access information, a depository account information portal of a depository institution computer system associated with the depository institution, wherein access to the depository account information portal does not require specialized technological access to the depository institution computer system or authorization from the depository institution beyond the technological access and authorization provided to the client. The one or more transaction management computers may then obtain, via the depository account information portal, the depository account balance information.

In a step S575, the one or more transaction management computers may determine that the depository account balance equals the deficiency amount or exceeds the deficiency amount by at least a depository account balance threshold amount. In embodiments, the depository account balance threshold amount may be a depository account minimum balance, which may be specified by the client or by the depository institution. It may be a minimum balance required to avoid incurring fees. In embodiments, the depository account balance threshold amount may be zero, meaning there is no minimum balance that must be maintained for the depository account.

In embodiments, the one or more transaction management computers may generate a second electronic notification, which may comprise an indication of a proposed sweep transfer of at least the deficiency amount from the depository account to the source account. In embodiments, the second electronic notification may comprise a request for authorization to proceed with the proposed sweep transfer. The second electronic notification may indicate the amount proposed to be transferred. In embodiments, the second electronic notification may only indicate that a transfer of funds is proposed. The one or more transaction management computers may transmit the second electronic notification to the client device and/or to another user device associated with the client. In embodiments, the one or more transaction management computers may receive, e.g., from the client device, an electronic authorization to proceed with the proposed sweep transfer. In embodiments, the electronic authorization may be encrypted using an asymmetric private key generated based at least in part upon an invariant biometric feature vector, which may be associated with the client. In embodiments, other encryption algorithms may be used.

In a step S576, the one or more transaction management computers may generate electronic transaction instructions for a transfer of at least the deficiency amount from the depository account to the source account. In embodiments, the electronic transaction instructions may comprise ACH instructions. In embodiments, the electronic transaction instructions may comprise commands input via a depository account transaction portal of the depository institution computer system. In embodiments, the depository account transaction portal may comprise a transaction graphical user interface with a recipient address input element and a transaction amount input element. In embodiments, the depository account transaction portal may comprise an API for accessing the depository institution computer system. The API can include account authentication verification commands to identify the depository account and/or verify the credentials associated with a request for transactions (e.g., fund transfers) from a particular depository account.

In a step S578, one or more transaction management computers may provide to the depository institution computer system via a depository account transaction portal of the depository institution computer system, the electronic transaction instructions causing the depository institution computer system to execute the transfer.

In a step S580, one or more transaction management computers may generate an electronic notification of the transfer. The electronic notification may indicate that a transfer occurred, the amount transferred, the date and/or time of the transfer, and/or the one or more sending account and/or recipient account, to name a few. In embodiments, the electronic notification may comprise an updated source account balance after the transfer is executed or an updated depository account balance after the transfer is executed.

In a step S582, one or more transaction management computers may transmit to the client device the electronic notification of the transfer.

In embodiments, the one or more transaction management computers may determine that the deficiency amount exceeds the depository account balance. The one or more transaction management computers may then generate a second electronic notification comprising an indication of the deficiency amount and transmit the second electronic notification to the client device. In embodiments, the second electronic notification may comprise account input fields to identify a second depository account and/or associated second depository account access credentials.

In embodiments, the one or more transaction management computers may obtain depository account balance information for a plurality of depository accounts. The one or more transaction management computers may generate electronic transaction instructions for transfers of a portion of at least the deficiency amount from each of a plurality of the depository accounts to the source account. The one or more transaction management computers may then provide the electronic transaction instructions to respective depository institution computer systems via respective depository account transaction portals, causing the depository institution computer systems to execute the transfers. The one or more transaction management computers may determine the depository accounts from which to transfer funds based at least in part upon the transaction rules. The transaction rules may comprise any of minimizing a number of transfers necessary to cover the deficiency amount, preferencing depository accounts that have no FDIC coverage, using depository accounts according to a preference order specified by the client and/or specified by a deposit sweep program administrator, and/or preferencing depository accounts based at least in part upon their respective balances and/or numbers of accounts (e.g., whether an account holds multiple small accounts or a few large accounts, to name a few).

In embodiments, a system for performing cash sweep transactions, e.g., deposit sweep transactions, that bypass source and/or destination institution technological cooperation can comprise one or more processors and non-transitory computer-readable memory having stored thereon instructions to perform the steps of obtaining, by one or more transaction management computers from one or more databases comprising non-transitory computer-readable memory, source account access information for a source account of a client, the source account held at a source institution and the source account access information comprising source account identifying information and source account authentication information; obtaining, by the one or more transaction management computers, one or more transaction rules; obtaining, by the one or more transaction management computers according to the one or more transaction rules, source account transaction data comprising one or more buy orders and/or sell orders for the source account by accessing, by the one or more transaction management computers using the source account access information, a source account information portal of a source institution computer system associated with the source institution, wherein access to the source account information portal does not require specialized technological access to the source institution computer system or authorization from the source institution beyond the technological access and authorization provided to the client, and by obtaining, via the source account information portal, the source account transaction data; determining, by the one or more transaction management computers, that the source transaction data represents a net buy order having a net buy amount based at least in part on information in the transaction data; obtaining, by the one or more transaction management computers via the source account information portal, source account balance information for the source account comprising a source account balance; determining, by the one or more transaction management computers, that the source account balance does not equal or exceed the net buy amount for the net buy order; determining, by the one or more transaction management computers, a deficiency amount based at least in part on the source account balance information and the net buy amount; accessing, by the one or more transaction management computers, the one or more databases to obtain depository account access information for a depository account held at a depository institution, the depository account access information comprising at least depository account identifying information and depository account authentication information; obtaining, by the one or more transaction management computers, depository account balance information for the depository account comprising a depository account balance by accessing, by the one or more transaction management computers using the depository account access information, a depository account information portal of a depository institution computer system associated with the depository institution, wherein access to the depository account information portal does not require specialized technological access to the depository institution computer system or authorization from the depository institution beyond the technological access and authorization provided to the client, and by obtaining, via the depository account information portal, the depository account balance information; determining, by the one or more transaction management computers, that the depository account balance equals the deficiency amount or exceeds the deficiency amount by at least a depository account balance threshold amount; generating, by the one or more transaction management computers, electronic transaction instructions for a transfer of at least the deficiency amount from the depository account to the source account; providing, by the one or more transaction management computers to the depository institution computer system via a depository account transaction portal of the depository institution computer system, the electronic transaction instructions causing the depository institution computer system to execute the transfer; generating, by the one or more transaction management computers, an electronic notification of the transfer; and transmitting, by the one or more transaction management computers to a client device associated with the client, the electronic notification of the transfer.

In embodiments, a method for performing brokerage transactions associated with a cash sweep program such as a deposit sweep program and authorizing sweep transfers, from a client device perspective, can comprise transmitting, from a client device associated with a client to a transaction management computer system comprising one or more computers, client access credentials associated with a transaction management account. The client access credentials may have been input via a user input device embedded in and/or operatively connected to the client device. The credentials may thus have been populated into respective client access credential input fields on a login GUI displayed on a display screen embedded in and/or operatively connected to the client device.

The client device may receive from the transaction management computer system machine-readable instructions to render an account information graphical user interface. The client device may then receive from a user input device (e.g., keyboard, keypad, touch pad, touch screen, mouse, microphone, camera, scanner, etc.) source account access information for a source account of the client, the source account held at a source institution and the source account access information comprising source account identifying information and source account authentication information. The client device may transmit to the transaction management computer system, via the account information graphical user interface, the source account access information.

In embodiments, the client device may also receive, e.g., from the user input device, depository account access information for a depository account of the client, the depository account held at a depository institution and the depository account access information comprising depository account identifying information and depository account authentication information. The client device may transmit the depository account access information to the transaction management computer system, e.g., via the account information graphical user interface.

The client device may access a source account transaction portal of a source institution computer system associated with the source institution. The source account transaction portal, which may comprise a graphical user interface or an API, may comprise transaction parameter options for transactions from the source account. Transaction parameter options can include order amounts (e.g., buy amounts, sell amounts, limit amounts, transaction time parameters (e.g., to execute the transaction at a specify date and/or time), and/or security identifiers (e.g., stock symbols) associated with the order, to name a few). The client device may transmit to the source institution computer system via the source account transaction portal electronic transaction instructions comprising transaction parameters (e.g., parameters input and/or selected by the client).

The client device may then receive from the transaction management computer system a first electronic notification of a proposed sweep transfer from a deposit account associated with the client to the source account, the transaction management computer system having monitored the source account using the source account authentication information to access a source account information portal of the source institution computer system and having determined a deficiency of funds in the source account based at least in part upon pending order information obtained via the source account information portal.

The client device may transmit to the transaction management computer system an electronic authorization to perform the proposed sweep transfer. In embodiments, the electronic authorization may comprise an encrypted message, which may be encrypted using a biometric-derived private key. The client device may thereafter receive from the transaction management computer system a second electronic notification comprising an indication that the proposed sweep transfer was executed.

In embodiments, a system for performing cash sweep transaction such as deposit sweep transactions that bypass source and/or destination institution technological cooperation can comprise one or more processors and non-transitory computer-readable memory having stored thereon instructions to perform the steps of transmitting, from a client device associated with a client to a transaction management computer system comprising one or more computers, client access credentials associated with a transaction management account; receiving, at the client device from the transaction management computer system, machine-readable instructions to render an account information graphical user interface; receiving, at the client device from a user input device, source account access information for a source account of the client, the source account held at a source institution and the source account access information comprising source account identifying information and source account authentication information; transmitting, from the client device to the transaction management computer system via the account information graphical user interface, the source account access information; accessing, by the client device, a source account transaction portal of a source institution computer system associated with the source institution, the source account transaction portal comprising transaction parameter options for transactions from the source account; transmitting, by the client device to the source institution computer system via the source account transaction portal, electronic transaction instructions comprising transaction parameters; receiving, at the client device from the transaction management computer system, a first electronic notification of a proposed sweep transfer from a deposit account associated with the client to the source account, the transaction management computer system having monitored the source account using the source account authentication information to access a source account information portal of the source institution computer system and having determined a deficiency of funds in the source account based at least in part upon pending order information obtained via the source account information portal; transmitting, from the client device to the transaction management computer system, an electronic authorization to perform the proposed sweep transfer; and receiving, at the client device from the transaction management computer system, a second electronic notification comprising an indication that the proposed sweep transfer was executed.

Figure 6A:
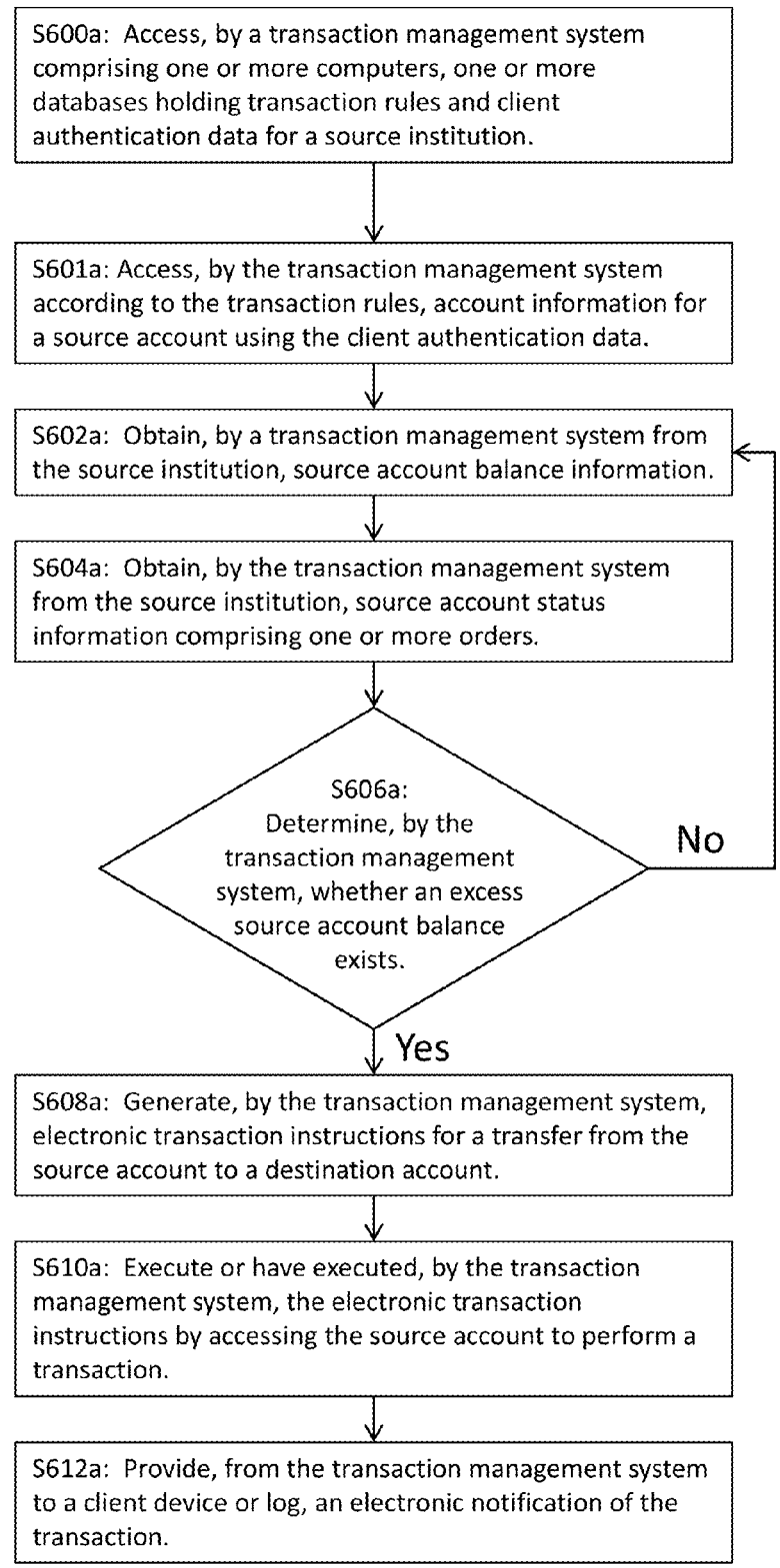
FIG. 6A is flow chart of embodiments of the invention for processing excess funds in accordance with exemplary embodiments of the present invention.

Referring to FIG. 6A, there are disclosed embodiments for monitoring and transferring excess funds from a source account to a destination account (e.g., an interest bearing account). The process may be performed by the TMS 120, which may comprise a computer system having one or more computers, which may be intermediary computers with respect to a source institution computer system, destination institution computer systems, and/or user devices.

Block S600*a* comprises a computer-implemented operation of the TMS 120 computer system accessing the one or more databases holding the transaction rules and the client authentication data for the source institution. In embodiments, the TMS 120 may also access client authentication data for the one or more destination institutions.

Block S601*a* comprises a computer-implemented operation of accessing, by the TMS 120, account information for a source account at the source institution using the client authentication data. Accessing account information may comprise logging into an account access portal (e.g., a website or API), such as by inputting the client authentication data (e.g., a username and password or additional authentication information). In embodiments, one or more transaction rules may govern the frequency with which the account information is accessed or the time of day or date when the account information is accessed, to name a few.

Block S602*a* comprises a computer-implemented operation of obtaining, by the TMS 120, from the source institution client source balance information, as described previously.

Block S604*a* comprises a computer-implemented operation of the TMS 120 periodically or aperiodically obtaining the source transaction data comprising one or more buy orders and/or sell orders for the source account, by the one or more intermediary computers via the one or more networks. A purpose of this obtaining operation may be to determine if there are any pending buy or sell orders and/or completed transactions which may change the source account balance and affect whether there is an excess of funds in the source account. In embodiments, the obtaining the source transaction data may comprise retrieving the source transaction data, via access to a server of the source institution, using the client source authentication data from the electronic storage 314. In embodiments, this operation may be based at least in part upon automatic polling or may be triggered by receiving data indicating that a change has occurred in the source account balance or that a transaction order or a net buy order or a net sell order has been received and/or that a transaction has been performed. In embodiments, this operation may be optional, as the source account balance may be queried to determine whether a balance change occurred (e.g., by comparing a current balance to a data record corresponding to a previous and/or last obtained balance).

Block S606*a* comprises a computer-implemented operation by the TMS 120 computer system of transforming data to determine whether an excess source account balance exists. In embodiments, this operation may comprise comparing the client source account balance to a source account maximum balance amount recorded in the one or more databases and determining an excess amount, if any. In embodiments, such a determination may be determined via a subtraction operation of the source account maximum balance amount from the source account balance or via a comparison operation, such as an inequality test to determine whether a source account balance is greater than a predefined threshold. In embodiments, following a determination that a predefined threshold is exceeded, the TMS 120 may determine the excess amount.

Block S608*a* comprises a computer-implemented operation by the TMS 120 computer system of generating electronic transaction instructions to transfer the excess amount of funds from the client source account to one or more of the client destination accounts. In embodiments, appropriate client source account authentication data, e.g., username and password, may be obtained from the storage 314. In embodiments, appropriate client destination account authentication data, e.g., username and password, may also be obtained from the storage 316 to facilitate this transfer. In embodiments, source and/or destination account identifiers may be obtained. One or more destination account identifiers may identify the accounts to which the excess amount will be transferred. In embodiments, the electronic transaction instructions may comprise respective amounts to be transferred to each of the one or more destination accounts.

Block S610*a* comprises a computer-implemented operation of the transaction management system 120 executing or having executed the transaction instructions. In embodiments, this operation may comprise initiating transfer of an amount from the respective source account to one or more of the client destination accounts using the destination account authentication credentials, as described. In embodiments, this operation may comprise selecting an execution or transfer button on an interface associated with the source institution computer system.

Block S612*a* comprises a computer-implemented operation of the transaction management system 120 providing or making accessible over the one or more networks to the client device an electronic notification of the fund transfer from the source account to one or more of the client destination accounts. The client source account balance held in electronic storage 318 and the one or more client destination account balances held in the electronic storage 320 may then be updated. In embodiments, the client device may be a transaction history log maintained on a server of another, and may comprise updating the transaction history log. The transaction history log may be accessible via a website associates with the TMS 120 and/or via software, such as a mobile application running on a client device, such as a smart phone.

Figure 6B:
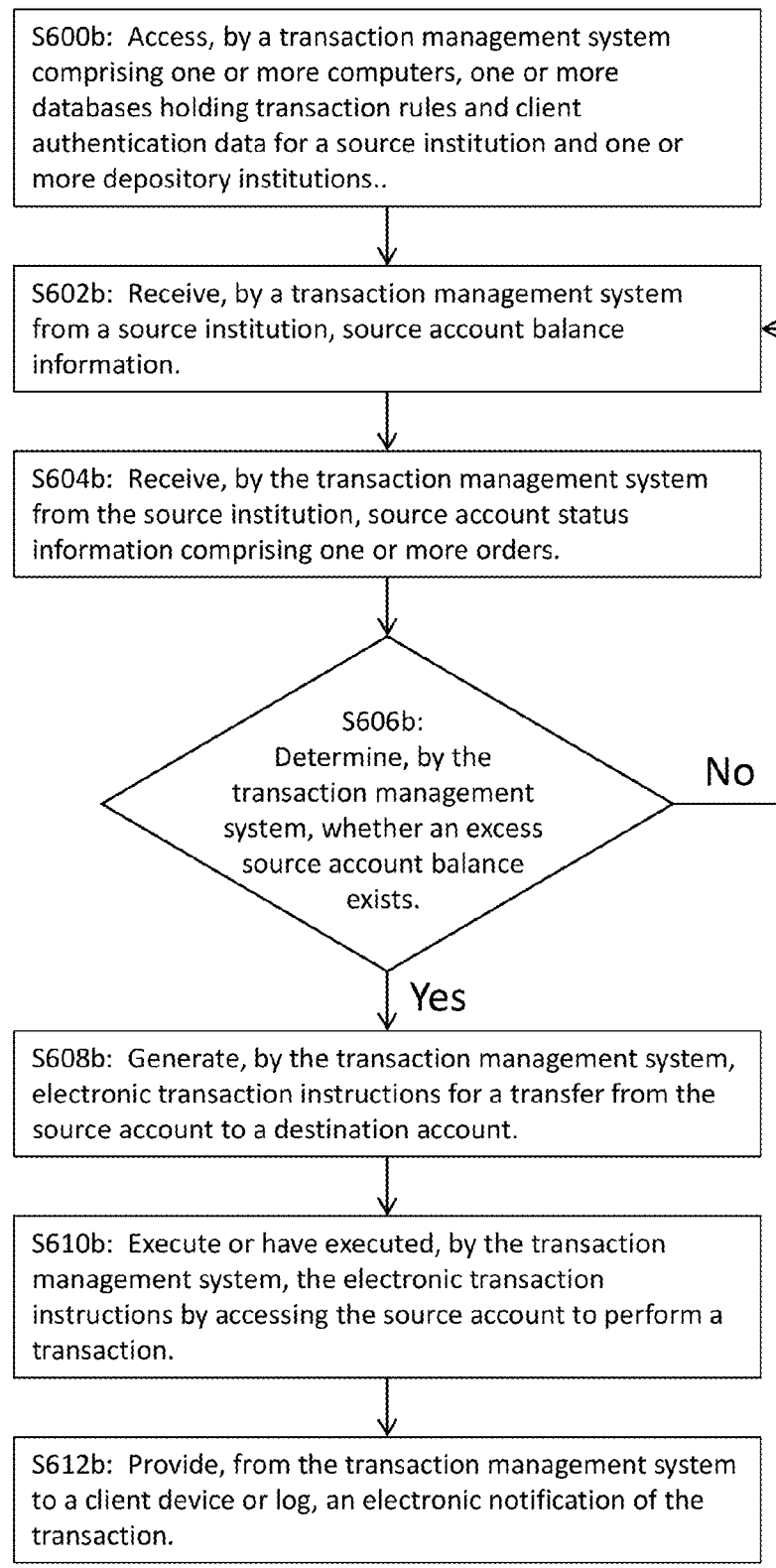
FIG. 6B is flow chart of further embodiments of the invention for processing excess funds using push operations in accordance with exemplary embodiments of the present invention.

Referring to FIG. 6B, a yet further embodiment of the invention is disclosed. This figure is the same as FIG. 6A except that operations S602*b* and S604*b* comprise receiving operations to reflect that one or more of these operations may receive data that has been pushed and/or transmitted to the TMS 120 from the client device and/or the source institution.

Figure 6C:
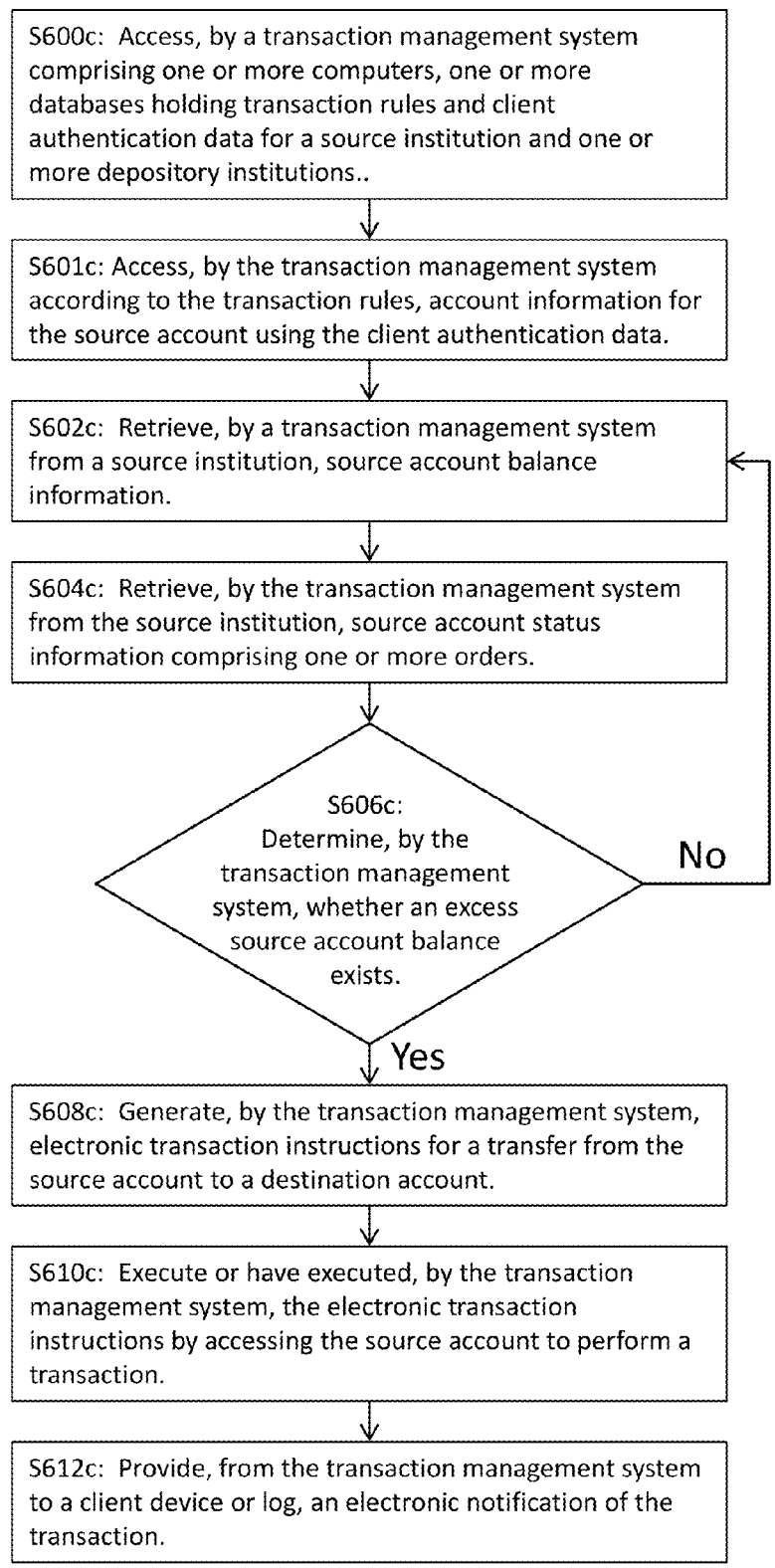
FIG. 6C is flow chart of embodiments of the invention for processing excess funds using retrieval operations in accordance with exemplary embodiments of the present invention.

Referring to FIG. 6C, a yet further embodiment of the invention is disclosed. This figure is the same as FIG. 6A except that the operations S602*c* and S604*c* are retrieving steps instead of obtaining steps, to reflect that one or more of these operations may retrieve data by accessing the client device and/or the computer servers of the source institution using the client authentication information, e.g., logging into the source account using the client source account credentials and/or using an API for accessing this information in the source account computer system.

In embodiments, any combination of receiving and retrieving operations may be used by the TMS 120 to perform these steps.

Figures 1, 6D:
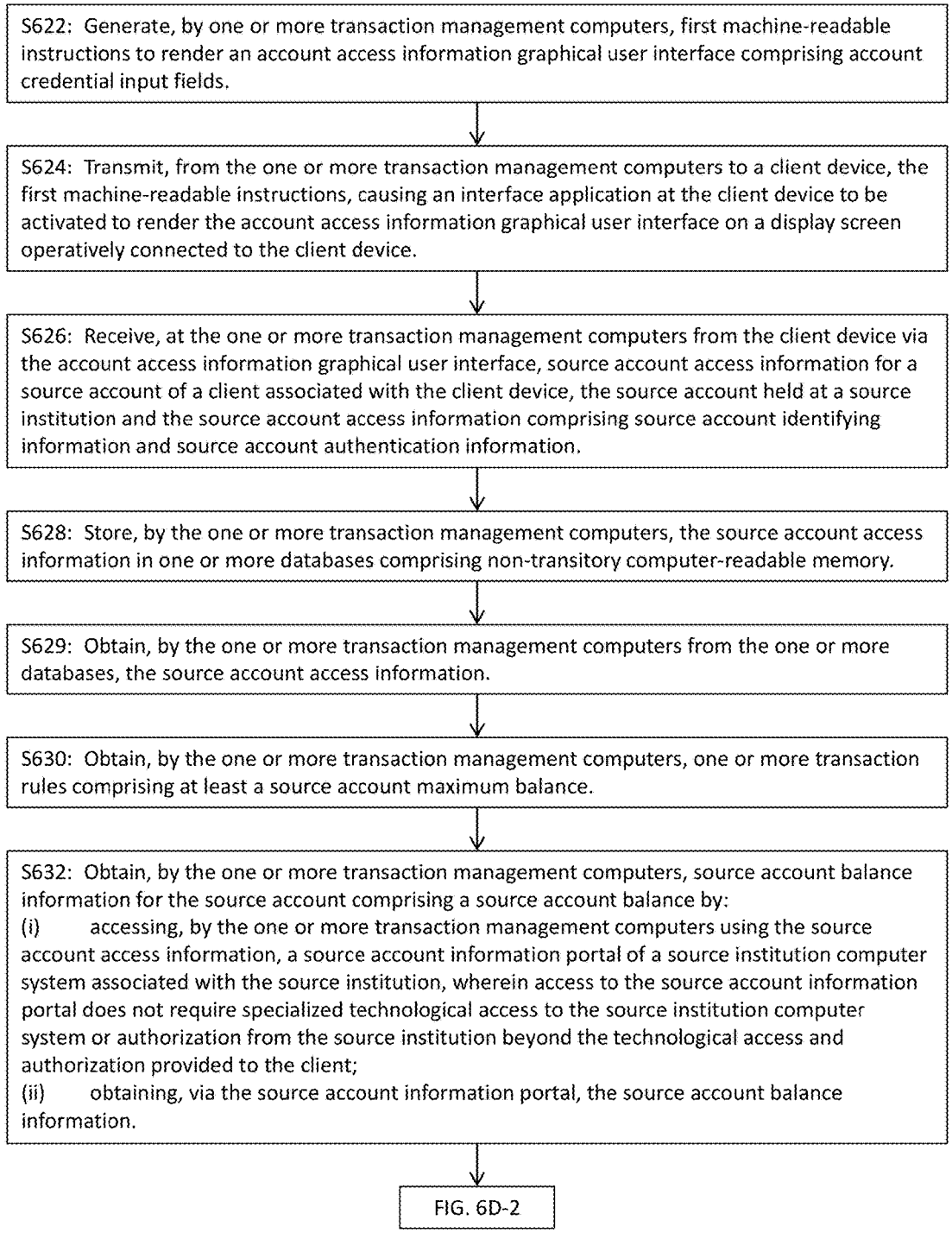
Figures 2, 6D:
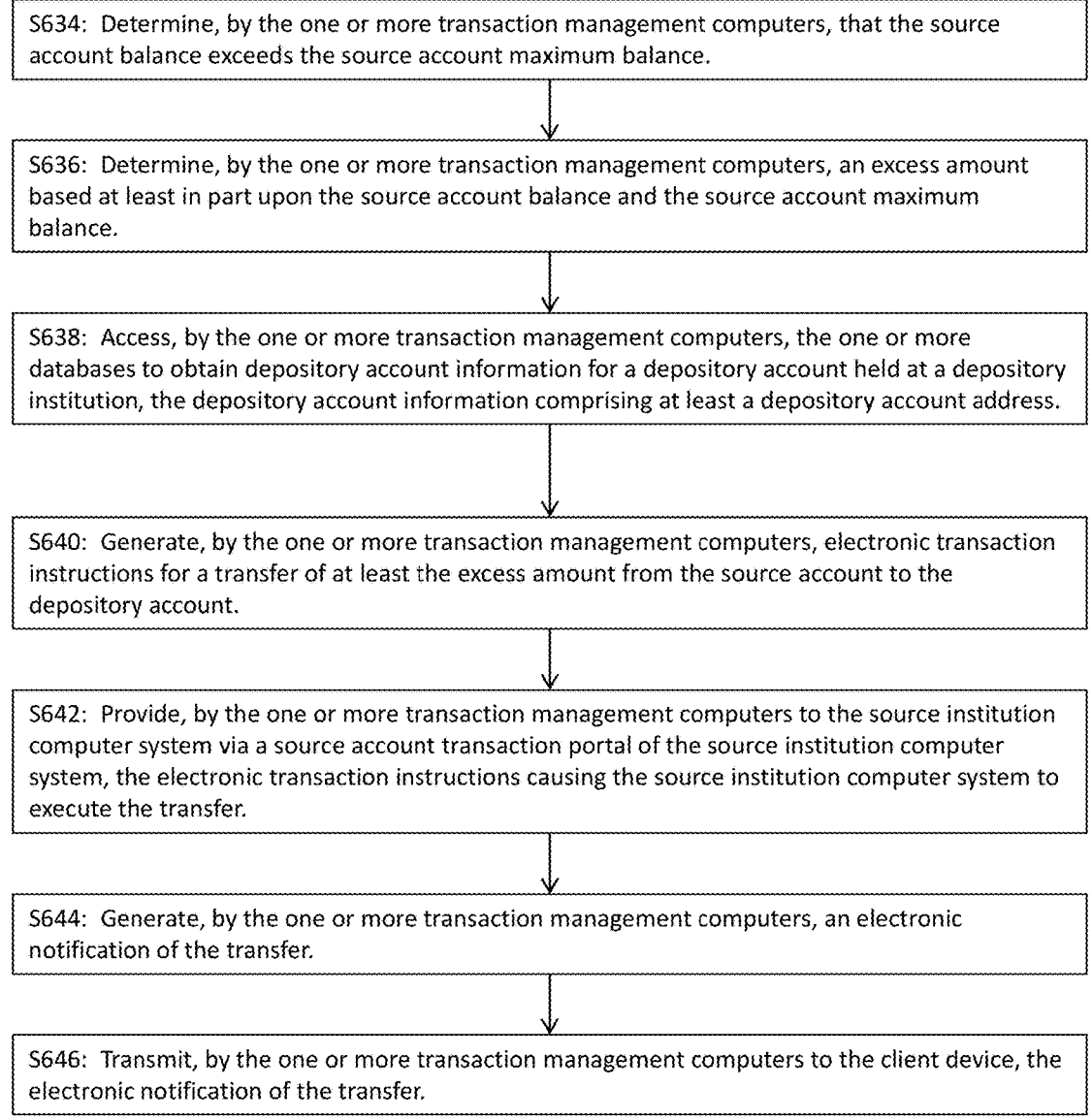

FIGS. 6D-1-6D-2 show an exemplary process for performing a bypass deposit sweep to maintain a source account maximum balance in accordance with embodiments of the present invention. In embodiments, variations of this exemplary process may be performed for other types of cash sweeps. A source account may be trading account, from which it is desirable to transfer excess funds to interest-bearing and/or insured accounts, such as depository accounts.

In a step S622, one or more transaction management computers may generate first machine-readable instructions to render an account access information graphical user interface comprising account credential input fields. Accordingly, the first machine-readable instructions may comprise display data, graphical elements, and/or computer code (e.g., style code, layout code, content expressed in a markup language, and/or input handling code), to name a few.

In a step S624, the one or more transaction management computers may transmit to a client device the first machine-readable instructions, causing an interface application at the client device to be activated to render the account access information graphical user interface on a display screen operatively connected to the client device.

In a step S626, the one or more transaction management computers may receive from the client device via the account access information graphical user interface (e.g., after input via a user input device), source account access information for a source account of a client associated with the client device, the source account held at a source institution and the source account access information comprising source account identifying information and source account authentication information.

In a step S628, the one or more transaction management computers may store the source account access information in one or more databases comprising non-transitory computer-readable memory.

In a step S629, the one or more transaction management computers may obtain the source account access information from the one or more databases. In embodiments where source account access information was previously stored in the one or more databases, the databases may be accessed and the source account access information retrieved without receiving such information anew from the client device.

In a step S630, the one or more transaction management computers may obtain one or more transaction rules comprising at least a source account maximum balance. In embodiments, the transaction rules may be obtained from one or more databases, which may have been populated based at least in part upon user-input transaction rules and/or transaction parameters. The transaction rules may further comprise an account monitoring frequency for obtaining source account balance data.

In a step S632, the one or more transaction management computers may obtain source account balance information for the source account, wherein the source account balance information comprises a source account balance. The one or more transaction management computers may access a source account information portal of a source institution computer system associated with the source institution using the source account access information. Access to the source account information portal may not require specialized technological access to the source institution computer system or authorization from the source institution beyond the technological access and authorization provided to the client. In embodiments, the source account information portal may comprise a graphical user interface. In embodiments, the portal may comprise a non-graphical interface, such as a text-based or command line interface. In embodiments, the source account information portal may comprise a GUI provided by an application, such as a mobile application running on a smart phone. In embodiments, the source account information portal may comprise a website accessible via the Internet at a URL. The one or more transaction management computers may then obtain the source account balance information via the source account information portal, e.g., by screen scraping. In embodiments, the source account information portal may comprise an API, accessible by one or more other computer systems and/or user devices.

In a step S634, the one or more transaction management computers may determine that the source account balance exceeds the source account maximum balance.

In a step S636, the one or more transaction management computers may determine an excess amount based at least in part upon the source account balance and the source account maximum balance.

In a step S638, the one or more transaction management computers may access the one or more databases to obtain depository account information for a depository account held at a depository institution, the depository account information comprising at least a depository account address.

In a step S640, the one or more transaction management computers may generate electronic transaction instructions for a transfer of at least the excess amount from the source account to the depository account. In embodiments, the electronic transaction instructions may comprise ACH instructions.

In a step S642, the one or more transaction management computers may provide to the source institution computer system the electronic transaction instructions causing the source institution computer system to execute the transfer. In embodiments, the electronic transaction instructions may be provided via a source account transaction portal of the source institution computer system. Such a source account transaction portal may comprise an API. In embodiments, the electronic transactions instructions may otherwise be transmitted to the source institution computer system.

In a step S644, the one or more transaction management computers may generate an electronic notification of the transfer.

In a step S642, the one or more transaction management computers may transmit to the client device the electronic notification of the transfer. The electronic notification may comprise a push notification that is automatically rendered on the client device. In embodiments, the electronic notification may comprise an email, SMS, or other electronic message. The electronic notification may be viewable in an interface application, such as a deposit sweep application running on the client device or an Internet browser application.

FIG. 6E is a flow chart of an exemplary process for analyzing a depository account balance in accordance with exemplary embodiments of the present invention.

In a step S652, the one or more transaction management computers may obtain depository account access information comprising at least depository account authentication information.

In a step S654, the one or more transaction management computers may obtain depository account balance information for the depository account comprising a depository account balance. The one or more transaction management computers may access, using the depository account access information, a depository account information portal of a depository institution computer system associated with the depository institution. In embodiments, access to the depository account information portal may not require specialized technological access to the depository institution computer system or authorization from the depository institution beyond the technological access and authorization provided to the client. The one or more transaction management computers may then obtain the depository account balance information via the depository account information portal. In embodiments, the depository account information portal may comprise an API. In embodiments, the depository account information portal may comprise a website or dedicated application (e.g., mobile app) comprising one or more GUIs. In embodiments, obtaining data from the depository account information portal may comprise screen scraping.

In a step S656, the one or more transaction management computers may obtain depository account maximum balance information comprising a depository account maximum balance. The depository account maximum balance may be obtained from one or more databases. In embodiments, such databases may comprise user settings or preferences. In other embodiments, a deposit sweep program administrator or a depository institution may set the depository account maximum balance. In embodiments, the depository account maximum balance may be based at least in part upon a maximum insurable amount, e.g., for FDIC insurance. In embodiments, the depository account maximum balance may be coded as part of a logical rule for evaluating permissible depository account balances.

In a step S658, the one or more transaction management computers may determine that a post-transfer depository account balance will not exceed the depository account maximum balance. Such determination may comprise computing the post-transfer balance based at least in part upon the current balance and the excess amount to be transferred into the account, and comparing the computed post-transfer balance to the depository account maximum balance.

In embodiments, the one or more transaction management computers may determine a plurality of depository accounts into which to transfer portions of the excess amount. The plurality of depository accounts and the respective amounts to transfer to each may be determined so as not to exceed respective depository account balances. In embodiments, the determination of one or more depository accounts may be based at least in part upon any of interest rates (e.g., to give preference to higher interest-bearing accounts), current account balances, excess amount, maximum insurable limits for each respective account, number of sweep program clients (e.g., deposit sweep program clients) whose funds are in the account and/or sizes (e.g., balances) of such accounts, to name a few.

In embodiments, a system for performing deposit sweep transactions that bypass source and/or destination institution technological cooperation can comprise one or more processors and non-transitory computer-readable memory having stored thereon instructions to perform the steps of obtaining, by one or more transaction management computers from one or more databases comprising non-transitory computer-readable memory, source account access information for a source account of a client, the source account held at a source institution and the source account access information comprising source account identifying information and source account authentication information; obtaining, by the one or more transaction management computers, one or more transaction rules comprising at least a source account maximum balance; obtaining, by the one or more transaction management computers, source account balance information for the source account comprising a source account balance by accessing, by the one or more transaction management computers using the source account access information, a source account information portal of a source institution computer system associated with the source institution, wherein access to the source account information portal does not require specialized technological access to the source institution computer system or authorization from the source institution beyond the technological access and authorization provided to the client, and by obtaining, via the source account information portal, the source account balance information; determining, by the one or more transaction management computers, that the source account balance exceeds the source account maximum balance; determining, by the one or more transaction management computers, an excess amount based at least in part upon the source account balance and the source account maximum balance; accessing, by the one or more transaction management computers, the one or more databases to obtain depository account information for a depository account held at a depository institution, the depository account information comprising at least a depository account address; generating, by the one or more transaction management computers, electronic transaction instructions for a transfer of at least the excess amount from the source account to the depository account; providing, by the one or more transaction management computers to the source institution computer system via a source account transaction portal of the source institution computer system, the electronic transaction instructions causing the source institution computer system to execute the transfer; generating, by the one or more transaction management computers, an electronic notification of the transfer; and transmitting, by the one or more transaction management computers to the client device, the electronic notification of the transfer. Such a system may perform other cash sweep transactions that bypass source and/or destination institution cooperation.

Referring to FIGS. 7A-7D, interfaces for a client device are illustrated. FIG. 7A illustrates embodiments of an interface listing multiple client source accounts (note that the Source Accounts button 702 is activated in FIG. 7A). An Add Account button 710 may initiate a process to add a new source account. In the exemplary embodiment, activating this Add Account button 710 will open the screen shown in FIG. 7B comprising a block 720 to input a source institution (e.g., via text entry, searching, selecting from a predefined list, to name a few). A source account number may be input in a block 722. A user's login credentials for the source account may also be input, such as in a block 724 for the client's username and a block 726 for the client's password. A Submit button 728 and a Cancel button 730 are also provided in the interface to complete the add account process and to cancel the process, respectively. In embodiments, a confirmation process may be performed to verify the account credentials. For example, the TMS 120 may attempt to access the account and obtain account balance information, and/or the TMS 120 may perform a test transaction.

FIG. 7C illustrates embodiments of an interface listing multiple client destination accounts, which may be depository accounts (note that the Destination Accounts button 704' is activated in FIG. 7C). The interface comprises an Add Account button 710' to initiate a process to add a new destination account. Activating this Add Account button 710' will open the screen shown in FIG. 7D with a block 720' to enter (e.g., input, search for, and/or select) a destination institution, a block 722' to enter a destination account identifier (e.g., an account number), a block 724' to enter a client username, and a block 726' to enter a client password. A Submit button 728' and a Cancel button 730' are also provided in the interface.

Figure 8A:
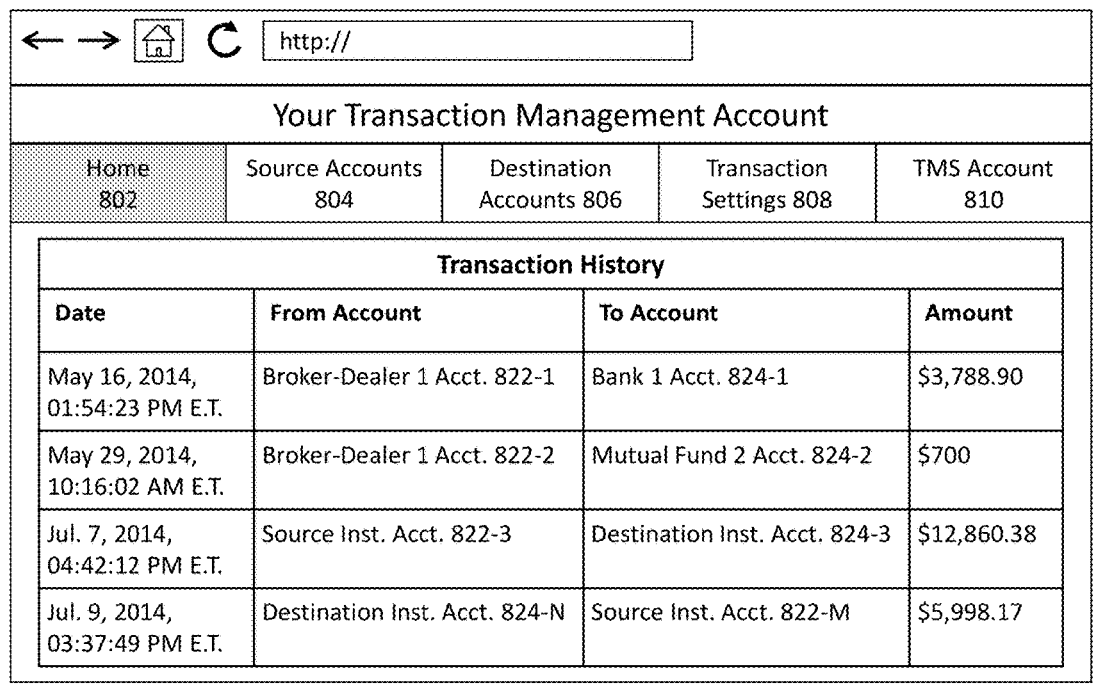
FIG. 8A is a schematic diagram of embodiments of a client interface screen for a client home page that lists recent transaction history for client source accounts and facilitates access to client source accounts and destination accounts and transaction rules and the client TMS account in accordance with exemplary embodiments of the present invention.

Referring to FIG. 8A, illustrated are embodiments of a Website interface 800 (e.g., accessible at a URL via a web browser) for accessing a user's transaction management account associated with the TMS 120, e.g., to access account information and/or change settings. Activating the "Home 802" element navigates to a home page (shown in the figure). In embodiments, the Home page interface may show a log of TMS transaction activity, such as a log of money movements, time of the transactions, the accounts involved, the amounts transferred, any fees incurred, etc. In embodiments, such information may be provided on a different webpage associated with the TMS.

In embodiments, the Website interface 800 may comprise a Source Accounts 804 element to access an interface for listing the client's source accounts (view accounts, view account balances, view account activity log, to name a few). In embodiments, the Website interface 800 may comprise a Destination Accounts 806 element to access an interface listing the client's destination accounts. In embodiments, the Website interface 800 may comprise a Transaction Settings 808 element to access an interface for creating, setting, and/or editing client transaction rules. In embodiments, the Website interface 800 may comprise a TMS Account 810 element to access and adjust TMS administration information, e.g., a logout option, billing information, contact information, financial information, and change TMS password, to name a few.

Figure 8B:
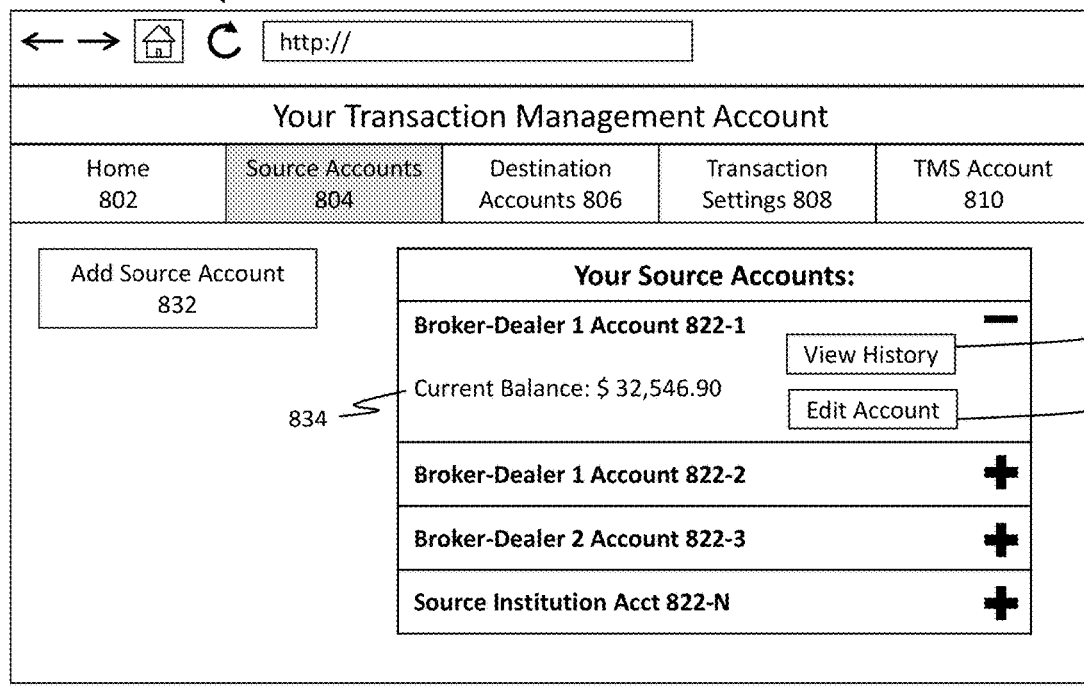
FIG. 8B is a schematic diagram of embodiments of a client interface screen for viewing a listing of the client's source accounts, with an Add Source Account button, a View Account button, and an Edit Account button in accordance with exemplary embodiments of the present invention.

Referring to FIG. 8B, embodiments of the Source Accounts 804 interface are illustrated. In the Your Source Accounts box, individual client source accounts are listed. In embodiments, when one of the source accounts is selected, a button for a View History 836 screen may be provided, where an account transaction history may be accessed. In embodiments, this information may be obtained by accessing source account data from the source institution servers using the client source account credentials and parsing and/or reformatting this data for display at the TMS website, as previously described. In embodiments, this information may be obtained in whole or in part from electronic storage in the TMS 120. In embodiments, an Edit Account 838 button may be provided to allow deletion of accounts and/or to allow changing source account credentials, which will update the source account credentials stored at the TMS in electronic storage 314. In embodiments, the TMS may provide an electronic notification to one or more user devices when a source account cannot be accessed and/or may prompt a user to modify the credentials. A button to Add Source Account 832 may be provided to present an interface for adding a new source account.

When the Add Source Account 832 button is clicked, an Add Source Accounts interface is provided. See FIG. 8C for exemplary embodiments of such an interface. Within this interface, block 842 allows entry of a source institution. Block 844 allows entry of a source account identifier (e.g., a source account number). Block 846 allows entry of a username for the source account, and block 848 allows entry of a password for the source account. In embodiments, an account name may be input to facilitate identification of the account for the user. A comparable interface may be provided for adding a new destination account.

When a particular one of the source accounts is highlighted in FIG. 8B, and the Edit Account button is activated, then an Edit interface is provided. Embodiments of an Edit interface are shown in FIG. 8D. Within the interface, block 852 allows entry of a modification of the source institution identifier (e.g., source institution account). Block 854 allows entry of a change of the source account identifier. Block 856 allows entry of a change of the username for the source account. Block 858 allows entry of a change of the password for the source account. Block 860 permits saving changes, block 862 cancels changes, and block 864 deletes an account.

Figure 8E:
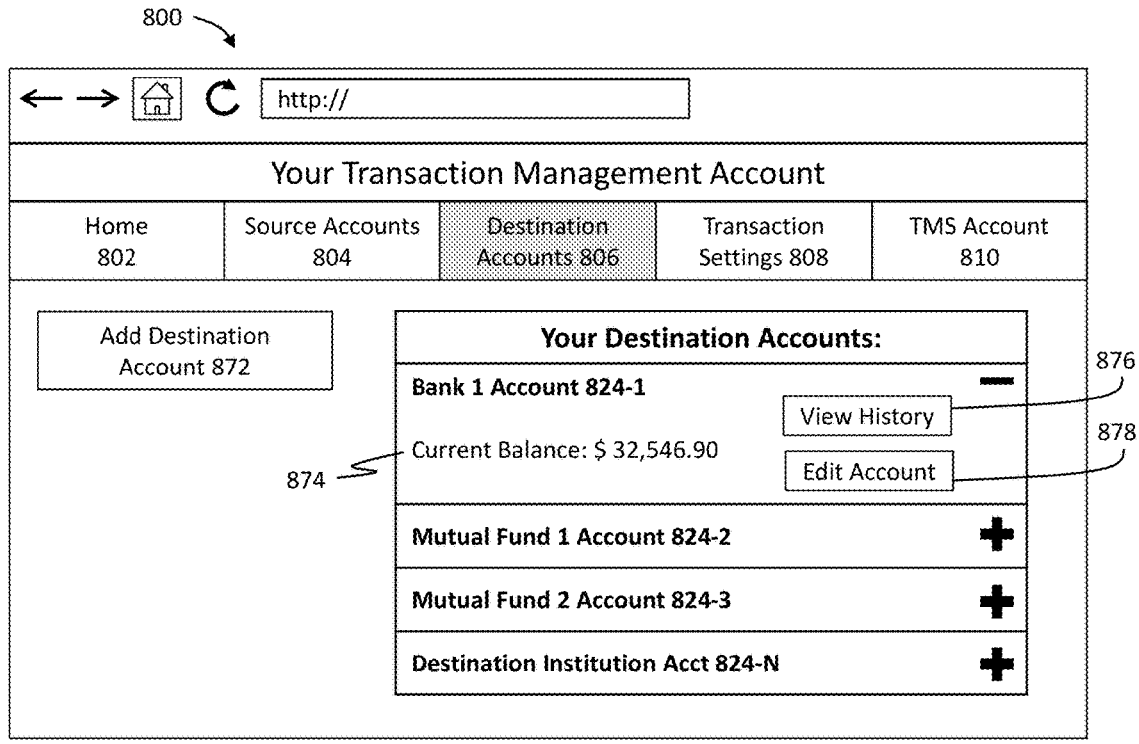
FIG. 8E is a schematic diagram of embodiments of a client interface screen for viewing a listing of the client's destination accounts, with an Add Source Account button, a View Account button, and an Edit Account button in accordance with exemplary embodiments of the present invention.

Referring to FIG. 8E, embodiments of the Destination Accounts 806 interface are illustrated. In the Your Destination Accounts box, individual client destination accounts are listed. In embodiments, when an individual destination account is selected, a button for a View History 876 screen may be provided where the destination account transaction history may be accessed using the account credentials obtained from the electronic storage 316 and parsed and/or reformatted for display at the TMS website. In embodiments, some or all of this account history data may be obtained from electronic storage at the TMS. In embodiments, an Edit Account 878 element (e.g., button) may be provided to allow deletion of accounts and/or to allow changing destination account information, such as account credentials. Changes to account information may be updated in the electronic storage 316. An Add Destination Account 872 button may be provided to open an interface to add a new destination account. An interface comparable to FIG. 8C may be provided for adding a new destination account. An interface comparable to FIG. 8D may be provided for editing the destination account data.

Figure 8F:
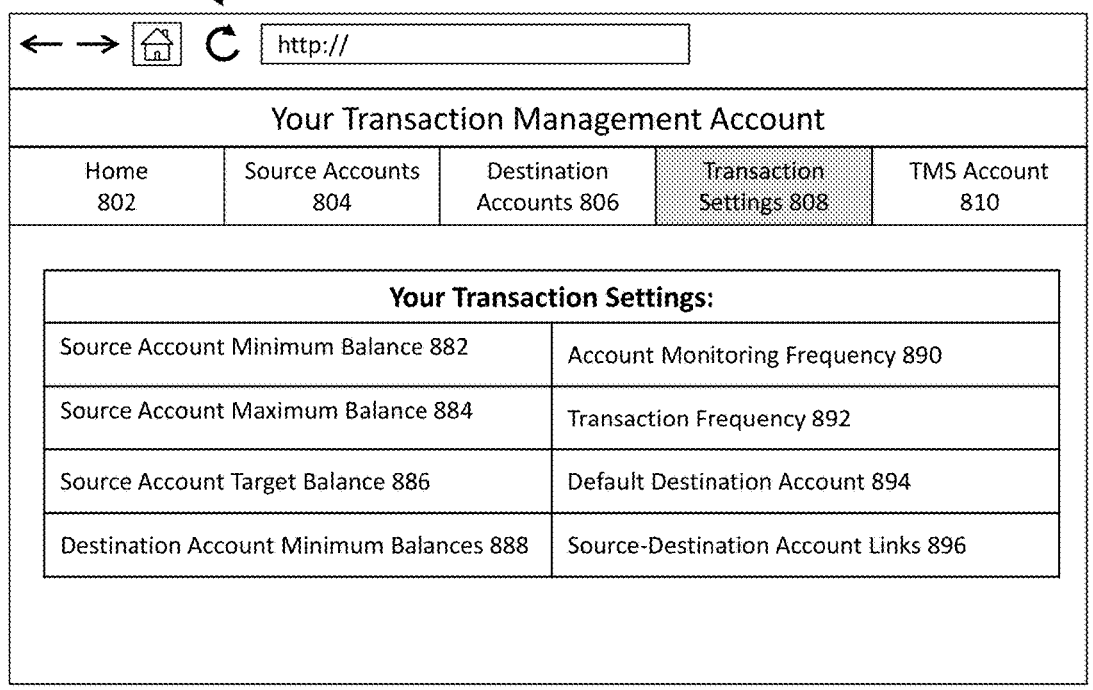
FIG. 8F is a schematic diagram of embodiments of an interface screen for editing transaction settings in accordance with exemplary embodiments of the present invention.

Referring to FIG. 8F, embodiments of a Transactions Settings 808 interface are presented.

These transaction settings are default and/or user-specified settings from which the TMS can generate electronic monitoring rules and/or electronic transaction rules. Listed below are example transaction setting types where a value may be input, an option selected, or a default setting used, to trigger generation of a rule using the setting. In embodiments, a setting may comprise a value (e.g., a threshold value), which may be an absolute value. In other embodiments, the value may be a proportion (e.g., percentage).

A Source Account Minimum Balances 882 setting is a minimum balance to be maintained in a source account. The TMS may create a rule to generate transfer instructions to transfer funds from a destination account to the source account to maintain this balance. This threshold minimum balance may be set for each source account individually, or may be used for all accounts. In embodiments, one or more destination accounts may be set for each of the source accounts, or a default one or more destination accounts may be set from which to transfer funds to maintain the source account minimum balance. In embodiments, the threshold minimum balance may be an absolute value or a percentage, e.g., of the account balance.

A Source Account Maximum Balances 884 setting is a maximum balance to be maintained in a source account. Based at least in part upon this threshold, the TMS may generate a rule to perform a subtraction operation or threshold comparison operation to determine when there is an excess amount in the source account over this source account maximum balance threshold, and/or to determine a corresponding excess amount. The rule may then initiate generation of instructions to transfer funds from the respective source account to a client destination account to remove the excess amount. In embodiments, this threshold may be set for each source account.

A Source Account Target Balance 886 setting is a target balance to be maintained in the source account. In embodiments, setting the target balance value may generate a rule to provide an electronic notice to the client device if the source account balance is less than this threshold. In embodiments, violating this target balance (e.g., via one or more executed or pending transactions) may initiate a transfer of funds to restore the target balance.

A Destination Account Minimum Balances 888 setting is a minimum balance to maintain in a destination account. Based at least in part upon this value, the TMS may generate a rule to prevent transfer from this destination account if the transfer transaction will cause the selected destination account balance to drop below the destination account minimum threshold. In embodiments, the TMS 120 may transfer from multiple destination accounts (e.g., according to a predefined order and/or a default order) to avoid violating the destination account minimum balance rule. Thus, the next destination account in an ordered list may be selected by the TMS, when the minimum balance will be violated for a given destination account. The destination account minimum balance threshold may be set for each destination account.

An Account Monitoring Frequency 890 setting may determine how often the TMS 120 monitors the source and/or destination accounts (e.g., once per day, twice per day, every hour, and/or every 5 minutes, to name a few) and/or specific times at which to monitor accounts (e.g., 9 am and/or 5 pm, market open, market close, to name a few). In embodiments, the setting may comprise an instruction to obtain account information following a transaction. This may be a default electronic instruction for the TMS 120.

A Transaction Frequency 892 setting may determine how often the TMS will initiate transfer transactions (e.g., as necessary, no more than once per day, cap of 5 transactions per month, to name a few).

A Default Destination Account 894 setting may allow the client to select a default destination account and/or a default order of destination accounts (e.g., if the first account is insufficient or a transfer will violate a destination account minimum balance rule, then the TMS may use a second account in the order, etc.). In embodiments, a rule may be set to transfer from two accounts a set percentage or amount.

A Source-Destination Account Links 896 setting provides links between source and destination accounts. For example, three source accounts may be linked to one destination account, while a fourth source account may be linked to a second destination account. Thus, in embodiments, the TMS may perform transactions, as described herein, between a source account and the one or more destination accounts to which it is linked in the TMS.

In embodiments, one or more of the intermediary computers may comprise a client computer. The one or more databases may comprise computer storage on the client computer to hold the client authentication data for the source institution computer system and the client authentication data for the one or more destination institution computer systems. In embodiments, accessing the client authentication data for the source institution computer and/or accessing the client authentication data for the one or more destination institution computers may be triggered/permitted only by authentication of the client by matching a predetermined security program, e.g., an iris scan, a fingerprint scan, and/or a voice sample to data held in the computer storage of the client computer.

In embodiments, a further operation of the TMS 120 may comprise associating, by the one or more intermediary computers, an insurance contract with a user's TMS account to insure against unauthorized transfers from the source account or the one or more destination accounts, when the predetermined security program is used to limit access to the client computer. In embodiments, a comparison operation may be performed of the amount of the net buy order and an insured amount limit, and if the insured amount limit is exceeded, then in embodiments, the transaction may be automatically terminated, or in embodiments an electronic notification may be sent to the client that the amount of the buy order exceed the insurance limit.

In embodiments, the client authentication data for the source institution computer of a source institution and the client authentication data for the one or more destination institution computers of one or more destination institutions may limit authorization only to transfers between client accounts associated with the source institution computers and the destination institution computers and no other transfers (e.g., no transfers to accounts not associated with the client or not registered with the TMS as such). An interface may be provided to insert this transfer limitation into any transfer instructions. In embodiments, it may be a default setting. Accordingly, the process may further comprise generating and/or verifying compliance with electronic transaction authorization rules.

In embodiments, the process may further comprise triggering an association, by the one or more computers, of an insurance contract to insure against unauthorized transfers from the source account or the one or more destination accounts, to a fund transfer when the limited authorization for fund transfers is activated.

In embodiments, the electronic authorization from the client is utilized along with their passwords and appropriate identification to retrieve source account (e.g., brokerage account) information and destination account (e.g., cash management account) information on a timely basis to move funds back-and-forth as needed to cover a trade and/or to maximize yield or maximize interest on a cash management account by directing the movement of funds among accounts across institutions while bypassing/inactivating the automatic fund transfer programs of clearing firm computers, and/or source institution computers and/or destination institution computers (and the attendant processing time and/or expense) at the computer systems of the clearing firms, the source institutions, and the destination institutions.

When a retail client provides their identification information and access information to the service provider associated with the TMS 120, the service provider may access data directly from the computer systems of the brokerage, money, and/or cash management providers. If the computer systems cannot be accessed directly the service provider (e.g., via the TMS 120) can use screen scraping or any other similar technology to access the respective clients account at the brokerage firm and/or at the cash management provider to retrieve appropriate account information. This account information may then be uploaded into a software program that determines an amount of money to be moved, from which account, and into which account, but bypassing/inactivating any the automatic fund transfer programs of clearing firm computers, and/or source institution computers and/or destination institution computers. The result of this automatic fund transfer bypass operation is that the client may be able to achieve a higher interest rate or yield on its cash management investments that are connected to the brokerage account and may eliminate attendant processing.

Figure 9A:
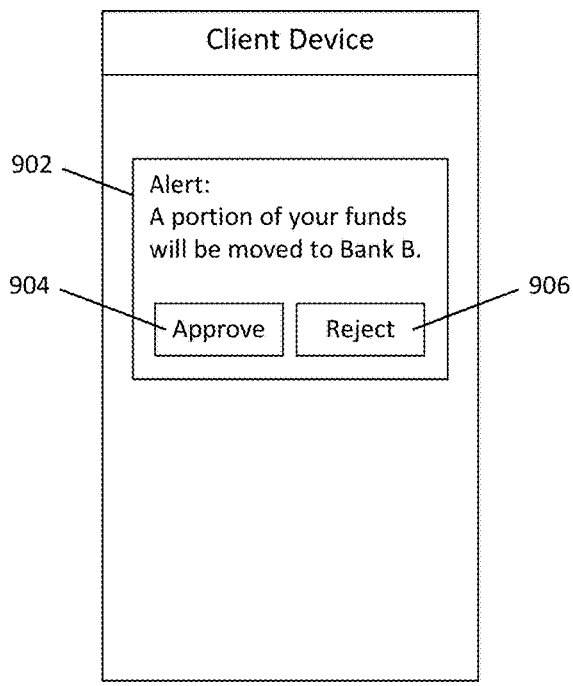
FIGS. 9A-C are screen shots of transaction notifications in accordance with exemplary embodiments of the present invention.
Figure 9B:
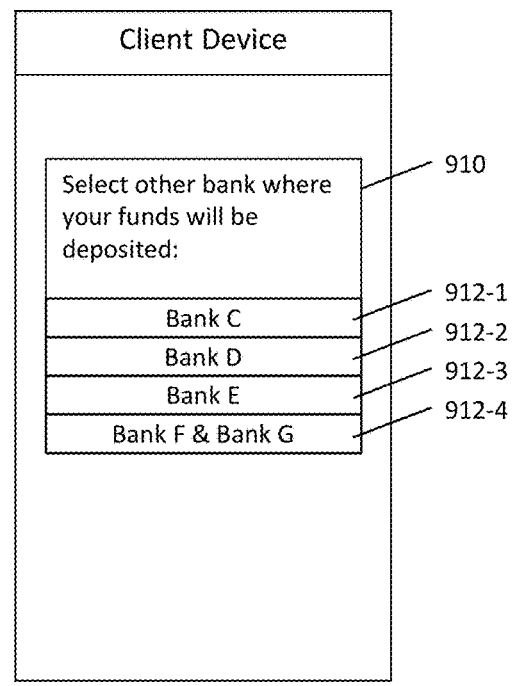
Figure 9C:
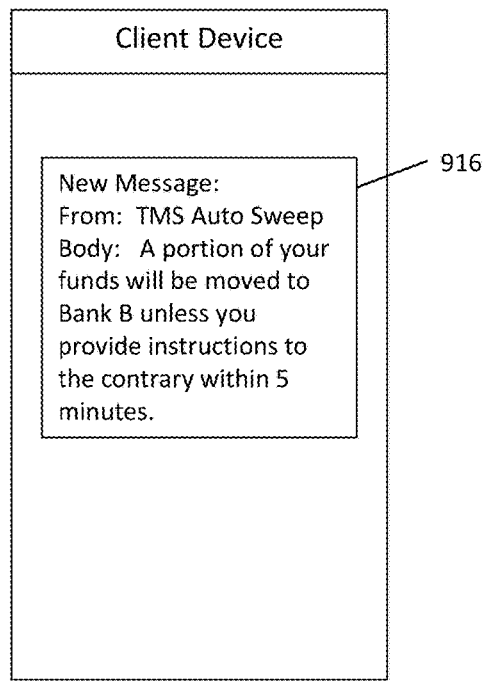

FIGS. 9A-C are exemplary screen shots of transaction notifications in accordance with embodiments of the present invention. The notifications may comprise destination institution management graphical user interfaces. The notifications may indicate to a sweep system customer, such as a deposit sweep system customer, that at least a portion of the customer's funds will be moved to a particular destination institution, such as a depository institution, which may be a depository institution not previously used to hold the customer's funds or not pre-approved by the customer. In embodiments, a customer may not want funds transferred to the particular depository institution for a variety of reasons, such as the existence of additional accounts at that depository institution, which could leave a portion of funds uninsured for being over an insurance limit. Exemplary processes for providing customer control in automated sweep operations, including deposit sweep operations, via at least destination institution management graphical user interfaces are described herein with respect to FIGS. 13A-13C-2.

FIG. 9A illustrates a first exemplary notification, which may be provided to a user electronic device, such as a mobile device. The notification 902 indicates that a portion of a user's funds will be moved to a particular bank, e.g., Bank B, which may be a different depository institution than previously used for funds of the deposit sweep customer (or other cash sweep customer). The exemplary notification 902 includes an approve option 904 and a reject option 906, which may be graphically rendered elements and/or hyperlinks. A user may select the approve option 904 to allow the deposit sweep transaction (or other respective cash sweep transaction) to proceed with a movement of the user's funds to the indicated depository institution. In embodiments, the interface may include a transfer amount input element (e.g., a text entry box, a drop-down menu, to name a few), by which the user can specify an amount of funds to allocate and/or transfer to the different depository institution or by which the user can specify a maximum permissible amount of funds to allocate and/or transfer. The user may instead select the reject option 906 to block the transfer, in which case the deposit sweep computer system (or other respective cash sweep computer system) may compute one or more potential reallocations of funds that would exclude the user's funds from the indicated depository institution. Upon selection of a reject option 906, the system may display an interface with alternate depository institution selection options or input options, as illustrated in FIG. 9B. A notification 902 may be a push notification, which may be displayed on a user electronic device, such as a mobile device. In embodiments, the notification 902 may comprise an email, text message, other electronic message, and/or automated telephone call, to name a few.

FIG. 9B shows an exemplary depository institution selection interface 910 in accordance with the present invention. Upon receipt of a user selection of a reject option a client device may display such a selection interface. The interface 910 may request that a user select or input one or more other depository institutions, e.g., banks, where that user's funds may be deposited during a deposit sweep or other cash sweep operation. According the interface 910 may include one or more input elements or selection elements 912 identifying depository institutions available for deposit of the user's funds. Display data indicating the available depository institutions may be received from a transaction management system, which may determine the institutions that have capacity for the user's funds. In embodiments, a plurality of depository institutions, e.g., Bank F and Bank G, may be required to satisfy deposit sweep transaction parameters for a particular deposit sweep operation, and a combination of depository institutions may be presented to a user for selection, as seen from selection option 912-4. The interface 910 may include transfer amount input elements, which may be maximum permissible transfer amounts, for each respective available and/or alternative depository institution.

FIG. 9C illustrates a second exemplary notification, which may be provided to a user electronic device. The notification 916 may indicate that a portion of a user's funds will be moved to a particular depository institution unless the user takes an action to prevent the transfer. In embodiments, the notification may provide a time limit within which the user must act to prevent the transfer successfully. The notification 916 may comprise instructions on how to prevent the transfer, a selectable option (e.g., a rendered GUI element, such as a button) to prevent the transfer, and/or a selectable hyperlink to prevent the transfer, to name a few. In embodiments, the notification 916 may be an informational notification only, providing an indication that at least a portion of the customer's funds have been allocated to a different depository institution, but not providing a mechanism for the user to object to the allocation.

In embodiments, sweep notifications may be provided to indicate that a sweep transaction occurred. Such sweep notifications may include balance information, such as post-sweep balances at one or more institutions and/or pre-sweep balances.

Figure 10A:
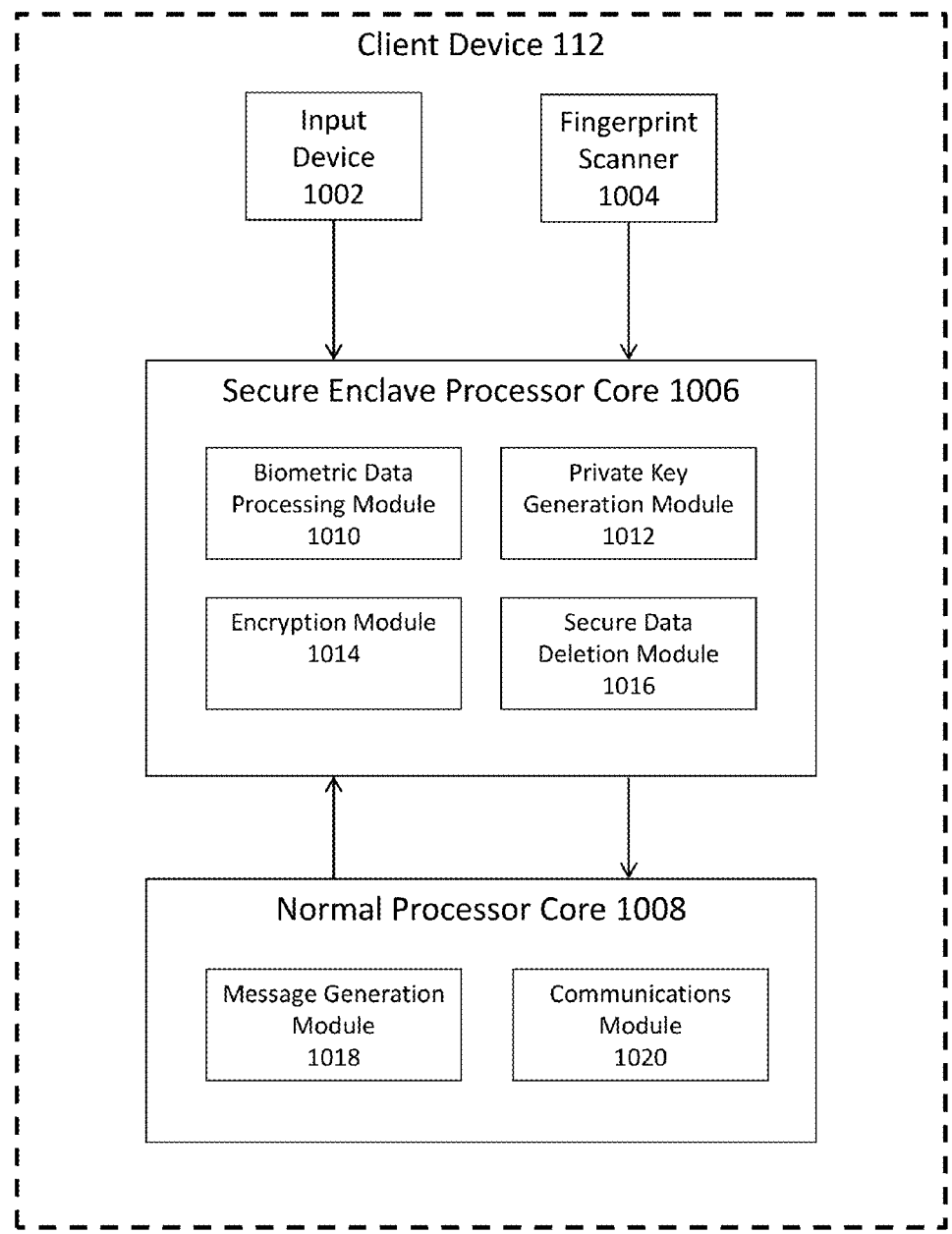
FIGS. 10A-C are schematic diagrams of secure authentication system architectures in accordance with exemplary embodiments of the present invention.
Figure 10B:
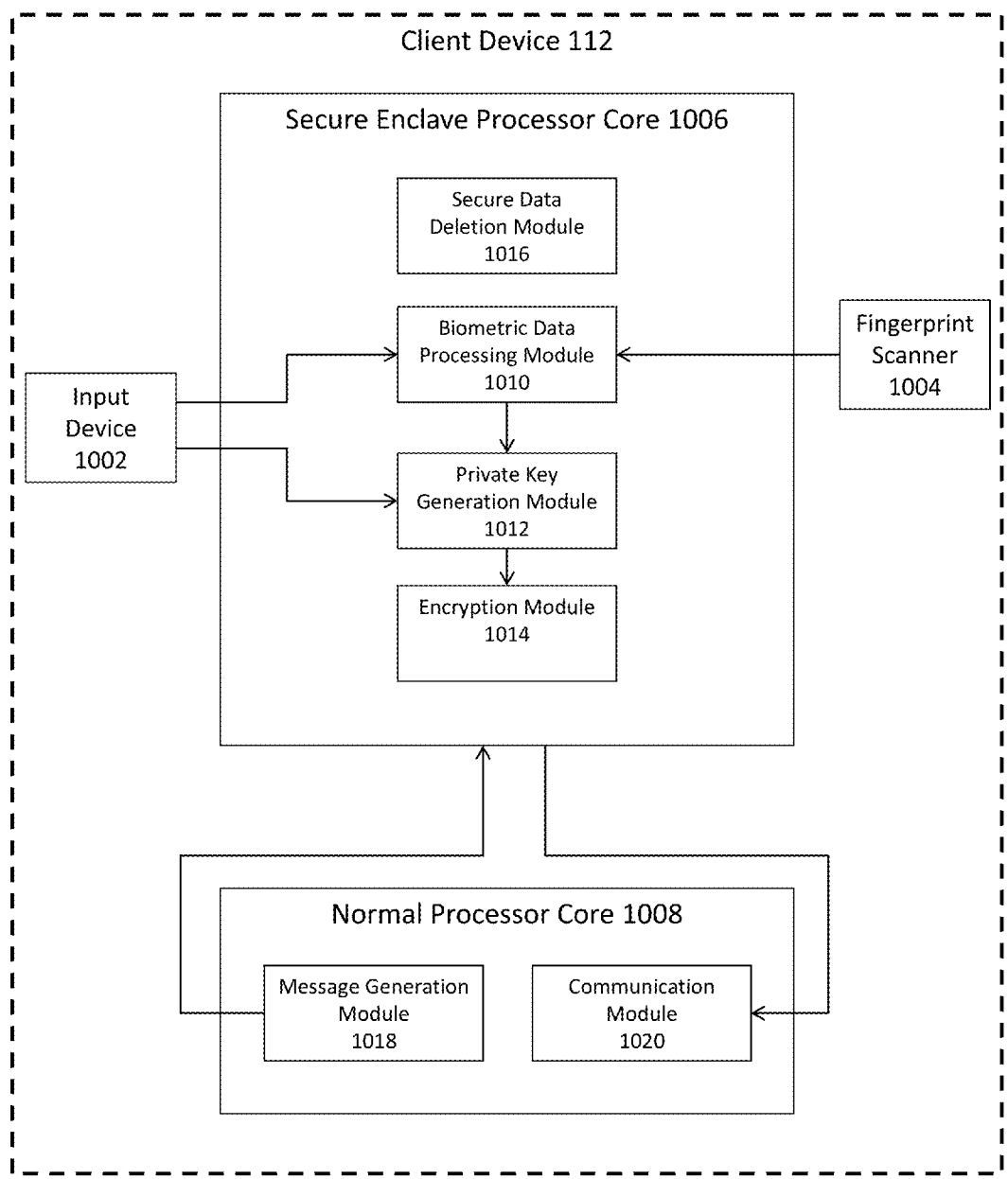
Figure 10C:
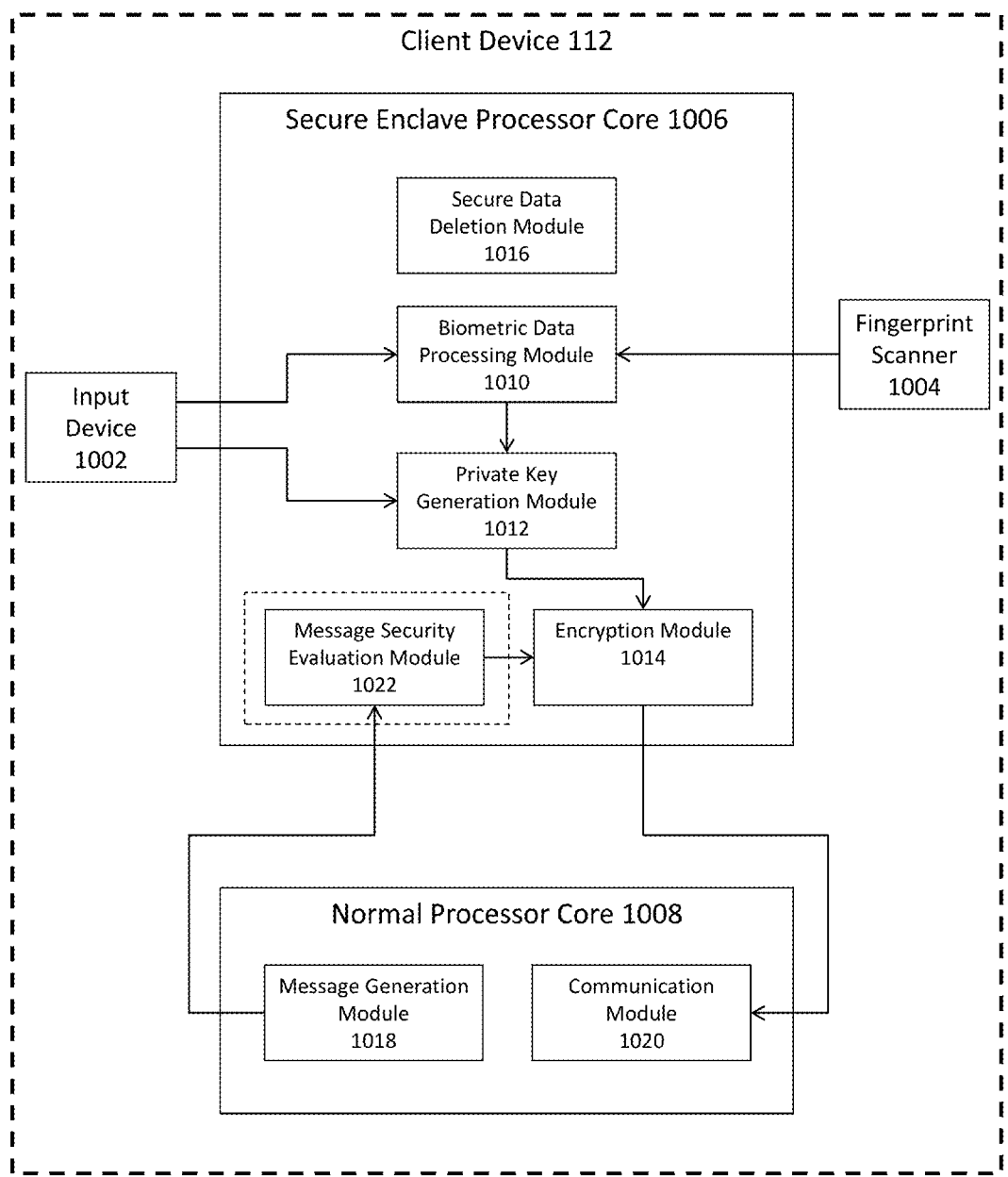

FIGS. 10A-C are schematic diagrams of secure authentication system architectures in accordance with exemplary embodiments of the present invention. A secure authentication system may provide security designed to ensure that one or more user electronic requests associated with cash sweep process, such as deposit sweep processes, originated from a valid authorized user. Such an authorized user may be a sweep customer, an individual (e.g., manager, administrator, employee, and/or agent) associated with a source or destination institution, and/or an individual associated with a cash sweep program, to name a few. Such a secure authentication system may avoid pure biometric comparisons, as biometric signatures cannot be changed if compromised. The secure authentication system may also avoid storing reference user credentials, such as passwords, biometric reference data, or other identifying or secret information. In embodiments, any of the modules described herein may perform one or more functions described with respect to other modules. In embodiments, any of the functions herein may be performed, in whole or in part, by one or more additional modules.

In embodiments, the security systems, methods, and program products described herein may be applied to non-sweep processes to provide secure authorization, e.g., for electronic messages, and/or to provide data security. The present invention is an improvement over the prior art security systems and methods that require either pure biometric signatures or storage of user credentials, such as reference credentials (e.g., user passwords, PINs, biometric data, security questions and/or corresponding answers, to name a few), and as such, the technological improvement can have far-reaching applications to enhance data security, message authentication, and/or data transmission security.

FIG. 10A shows a first embodiment of an exemplary secure authentication system. Secure data may be contained within and processed within a secure enclave processor core 1006, which may be one or more processor cores or portions thereof, e.g., isolated or partitioned from other non-secure system components. The Apple A7 processor with a Secure Enclave is an example of a prior art secure enclave processor. The secure enclave processor core 1006 of the present invention is an improvement over such existing secure processors. The processor core 1006 includes a novel input into the processor for electronic messages targeted for encryption. In embodiments, the secure enclave processor core 1006 may be isolated via hardware separation and/or software separation. It may have limited data pathways (e.g., circuitry, wiring) to and/or from the core. The secure enclave processor core 1006 may receive password input data from an input device 1002. Password input data may comprise alphanumeric sequences or numeric sequences (such as a personal identification number (PIN)), to name a few. The input device 1002 may comprise a keyboard, mouse, keypad, touch screen, microphone, camera, or video camera, to name a few. The secure enclave processor core 1006 may also receive biometric data from a biometric reader or scanner, such as a fingerprint scanner 1004. Biometric data may comprise images (e.g., facial images, fingerprint images, palm images, retinal images, iris images), scans, thermal mappings, and/or voice samples, to name a few. In embodiments, the secure enclave processor core 1006 may receive data from other system components, such as a normal processor core 1008. Such data may comprise message data targeted for encryption by the secure enclave processor core 1006. In embodiments, a single data pathway may connect the normal processor core 1008 to the secure enclave processor core 1006. In other embodiments, there may be a single pathway into the secure enclave processor core 1006 and a separate pathway from it.

The secure enclave processor core 1006 may comprise non-transitory computer-readable memory having stored thereon one or more software modules configured to run on the secure enclave processor core 1006. Such modules can include a biometric data processing module 1010, a private key generation module 1012, an encryption module 1014, and/or a secure data deletion module 1016. In embodiments, the non-transitory computer-readable memory may store, e.g., during processing, sensitive data such as password information, biometric data, and/or private keys.

A biometric data processing module 1010 may apply one or more algorithms, such as wavelet transformations, Fourier-Mellin transformations, other integral transformations, log-polar transformations, filtering (e.g., high pass and/or low pass filtering), encoding (e.g., base-36 encoding), and/or other operations to transform and/or convert received biometric data. The biometric data processing module 1010 may extract second biometric data from the received biometric data, where the second biometric data is designed to be unique to a user but able to be replicated from each of multiple instances of user-specific biometric data. In embodiments, the biometric data processing module 1010 may generate a feature vector from the biometric data, which may be an invariant feature vector. In embodiments, the module may generate a coding of the invariant feature vector, such as a 128-bit code, which may be designed to be an invariant code. In embodiments, additional input information, such as a PIN, may be used in the generation of an invariant feature vector or corresponding code, e.g., to increase the variation in output from one user to the next.

A private key generation module 1012 may generate a private key, e.g., based at least in part upon the biometric data. The private key generation module 1012 may also use a password or PIN number in generating the private key. The private key may be used in a public key or asymmetric key cryptography security system. In embodiments, the private key generation module 1012 may also generate a public key corresponding to the private key. The public key may be generated upon the first generation of the private key, and the public key may be stored on the user electronic device or transmitted to one or more other entities, such as a deposit sweep computer system or other cash sweep computer system. A public key may represent non-secure information that can be used to verify the validity of generated private keys that should correspond thereto. Accordingly, a public key stored on the user electronic device may be used to determine, at the device, a user's authorization to use the device or to engage in one or more secure transactions or operations. In embodiments, a public key stored on the user electronic device may be used to determine whether a correct private key was generated, e.g., prior to using the private key to encrypt an electronic message. A public key stored at a remote computer system may be used to confirm authorization for received electronic requests signed using the private key, e.g., so as to generate a digital signature.

An encryption module 1014 may use the generated private key to encrypt one or more electronic messages and/or to provide an indication of authenticity of one or more electronic messages, such as by providing a digital signature based at least in part upon the private key. In embodiments, the encryption process may comprise hashing an electronic message payload to produce a message digest and encrypting the message digest using the private key, which functions as a private signing key. The encrypted message digest may comprise a digital signature. The encrypted message may be decrypted and/or the digital signature may be verified using a corresponding public key, which functions as a public verification key.

A secure data deletion module 1016 may delete from any memory devices of the client device 112, and more specifically any non-transitory computer-readable memory within the secure enclave processor core 1006, any secure information, such as a user password, biometric data, processed biometric data (e.g., biometric images or versions thereof that were generated using one or more algorithms) and/or private key data. The secure data deletion module 1016 may perform multiple delete and/or overwrite operations to ensure that even partial copies of sensitive data do not remain in memory.

A normal processor core 1008 may run other software modules used by a client device, which can include a message generation module 1018 and a communications module 1020. A client device 112 may comprise one or more normal processor cores 1008.

A message generation module 1018 may generate one or more electronic messages, which can comprise user requests, user instructions, and/or user information. The messages may be unencrypted when generated. Such electronic messages may be configured to be transmitted via a communications network, such as a data network. Accordingly, messages may be transmitted as one or more data packets.

A communications module 1020 may be configured to send and/or receive electronic messages, data, and/or data packets. Such messages can comprise push notifications, alerts, emails, and/or SMS messages, to name a few. The communications module 1020 may transmit one or more electronic messages, which may be unencrypted or encrypted, to one or more user electronic devices or computer systems. The communications module 1020 may use hardware and/or software that comprise a communications portal, as described herein.

FIG. 10B shows a second embodiment of an exemplary secure authentication system. The figure illustrates exemplary data pathways, e.g., among software modules. The data pathways may comprise computer-readable instructions to transmit data from one module or device to another and/or to fetch data from a particular module or device. In embodiments, certain data pathways may comprise hardware components, such as wire, e.g., copper wire, circuitry, printed circuitry, and/or hardware sockets and plugs. Multiple data types may flow along a given hardware pathway. For example a single hardware connection between the normal processor core 1008 and the secure enclave processor core 1006 may allow electronic messages targeted for encryption to be sent from the normal processor core 1008 (e.g., from the message generation module 1018) to the encryption module 1014 and may allow encrypted electronic messages to be sent from the encryption module 1014 to the normal processor core 1008 (e.g., to the communication module 1020). In other embodiments, a plurality of hardware connections, which may be dedicated pathways, may be employed.

As shown in FIG. 10B, user credential information, such as a user password, PIN, and/or username, may be input into the biometric data processing module 1010 from an input device 1002. In embodiments, an intermediate input device processing module may receive data from the input device 1002 and pass it to the biometric data processing module 1010. Biometric data, such as a biometric image or other biometric reading data, may be input into the biometric data processing module 1010 from a biometric reader device, such as fingerprint scanner 1004. The biometric data processing module 1010 may generate an invariant feature vector based at least in part upon the input biometric data and/or the input user credential information.

The feature vector may be passed from the biometric data processing module 1010 to the private key generation module 1012. In embodiments, user credential information may also be passed from the biometric data processing module 1010 to the private key generation module 1012. In other embodiments, the user credential information may be passed to the private key generation module 1012 from the input device 1002 or from an intermediate input device processing module. The private key generation module 1012 may generate an invariant asymmetric private key, which it may pass to the encryption module 1014.

The encryption module may use the private key to encrypt or digitally sign an electronic message received from the message generation module 1018. The encrypted or signed electronic message may then be provided to the communication module 1020 from the encryption module.

FIG. 10C shows another exemplary embodiment of an exemplary secure authentication system. Data may flow within the system similar to the embodiment illustrated by FIG. 10B. However, within the secure enclave processor core 1006 a message security evaluation module 1022 may receive any data passed to the secure enclave processor core 1006 from the one or more normal processor cores 1008. The message security evaluation module 1022 may analyze electronic messages targeted for encryption that are received at the secure enclave processor core 1006, e.g., to ensure that the messages comply with preapproved data formats and/or to perform preliminary authentication of the messages, which may reduce the risk of introducing malicious code, e.g., viruses, into the secure core 1006 and/or may reduce the risk of encrypting and transmitting unauthorized electronic messages not provided by an authorized user. In embodiments, the message security evaluation module 1022 may require input of user credentials, such as a password, to authenticate a message prior to encrypting and transmitting to other devices or computer systems. The message security evaluation module 1022 may be isolated from the remainder of the contents of the secure enclave processor core 1006, except for a data pathway to transmit verified messages targeted for encryption to the encryption module 1014. Once a message is authenticated it may be passed to the encryption module 1014 for encryption and/or digital signature.

Figure 11A:
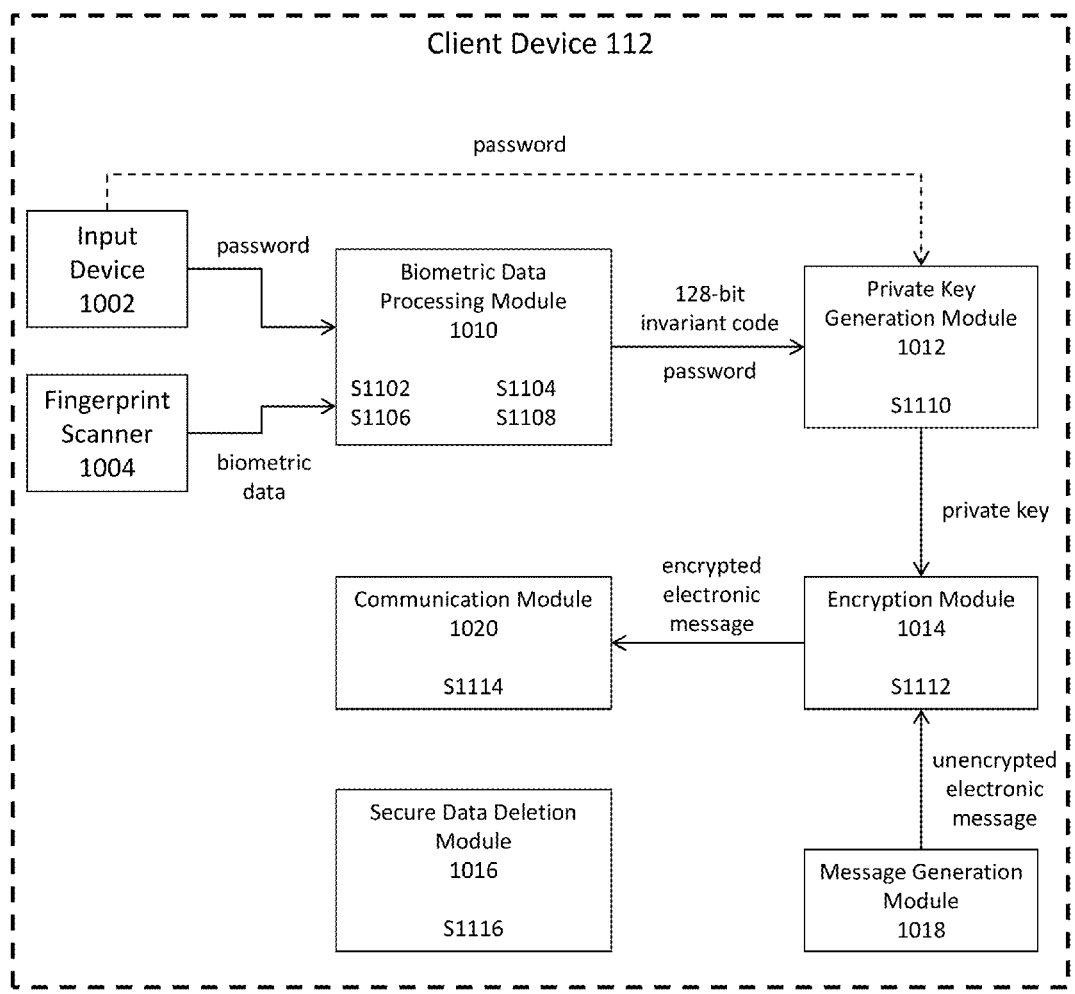
FIG. 11A is a schematic diagram of data flow among components of a client device and steps performed by each component in a secure data authentication process associated with deposit sweep transfer operations in accordance with exemplary embodiments of the present invention.

FIG. 11A illustrates data flow among components of a client device 112 and steps performed by each component in a secure data authentication process associated with deposit sweep or other cash sweep transfer operations. The steps performed are described herein with respect to FIGS. 11B-D. A biometric data processing module 1010 may receive a user password from an input device 1002 and may receive biometric data from a biometric reader device, such as a fingerprint scanner 1004. The biometric data processing module 1010 may generate an invariant code based at least in part upon the biometric data and the user password, e.g., by performing steps S1102, S1104, S1106, and S1108. Such processes may comprise biohashing. Biohashing is described in Andrew Teoh Beng Jin et al., *Biohashing: two factor authentication featuring fingerprint data and tokenised random number*, Pattern Recognition 37 (2004) 2245-2255 and in Loris Nanni & Alessandra Lumini, *Empirical tests on BioHashing*, Neurocomputing 69 (2006) 2390-2395, the contents of each of which are incorporated by reference as if fully set forth herein.

The biometric data processing module 1010 may pass the invariant code to a private key generation module 1012. The biometric data processing module 1010 may also pass the user password to the module 1012, although in embodiments the private key generation module 1012 may obtain the password from the input device 1002. The private key generation module 1012 may perform step S1110 to generate an asymmetric private key. The private key generation module 1012 may pass the private key to an encryption module 1014. The encryption module 1014 may obtain a message targeted for encryption or digital signature, e.g., from a message generation module 1018. In embodiments, the electronic message targeted for encryption or digital signature may be initially unencrypted. In other embodiments, it may already be encrypted using encryption techniques that do not involve the private key. The encryption module 1014 may encrypt or digitally sign the electronic message by performing step S1112. The encryption module 1014 may pass the encrypted or digitally signed electronic message to a communications module 1020, which may transmit the encrypted or digitally signed electronic message to other devices and/or computer systems in a step S1114. A secure data deletion module 1016 may execute step S1116 to remove sensitive data, such as the user password, input biometric data, processed biometric data, private key, and/or encrypted or signed electronic message from the memory devices of the client device 112.

This secure data authentication system and processes eliminate the need to store secure data at all, whether locally on the client device or remotely, such as on computer servers. Encryption or digital signature is provided using a private asymmetric key, which is regenerated either each instance it is needed or for each user session. User sessions may time out after a particular period of time, and/or the secure data deletion module 1016 may be configured to delete any sensitive data after a predefined period of time.

Unlike security systems in the prior art, the system and processes of the present invention do not store reference user credentials or reference biometric data to be matched against user credentials or biometric data that is input for authentication of a user or a user electronic request. Instead, encrypted or digitally signed electronic messages may be verified using a public key corresponding to the private key that functioned as the signing key. The public key is not sensitive data or is less sensitive than user credential information and user biometric data. Accordingly, the public key may be stored locally on the client device and/or on remote servers, e.g., in non-transitory computer-readable memory operatively connected thereto, which remote servers may comprise a cash sweep computer system, which may be a deposit sweep computer system. Any illicit or accidental access to the public key cannot result in an unauthorized transfer. Meanwhile, the private key only exists within the secure enclave processor core 1006 and only for a limited period of time, e.g., during the pendency of the encryption operations or a user session. The private key cannot be extracted from the secure enclave processor core 1006 due to limited hardware data pathways and/or software barriers to extraction. These aspects of the security system of the present invention provide key advantages over prior art security systems.

The secure data authentication system and processes of the present invention further improve on prior art public key cryptography systems that seek to introduce entropy into private key generation to decrease the probability of regeneration of the private key. Prior art private keys must be stored, e.g., in a security token device, in a computer file, memorized, and/or written down, to name a few. Stored private keys are susceptible to loss, theft, and/or accidental disclosure. The present invention provides technical mechanisms for regenerating a private key based at least in part upon biometric data, which eliminates the need to store the private key. An invariant, replicable, unique representation of a user's biometric data is generated from the input biometric data. That invariant representation is then used to generate a private key. The invariant feature extraction processes and/or the private key generation process may be further based at least in part upon user password information, such as a numeric passcode or PIN. Accordingly, a user may regenerate a private key as needed to authenticate an electronic request or to provide other authentication.

Figure 11B:
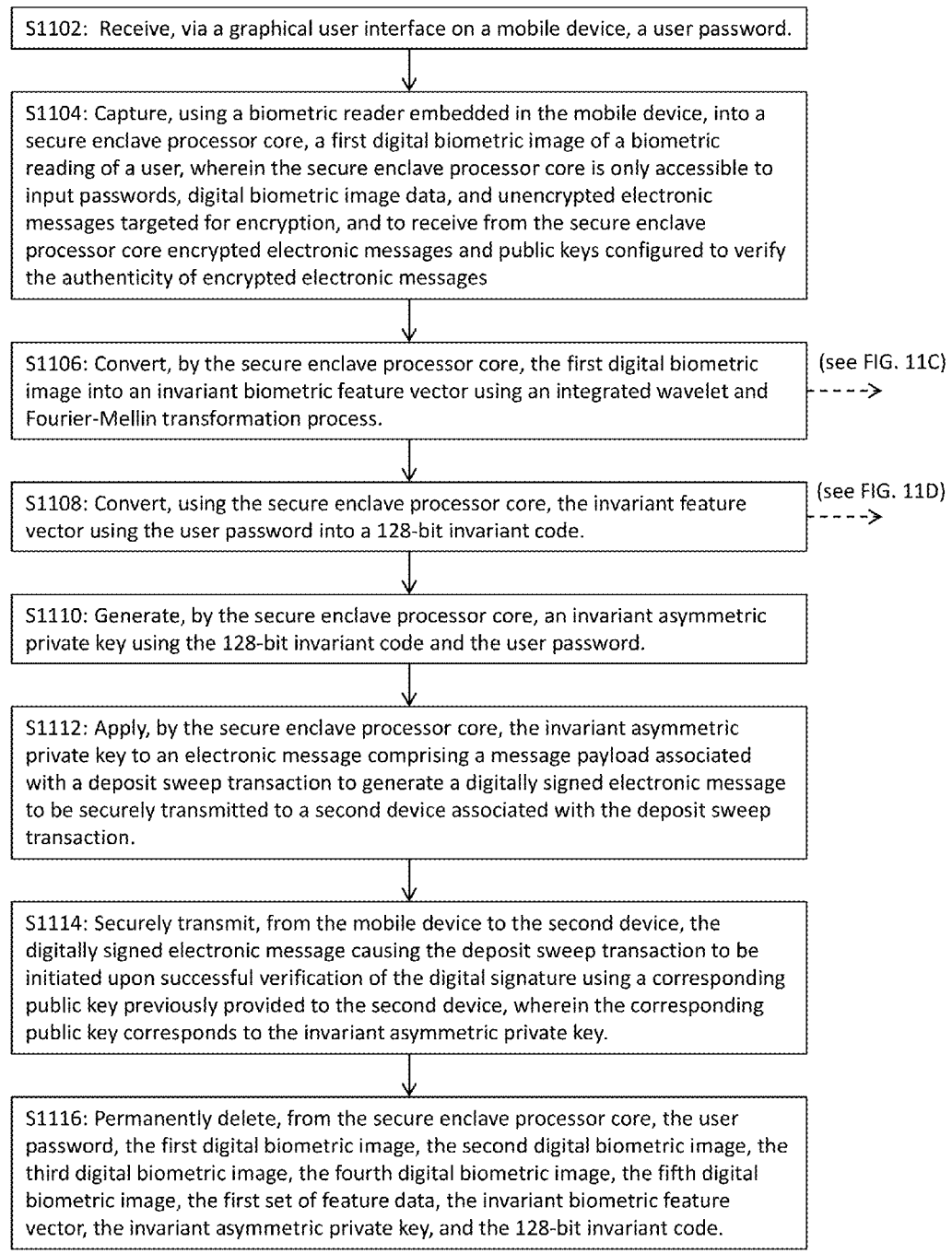
FIGS. 11B-D are flow charts of exemplary processes for performing deposit sweep operations securely in accordance with exemplary embodiments of the present invention.
Figure 11C:
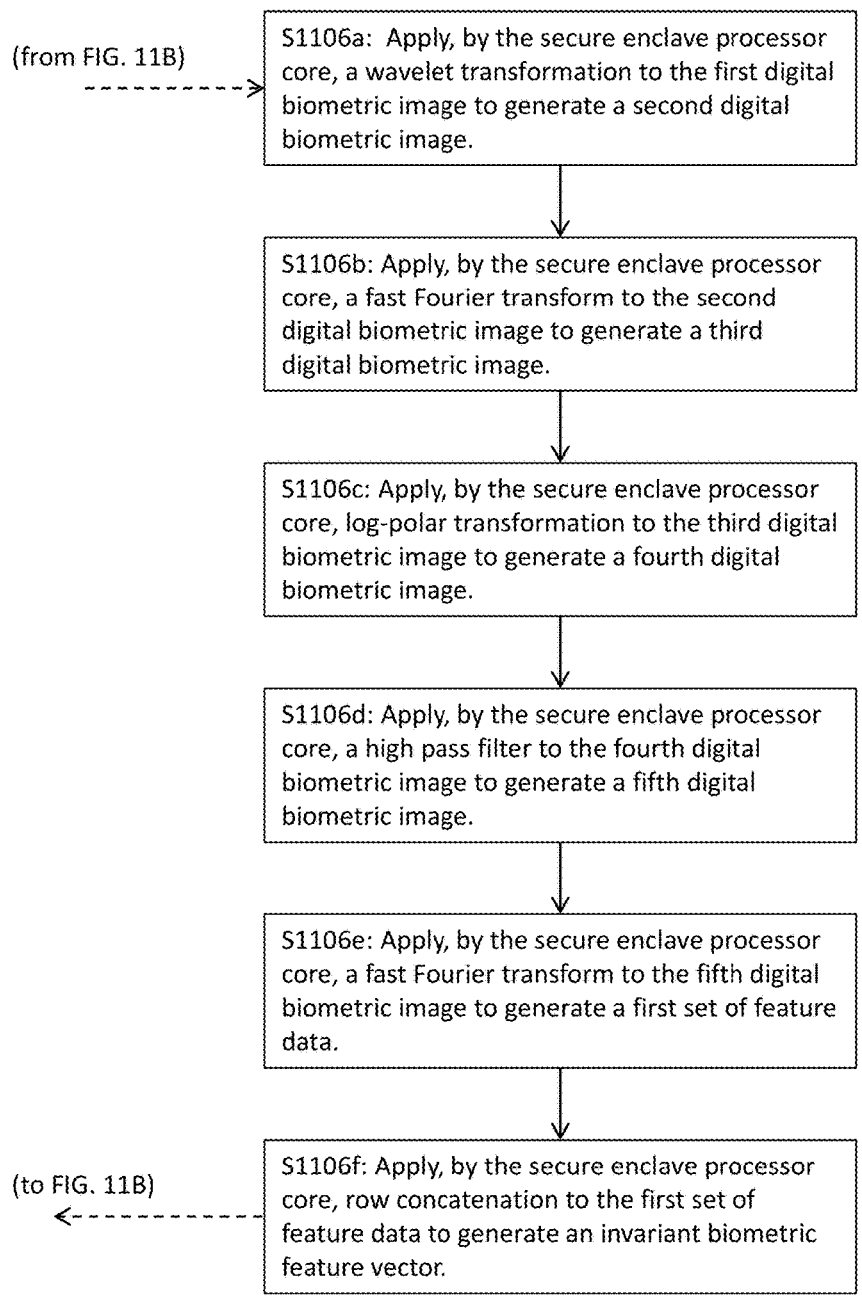
Figure 11D:
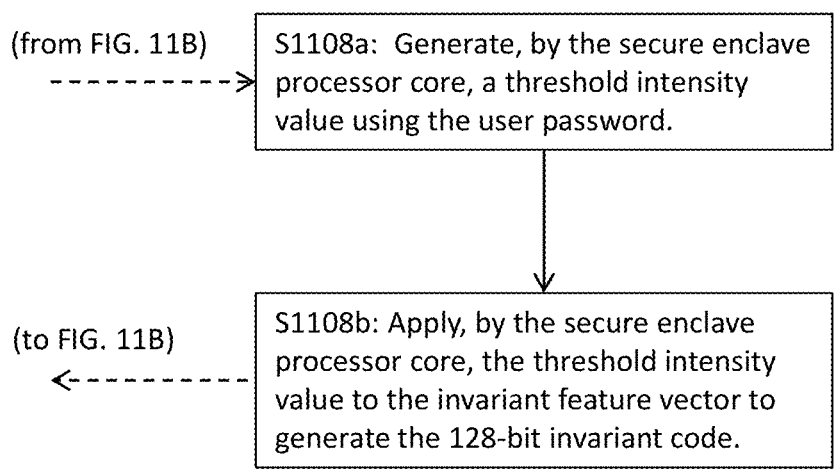

FIGS. 11B-D are flow charts of exemplary processes for performing cash sweep operations, such as deposit sweep operations, securely. In embodiments, a security protocol module at the client device may be activated to perform encryption and/or digital signature processes, as described herein. The security protocol module may be activated upon a user electronic request to transmit sweep transaction data, instructions, or requests, which require authentication or encryption, or upon receipt of other user requests at the client device, such as requests to access account information associated with a customer account at a cash sweep management system (e.g., a deposit sweep management system), at a source institution, and/or at a destination institution, to name a few. In embodiments, the security protocol module may be activated upon input of user biometric information and/or access of or activation of a biometric reader device by the user.

Referring to FIG. 11B, in a step S1102, a mobile device may receive a user password via a graphical user interface rendered on the mobile device. The mobile device may be a client device, as described herein, such as a cell phone, smart phone, personal digital assistant, or tablet computer, to name a few. The graphical user interface may be a login interface or other interface with rendered user credential input elements. The user password may be input using a user input device, such as a keyboard, keypad, touch screen, touchpad, pointer device, mouse, or microphone, to name a few. The user password may be a series of digits, such as a numeric passcode or personal identification number, which defines a number. In embodiments, the user password may be an alphanumeric sequence. An alphanumeric sequence may be encoded to convert it to a numeric sequence. In embodiments, an alphanumeric user password may be converted to binary data using base-36 encoding.

In a step S1104, the mobile device may capture into a secure enclave processor core of the mobile device using a biometric reader embedded in the mobile device, a first digital biometric image of a biometric reading of a user. The biometric reader may be a scanner such as a fingerprint scanner, hand or palm scanner, retinal scanner, iris scanner, blood sampler, or voice scanner to name a few. In embodiments, the biometric reader may be a capacitive scanner (e.g., a capacitive fingerprint scanner) that can use electrical current to determine ridges and valleys, e.g., based at least in part upon detected voltage outputs. In embodiments, the biometric reader may be an optical scanner that can use light (e.g., emitted from a diode) and measure the intensity of reflection, e.g., to determine distances to surface points and/or elevations thereof. The secure enclave processor core may only be accessible to input passwords, digital biometric image data, and electronic messages targeted for encryption or digital signature, and further accessible to receive outputs of encrypted or digitally signed electronic messages and public keys configured to verify the authenticity of encrypted electronic messages.

In a step S1106, the secure enclave processor core may convert the first digital biometric image into an invariant biometric feature vector using an integrated wavelet and Fourier-Mellin transformation process. An exemplary particular process by which the invariant biometric feature vector may be generated is illustrated in FIG. 11C, described herein.

In embodiments, e.g., prior to converting the first digital biometric image in the invariant biometric feature vector, the secure enclave processor core may convert the first digital biometric image into a distorted first digital biometric image, which may comprise a sixth digital biometric image. To do so the secure enclave processor core may apply a distortion to the first digital biometric image, such as by applying a distortion algorithm, which may produce a radial distortion, such as a barrel distortion (e.g., fisheye distortion), pincushion distortion, or mustache distortion. The distortion may be based at least in part upon the user password. For example, the user password may be used to select a particular distortion algorithm (e.g., from a predefined set of distortion algorithms) or parameters therefor. Accordingly, a numeric value may be derived from the user password (e.g., via encoding and/or by treating a numeric passcode as a number) and used, e.g., in conjunction with logical programming rules, to select an algorithm and/or set algorithm parameters. In embodiments, the user password may provide an input to a distortion algorithm to indicate a center of distortion, e.g., by selecting a location, such as a pixel location, associated with the center of distortion, which location may be based at least in part upon the numeric value derived from the user password. The sixth digital biometric image produced using the distortion algorithm may be converted into an invariant biometric feature vector in place of the first digital biometric image, using the process described in FIG. 11C.

In a step S1108, the secure enclave processor core may convert the invariant feature vector using the user password into a 128-bit invariant code. In embodiments, the invariant code may be a binary series. Although the process is described with respect to a 128-bit code, in embodiments, other bit counts may be used, e.g., 64 bits, 256 bits, 512 bits, 1024 bits, 2048 bits, 4096 bits, to name a few. The invariant code may provide a seed for generation of a private key. An exemplary process for generating the invariant code from the invariant biometric feature vector is illustrated in FIG. 11D, described herein.

In a step S1110, the secure enclave processor core may generate an invariant asymmetric private key using the 128-bit invariant code. In embodiments, the secure enclave processor core may also use the user password to generate the private key. In embodiments, a key generation algorithm, such as an RSA algorithm or a Digital Signature Algorithm (DSA) (e.g., as described by the FIPS 186-3 standard or the FIPS 186-4 standard), may be used to generate the private key. In embodiments, the invariant code may comprise a seed input into a cryptographically secure pseudo-random number generator, the output of which may be processed by an RSA or other key generation algorithm. In embodiments, the user password may be used to modify the invariant code, such as by using the user password to cipher the invariant code, e.g., to offset the invariant code or the digits thereof, as a multiplier of the invariant code or the digits thereof, and/or to prepend, insert, or append the user password to the invariant code (e.g., optionally first converting the password to binary). The modification of the invariant code may be made prior to input of the modified invariant code into a key generation algorithm.

In a step S1112, the secure enclave processor core may apply the invariant asymmetric private key to an electronic message associated with a cash sweep transaction, which may be a deposit sweep transaction, to generate a digitally signed electronic message comprising a message payload and digital signature to be securely transmitted to a second device associated with the sweep transaction. In embodiments, the second device may be any of a sweep computer system (e.g., a deposit sweep computer system), a source institution computer system, a depository institution computer system, or another destination institution computer system (e.g., an ETF computer system or money fund computer system, to name a few). In embodiments, the message payload may comprise a request to perform a particular sweep operation, user information such as account credentials associated with sweep operations, and/or authorization to perform a particular sweep operation, which may be a cash sweep operation, such as a deposit sweep operation or a sweep involving non-depository accounts, such as ETFs, money funds, stable value funds, or capital investment plans, to name a few. The digital signature may be generated using the invariant asymmetric private key with a public key cryptography algorithm. For example, the secure enclave processor core may hash the message payload to produce a message digest and then may encrypt the message digest using the invariant asymmetric private key.

Applying the invariant asymmetric private key to an electronic message can comprise receiving, at the secure enclave processor core from a normal processor core, the electronic message. The secure enclave processor core may then evaluate the electronic message, e.g., to verify the message data format, which may be a protection against introducing malicious code into the secure enclave processor core. The secure enclave processor core may then generate a message digest by computing a hash of the message payload and then may encrypt the message digest using the invariant asymmetric private key.

In a step S1114, the mobile device may securely transmit to the second device the digitally signed electronic message causing the sweep transaction to be initiated upon successful verification of the digital signature using a corresponding public key previously provided to the second device, wherein the corresponding public key corresponds to the invariant asymmetric private key. In embodiments, the public key may be generated upon the first generation of a private key and then provide to other devices, such as the second device. In embodiments, a copy of the public key may be maintained at the mobile device, e.g., stored in non-transitory computer-readable memory. The mobile device may use such a stored public key to verify subsequent instances of generation of the private key to ensure the private key was generated accurately prior to signing electronic messages with it.

In a step S1116, the secure enclave processor core may permanently delete the user password, the first digital biometric image, the second digital biometric image, the third digital biometric image, the fourth digital biometric image, the fifth digital biometric image, the first set of feature data, the invariant biometric feature vector, the invariant asymmetric private key, and the 128-bit invariant code.

FIG. 11C shows an exemplary process for converting a digital biometric image into an invariant biometric feature vector. The digital biometric images that are generated and processed in this process may comprise biometric data and/or image data, such as pixels, pixel position data, pixel values (e.g., brightness or light intensity values), and/or color values, to name a few.

In a step S1106a, the secure enclave processor core may apply a wavelet transformation to the first digital biometric image to generate a second digital biometric image. In embodiments, a discrete wavelet transformation may be applied.

In a step S1106b, the secure enclave processor core may apply a fast Fourier transform to the second digital biometric image to generate a third digital biometric image. The third digital biometric image may thus be a representation of the second digital biometric image in the frequency domain.

In a step S1106c, the secure enclave processor core may apply a log-polar transformation to the third digital biometric image to generate a fourth digital biometric image. A representation of the third biometric image using log-polar coordinates may be used to adjust for rotational variations in the input biometric data, e.g., if a fingerprint was scanned at a rotated angle, and/or to adjust for differences in scale, e.g., if the scanned sample was closer or farther from the biometric reader, such as if a finger was pressed firmly against the reader instead of being held a short distance away.

In a step S1106d, the secure enclave processor core may apply a high pass filter to the fourth digital biometric image to generate a fifth digital biometric image. The high pass filter may reduce noise in the image data. The filter may eliminate image data with values below a predefined threshold value.

In a step S1106e, the secure enclave processor core may apply a fast Fourier transform to the fifth digital biometric image to generate a first set of feature data. In embodiments, the feature data may comprise a series of values.

In a step S1106f, the secure enclave processor core may apply row concatenation to the first set of feature data to generate an invariant biometric feature vector.

FIG. 11D shows an exemplary process for converting the invariant feature vector into a 128-bit invariant code.

In a step S1108a, the secure enclave processor core may generate, using the user password, a threshold intensity value. In embodiments, the threshold intensity value may be scaled or normalized within a predefined intensity range. For example, a four-digit passcode may have 5,040 permutations in the range 0000 to 9999. A user password that is a four-digit passcode may be scaled from that range to a scaled range, such as 0 to 255, which range may correspond to possible image intensity values. In embodiments, the user password may be normalized within the range of values of the invariant feature vector elements or within the range of permissible values of the invariant feature vector elements. The normalized user password may then be used as a threshold intensity value.

Accordingly, generating the threshold intensity value may comprise obtaining a numeric value from the user password (e.g., by treating an input numeric sequence as a number or by encoding an alphanumeric sequence) and then normalizing that numeric value within a predefined intensity range of possible intensity values by scaling the numeric value based at least in part upon a relation between a range of possible numeric values and the predefined intensity range.

In a step S1108b, the secure enclave processor core may apply the threshold intensity value to the invariant feature vector to generate an invariant code, such as a 128-bit invariant code. If an element of the invariant feature vector is less than the threshold intensity value, the corresponding element in the invariant code may be assigned a value of zero. If the element of the invariant feature vector equals or exceeds the threshold intensity value, the corresponding element in the invariant code may be assigned a value of one. In embodiments, the zeros may be assigned to elements greater than the threshold intensity value, while the ones may be assigned to elements less than or equal to the threshold intensity value. The resulting invariant code may be a series or vector of ones and/or zeros.

In embodiments, applying the threshold intensity value to the invariant feature vector to generate the 128-bit invariant code can comprise generating, using the threshold intensity value, a sequence of real numbers comprising a set of pseudo-random vectors. The secure enclave processor core may then apply a Gram-Schmidt ortho-normalization to the set of pseudo-random vectors to transform them into an orthonormal set of vectors. In embodiments, the secure enclave processor core may normalize the invariant biometric feature vector, e.g., between the values negative one and positive one. The secure enclave processor core may compute an inner product between the invariant biometric feature vector and the orthonormal set of vectors. For each inner product value less than the threshold intensity value the secure enclave processor core may assign a value of zero to a corresponding element position in a binary vector, and for each inner product value greater than the threshold intensity value the secure enclave processor core may assign a value of one. Accordingly, the secure enclave processor core may map each assigned value to a bit location based at least in part upon the element location within the biometric feature vector. In embodiments, element locations with the biometric feature vector may have been determined using a log polar transformation. In embodiments, the secure enclave processor core may aggregate the values in their respective locations to produce a bit string. As such, the secure enclave processor core constructs an ordered sequence of zeros and/or ones based at least in part upon a comparison of the biometric feature vector element values to the threshold intensity value and a mapping of the element location to a location in the ordered sequence, which is the bit string.

In embodiments, a particular type of feature vector known as FingerCode may be generated as an alternative to step S1106. FingerCode generation is described in Dario Maio & Loris Nanni, *An efficient fingerprint verification system using integrated gabor filters and Parzen Window Classifier*, Neurocomputing 68 (2005) 208-216 and in A. K. Jain et al., *Filterbank-based fingerprint matching*, IEEE Trans. Image Process. 5 (9) (2000) 846-859, which are incorporated by reference as if fully set forth herein. Accordingly, a biometric image is input to a FingerCode feature extraction process. The biometric digital image may be preprocessed, e.g., filtered, to reduce noise and/or increase contrast. Then, in the feature extraction process a reference point or core point is determined, which may be the point of maximum curvature of concave ridges. To determine the reference point, the secure enclave processor core may, at least, divide the biometric image into a grid having any number of rows and columns. Then, it may compute a gradient at each pixel of the image. In embodiments, it may compute gradients in two perpendicular directions corresponding to the directions of the rows and columns. Then a local orientation may be computed at the center of each cell or sector of the grid to generate an orientation field. The orientation field may be smoothed, such as by low pass filtering, which may comprise converting the orientation field into a continuous vector field, which may be further processed to determine curvature.

Once a core point is determined, the digital biometric image may be divided into sectors. FIGS. 12A-D illustrate exemplary selection of a core point 1208 on a digital biometric image 1202 for biometric feature extraction in accordance with exemplary embodiments of the present invention, as well as division of the digital biometric image into sectors 1206. FIGS. 12A-B illustrate sectors that are bands 1206a created using a polar coordinate system, while FIGS. 12C-D illustrate Cartesian sectors 1206c. The digital biometric image may be divided into different numbers of sectors 1206, such as 64, 128, 256, or 512 sectors, to name a few. Each sector may correspond to a vector element. In embodiments, a plurality of grids 1204 may be used and combined to generate a vector for more parameters (e.g., two 64-sector grids may be combined to generate a 128-element vector).

In embodiments, the core point may be shifted based at least in part upon the user password. For example, a numeric passcode may define a translation in the respective coordinate system. Accordingly, a passcode numeric value may be scaled to the image boundaries. In embodiments, a first portion of a passcode (e.g., the first three digits) may define a first translation parameter, such as a distance along a horizontal axis in the Cartesian system or a distance in the polar system, while a second portion of the passcode (e.g., the second three digits) may define a second translation parameter, such as a distance along a vertical axis in the Cartesian system or an angle in the polar system, or vice versa, to name a few. The superimposed coordinate systems may comprise any number of sectors. In embodiments, each sector may be assigned to a position within a vector or array.

A value computed within a respective sector may be assigned to the respective position within the vector. In embodiments, values may be normalized between 0 and 9 and/or may be binary values. Pixel values within each sector may be normalized. In embodiments, one or more filters may be applied to each sector. In embodiments, filters such as Gabor filters may be applied in a plurality of directions, such as two, four, or eight directions, to name a few. Then, an average absolute deviation from the mean grey values in each sector may be computed. The resulting value may be assigned to a vector element position.

In embodiments, a system for generating a secure biometric-based cryptographic key without storing biometric information in order to authenticate data in a cash sweep (e.g., deposit sweep) transfer system can comprise one or more processors (e.g., of a mobile device) and non-transitory computer-readable memory having stored thereon instructions to perform the steps of receiving, via a first graphical user interface on a mobile device, a user password; capturing, using a biometric reader embedded in the mobile device, into a secure enclave processor core, a first digital biometric image of a biometric reading of a user, wherein the secure enclave processor core is only accessible to input passwords, digital biometric image data, and electronic messages targeted for encryption, and to receive from the secure enclave processor core encrypted electronic messages and public keys configured to verify the authenticity of encrypted electronic messages; converting, by the secure enclave processor core, the first digital biometric image into an invariant biometric feature vector using an integrated wavelet and Fourier-Mellin transformation process; converting, by the secure enclave processor core, the invariant feature vector using the user password into a 128-bit invariant code; generating, by the secure enclave processor core, an invariant asymmetric private key using the 128-bit invariant code and the user password; applying, by the secure enclave processor core, the invariant asymmetric private key to an electronic message comprising a message payload associated with a cash sweep transaction such as a cash sweep transaction to generate a digitally signed electronic message to be securely transmitted to a second device associated with the sweep (e.g., deposit sweep) transaction; securely transmitting, from the mobile device to the second device, the digitally signed electronic message causing the sweep transaction to be initiated upon successful verification of the digital signature using a corresponding public key previously provided to the second device, wherein the corresponding public key corresponds to the invariant asymmetric private key; and permanently deleting, from the secure enclave processor core, the user password, the first digital biometric image, the second digital biometric image, the third digital biometric image, the fourth digital biometric image, the fifth digital biometric image, the first set of feature data, the invariant biometric feature vector, the invariant asymmetric private key, and the 128-bit invariant code.

Figure 13A:
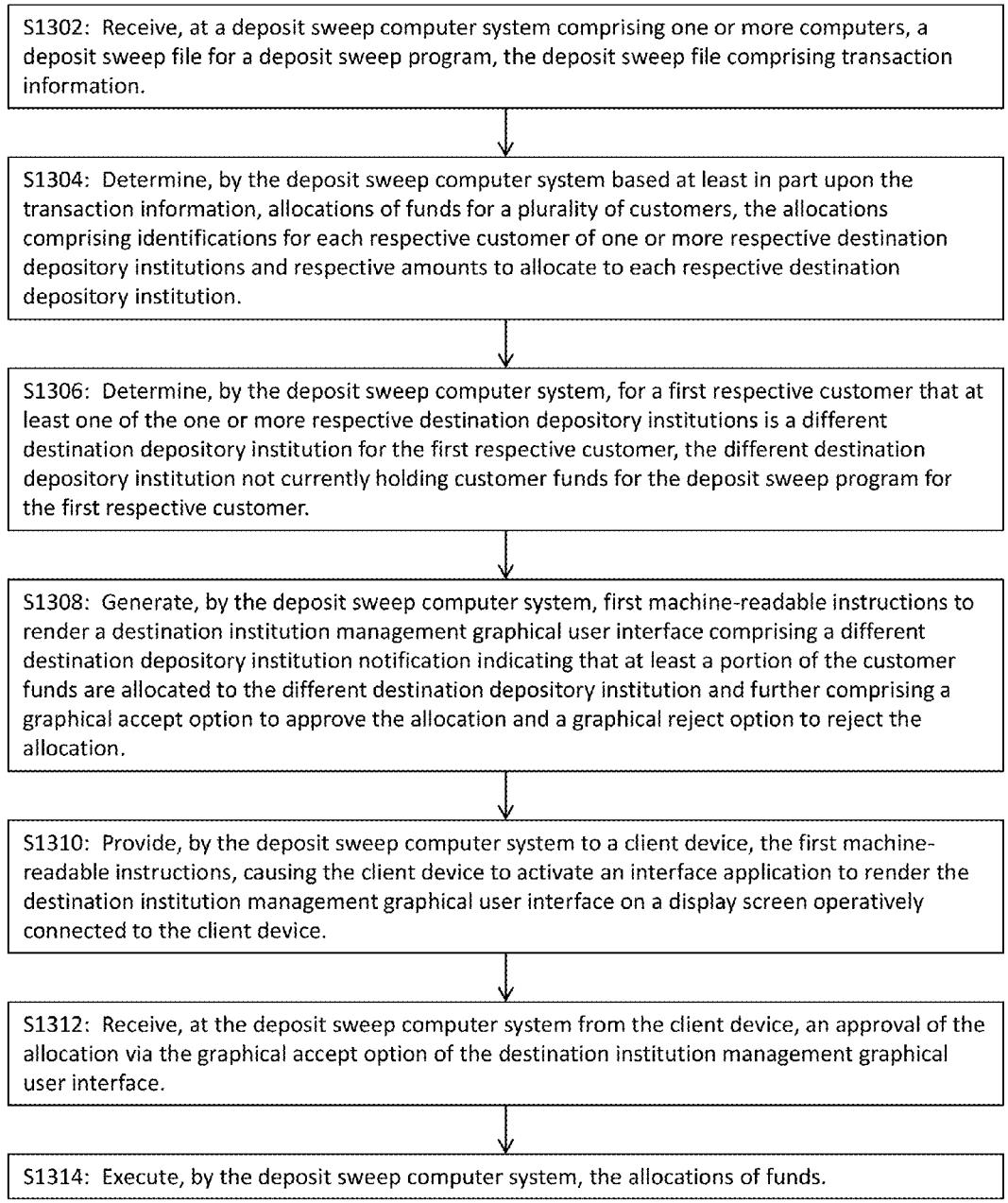

FIGS. 13A, 13-B-1-13-B-2, and 13-C-1-13-C-2 are flow charts illustrating various embodiments of methods for inserting remote customer control into automated cash sweep processes. The processes are illustrated with respect to deposit sweeps. In embodiments, similar processes may be implemented for other cash sweeps, which may involved destination institutions other than the depository institutions shown in the figures. The processes described therein utilize specially generated graphical user interfaces to provide deposit sweep customers with information regarding the depository institutions to which their funds are proposed to be allocated and/or transferred. The customers can approve the allocations or reject them. In embodiments, the customers, via the graphical user interfaces, may identify alternative depository institutions to which to allocate their funds and/or threshold amounts to transfer to particular depository institutions. Accordingly, the GUIs alter the technical operation of prior art deposit sweep processes, enabling new information and customer feedback mechanisms, which can alter the operation of the deposit sweep processes, such as allocations of funds.

FIG. 13A is a flow chart of a process for performing deposit sweep transactions comprising providing customer control in an automated deposit sweep transaction in accordance with exemplary embodiments of the present invention.

In a step S1302, a deposit sweep computer system comprising one or more computers may receive a deposit sweep file for a deposit sweep program. The deposit sweep file may comprise transaction information. In embodiments, transaction information can comprise indications of transactions, which can include buy amounts, sell amounts, net transaction amounts, transaction fee amounts, pre-transaction balances, and/or post-transaction balances, to name a few. In embodiments, the deposit sweep computer system may obtain one or more transaction amounts and may separately obtain one or more account balances. The system may compute post-transaction account balances therefrom.

In a step S1304, the deposit sweep computer system may determine, based at least in part upon the transaction information, allocations of funds for a plurality of customers. The allocations may comprise identifications for each respective customer of one or more respective destination depository institutions and respective amounts to allocate to each respective destination depository institution. In embodiments, executing the allocations may comprise updating one or more electronic ledgers. In embodiments, executing the allocations may comprise transferring the respective amounts from a first account to a second account.

In a step S1306, the deposit sweep computer system may determine for a first respective customer that at least one of the one or more respective destination depository institutions is a different destination depository institution for the first respective customer. The different destination depository institution may not currently hold customer funds for the deposit sweep program for the first respective customer. In embodiments, the deposit sweep computer system may analyze historical transaction and/or account data to determine that whether a destination depository institution previously held customer funds. Accordingly, the deposit sweep computer system may determine different destination depository institutions that never held funds for the first respective customer or that did not hold such funds within a threshold period of time (e.g., 2 months, 6 months, 1 year, 2 years, 5 years). In embodiments, the deposit sweep computer system may determine different destination depository institutions based at least in part upon a comparison to a previous sweep transaction, e.g., the last sweep transaction involving funds of the first respective customer. Any depository institution not included in the previous sweep transaction may be flagged as a different depository institution for the current sweep transaction.

In embodiments, the deposit sweep computer system may determine different destination depository institutions that do not currently hold any funds for the first respective customer, including funds outside the deposit sweep program, e.g., in non-program accounts. In embodiments, the deposit sweep computer system may use user credentials for the first respective customer to access account information and/or otherwise to determine whether any account exists for the first respective customer at the depository institution.

Accordingly, the deposit sweep computer system may determine that the different destination depository institution does not have an existing account for the first respective customer. The deposit sweep computer system may access a database of customer preferences to determine whether the customer has pre-approved or pre-rejected a particular depository institution.

In a step S1308, the deposit sweep computer system may generate first machine-readable instructions (e.g., mark-up code, style code, image data, text data, interaction processing code such as JavaScript, to name a few) to render a destination institution management graphical user interface. The interface may comprise a different destination depository institution notification indicating that at least a portion of the customer funds are allocated to the different destination depository institution. The interface may further comprise a graphical accept option to approve the allocation and/or a graphical reject option to reject the allocation.

In embodiments, the destination institution management graphical user interface may identify the source account. The interface may include an indication of the amount of funds allocated or targeted for allocation to the different destination depository institution for the first respective customer. The notification may indicate that the allocation will be performed absent selection of a reject option. In embodiments, the notification may indicate a time period within which a reject option must be submitted. The interface may indicate that the allocation will be performed within a predefined period of time absent selection of a reject option. In embodiments, the interface may comprise a transfer amount input element by which a user may input an amount of funds, which may be a maximum amount of funds, permitted to be transferred and/or allocated to the different destination depository institution. Exemplary destination institution management graphical user interfaces are shown in FIGS. 9A-C.

In embodiments, the interface may comprise a plurality of alternate depository institution selection options, e.g., prior to the computer system allocating funds to a particular one or more different depository institutions. A user of a client device may select one or more of the alternate depository institution selection options, and then the computer system may determine the allocation based at least in part on the selection. In embodiments, the interface may comprise respective transfer amount input elements, e.g., maximum transfer amount input elements, associated with each of the one or more alternate depository institution selection options. A user may input respective amounts of funds, e.g., maximum amounts of funds, permitted to be allocated to the respective alternate depository institutions.

In a step S1310, the deposit sweep computer system may provide to a client device the first machine-readable instructions, causing the client device to activate an interface application to render the destination institution management graphical user interface on a display screen (e.g., an embedded display screen and/or touch screen, an external display screen, a projector, to name a few) operatively connected to the client device.

In a step S1312, the deposit sweep computer system may receive from the client device an approval of the allocation via the graphical accept option of the destination institution management graphical user interface. In embodiments, approvals and/or rejections may be stored in one or more databases, e.g., for future access. Accordingly, the deposit sweep computer system may store in one or more databases comprising non-transitory computer-readable memory an indication of the approval of the allocation. The indication may comprise an identification of the different destination depository institution, which may comprise a database identifier.

In embodiments, the deposit sweep computer system may receive from the client device, along with the approval of the allocation, a transfer amount via a transfer amount input element of the destination institution management graphical user interface. The transfer amount may be a maximum permissible transfer amount specified by the user. The computer system may determine an updated allocation of funds based at least in part upon the transfer amount. The computer system may then executed the updated allocation of funds.

In a step S1314, the deposit sweep computer system may execute the allocations of funds. In embodiments, executing the allocations of funds may comprise one or more transfers of funds according to the determined allocations. In embodiments, executing the allocations of funds may comprise inserting and/or modifying electronic entries in one or more electronic ledgers, which may comprise one or more databases.

In embodiments, the process may be repeated for one or more other customers, such as a second respective customer. Accordingly, in embodiments the method may further comprise prior to executing the allocations of funds, determining, by the deposit sweep computer system, for a second respective customer that at least one of the one or more respective destination depository institutions is a respective different destination depository institution for the second respective customer, the respective different destination depository institution not currently holding customer funds for the deposit sweep program for the second respective customer; generating, by the deposit sweep computer system, second machine-readable instructions to render a respective destination institution management graphical user interface comprising a respective different destination depository institution notification indicating that at least a portion of the customer funds of the second respective customer are allocated to the respective different destination depository institution and further comprising a respective graphical accept option to approve the allocation and a respective graphical reject option to reject the allocation; providing, by the deposit sweep computer system to a second client device associated with the second respective customer, the second machine-readable instructions, causing the second client device to activate a respective interface application to render the respective destination institution management graphical user interface on a respective display screen operatively connected to the second client device; receiving, at the deposit sweep computer system from the second client device, a respective approval of the allocation via the respective graphical accept option of the respective destination institution management graphical user interface; and executing, by the deposit sweep computer system, the allocations of funds.

In embodiments, a system for performing a deposit sweep transaction with customer control can comprise one or more processors and non-transitory computer-readable memory having stored thereon instructions to perform the steps of receiving, at a deposit sweep computer system comprising one or more computers, a deposit sweep file for a deposit sweep program, the deposit sweep file comprising transaction information; determining, by the deposit sweep computer system based at least in part upon the transaction information, allocations of funds for a plurality of customers, the allocations comprising identifications for each respective customer of one or more respective destination depository institutions and respective amounts to allocate to each respective destination depository institution; determining, by the deposit sweep computer system, for a first respective customer that at least one of the one or more respective destination depository institutions is a different destination depository institution for the first respective customer, the different destination depository institution not currently holding customer funds for the deposit sweep program for the first respective customer; generating, by the deposit sweep computer system, first machine-readable instructions to render a destination institution management graphical user interface comprising a different destination depository institution notification indicating that at least a portion of the customer funds are allocated to the different destination depository institution and further comprising a graphical accept option to approve the allocation and a graphical reject option to reject the allocation; providing, by the deposit sweep computer system to a client device, the first machine-readable instructions, causing the client device to activate an interface application to render the destination institution management graphical user interface on a display screen operatively connected to the client device; receiving, at the deposit sweep computer system from the client device, an approval of the allocation via the graphical accept option of the destination institution management graphical user interface; and executing, by the deposit sweep computer system, the allocations of funds.

In embodiments, a client device, which may be a mobile device such as a mobile phone, may comprise one or more processors and non-transitory computer-readable memory having stored thereon computer-readable instructions to perform the steps of receiving, at client device associated with a first respective customer from a deposit sweep computer system, first machine-readable instructions to render a destination institution management graphical user interface comprising first display data comprising a different destination depository institution notification indicating that at least a portion of the customer funds are allocated to a different destination depository institution not currently holding funds of the first respective customer, the destination institution management graphical user interface further comprising a graphical accept option to approve the allocation of funds and a graphical reject option to reject the allocation; activating, by the client device an interface application to render the destination institution management graphical user interface on a display screen operatively connected to the client device; receiving, at the client device via an input device, a user selection of the graphical accept option; transmitting, from the client device to the deposit sweep computer system, an electronic approval of the allocation corresponding to the user selection of the graphical reject option; and receiving, at the client device, an electronic notification of an execution of the allocation of funds. In embodiments, the client device may include a dedicated application (e.g., a mobile app) configured to interact with the deposit sweep computer system. Such an application may be activated automatically upon receipt of data and/or instructions from a deposit sweep computer system or from a source institution or depository institution.

Figures 1, 13B:
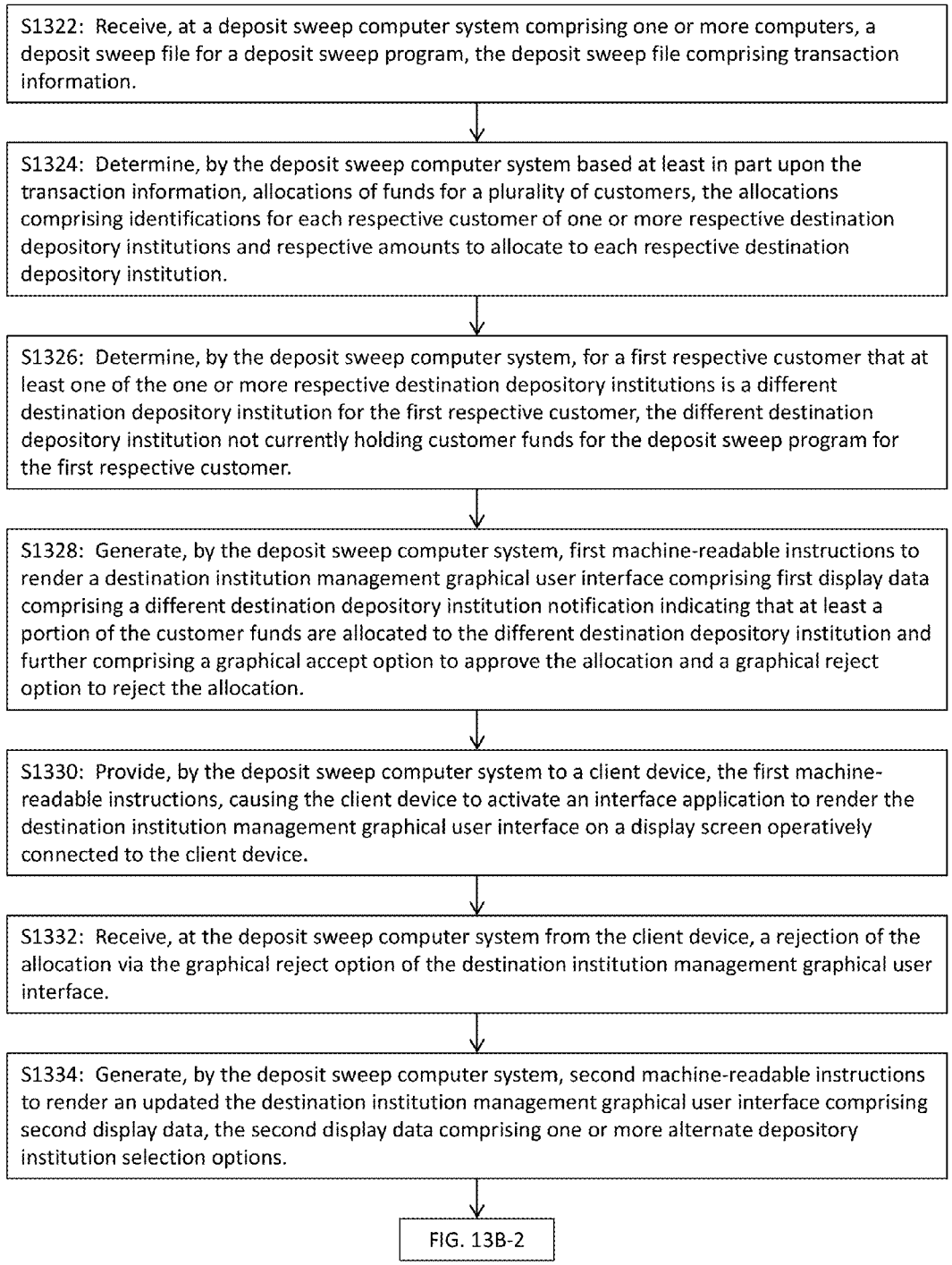

FIGS. 13B-1-13B-2 are flow charts of a process for performing deposit sweep transactions that comprises providing customer control in an automated deposit sweep transaction in accordance with exemplary embodiments of the present invention in which the customer rejects a proposed allocation of funds to a new depository institution.

In a step S1322, a deposit sweep computer system comprising one or more computers may receive a deposit sweep file for a deposit sweep program. The deposit sweep file may comprise transaction information (e.g., for pending and/or completed transactions, such as amounts transferred to respective accounts and/or amounts transferred from respective accounts) and/or account balance information.

In a step S1324, the deposit sweep computer system may determine, based at least in part upon the transaction information, allocations of funds for a plurality of customers. The allocations may comprise identifications for each respective customer of one or more respective destination depository institutions and respective amounts to allocate to each respective destination depository institution. In embodiments, the allocations may comprise identifications of source accounts, e.g., trading accounts, from which to transfer funds to the respective destination depository institutions.

In a step S1326, the deposit sweep computer system may determine for a first respective customer that at least one of the one or more respective destination depository institutions is a different destination depository institution for the first respective customer, as described herein. The different destination depository institution may not currently hold customer funds for the deposit sweep program for the first respective customer.

In a step S1328, the deposit sweep computer system may generate first machine-readable instructions to render a destination institution management graphical user interface. The interface may comprise first display data comprising a different destination depository institution notification indicating that at least a portion of the customer funds are allocated to the different destination depository institution. The different destination depository institution notification may comprise an indication of the amount of funds allocated to the different depository institution for the first respective customer. The interface may further comprise a graphical accept option to approve the allocation and/or a graphical reject option to reject the allocation. In embodiments, an accept option may not be provided, and approvals may be handled as the default option unless a reject option is selected.

In a step S1330, the deposit sweep computer system may provide to a client device associated with the first respective customer the first machine-readable instructions, causing the client device to activate an interface application to render the destination institution management graphical user interface on a display screen operatively connected to the client device. In embodiments, activating the interface application may comprise causing the interface application to receive the first machine-readable instructions and render the destination institution management graphical user interface. An interface application may be a dedicated application, such as a preinstalled application or a downloadable application, for deposit sweep management, account management, or other financial management. In embodiments, an interface application may be a web browser application configured to render graphical content, e.g., associated with one or more webpages.

In a step S1332, the deposit sweep computer system may receive from the client device a rejection of the allocation via the graphical reject option of the destination institution management graphical user interface. In embodiments, an indication of the rejection may be stored in one or more databases. Such an indication may comprise an identification of the different destination depository institution.

In a step S1334, the deposit sweep computer system may generate second machine-readable instructions to render an updated destination institution management graphical user interface comprising second display data. The second display data can comprise one or more alternate depository institution selection options. In embodiments, a GUI showing one or more depository institution options may be provided to a user prior to determining an allocation of funds and/or prior to receiving a rejection of a first proposed allocation. In embodiments, the updated destination institution management GUI may comprise respective transfer amount input elements associated with each of the one or more alternate depository institution selection options. A user may input, via such input elements, respective amounts of funds to allocate or maximum amounts of funds permitted to be allocated to the respective alternate depository institutions.

In a step S1336, the deposit sweep computer system may provide to the client device the second machine-readable instructions, causing the client device to render the updated destination institution management graphical user interface. In other embodiments, the second machine-readable instructions may be part of the first machine-readable instructions so that upon a user selection of a reject option the client device already has the data required to display the alternate depository institution selection options.

In a step S1338, the deposit sweep computer system may receive from the client device via the updated destination institution management graphical user interface a selection of at least one of the alternate depository institution selection options. In embodiments, selections of a plurality of permissible alternate depository institutions may be received. In embodiments, indications of such selections may be stored in one or more databases. Such indications can include identifications of the alternate depository institutions associated with the alternate depository institution selections.

In a step S1340, the deposit sweep computer system may determine an updated allocation of funds. The updated allocation of funds may be based at least in part upon the rejection of the first allocation and/or the selection of alternate depository institutions. The updated allocation of funds may also be based at least in part upon the initial allocation, relying upon the user's inputs to determine an updated allocation that satisfies the allocation criteria (e.g., moving a certain amount of funds out of a particular depository institution or to a particular depository institution) while satisfying the user's preferences. The computer system may allocate a portion of funds of the first respective customer to the at least one selected alternate depository institution. In embodiments, the allocation and notification process may be repeated if the reallocation results in additional different destination depository institutions for other customers.

In a step S1342, the deposit sweep computer system may execute the updated allocations of funds. In embodiments, executing the updated allocations can comprise creating and/or modifying electronic ledger entries. In embodiments, executing the updated allocations can comprise performing transfers of funds, e.g., by transmitting transaction instructions such as ACH instructions to one or more institutions.

In embodiments, the process may be repeated for one or more other customers, such as a second respective customer.

In embodiments, a system for performing a deposit sweep transaction with customer control can comprise one or more processors and non-transitory computer-readable memory having stored thereon instructions to perform the steps of receiving, at a deposit sweep computer system comprising one or more computers, a deposit sweep file for a deposit sweep program, the deposit sweep file comprising transaction information; determining, by the deposit sweep computer system based at least in part upon the transaction information, allocations of funds for a plurality of customers, the allocations comprising identifications for each respective customer of one or more respective destination depository institutions and respective amounts to allocate to each respective destination depository institution; determining, by the deposit sweep computer system, for a first respective customer that at least one of the one or more respective destination depository institutions is a different destination depository institution for the first respective customer, the different destination depository institution not currently holding customer funds for the deposit sweep program for the first respective customer; generating, by the deposit sweep computer system, first machine-readable instructions to render a destination institution management graphical user interface comprising first display data comprising a different destination depository institution notification indicating that at least a portion of the customer funds are allocated to the different destination depository institution and further comprising a graphical accept option to approve the allocation and a graphical reject option to reject the allocation; providing, by the deposit sweep computer system to a client device, the first machine-readable instructions, causing the client device to activate an interface application to render the destination institution management graphical user interface on a display screen operatively connected to the client device; receiving, at the deposit sweep computer system from the client device, a rejection of the allocation via the graphical reject option of the destination institution management graphical user interface; generating, by the deposit sweep computer system, second machine-readable instructions to render an updated destination institution management graphical user interface comprising second display data, the second display data comprising one or more alternate depository institution selection options; providing, by the deposit sweep computer system to the client device, the second machine-readable instructions, causing the client device to render the updated destination institution management graphical user interface; receiving, at the deposit sweep computer system from the client device via the updated destination institution management graphical user interface, an alternate depository institution selection comprising a selection of at least one of the alternate depository institution selection options; determining, by the deposit sweep computer system, an updated allocation of funds based at least in part upon the alternate depository institution selection; and executing, by the deposit sweep computer system, the updated allocations of funds.

In embodiments, a client device, which may be a mobile device such as a mobile phone, may comprise one or more processors and non-transitory computer-readable memory having stored thereon computer-readable instructions to perform the steps of receiving, at client device associated with a first respective customer from a deposit sweep computer system, first machine-readable instructions to render a destination institution management graphical user interface comprising first display data comprising a different destination depository institution notification indicating that at least a portion of the customer funds are allocated to a different destination depository institution not currently holding funds of the first respective customer, the destination institution management graphical user interface further comprising a graphical accept option to approve the allocation and a graphical reject option to reject the allocation; activating, by the client device an interface application to render the destination institution management graphical user interface on a display screen operatively connected to the client device; receiving, at the client device via an input device, a user selection of the graphical reject option; transmitting, from the client device to the deposit sweep computer system, an electronic rejection of the allocation corresponding to the user selection of the graphical reject option; receiving, at the client device from the deposit sweep computer system, second machine-readable instructions to render an updated destination institution management graphical user interface comprising second display data, the second display data comprising one or more alternate depository institution selection options; rendering, by the client device the updated destination institution management graphical user interface on the display screen; receiving, at the client device via an input device, an alternate depository institution selection comprising a user selection of at least one of the alternate depository institution selection options; transmitting, from the client device to the deposit sweep computer system, the alternate depository institution selection; receiving, at the client device, an electronic notification of an updated allocation of funds, wherein the allocation does not allocate funds to the different destination depository institution and wherein the allocation allocates funds to an alternate depository institution associated with the alternate depository institution selection. In embodiments, the client device may include a dedicated application (e.g., a mobile app) configured to interact with the deposit sweep computer system. Such an application may be activated automatically upon receipt of data and/or instructions from a deposit sweep computer system or from a source institution or depository institution.

Figures 1, 13C:
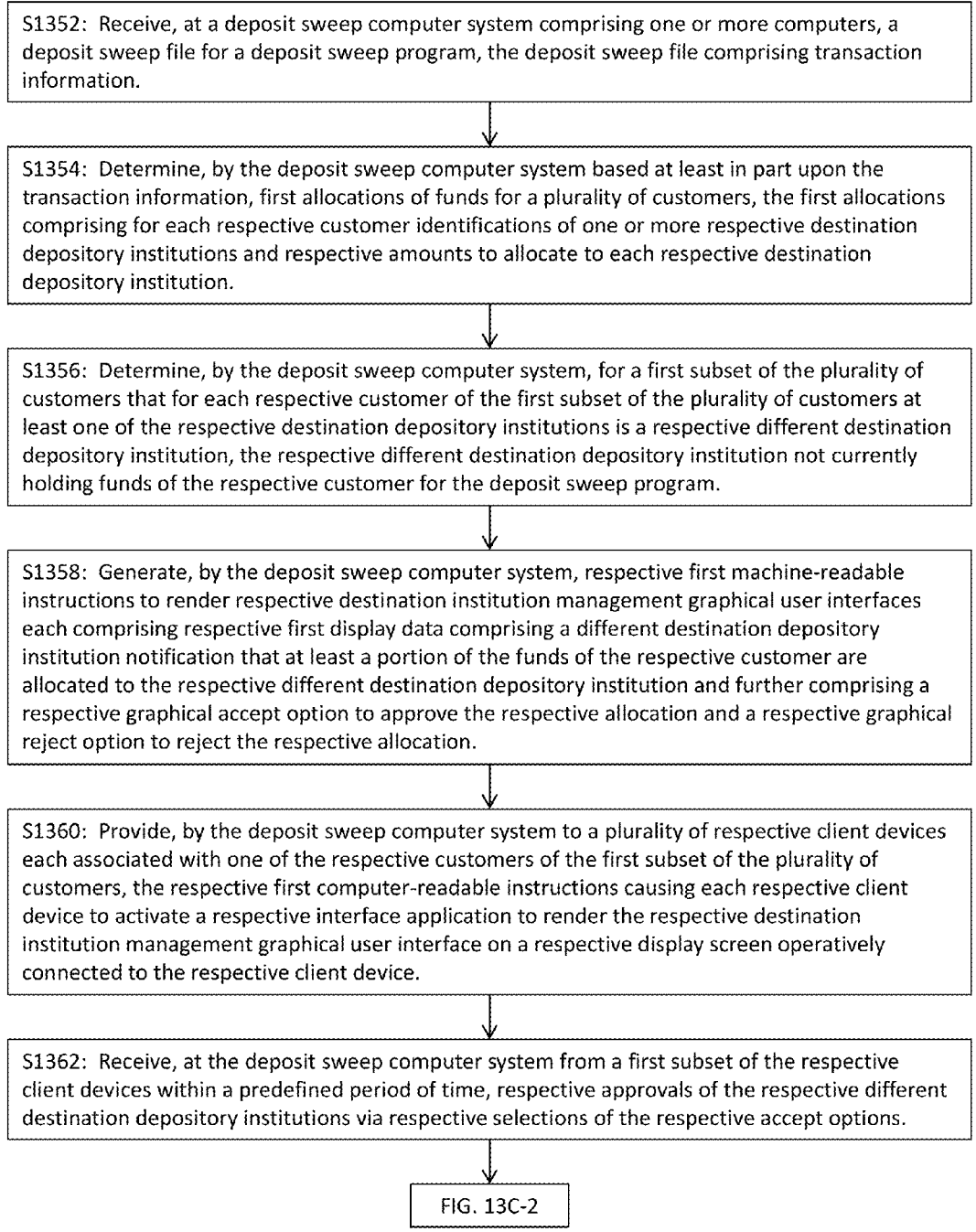

FIGS. 13C-1-13C-2 are flow charts of a process for performing deposit sweep transactions comprising providing customer control in automated deposit sweep transactions in accordance with exemplary embodiments of the present invention in which a plurality of customers provide input as to destination depository institutions.

In a step S1352, a deposit sweep computer system comprising one or more computers may receive a deposit sweep file for a deposit sweep program, the deposit sweep file comprising transaction information.

In a step S1354, the deposit sweep computer system may determine, based at least in part upon the transaction information, first allocations of funds for a plurality of customers. The first allocations may comprise for each respective customer at least identifications of one or more respective destination depository institutions and respective amounts to allocate to each respective destination depository institution.

In a step S1356, the deposit sweep computer system may determine for a first subset of the plurality of customers that for each respective customer of the first subset of the plurality of customers at least one of the respective destination depository institutions is a respective different destination depository institution. Such a respective different destination depository institution may not currently hold customer funds for the respective customer for the deposit sweep program. In embodiments, the different destination depository institution may be determined based at least in part upon other criteria, such as whether the institution holds any customer funds and/or historical holding of funds for the customer.

In a step S1358, the deposit sweep computer system may generate respective first machine-readable instructions to render respective destination institution management graphical user interfaces. Each interface may comprise respective first display data, which in turn may comprise a different destination depository institution notification indicating that at least a portion of the funds of the respective customer are allocated to the respective different destination depository institution. The interface may further comprise a respective graphical accept option to approve the respective allocation and a respective graphical reject option to reject the respective allocation.

In a step S1360, the deposit sweep computer system may provide to a plurality of respective client devices each associated with one of the respective customers of the first subset of the plurality of customers the respective first computer-readable instructions, causing each respective client device to activate a respective interface application to render the respective destination institution management graphical user interface on a respective display screen operatively connected to the respective client device. In embodiments, the respective first machine-readable instructions may be provided to a plurality of client devices associated with a particular customer.

In a step S1362, the deposit sweep computer system may receive from a first subset of the respective client devices within a predefined period of time (e.g., 5 minutes, 15 minutes, 1 hour, 1 day, to name a few), respective approvals of the respective different destination depository institutions via respective selections of the respective accept options.

In a step S1364, the deposit sweep computer system may receive from a second subset of the respective client devices within the predefined period of time, respective rejections of the respective different destination depository institutions via respective selections of the respective reject options. In embodiments, non-responses may be treated as approvals. In embodiments, the respective rejections may comprise respective selections of one or more alternate destination depository institutions. The respective reject options may comprise respective alternate destination depository institution selection options.

In embodiments, the deposit sweep computer system may determine a third subset of the respective client devices comprising those of the plurality of respective client devices not included in the first subset or the second subset of the respective client devices. Accordingly, the third subset of the respective client devices is comprised of those client devices that did not respond (e.g., accept or reject the respective first allocation) within the predefined period of time. In embodiments, the third subset may comprise a subset of deposit sweep customers for whom responses were not received, e.g., from their respective client devices. The deposit sweep computer system may handle non-responses as approvals. Accordingly, the deposit sweep computer system may determine and/or assign respective approvals of the respective different destination depository institutions for each respective client device of the third subset of the respective client devices. In embodiments, such default approvals for the non-responsive customers may be temporary approvals for the first allocation, and subsequent allocations to the respective different destination depository institutions may re-trigger this different destination depository institution notification process.

In embodiments, a selection of an accept option, a reject option, and/or one or more alternate depository institution selection options that is received after the predefined period of time may be stored for use with future deposit sweep allocations of funds. However, the current deposit sweep transaction may be performed using the respective first allocation of funds.

In a step S1366, the deposit sweep computer system may determine second allocations of funds for the plurality of customers, the second allocations based at least in part upon the transaction information, the first allocations, and the respective rejections. The second allocations of funds may not include allocations of funds for the plurality of customers to the respective different destination depository institutions associated with the respective rejections.

In embodiments, the deposit sweep computer system may generate for each of the second subset of the respective client devices, respective second machine-readable instructions to render respective updated destination institution management graphical user interfaces each comprising respective second display data comprising one or more respective alternate depository institution selection options. The deposit sweep computer system may provide the respective second machine-readable instructions to the second subset of the respective client devices, which may cause each respective client device to render the respective updated destination institution management graphical user interface. The deposit sweep computer system may receive from one or more of the second subset of the respective client devices, e.g., via the respective updated destination institution management graphical user interfaces, respective alternate depository institution selections comprising respective selections of at least one of the respective alternate depository institution selection options. Accordingly, second allocations of funds for the plurality of customers may be based at least in part upon the transaction information, the first allocations, and the respective alternate depository institution selections.

In a step S1368, the deposit sweep computer system may execute the second allocations of funds. In embodiments, executing the second allocations of funds may comprise updating an electronic ledger, such as by creating or updating electronic ledger entries. In embodiments, executing the second allocations of funds may comprise performing or initiating a plurality of transfers of funds according to the second allocations of funds.

In embodiments, a system for performing a deposit sweep transaction with customer control can comprise one or more processors and non-transitory computer-readable memory having stored thereon instructions to perform the steps of receiving, at a deposit sweep computer system comprising one or more computers, a deposit sweep file for a deposit sweep program, the deposit sweep file comprising transaction information; determining, by the deposit sweep computer system based at least in part upon the transaction information, first allocations of funds for a plurality of customers, the first allocations comprising for each respective customer identifications of one or more respective destination depository institutions and respective amounts to allocate to each respective destination depository institution; determining, by the deposit sweep computer system, for a first subset of the plurality of customers that for each respective customer of the first subset of the plurality of customers at least one of the respective destination depository institutions is a respective different destination depository institution, the respective different destination depository institution not currently holding funds of the respective customer for the deposit sweep program; generating, by the deposit sweep computer system, respective first machine-readable instructions to render respective destination institution management graphical user interfaces each comprising respective first display data comprising a different destination depository institution notification indicating that at least a portion of the funds of the respective customer are allocated to the respective different destination depository institution and further comprising a respective graphical accept option to approve the respective allocation and a respective graphical reject option to reject the respective allocation; providing, by the deposit sweep computer system to a plurality of respective client devices each associated with one of the respective customers of the first subset of the plurality of customers, the respective first computer-readable instructions causing each respective client device to activate a respective interface application to render the respective destination institution management graphical user interface on a respective display screen operatively connected to the respective client device; receiving, at the deposit sweep computer system from a first subset of the respective client devices within a predefined period of time, respective approvals of the respective different destination depository institutions via respective selections of the respective accept options; receiving, at the deposit sweep computer system from a second subset of the respective client devices within the predefined period of time, respective rejections of the respective different destination depository institutions via respective selections of the respective reject options; determining, by the deposit sweep computer system, second allocations of funds for the plurality of customers, the second allocations based at least in part upon the transaction information, the first allocations, and the respective rejections; and executing, by the deposit sweep computer system, the second allocations of funds.

The systems, methods, and program products described herein with respect to deposit sweep transactions and associated destination depository institutions may also apply to other cash sweep transactions and their associated destination institutions. For example, in embodiments a system for performing a cash sweep transaction with customer control can comprise one or more processors and non-transitory computer-readable memory having stored thereon instructions to perform the steps of receiving, at a cash sweep computer system comprising one or more computers, a cash sweep file for a cash sweep program, the cash sweep file comprising transaction information; determining, by the cash sweep computer system based at least in part upon the transaction information, first allocations of funds for a plurality of customers, the first allocations comprising for each respective customer identifications of one or more respective destination institutions (e.g., ETF providers, brokers-dealers associated with one or more ETF or money fund, capital investment plan institutions, to name a few) and respective amounts to allocate to each respective destination institution; determining, by the cash sweep computer system, for a first subset of the plurality of customers that for each respective customer of the first subset of the plurality of customers at least one of the respective destination institutions is a respective different destination institution, the respective different destination institution not currently holding funds of the respective customer for the cash sweep program; generating, by the cash sweep computer system, respective first machine-readable instructions to render respective destination institution management graphical user interfaces each comprising respective first display data comprising a different destination institution notification indicating that at least a portion of the funds of the respective customer are allocated to the respective different destination institution and further comprising a respective graphical accept option to approve the respective allocation and a respective graphical reject option to reject the respective allocation; providing, by the cash sweep computer system to a plurality of respective client devices each associated with one of the respective customers of the first subset of the plurality of customers, the respective first computer-readable instructions causing each respective client device to activate a respective interface application to render the respective destination institution management graphical user interface on a respective display screen operatively connected to the respective client device; receiving, at the cash sweep computer system from a first subset of the respective client devices within a predefined period of time, respective approvals of the respective different destination institutions via respective selections of the respective accept options; receiving, at the cash sweep computer system from a second subset of the respective client devices within the predefined period of time, respective rejections of the respective different destination institutions via respective selections of the respective reject options; determining, by the cash sweep computer system, second allocations of funds for the plurality of customers, the second allocations based at least in part upon the transaction information, the first allocations, and the respective rejections; and executing, by the cash sweep computer system, the second allocations of funds.

The following non-limiting embodiments are provided as examples consistent with the invention. Note that these examples may be implemented in method format, system format and/or non-transitory computer-readable medium format.

In embodiments, a method example may comprise: accessing, by one or more intermediary computers, one or more databases holding transaction rules, and client authentication data for a source institution computer of a source institution and client authentication data for one or more destination institution computers of one or more destination institutions: to obtain source account balance information for the source account of the client held in the source institution, and source transaction data for the source account; to obtain destination account balance data for one or more client destination accounts held in one or more destination institutions, wherein the one or more intermediary computers are not affiliated with the source institution holding the source account or with the one or more destination institutions holding the one or more destination accounts of the client; determining, by the one by the one or more intermediary computers, if the source institution computer and/or the destination institution computer and/or a clearing firm computer of a clearing firm has an active sweep program; setting, by the one by the one or more intermediary computers, an election to deactivate use of the active sweep program when it has been determined that such sweep program is active; periodically or aperiodically directly obtaining, by the one by the one or more intermediary computers via one or more networks, the source account balance information for the source account without requiring the client's computer or the source institution computer and/or a clearing firm computer to initiate a request for access to the information; periodically or aperiodically directly obtaining, by the one by the one or more intermediary computers via one or more networks, the destination account balance information for the one or more destination accounts without requiring the client's computer or the one or more destination institution computers and/or a clearing firm computer to initiate a request for access to the information; periodically or aperiodically directly obtaining, by the one by the one or more intermediary computers via one or more networks, the source transaction data comprising one or more buy orders and/or sell orders for the source account without requiring the client's computer or the source institution computer and/or a clearing firm computer to initiate a request for access to the transaction data; transforming data, based at least in part on information in the transaction data, to determine, by the one or more intermediary computers, that the source transaction data for the source account represents a net buy order with a net buy amount; transforming data, based at least in part on the source account balance information for the source account, to determine, by the one or more intermediary computers, that a source account balance for the source account does not equal or exceed the net buy amount for the net buy order, and determining a deficiency amount; generating and directly instructing, by the one or more intermediary computers and the one or more networks, to make a fund transfer from at least one of the one or more destination accounts of at least the deficiency amount to the source account, via access to one or more servers of the one or more destination institutions using the client authentication data without requiring the client's computer or the source institution computer or the destination institution computer and/or the clearing firm computer to initiate a request for transfer; and generating and sending electronic notice, by the one or more intermediary computers and the one or more networks, of the transfer.

In embodiments, a system example may comprise: one or more intermediary computers configured: to access, by one or more intermediary computers, one or more databases holding transaction rules, and client authentication data for a source institution computer of a source institution and client authentication data for one or more destination institution computers of one or more destination institutions: to obtain source account balance information for the source account of the client held in the source institution, and source transaction data for the source account; to obtain destination account balance data for one or more client destination accounts held in one or more destination institutions, wherein the one or more intermediary computers are not affiliated with the source institution holding the source account or with the one or more destination institutions holding the one or more destination accounts of the client; to determine, by the one or more intermediary computers, if the source institution computer and/or the destination institution computer and/or a clearing firm computer of a clearing firm has an active sweep program; to set, by the one or more intermediary computers, an election to deactivate use of the active sweep program when it has been determined that such sweep program is active; to directly obtain periodically or aperiodically, by the one or more intermediary computers via one or more networks, the source account balance information for the source account without requiring the client's computer or the source institution computer and/or a clearing firm computer to initiate a request for access to the information; to directly obtain periodically or aperiodically, by the one by the one or more intermediary computers via one or more networks, the destination account balance information for the one or more destination accounts without requiring the client's computer or the one or more destination institution computers and/or a clearing firm computer to initiate a request for access to the information; to directly obtain periodically or aperiodically, by the one by the one or more intermediary computers via one or more networks, the source transaction data comprising one or more buy orders and/or sell orders for the source account without requiring the client's computer or the source institution computer and/or a clearing firm computer to initiate a request for access to the transaction data; to transform data, by the one or more intermediary computers, based at least in part on information in the transaction data, to determine whether the source transaction data for the source account represents a net buy order with a net buy amount; to transform data, by the one or more intermediary computers, based at least in part on the source account balance information for the source account, to determine whether a source account balance for the source account does not equal or exceed the net buy amount for the net buy order, and determining a deficiency amount, when the source transaction data is a net buy order; to generate and directly instruct, by the one or more intermediary computers and the one or more networks, to make a fund transfer from at least one of the one or more destination accounts of at least the deficiency amount to the source account, via access to one or more servers of the one or more destination institutions using the client authentication data without requiring the client's computer or the source institution computer or the destination institution computer and/or the clearing firm computer to initiate a request for transfer; and to generate and send electronic notice, by the one or more intermediary computers and the one or more networks, of the transfer.

In embodiments, a method example may comprise: accessing, by one or more intermediary computers, one or more databases holding transaction rules, and client authentication data for a source institution computer of a source institution and client authentication data for one or more destination institution computers of one or more destination institutions: to obtain source account balance information for the source account of the client held in the source institution, and source transaction data for the source account; to obtain destination account balance data for one or more client destination accounts held in one or more destination institutions, wherein the one or more intermediary computers are not affiliated with the source institution holding the source account or with the one or more destination institutions holding the one or more destination accounts of the client; periodically or aperiodically obtaining, by the one by the one or more intermediary computers via one or more networks, the source account balance information for the source account, while bypassing one or more automatic fund transfer programs of the source institution computer and/or a clearing firm computer of a clearing firm and without requiring the client's computer or the source institution computer and/or a clearing firm computer to initiate a request for access to the information; periodically or aperiodically obtaining, by the one by the one or more intermediary computers via the one or more networks, the destination account balance information for the one or more destination accounts, while bypassing one or more automatic fund transfer programs of the one or more destination institution computers and/or the clearing firm computer and-without requiring the client's computer or the one or more destination institution computers and/or a clearing firm computer to initiate a request for access to the information; periodically or aperiodically obtaining, by the one by the one or more intermediary computers via the one or more networks, the source transaction data comprising one or more buy orders and/or sell orders for the source account, while bypassing the one or more automatic fund transfer programs of the source institution computer and/or the clearing firm computer and without requiring the client's computer or the source institution computer and/or a clearing firm computer to initiate a request for access to the transaction data; transforming data, by the one by the one or more intermediary computers, based at least in part on information in the transaction data, to determine, by the one or more intermediary computers, that the source transaction data for the source account represents a net buy order with a net buy amount; transforming data, by the one by the one or more intermediary computers, based at least in part on the source account balance information for the source account, to determine that a source account balance for the source account does not equal or exceed the net buy amount for the net buy order, and determining a deficiency amount; generating and sending for execution electronic transaction instructions, by the one or more intermediary computers and the one or more networks, for a transfer from at least one of the one or more destination accounts of at least the deficiency amount to the source account, via access to one or more servers of the one or more destination institutions using the client authentication data, while bypassing the one or more automatic fund transfer programs of the source and/or destination institution computers and/or the clearing firm computer and without requiring the client's computer or the source institution computer or the destination institution computer and/or the clearing firm computer to initiate a request for transfer; and generating and sending electronic notice, by the one or more intermediary computers and the one or more networks, of the transfer.

In embodiments of a method or system example the one or more intermediary computers may comprise a client computer, wherein the one or more databases comprise computer storage on the client computer that holds the client authentication data for the source institution computer and the client authentication data for the one or more destination institution computers, and wherein the accessing the client authentication data for the source institution computer and the client authentication data for the one or more destination institution computers is triggered only by authentication of the client by matching a predetermined security program.

In embodiments, a method or system example may comprise: triggering an association, by the one or more computers, of an insurance contract to insure against unauthorized transfers from the source account or the one or more destination accounts, when the predetermined security program is used for a transfer of funds.

In embodiments, a method or system example may comprise activating a limited authorization for only transfers between client accounts associated with the source institution computers and the destination institution computers and no other transfers.

In embodiments, a method or system example may comprise: triggering an association, by the one or more computers, of an insurance contract to insure against unauthorized transfers from the source account or the one or more destination accounts, to a fund transfer when the limited authorization for fund transfers is activated.

In embodiments, a method or system example may comprise determining when the source account balance information for the source account exceeds a threshold amount set in the transaction rules; and generating and sending for execution electronic transaction instructions, by the one or more intermediary computers and the one or more networks, to transfer funds from the source account to at least one of the one or more destination accounts.

In embodiments, a method or system example may comprise generating and sending an electronic notification, by the one or more intermediary computers and the one or more networks, when the deficiency amount is greater than the destination account balance data for the one or more destination accounts.

In embodiments of a method or system example the obtaining the source transaction data, and/or the source account balance information, and/or the destination account balance information for the one or more destination accounts, may comprise receiving an automatically pushed file via the one or more networks.

In embodiments of a method or system example, the obtaining the source transaction data, and/or the source account balance information, and/or the destination account balance information for the one or more destination accounts, may comprise retrieving the source transaction data and/or the source account balance information and/or the destination account balance information, via access to a server of the source institution and/or via access to the one or more servers of the one or more destination institutions, using the client authentication data.

In embodiments of a method or system example there may be a plurality of the destination accounts.

In embodiments of a method or system example there may be a plurality of the destination accounts, and the method may further comprise: sending or making accessible automatically, by the one or more computers and via the one or more networks, destination balance information to the client for each of the destination account when the source transaction data is received or obtained.

In embodiments of a method or system example there may be a plurality of the destination accounts, and the method may further comprise: selecting one of the destination accounts from which to transfer funds, by the one or more intermediary computers, based at least in part upon one or more criteria may comprise at least one selected from the group of a client preference, minimizing a number of transfers necessary to cover the deficiency amount, and selecting one of the destination accounts which has client funds in the account that exceed an FDIC insurance limit.

In embodiments of a method or system example the electronic instructions may be ACH instructions.

In embodiments of a method or system example, when transaction data is obtained that represents a net buy order, the generating and sending or make accessible the one or more electronic instructions to transfer to the cover the deficiency amount may operate within a predetermined time period after a time associated with the source transaction data, so that the one or more buy orders are not defaulted.

In embodiments, a method or system example may comprise: maintaining, by the one or more intermediary computers, the one or more databases with the client authentication data.

In embodiments, a system example may comprise: one or more intermediary computers configured: to access, by one or more intermediary computers, one or more databases holding transaction rules, and client authentication data for a source institution computer of a source institution and client authentication data for one or more destination institution computers of one or more destination institutions: to obtain source account balance information for the source account of the client held in the source institution, and source transaction data for the source account; to obtain destination account balance data for one or more client destination accounts held in one or more destination institutions, wherein the one or more intermediary computers are not affiliated with the source institution holding the source account or with the one or more destination institutions holding the one or more destination accounts of the client; to obtain periodically or aperiodically, by the one by the one or more intermediary computers via one or more networks, the source account balance information for the source account, while bypassing one or more automatic fund transfer programs of the source institution computer and/or a clearing firm computer of a clearing firm and without requiring the client's computer or the source institution computer and/or a clearing firm computer to initiate a request for access to the information; to obtain periodically or aperiodically, by the one by the one or more intermediary computers via the one or more networks, the destination account balance information for the one or more destination accounts, while bypassing one or more automatic fund transfer programs of the one or more destination institution computers and/or the clearing firm computer and-without requiring the client's computer or the one or more destination institution computers and/or a clearing firm computer to initiate a request for access to the information; to obtain periodically or aperiodically, by the one by the one or more intermediary computers via the one or more networks, the source transaction data comprising one or more buy orders and/or sell orders for the source account, while bypassing the one or more automatic fund transfer programs of the source institution computer and/or the clearing firm computer and without requiring the client's computer or the source institution computer and/or a clearing firm computer to initiate a request for access to the transaction data; to transform data, by the one by the one or more intermediary computers, based at least in part on information in the transaction data, to determine whether the source transaction data for the source account represents a net buy order with a net buy amount; to transform data, by the one by the one or more intermediary computers, based at least in part on the source account balance information for the source account, to determine whether a source account balance for the source account does not equal or exceed the net buy amount for the net buy order, and determining a deficiency amount, when the source transaction data is a net buy order; to generate and send for execution electronic transaction instructions, by the one or more intermediary computers and the one or more networks, for a transfer from at least one of the one or more destination accounts of at least the deficiency amount to the source account, via access to one or more servers of the one or more destination institutions using the client authentication data, while bypassing the one or more automatic fund transfer programs of the source and/or destination institution computers and/or the clearing firm computer and without requiring the client's computer or the source institution computer or the destination institution computer and/or the clearing firm computer to initiate a request for transfer; and to generate and send electronic notice, by the one or more intermediary computers and the one or more networks, of the transfer.

In embodiments, a non-transitory computer-readable medium may comprise computer-readable program instructions, that when executed by one or more computers, configure the one or more computers: to access, by one or more intermediary computers, one or more databases holding transaction rules, and client authentication data for a source institution computer of a source institution and client authentication data for one or more destination institution computers of one or more destination institutions: to obtain source account balance information for the source account of the client held in the source institution, and source transaction data for the source account; to obtain destination account balance data for one or more client destination accounts held in one or more destination institutions, wherein the one or more intermediary computers are not affiliated with the source institution holding the source account or with the one or more destination institutions holding the one or more destination accounts of the client; to obtain periodically or aperiodically, by the one by the one or more intermediary computers via one or more networks, the source account balance information for the source account, while bypassing one or more automatic fund transfer programs of the source institution computer and/or a clearing firm computer of a clearing firm and without requiring the client's computer or the source institution computer and/or a clearing firm computer to initiate a request for access to the information; to obtain periodically or aperiodically, by the one by the one or more intermediary computers via the one or more networks, the destination account balance information for the one or more destination accounts, while bypassing one or more automatic fund transfer programs of the one or more destination institution computers and/or the clearing firm computer and-without requiring the client's computer or the one or more destination institution computers and/or a clearing firm computer to initiate a request for access to the information; to obtain periodically or aperiodically, by the one by the one or more intermediary computers via the one or more networks, the source transaction data comprising one or more buy orders and/or sell orders for the source account, while bypassing the one or more automatic fund transfer programs of the source institution computer and/or the clearing firm computer and without requiring the client's computer or the source institution computer and/or a clearing firm computer to initiate a request for access to the transaction data; to transform data, by the one by the one or more intermediary computers, based at least in part on information in the transaction data, to determine whether the source transaction data for the source account represents a net buy order with a net buy amount; to transform data, by the one by the one or more intermediary computers, based at least in part on the source account balance information for the source account, to determine whether a source account balance for the source account does not equal or exceed the net buy amount for the net buy order, and determining a deficiency amount, when the source transaction data is a net buy order; to generate and send for execution electronic transaction instructions, by the one or more intermediary computers and the one or more networks, for a transfer from at least one of the one or more destination accounts of at least the deficiency amount to the source account, via access to one or more servers of the one or more destination institutions using the client authentication data, while bypassing the one or more automatic fund transfer programs of the source and/or destination institution computers and/or the clearing firm computer and without requiring the client's computer or the source institution computer or the destination institution computer and/or the clearing firm computer to initiate a request for transfer; and to generate and send electronic notice, by the one or more intermediary computers and the one or more networks, of the transfer.

The TMS system 120 may comprise, in embodiments, a computing platform for performing, controlling, and/or initiating computer-implemented operations, for example, via a server and the one or more networks. The computer platform may comprise one or more system computers and other party computers comprising one or more processors. An exemplary system may operate under the control of computer-executable instructions to carry out the process steps described herein. Computer-executable instructions comprise, for example, instructions and data which configure a general or special purpose computer system or processing device to perform a certain function or group of functions. Computer software for the system may comprise, in embodiments, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

Information stored in or maintained in the one or more databases may be provided in conformance with a database system format such as, but not limited to, the Structured Query Language (SQL) format. Database query and access instructions, for example, in the form of one or more scripts, may be used which, when executed by a processor, serve to access, store and retrieve data maintained in the one or more databases according to the instructions contained in the script.

The system may comprise application software instructions which may implement a user interface portion for generating interactive pages or display screens by which a user/participant may provide data to and receive information from the system and the database using a human-machine interface. In embodiments, interactive pages may include user dialog boxes for accepting user entered information. The human-machine interface may comprise a Graphical User Interface (GUI) portion for prompting the user to enter data by providing an interactive dialog box or message box instructing the user to enter particular data, or to select from among a multitude of options provided using a pull-down menu. In embodiments, a user may interact with the system via the graphical user interface by using a pointing device and/or other data entry device. The GUI portion may place the output of the system in a format for presentation to a user via the display. In embodiments, the GUI may be implemented as a sequence of Java instructions.

In embodiments of the present invention, the various program operations as described herein may be provided by the system in response to the one or more processors executing one or more sequences of computer-readable instructions contained in main memory. Such instructions may be read into main memory from another non-transitory computer-readable medium. Execution of the sequences of instructions contained in main memory may cause one or more processors of the system to perform the process steps described herein. It should be appreciated that embodiments of the system may perform fewer or additional processes as compared to those described herein. As noted, the one or more processors may be arranged in a multi-processing arrangement. In embodiments, hard-wired circuitry may be used in place of or in combination with software instructions to implement the invention. Thus, embodiments of the invention are not limited to any specific combination of hardware circuitry and software.

Computer-readable medium or computer-readable storage medium may refer to any medium that is computer-readable and participates in storing and providing instructions to the processor for execution. Such a medium may be removable or non-removable and may be non-volatile media and non-transitory media. Non-volatile media include, for example, optical or magnetic disks, such as the storage device. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other tangible medium from which a computer can read computer instructions. Combinations of the above are also included within the scope of machine-readable media. Machine-executable instructions comprise, for example, instructions and data which cause a general purpose computer, special purpose computer, or a special purpose processing machine to perform a certain function or group of functions.

In embodiments, the communication system of the TMS 120 may comprise a communication interface that may be communicatively coupled to a web server configured to generate and output web content that is suitable for display using a web browser at a computing device. In embodiments, the server may generate and transmit requested information through the communication interface to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from clients' terminals, access and process data from various sources, and output computer-executable instructions and data using the network. Interactive pages transmitted and received using the network may conform to necessary protocols.

In embodiments, the web server may correspond to a secure web application server behind a web server program that a service provider employs to run one or more web based application programs in a secure fashion. Such a secure web application server may be configured to execute one or more web based application programs, respond to commands and data received from the clients (via a web page supported by the web server), and provide data and results to the clients. The web server and the web application server may be implemented using a single computing platform. Alternatively, it may also be implemented using multiple separate and distributed computing platforms.

As noted above, embodiments of the present invention may be practiced in a networked environment using logical connections to one or more remote computers having processors. Logical connections may include a local area network (LAN) and a wide area network (WAN) that are presented here by way of example and not limitation. Such networked environments are in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Embodiments of the invention have been described in the general context of method steps which may be implemented in embodiments by a program product comprising machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based at least in part upon Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

It should be noted that although the flow charts provided herein and the claims show a specific order of method steps, it is understood that the order of these steps may differ from what is depicted and is not limiting on the invention. Also two or more steps may be performed concurrently or with partial concurrence. Such variation will depend on the software and hardware systems chosen and on designer choice. It is understood that all such variations are within the scope of the invention. Likewise, software and web implementations of the present invention may be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations.

All components, modes of communication, and/or processes described heretofore are interchangeable and combinable with similar components, modes of communication, and/or processes disclosed elsewhere in the specification, unless an express indication is made to the contrary. It is intended that any structure or step of an embodiments disclosed herein may be combined with other structure and or method embodiments to form further embodiments with this added element or step.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed:

1. A method of performing a deposit sweep transaction, comprising:
   (a) receiving, at a deposit sweep computer system comprising one or more computers, a deposit sweep file for a deposit sweep program, the deposit sweep file comprising transaction information;
   (b) determining, by the deposit sweep computer system based at least in part upon the transaction information, first allocations of funds for a plurality of customers, the first allocations comprising for each respective customer identifications of a plurality of respective destination depository institutions and respective amounts to allocate to each respective destination depository institution;

(c) determining, by the deposit sweep computer system, for each of a first subset of the plurality of customers a plurality of respective different destination depository institutions, the respective different destination depository institutions not currently holding funds of the each respective customer for the deposit sweep program;

(d) generating, by the deposit sweep computer system, respective first machine readable instructions to render respective destination institution management graphical user interfaces each comprising respective first display data comprising a different destination depository institution notification indicating that at least a portion of the funds of the each respective customer are allocated to at least one of the respective different destination depository institutions and further comprising a respective graphical accept option to approve the respective allocation and a respective graphical reject option to reject the respective allocation;

(e) providing, by the deposit sweep computer system to a plurality of respective client devices each associated with one of the respective customers of the first subset of the plurality of customers, the respective first computer-readable instructions causing each respective client device to activate a respective interface application to render the respective destination institution management graphical user interface on a respective display screen operatively connected to the respective client device;

(f) receiving, at the deposit sweep computer system from a first subset of the respective client devices within a predefined period of time, respective approvals of the respective different destination depository institutions via respective selections of the respective accept options;

(g) receiving, at the deposit sweep computer system from a second subset of the respective client devices within the predefined period of time, respective rejections of the respective different destination depository institutions via respective selections of the respective reject options;

(h) determining, by the deposit sweep computer system, second allocations of funds for the plurality of customers, the second allocations based at least in part upon the transaction information, the first allocations, and the respective rejections; and (i) executing, by the deposit sweep computer system, the second allocations of funds.

2. The method of claim 1, further comprising, prior to determining the second allocations of funds:
(j) determining, by the deposit sweep computer system, a third subset of the respective client devices comprising those of the plurality of respective client devices not included in the first subset or the second subset of the respective client devices; and
(k) determining, by the deposit sweep computer system, respective approvals of the respective different destination depository institutions for each of the third subset of the respective client devices.

3. The method of claim 1, wherein at least one of the respective rejections comprises a selection of one or more alternate depository institutions.

4. The method of claim 1, wherein executing the second allocations of funds comprises updating an electronic ledger.

5. The method of claim 1, further comprising, prior to determining the second allocations of funds:
(j) generating, by the deposit sweep computer system for each of the second subset of the respective client devices, respective second machine-readable instructions to render respective updated destination institution management graphical user interfaces each comprising respective second display data comprising one or more respective alternate depository institution selection options;
(k) providing, by the deposit sweep computer system to the second subset of the respective client devices, the respective second machine-readable instructions, causing each respective client device to render the respective updated destination institution management graphical user interface; and
(l) receiving, at the deposit sweep computer system from one or more of the second subset of the respective client devices via the respective updated destination institution management graphical user interfaces, respective alternate depository institution selections comprising respective selections of at least one of the respective alternate depository institution selection options;
wherein determining, by the deposit sweep computer system, second allocations of funds for the plurality of customers comprises determining the second allocations based at least in part upon the transaction information, the first allocations, and the respective alternate depository institution selections.

6. The method of claim 5, wherein the one or more respective alternate depository institution selection options are generated based on the plurality of respective different destination depository institutions.

7. The method of claim 1, wherein the second allocations of funds do not include allocations of funds for the plurality of customers to the respective different destination depository institutions associated with the respective rejections.

8. The method of claim 1, wherein the transaction information comprises debits, credits, and/or balance information associated with a client account, and/or net credits, net debits information associated with a client account.

9. The method of claim 1, wherein the determining step (c) further comprises determining that the plurality of respective different destination depository institutions do not hold customer funds in non-program accounts.

10. The method of claim 1, wherein the different destination depository institution notification comprises an indication of the amount of funds to be allocated to the at least one of the plurality of respective different destination depository institutions.

11. The method of claim 1, wherein the respective destination institution management graphical user interfaces each comprise a transfer amount input element by which a user may input a maximum amount of funds permitted to be allocated to the at least one of the plurality of respective different destination depository institutions.

12. The method of claim 1, further comprising:
(j) storing, by the deposit sweep computer system in one or more databases comprising non-transitory computer-readable memory, an indication of each respective approval of the respective different destination depository institutions, the indication comprising an identification of the respective different destination depository institution that corresponds to the each respective client approval.

13. A deposit sweep computer system, comprising:
one or more processor devices; and
one or more memory devices coupled to the one or more processor devices, the one or more memory devices storing computer program instructions for causing, when executed, the one or more processor devices to perform:
(a) receiving, at a deposit sweep computer system, a deposit sweep file for a deposit sweep program, the deposit sweep file comprising transaction information;
(b) determining, by the deposit sweep computer system based at least in part upon the transaction information, first allocations of funds for a plurality of customers, the first allocations comprising for each respective customer identifications of a plurality of respective destination depository institutions and respective amounts to allocate to each respective destination depository institution;
(c) determining, by the deposit sweep computer system, for each of a first subset of the plurality of customers a plurality of respective different destination depository institutions, the respective different destination depository institutions not currently holding funds of the each respective customer for the deposit sweep program;
(d) generating, by the deposit sweep computer system, respective first machine readable instructions to render respective destination institution management graphical user interfaces each comprising respective first display data comprising a different destination depository institution notification indicating that at least a portion of the funds of the each respective customer are allocated to at least one of the respective different destination depository institutions and further comprising a respective graphical accept option to approve the respective allocation and a respective graphical reject option to reject the respective allocation;
(e) providing, by the deposit sweep computer system to a plurality of respective client devices each associated with one of the respective customers of the first subset of the plurality of customers, the respective first computer-readable instructions causing each respective client device to activate a respective interface application to render the respective destination institution management graphical user interface on a respective display screen operatively connected to the respective client device;
(f) receiving, at the deposit sweep computer system from a first subset of the respective client devices within a predefined period of time, respective approvals of the respective different destination depository institutions via respective selections of the respective accept options;
(g) receiving, at the deposit sweep computer system from a second subset of the respective client devices within the predefined period of time, respective rejections of the respective different destination depository institutions via respective selections of the respective reject options;
(h) determining, by the deposit sweep computer system, second allocations of funds for the plurality of customers, the second allocations based at least in part upon the transaction information, the first allocations, and the respective rejections; and
(i) executing, by the deposit sweep computer system, the second allocations of funds.

14. The deposit sweep computer system of claim 13, wherein the one or more memory devices store additional instructions to further perform, prior to determining the second allocations of funds:
(j) determining, by the deposit sweep computer system, a third subset of the respective client devices comprising those of the plurality of respective client devices not included in the first subset or the second subset of the respective client devices; and
(k) determining, by the deposit sweep computer system, respective approvals of the respective different destination depository institutions for each of the third subset of the respective client devices.

15. The deposit sweep computer system of claim 13, wherein at least one of the respective rejections comprises a selection of one or more alternate depository institutions.

16. The deposit sweep computer system of claim 13, wherein executing the second allocations of funds comprises updating an electronic ledger.

17. The deposit sweep computer system of claim 13, wherein the one or more memory devices store additional instructions to further perform, prior to determining the second allocations of funds:
(j) generating, by the deposit sweep computer system for each of the second subset of the respective client devices, respective second machine-readable instructions to render respective updated destination institution management graphical user interfaces each comprising respective second display data comprising one or more respective alternate depository institution selection options;
(k) providing, by the deposit sweep computer system to the second subset of the respective client devices, the respective second machine-readable instructions, causing each respective client device to render the respective updated destination institution management graphical user interface; and
(l) receiving, at the deposit sweep computer system from one or more of the second subset of the respective client devices via the respective updated destination institution management graphical user interfaces, respective alternate depository institution selections comprising respective selections of at least one of the respective alternate depository institution selection options;
wherein determining, by the deposit sweep computer system, second allocations of funds for the plurality of customers comprises determining the second allocations based at least in part upon the transaction information, the first allocations, and the respective alternate depository institution selections.

18. The deposit sweep computer system of claim 17, wherein the one or more respective alternate depository institution selection options are generated based on the plurality of respective different destination depository institutions.

19. The deposit sweep computer system of claim 13, wherein the second allocations of funds do not include allocations of funds for the plurality of customers to the respective different destination depository institutions associated with the respective rejections.

20. The deposit sweep computer system of claim 13, wherein the transaction information comprises debits, credits, and/or balance information associated with a client account, and/or net credits, net debits information associated with a client account.

21. The deposit sweep computer system of claim 13, wherein the determining step (c) further comprises determining that the plurality of respective different destination depository institutions do not hold customer funds in non-program accounts.

22. The deposit sweep computer system of claim 13, wherein the different destination depository institution notification comprises an indication of the amount of funds to be allocated to the at least one of the plurality of respective different destination depository institutions.

23. The deposit sweep computer system of claim 13, wherein the respective destination institution management graphical user interfaces each comprise a transfer amount input element by which a user may input a maximum amount of funds permitted to be allocated to the at least one of the plurality of respective different destination depository institutions.

24. The deposit sweep computer system of claim 13, wherein the one or more memory devices store additional instructions to further perform:
   (j) storing, by the deposit sweep computer system in one or more databases comprising non-transitory computer-readable memory, an indication of each respective approval of the respective different destination depository institutions, the indication comprising an identification of the respective different destination depository institution that corresponds to the each respective client approval.

\* \* \* \* \*